(12) United States Patent
Huang et al.

(10) Patent No.: US 12,460,000 B2
(45) Date of Patent: Nov. 4, 2025

(54) ANTI-CD19 AND ANTI-CD3 BISPECIFIC ANTIGEN BINDING PROTEINS AND USES THEREOF

(71) Applicant: ITabMed (HK) Limited, Hong Kong (CN)

(72) Inventors: Zhihua Huang, Shanghai (CN); Yiqun Rao, Shanghai (CN); Wuzhong Shen, Shanghai (CN); Yumin Cui, Shanghai (CN); Xiaoqiang Yan, Shanghai (CN)

(73) Assignee: ITabMed (HK) Limited, Hong Kong (CN)

( * ) Notice: Subject to any disclaimer, the term of this patent is extended or adjusted under 35 U.S.C. 154(b) by 1256 days.

(21) Appl. No.: 17/273,955

(22) PCT Filed: Sep. 6, 2019

(86) PCT No.: PCT/CN2019/104680
§ 371 (c)(1),
(2) Date: Mar. 5, 2021

(87) PCT Pub. No.: WO2020/048525
PCT Pub. Date: Mar. 12, 2020

(65) Prior Publication Data
US 2021/0301018 A1    Sep. 30, 2021

(30) Foreign Application Priority Data

Sep. 7, 2018 (CN) .......................... 201811041588.X

(51) Int. Cl.
*C07K 16/28* (2006.01)
*A61K 39/00* (2006.01)
*A61P 35/00* (2006.01)

(52) U.S. Cl.
CPC .......... *C07K 16/2809* (2013.01); *A61P 35/00* (2018.01); *A61K 2039/505* (2013.01); *C07K 2317/31* (2013.01); *C07K 2317/522* (2013.01); *C07K 2317/55* (2013.01); *C07K 2317/56* (2013.01); *C07K 2317/622* (2013.01); *C07K 2317/73* (2013.01); *C07K 2317/92* (2013.01)

(58) Field of Classification Search
CPC ............ C07K 16/2809; C07K 2317/31; C07K 2317/522; C07K 2317/55; C07K 2317/56; C07K 2317/622; C07K 2317/73; C07K 2317/92; C07K 16/28; C07K 16/2803; A61P 35/00; A61K 2039/505
See application file for complete search history.

(56) References Cited

U.S. PATENT DOCUMENTS

| | | |
|---|---|---|
| 4,237,224 A | 12/1980 | Cohen et al. |
| 4,485,045 A | 11/1984 | Regen |
| 4,544,545 A | 10/1985 | Ryan et al. |
| 4,676,980 A | 6/1987 | Segal et al. |
| 4,683,195 A | 7/1987 | Mullis et al. |
| 4,683,202 A | 7/1987 | Mullis |
| 4,751,180 A | 6/1988 | Cousens et al. |
| 4,816,567 A | 3/1989 | Cabilly et al. |
| 4,935,233 A | 6/1990 | Bell et al. |
| 4,946,778 A | 8/1990 | Ladner et al. |
| 5,013,556 A | 5/1991 | Woodle et al. |
| 5,030,719 A | 7/1991 | Umemoto et al. |
| 5,151,510 A | 9/1992 | Stec et al. |
| 5,283,173 A | 2/1994 | Fields et al. |
| 5,468,614 A | 11/1995 | Fields et al. |
| 5,530,101 A | 6/1996 | Queen et al. |
| 5,545,806 A | 8/1996 | Lonberg et al. |
| 5,545,807 A | 8/1996 | Surani et al. |
| 5,569,825 A | 10/1996 | Lonberg et al. |
| 5,585,089 A | 12/1996 | Queen et al. |
| 5,591,669 A | 1/1997 | Krimpenfort et al. |
| 5,612,205 A | 3/1997 | Kay et al. |
| 5,625,126 A | 4/1997 | Lonberg et al. |
| 5,625,825 A | 4/1997 | Rostoker et al. |
| 5,633,425 A | 5/1997 | Lonberg et al. |
| 5,643,763 A | 7/1997 | Dunn et al. |
| 5,661,016 A | 8/1997 | Lonberg et al. |
| 5,693,761 A | 12/1997 | Queen et al. |
| 5,693,792 A | 12/1997 | Torii et al. |
| 5,703,057 A | 12/1997 | Johnston et al. |
| 5,714,350 A | 2/1998 | Co et al. |
| 5,721,367 A | 2/1998 | Kay et al. |
| 5,733,743 A | 3/1998 | Johnson et al. |
| 5,736,137 A | 4/1998 | Anderson et al. |
| 5,770,429 A | 6/1998 | Lonberg et al. |

(Continued)

FOREIGN PATENT DOCUMENTS

| | | |
|---|---|---|
| CN | 101687915 A | 3/2010 |
| CN | 103842383 A | 6/2014 |

(Continued)

OTHER PUBLICATIONS

U.S. Appl. No. 17/417,480, filed Dec. 14, 2021, No matching document found.*
Kuhn et al.—Therapeutic anti-CD3 monoclonal antibodies: from bench to bedside. Immunotherapy, 8, 889-906, 2016. (Year: 2016).*
Herrera et al.—Investigational antibody-drug conjugates for treatment of B-lineage malignancies. Clin. Lymph. Myel. and Leukem. 18, 452-468, 2018. (Year: 2018).*

(Continued)

*Primary Examiner* — Elly-Gerald Stoica
(74) *Attorney, Agent, or Firm* — MORRISON & FOERSTER LLP

(57) ABSTRACT

The present invention provides bispecific antigen binding proteins (BSAPs) that specifically bind to CD3 and a tumor antigen (e.g., CD19). The present invention also provides uses of the BSAPs for the preparation of pharmaceutical compositions, methods of treating cancer, and kits comprising the BSAPs.

20 Claims, 7 Drawing Sheets

Specification includes a Sequence Listing.

(56) References Cited

U.S. PATENT DOCUMENTS

| | | | |
|---|---|---|---|
| 5,777,085 A | 7/1998 | Co et al. | |
| 5,789,215 A | 8/1998 | Berns et al. | |
| 5,789,650 A | 8/1998 | Lonberg et al. | |
| 5,814,318 A | 9/1998 | Lonberg et al. | |
| 5,837,458 A | 11/1998 | Minshull et al. | |
| 5,874,299 A | 2/1999 | Lonberg et al. | |
| 5,877,397 A | 3/1999 | Lonberg et al. | |
| 5,939,598 A | 8/1999 | Kucherlapati et al. | |
| 5,959,083 A | 9/1999 | Bosslet et al. | |
| 6,005,079 A | 12/1999 | Casterman et al. | |
| 6,023,010 A | 2/2000 | Krimpenfort et al. | |
| 6,075,181 A | 6/2000 | Kucherlapati et al. | |
| 6,114,598 A | 9/2000 | Kucherlapati et al. | |
| 6,150,584 A | 11/2000 | Kucherlapati et al. | |
| 6,162,963 A | 12/2000 | Kucherlapati et al. | |
| 6,255,458 B1 | 7/2001 | Lonberg et al. | |
| 6,291,158 B1 | 9/2001 | Winter et al. | |
| 6,291,161 B1 | 9/2001 | Lerner et al. | |
| 6,410,319 B1 | 6/2002 | Raubitschek et al. | |
| 6,423,498 B1 | 7/2002 | Markland et al. | |
| 6,521,404 B1 | 2/2003 | Griffiths et al. | |
| 6,982,321 B2 | 1/2006 | Winter | |
| 7,087,409 B2 | 8/2006 | Barbas et al. | |
| 7,109,003 B2 | 9/2006 | Hanson et al. | |
| 7,115,717 B2 | 10/2006 | Mori et al. | |
| 7,288,251 B2 | 10/2007 | Bedian et al. | |
| 7,387,776 B2 | 6/2008 | Keler et al. | |
| 7,429,644 B2 | 9/2008 | Garber et al. | |
| 7,435,797 B2 | 10/2008 | Lowman et al. | |
| 7,446,191 B2 | 11/2008 | Jensen | |
| 7,462,352 B2 | 12/2008 | Hansen et al. | |
| 7,514,537 B2 | 4/2009 | Jensen | |
| 7,557,189 B2 | 7/2009 | Hoffee et al. | |
| 7,723,482 B2 | 5/2010 | Soulillou et al. | |
| 7,723,484 B2 | 5/2010 | Beidler et al. | |
| 7,846,440 B2 | 12/2010 | Schoeberl et al. | |
| 8,101,179 B2 | 1/2012 | Numazaki et al. | |
| 8,709,421 B2 | 4/2014 | Heiss et al. | |
| 8,846,042 B2 | 9/2014 | Zhou | |
| 8,884,602 B2 | 11/2014 | Utsunomiya | |
| 9,718,893 B2 | 8/2017 | Jung | |
| 10,870,701 B2 * | 12/2020 | Cui | C07K 16/3046 |
| 11,013,800 B2 | 5/2021 | Zhou | |
| 11,304,975 B2 | 4/2022 | Galetto et al. | |
| 2002/0086014 A1 | 7/2002 | Korman et al. | |
| 2002/0142359 A1 | 10/2002 | Copley et al. | |
| 2003/0157054 A1 | 8/2003 | Gillies et al. | |
| 2005/0033029 A1 | 2/2005 | Lu | |
| 2005/0112694 A1 | 5/2005 | Carter et al. | |
| 2005/0118183 A1 | 6/2005 | Hoffee et al. | |
| 2005/0208043 A1 | 9/2005 | Adams et al. | |
| 2005/0232919 A1 | 10/2005 | Grasso et al. | |
| 2006/0165686 A1 | 7/2006 | Elson et al. | |
| 2006/0177896 A1 | 8/2006 | Mach et al. | |
| 2007/0059298 A1 | 3/2007 | Volkmann | |
| 2007/0065431 A1 | 3/2007 | Coia et al. | |
| 2007/0077246 A1 | 4/2007 | Koenig et al. | |
| 2007/0148718 A1 | 6/2007 | Medghalchi et al. | |
| 2007/0161783 A1 | 7/2007 | Barbosa et al. | |
| 2007/0274981 A1 | 11/2007 | Sun et al. | |
| 2007/0287170 A1 | 12/2007 | Davis et al. | |
| 2008/0044429 A1 | 2/2008 | Johnson et al. | |
| 2008/0260731 A1 | 10/2008 | Bernett et al. | |
| 2008/0286272 A1 | 11/2008 | Lackmann et al. | |
| 2009/0136485 A1 * | 5/2009 | Chu | C07K 16/2803 530/389.1 |
| 2009/0155275 A1 | 6/2009 | Wu et al. | |
| 2009/0191201 A1 | 7/2009 | Heiss et al. | |
| 2009/0202433 A1 | 8/2009 | Chang et al. | |
| 2009/0220501 A1 * | 9/2009 | Fey | C07K 16/2803 424/179.1 |
| 2009/0232810 A1 | 9/2009 | Kraus et al. | |
| 2009/0304710 A1 | 12/2009 | Park et al. | |
| 2009/0304716 A1 | 12/2009 | Reinhardt et al. | |
| 2010/0003253 A1 | 1/2010 | Laeremans et al. | |
| 2010/0003258 A1 | 1/2010 | Weng et al. | |
| 2010/0025177 A1 | 2/2010 | Fukushima et al. | |
| 2010/0065818 A1 | 3/2010 | Kim et al. | |
| 2010/0092491 A1 | 4/2010 | Anastasi et al. | |
| 2010/0150918 A1 | 6/2010 | Kufer et al. | |
| 2010/0183615 A1 | 7/2010 | Kufer et al. | |
| 2010/0189722 A1 | 7/2010 | Heider et al. | |
| 2010/0196364 A1 | 8/2010 | Kim et al. | |
| 2010/0226922 A1 | 9/2010 | Maetzel et al. | |
| 2010/0239582 A1 | 9/2010 | Humphreys et al. | |
| 2010/0310463 A1 | 12/2010 | Gunnarsson et al. | |
| 2011/0028696 A1 | 2/2011 | Cardarelli et al. | |
| 2011/0054151 A1 | 3/2011 | Lazar et al. | |
| 2011/0059090 A1 | 3/2011 | Revets et al. | |
| 2011/0064653 A1 | 3/2011 | Hansen et al. | |
| 2011/0123529 A1 | 5/2011 | Laeremans et al. | |
| 2012/0135110 A1 | 5/2012 | Chiba et al. | |
| 2012/0244161 A1 | 9/2012 | Zugmeier et al. | |
| 2012/0321626 A1 | 12/2012 | Zhou | |
| 2014/0288275 A1 * | 9/2014 | Moore | A61P 35/00 435/69.6 |
| 2015/0056206 A1 | 2/2015 | Zhou | |
| 2015/0086550 A1 | 3/2015 | Heiss et al. | |
| 2017/0174786 A1 | 6/2017 | Bacac et al. | |
| 2019/0092862 A1 | 3/2019 | Cui et al. | |
| 2019/0284279 A1 | 9/2019 | Kong et al. | |
| 2021/0070882 A1 | 3/2021 | Bacac et al. | |
| 2021/0393776 A1 | 12/2021 | Zhou et al. | |
| 2022/0064295 A1 | 3/2022 | Huang et al. | |

FOREIGN PATENT DOCUMENTS

| | | |
|---|---|---|
| CN | 104592391 A | 5/2015 |
| CN | 104788567 A | 7/2015 |
| CN | 105378068 A | 3/2016 |
| CN | 107184977 A | 9/2017 |
| CN | 107636015 A | 1/2018 |
| CN | 107660151 A | 2/2018 |
| CN | 107903324 A | 4/2018 |
| CN | 108026177 A | 5/2018 |
| CN | 108690138 A | 10/2018 |
| EP | 0183070 A2 | 6/1986 |
| EP | 0244234 A2 | 11/1987 |
| EP | 0402226 A1 | 12/1990 |
| EP | 0463151 B1 | 6/1996 |
| EP | 0773288 A2 | 5/1997 |
| EP | 0546073 B1 | 9/1997 |
| EP | 0843961 B1 | 1/2007 |
| JP | 3068180 B2 | 7/2000 |
| JP | 3068506 B2 | 7/2000 |
| JP | 3068507 B2 | 7/2000 |
| JP | 2008-539177 A | 11/2008 |
| JP | 2009-511521 A | 3/2009 |
| JP | 2009131284 A | 6/2009 |
| JP | 2009526770 A | 7/2009 |
| JP | 2010-524435 A | 7/2010 |
| JP | 2010523096 A | 7/2010 |
| JP | 2011-501671 A | 1/2011 |
| JP | 2014-519322 A | 8/2014 |
| JP | 2015502373 A | 1/2015 |
| JP | 6400470 B2 | 9/2018 |
| JP | 2018533929 A | 11/2018 |
| JP | 7229566 B2 | 2/2023 |
| WO | WO-1991/00360 A1 | 1/1991 |
| WO | WO-1991/10741 A1 | 7/1991 |
| WO | WO-1992/01047 A1 | 1/1992 |
| WO | WO-1992/03918 A1 | 3/1992 |
| WO | WO-1992/22645 A1 | 12/1992 |
| WO | WO-1992/22647 A1 | 12/1992 |
| WO | WO-1992/22670 A1 | 12/1992 |
| WO | WO-1993/08829 A1 | 5/1993 |
| WO | WO-1993/12227 A1 | 6/1993 |
| WO | WO-1994/00569 A1 | 1/1994 |
| WO | WO-1994/02602 A1 | 2/1994 |
| WO | WO-1994/04678 A1 | 3/1994 |
| WO | WO-1994/09131 A1 | 4/1994 |
| WO | WO-1994/11026 A2 | 5/1994 |
| WO | WO-1994/25585 A1 | 11/1994 |
| WO | WO-1994/25591 A1 | 11/1994 |

(56) References Cited

FOREIGN PATENT DOCUMENTS

| | | |
|---|---|---|
| WO | WO-1995/22618 A1 | 8/1995 |
| WO | WO-1996/14436 A1 | 5/1996 |
| WO | WO-1996/27011 A1 | 9/1996 |
| WO | WO-1996/33735 A1 | 10/1996 |
| WO | WO-1996/34096 A1 | 10/1996 |
| WO | WO-1996/34103 A1 | 10/1996 |
| WO | WO-1997/13852 A1 | 4/1997 |
| WO | WO-1998/24884 A1 | 6/1998 |
| WO | WO-1998/24893 A2 | 6/1998 |
| WO | WO-1999/37791 A1 | 7/1999 |
| WO | WO-2000/076310 A1 | 12/2000 |
| WO | WO-2002/077029 A2 | 10/2002 |
| WO | WO-2006/072620 A1 | 7/2006 |
| WO | WO-2006/095164 A1 | 9/2006 |
| WO | WO-2006/106959 A1 | 10/2006 |
| WO | WO-2006/114115 A1 | 11/2006 |
| WO | WO-2007/042261 A2 | 4/2007 |
| WO | WO-2007/065027 A2 | 6/2007 |
| WO | WO-2007/098934 A1 | 9/2007 |
| WO | WO-2008/024188 A2 | 2/2008 |
| WO | WO-2008/119566 A2 | 10/2008 |
| WO | WO-2008/119567 A2 | 10/2008 |
| WO | WO-2009/052081 A2 | 4/2009 |
| WO | WO-2009/068628 A1 | 6/2009 |
| WO | WO-2009/068630 A1 | 6/2009 |
| WO | WO-2009/149185 A2 | 12/2009 |
| WO | WO-2010/037836 A2 | 4/2010 |
| WO | WO-2010/037838 A2 | 4/2010 |
| WO | WO-2010/052014 A1 | 5/2010 |
| WO | WO-2010/069765 A1 | 6/2010 |
| WO | WO-2010/104949 A2 | 9/2010 |
| WO | WO-2010/145792 A1 | 12/2010 |
| WO | WO-2010/150918 A1 | 12/2010 |
| WO | 2011033105 A1 | 3/2011 |
| WO | WO-2011028683 A1 | 3/2011 |
| WO | WO-2011/079283 A1 | 6/2011 |
| WO | WO-2012158818 A2 * | 11/2012 ....... A61K 39/39558 |
| WO | WO-2014/012085 A2 | 1/2014 |
| WO | 2014110601 A1 | 7/2014 |
| WO | WO-2014167022 A1 * | 10/2014 ............. A61P 35/00 |
| WO | WO-2016/055593 A1 | 4/2016 |
| WO | WO-2016/142314 A1 | 9/2016 |
| WO | WO-2016/189014 A1 | 12/2016 |
| WO | WO-2017/055314 A1 | 4/2017 |
| WO | WO-2017/157305 A1 | 9/2017 |
| WO | WO-2018/188612 A1 | 10/2018 |
| WO | WO-2020/048525 A1 | 3/2020 |
| WO | WO-2020135335 A1 * | 7/2020 ............. A61P 35/00 |

OTHER PUBLICATIONS

Townsend et al., Significant differences in physicochemical properties of human immunoglobulin kappa and lambda CDR3 regions. Front. Immunol. 7, 2016. (Year: 2016).*

Janeway et al.—chapter 4 in Immunobiology: The Immune System in Health and Disease. 5th edition. New York: Garland Science; 2001. (Year: 2001).*

Rabia et al.—Understanding and overcoming trade-offs between antibody affinity, specificity, stability and solubility, Biochem. Eng. J. 137, 365-374, 2018. (Year: 2018).*

Adams, et al. (2006, e-pub. Mar. 6, 2006). "Avidity-Mediated Enhancement of In vivo Tumor Targeting By Single-Chain Fv Dimers," Clin. Cancer Res. 12:1599-1605.

Adams, R.L.P. (Jul. 1969). "The Effect of Endogenous Pools of Thymidylate on the Apparent Rate of DNA Synthesis," Exp. Cell Res. 56(1):55-58.

Alarcon, B. et al. (Apr. 1991). "The CD3-γ And CD3-δ Subunits of the T Cell Antigen Receptor can be Expressed Within Distinct Functional TCR/CD3 Complexes," EMBO J. 10(4):903-912.

Alt, M. et al. (1999). "Novel Tetravalent And Bispecific IgG-Like Antibody Molecules Combining Single-Chain Diabodies With The Immunoglobulin γ1 Fc or CH3 region," FEES Letters 454:90-94.

Altschul, S.F. et al. (1990). "Basic Local Alignment Search Tool," J. Mol. Biol. 215(3):403-410.

Altschul, S.F. et al. (1997). "Gapped BLAST and PSI-BLAST: A New Generation of Protein Database Search Programs," Nucl. Acids Res. 25(17):3389-3402.

Amann, M. et al. (Jan. 1, 2008) "Therapeutic Window Of MuS110, A Single-Chain Antibody Construct Bispecific For Murine EpCAM and Murine CD3." Cancer Res. 68(1):143-151, 10 pages.

Anasetti, C. et al. (Dec. 1990). "Induction of Specific Nonresponsiveness in Unprimed Human T Cells by Anti-CD3 Antibody and Alloantigen," J. Exp. Med. 172(6):1691-1700.

Baldrick, P. (Oct. 2000). "Pharmaceutical Excipient Development: The Need For Preclinical Guidance," Regul. Toxicol Phaimacol. 32(2):210-218.

Bargou, R. et al. (Aug. 15, 2008). "Tumor Regression In Cancer Patients By Very Low Doses Of A T Cell-Engaging Antibody," Science 321(5981):974-977. (English Abstract Only).

Baxevanis, C. N. (2008). "Antibody-Based Cancer Therapy," Expert Opinion On Drug Discovery 3(4):441-452.

Beiboer, S.H.W. et al. (2000). "Guided Selection of a Pan Carcinoma Specific Antibody Reveals Similar Binding Characteristics Yet Structural Divergence Between the Original Murine Antibody and its Human Equivalent," J. Mol. Biol. (2000) 296(3):833-849.

Bellone, S. et al (Jan. 2016). "Solitomab, an EpCAM/CD3 Bispecific Antibody Construct (BiTE), is Highly Active Against Primary Uterine Serous Papillary Carcinoma Cell Lines in Vitro", American Journal Of Obstetrics & Gynecology 214(1):99.e1-99.e8, 20 pages.

Bendig, M. M. (1995). "Humanization of Rodent Monoclonal Antibodies by CDR Grafting," Methods: A Companion to Methods in Enzymology 8:83-93.

Berger, C. et al. (Jan. 2008; e-pub. Dec. 3, 2007). "Adoptive Transfer of Effector CD8+ T Cells Derived From Central Memory Cells Establishes Persistent T Cell Memory in Primates," J. Clinical Investigation 118(1):294-305.

Beverley, P.C. et al. (Apr. 1981). "Distinctive Functional Characteristics of Human "T" Lymphocytes Defined by E Rosetting or a Monoclonal Anti-T Cell Antibody," Eur. J. Immunol. 11(4):329-334.

Biotecnol. "TribodyTM Technology," Located at <http://www.biotecnol.com/?tribody-technology>, last visited on Aug. 28, 2018, two pages.

Bird, R.E. et al. (Oct. 21, 1988). "Single-Chain Antigen-Binding Proteins," Science 242:423-426, 7 pages.

Bloom, L. et al. (Oct. 2009). "FN3: A New Protein Scaffold Reaches the Clinic," Drug Discovery Today 14(19-20):949-955.

Bobo, R.H. et al. (Mar. 15, 1994). "Convection-Enhanced Delivery of Macromolecules in the Brain," Proc. Natl. Acad. Sci. USA 91(6):2076-2080.

Boerner, P. et al. (Jul. 1, 1991). "Production of Antigen-Specific Human Monoclonal Antibodies From In Vitro-Primed Human Splenocytes," J. Immunol. 147(1):86-95.

Borden, P. et al. (Apr. 1, 1987). "Nucleotide Sequence of the cDNAs Encoding the Variable Region Heavy and Light Chains of a Myeloma Protein Specific for the Terminal Nonreducing End of Alpha(1→6)Dextran," PNAS 84(8):2440-2443.

Bottaro, D.P. et al. (1991). "Identification of the Hepatocyte Growth Factor Receptor as the c-met Proto-Oncogene Product," Science 251(4995):802-804.

Bradley, P. et al. (Sep. 16, 2005). "Toward High-Resolution De Novo Structure Prediction For Small Proteins," Science 309(5742):1868-1871, 5 pages.

Brennan, M. et al. (Jul. 5, 1985). "Preparation of Bispecific Antibodies by Chemical Recombination of Monoclonal Immunoglobulin $G_1$ Fragments," Science 229:81-83.

Brooks, B.R. et al. (1983). "CHARMM: A Program For Macromolecular Energy, Minimization, and Dynamics Calculations," J. Comput. Chem. 4(2):187-217.

Bruggemann, M. et al. (1993). "Designer Mice: The Production of Human Antibody Repertoires in Transgenic Animals," Year in Immunol. 7:33-40.

Burbaum, J.J. et al. (1990). "Understanding Structural Relationships of Proteins of Unsolved Three-Dimensional Structure," Proteins 7(2):99-111.

(56) References Cited

OTHER PUBLICATIONS

Calaycay, J. et al. (Oct. 5, 1985). "Primary Structure of a DNA- And Heparin-Binding Domain (Domain III) in Human Plasma Fibronectin," J. Biol. Chem. 260(22):12136-12141.
Caron, P.C. et al. (1992; e-pub. Oct. 1, 1992). "Engineered Humanized Dimeric Forms of IgG Are More Effective Antibodies," J. Exp Med. 176:1191-1195.
Carpenter et al. (Apr. 15, 2002). "A Humanized Non-FcR-binding anti-CD3 Antibody, Visilizumab, For Treatment Of Steroid-Refractory Acute Graft-Versus-Host Disease," Blood 99(5):2712-2719.
Carter, P. et al. (Feb. 1992). "High Level *Escherichia coli* Expression and Production of a Bivalent Humanized Antibody Fragment," BioTechnology 10:163-167.
Chames, et al. (Apr. 2009). "Bispecific Antibodies For Cancer Therapy: The Light At The End Of The Tunnel?" mAbs 1(6):539-547.
Chang, et al. (May 2002). "Molecular Advances in Pretargeting Radioimmunotherapy with Bispecific Antibodies[1]," Mol Cancer Ther. 1:553-563.
Charman, W.N. (2000, e-pub. Aug. 2000). "Lipids, Lipophilic Drugs, and Oral Drug Delivery—Some Emerging Concepts," Journal of Pharmaceutical Sciences 89(8):967-978.
Chatzigeorgiou, A. et al. (Dec. 2009, e-pub. Nov. 2009). "CD40/CD40L Signaling and Its Implication in Health and Disease," Biofactors. 35(6):474-483.
Chaudhary, V.K. et al. (Feb. 1990). "A Rapid Method of Cloning Functional Variable-Region Antibody Genes in *Escherichia coli* as Single-Chain Immunotoxins," Proc. Natl. Acad. Sci. U.S.A. 87(3):1066-1070.
Chetty, R. et al. (1994). "CD3: Structure, Function, and Role of Immunostaining in Clinical Practice," J Pathol. 173(4):303-307.
Chiswell, D.J. et al. (1992). "Phage Antibodies: Will New 'Coliclonal' Antibodies Replace Monoclonal Antibodies?," Trends in Biotechnology 10:80-84.
Chothia, C. et al. (1987). "Canonical Structures for the Hypervariable Regions of Immunoglobulins," J. Mol. Biol. 196(4):901-917, 18 pages.
Chothia, C. et al. (Dec. 21-28, 1989). "Conformations of Immunoglobulin Hypervariable Regions," Nature 342(6252):877-883.
Clackson, T. et al. (Aug. 15, 1991). "Making Antibody Fragments Using Phage Display Libraries," Nature 352(6336):624-628.
Coloma, M. J. et al. (Feb. 1997). "Design And Production Of Novel Tetravalent Bispecific Antibodies," Nat. Biotechnol. 15:159-163.
Conrad, M.L. et al. (2007; e-pub. Jul. 25, 2007). "TCR and CD3 Antibody Cross-Reactivity in 44 Species," Cytometry (Part A) 71A:925-933.
Cote, R.J. et al. (Apr. 1983). "Generation of Human Monoclonal Antibodies Reactive With Cellular Antigens," Proc Natl Acad Sci USA 80:2026-2030.
Cwirla, S.E. et al. (Aug. 1990). "Peptides on Phage: A Vast Library of Peptides for Identifying Ligands," PNAS USA 87:6378-6382.
Darke, P.L. et al. (Feb. 5, 1989). "Human Immunodeficiency Virus Protease. Bacterial Expression and Characterization of the Purified Aspartic Protease," J. Biol. Chem. 264(4):2307- 2312.
Davidson, B.L. et al. (Mar. 1993). "A Model System For in Vivo Gene Transfer into the Central Nervous System Using An Adenoviral Vector," Nature Genetics 3:219-223.
Davies, D.R. et al. (Jul. 1990). "Antibody-Antigen Complexes," Annual Rev. Biochem. 59:439-473.
Davis, J.H. et al. (2010, e-pub. Feb. 4, 2010). "SEEDbodies: Fusion Proteins Based On Strand-Exchange Engineered Domain (Seed) CH3 Heterodimers In An Fc Analogue Platform For Asymmetric Binders Or Immunofusions And Bispecific Antibodies," Protein Engineering, Design & Selection, 23(4):195-202.
Davis, L.H. et al. (Jun. 15, 1991). "Specific 33-Residue Repeat(s) Erythrocyte Ankyrin Associate with the Anion Exchanger," J. Biol. Chem. 266(17):11163-11169.

Dayhoff, M.O. et al. (1978). "A Model Of Evolutionary Change in Proteins," Chapter 22 in Atlas of Protein Sequence and Structure, National Biomedical Research Foundation, Washington DC, 5(3):345-352.
Demydenko, D. et al. (Jun. 2009) "Expression Of Galectin-1 In Malignant Tumors," Exp Oncol. 31(2):74-79.
Deyev, S.M. et al. (2008, e-pub. 2008). "Multivalency: The Hallmark Of Antibodies Used For Optimization Of Tumor Targeting By Design," BioEssays 30:904-918.
Dietz, H. et al. (Jan. 31, 2006). "Protein Structure by Mechanical Triangulation," Proc. Nat. Acad. Sci. USA 103(5):1244-1247.
Dodson, E.J. (Nov. 7-8, 2007). "Computational Biology: Protein Predictions," Nature 450:176-177.
Donate, L.E. et al. (Dec. 1994). "Molecular Evolution and Domain Structure of Plasminogen-related Growth Factors (HGF/SF and HGF1/MSP)," Prat. Sci. 3(12):2378-2394.
Dong, J. et al. (Feb. 11, 2011). "Stable IgG-like Bispecific Antibodies Directed Toward the Type I Insulin-like Growth Factor Receptor Demonstrate Enhanced Ligand Blockade and Anti-tumor Activity," Journal of Biological Chemistry, 286(6):4703-4717.
Ehrlich, P.H. et al. (1980). "Isolation of an Active Heavy-Chain Variable Domain From a Homogeneous Rabbit Antibody by Cathepsin B Digestion of the Aminoethylated Heavy Chain," Biochem 19(17):4091-4096.
Eisenfield, J. et al. (1991; e-published on Aug. 1991). "Constrained Optimization and Protein Structure Determination," Am. J. Physiol. 261:C376-386.
Eppstein, D.A. et al. (Jun. 1985). "Biological Activity of Liposome-Encapsulated Murine Interferon γ Is Mediated by a Cell Membrane Receptor," Proc. Natl. Acad. Sci. USA 82:3688-3692.
Fellouse, F.A. et al. (Aug. 24, 2004). "Synthetic Antibodies from a Four-Amino-Acid Code: A Dominant Role for Tyrosine in Antigen Recognition," PNAS 101(34):12467-12472.
Fishwild, D.M. et al. (Jul. 1996). "High-Avidity Human IgGκ Monoclonal Antibodies from a Novel Strain of Minilocus Transgenic Mice," Nature Biotechnology 14:845-851.
Flaherty, D. K. (2012) Chapter 10 "Antibody Diversity, Immunology for Pharmacy" in Immunology for Pharmacy. St. Louis, Mo.: Elsevier, 12 pages.
Froimowitz, M. (Jun. 1, 1990). "The Development of Computer Simulations of the Geometries and Thermodynamics of Biological Molecules," Biotechniques 8(6):640-644.
Geller, A.I. et al. (Feb. 1995). "An HSV-1 Vector Expressing Tyrosine Hydroxylase Causes Production and Release of I-DOPA from Cultured Rat Striatal Cells," J. Neurochem 64(2):487-496.
Geller, A.I. et al. (Aug. 1993). "Long-Term Increases in Neurotransmitter Release From Neuronal Cells Expressing a Constitutively Active Adenylate Cyclase From a Herpes Simplex Virus Type 1 Vector," Proc Natl. Acad. Sci. U.S.A. 90:7603-7607.
Geller, A.I. et al. (Feb. 1990). "Infection of Cultured Central Nervous System Neurons With a Defective Herpes Simplex Virus 1 Vector Results in Stable Expression of *Escherichia coli* β-Galactosidase," Proc Natl. Acad. Sci. USA 87:1149-1153.
Gorman, C.M. et al. (Nov. 1982). "The Rous Sarcoma Virus Long Terminal Repeat is a Strong Promoter When Introduced Into a Variety of Eukaryotic Cells by DNA-Mediated Transfection," Proc Natl. Acad. Sci. U.S.A. 79:6777-6781.
Graham, F.L. et al. (Jul. 1977). "Characteristics of a Human Cell Line Transformed by DNA From Human Adenovirus Type 5," J. Gen Virol. 36(1):59-74.
Green, L.L. et al. (May 1994). "Antigen-Specific Human Monoclonal Antibodies From Mice Engineered With Human Ig Heavy And Light Chain YACs," Nature Genetics 7(1):13-21.
Grosschedl, R. et al. (Jul. 1985). "Cell-Type Specificity of Immunoglobulin Gene Expression is Regulated By at Least Three DNA Sequence Elements," Cell 41(3):885-897.
Grosse-Hovest, L. et al. (2003). "A Recombinant Bispecific Single-Chain Antibody Induces Targeted, Supra-Agonistic CD28-Stimulation And Tumor Cell Killing," Eur.J. Immunol. 33:1334-1340.
Gruber, M. et al. (1994). "Efficient Tumor Cell Lysis Mediated by a Bispecific Single Chain Antibody Expressed in *Escherichia coli*," The Journal of Immunology 152(11):5368-5374.

(56) References Cited

OTHER PUBLICATIONS

Gunasekaran, K, et al. (Jun. 18, 2010). "Enhancing Antibody Fc Heterodimer Formation through Electrostatic Steering Effects: Applications to Bispecific Molecules and Monovalent IgG," Journal of Biological Chemistry 285(25):19637-19646.
Guss, B. et al. (Jul. 1986). "Structure of the IgG-Binding Regions of Streptococcal Protein G," EMBO J. 5(7):1567-1575.
Hamers-Casterman, C. et al. (Jun. 3, 1993). "Naturally Occurring Antibodies Devoid of Light Chains," Nature 363(6428):446-448.
Hanes, J. et al. (May 1997). "In Vitro Selection and Evolution of Functional Proteins by Using Ribosome Display," Proc Natl. Acad. Sci. U.S.A. 94:4937-4942.
Harris, W.J. (Nov. 1, 1995). "Therapeutic Monoclonals: Production of Humanized Monoclonal Antibodies for In Vivo Imaging and Therapy," Biochem. Soc. Transactions 23(4):1035-1038.
Hein, J. (1990). "Unified Approach to Alignment and Phylogenies," Methods in Enzymology 183:626-645.
Henikoff, S. et al. (Nov. 15, 1992). "Amino Acid Substitution Matrices from Protein Blocks," Proc. Natl. Acad. Sci. USA 89(22):10915-10919.
Herold. K.C. et al. (Feb. 1, 2003). "Activation of Human T Cells by FcR Nonbinding Anti-CD3 mAb, HOKT3γ1 (Ala-Ala)," J. Clin. Invest. 111(3):409-418.
Higgins, D.G. et al. (1989). "Fast and Sensitive Multiple Sequence Alignments on a Microcomputer," Comput Appl Biosci. 5(2):151-153.
Hirsch, R. et al. (Jun. 1988). "Effects of In Vivo Administration of Anti-T3 Monoclonal Antibody on T Cell Function in Mice: I. Immunosuppression if Transplantation Responses," J. Immunol. 140(11):3766-3772.
Hochman, J. et al. (1976). "Folding and Interaction of Subunits at the Antibody Combining Site," Biochem 15(12):2706-2710.
Holliger, P. et al. (Jul. 1993). ""Diabodies": Small Bivalent and Bispecific Antibody Fragments," Proceedings of the National Academy of Sciences 90:6444-6448.
Holt, L.J. et al. (Nov. 2003). "Domain Antibodies: Proteins for Therapy," Trends in Biotechnology 21(11):484-490.
Hongo, J.S. et al. (1995). "Development and Characterization of Murine Monoclonal Antibodies to the Latency-Associated Peptide of Transforming Growth Factor $\beta_1$," Hybridoma 14(3):253-260.
Hoogenboom, H.R. et al. (1992). "By-Passing Immunisation. Human Antibodies from Synthetic Repertoires of Germline Hh Gene Segments Rearranged in Vitro," Journal of Molecular Biology 227:381-388.
Hoogenboom, H.R. et al. (Dec. 1992). "Building Antibodies from their Genes," Immunol. Reviews 130(1):41-68.
Houdebine, L. M. (1994). "Production Of Pharmaceutical Proteins From Transgenic Animals," Journal Of Biotechnology 34(3):269-287.
Hurle, M.R. et al. (Aug. 1994)."Protein Engineering Techniques for Antibody Humanization," Current Opinion in Biotechnology 5:428-433.
Huse, W.D. et al. (Dec. 8, 1989). "Generation of a Large Combinatorial Library of the Immunoglobulin Repertoire in Phage Lambda," Science 246(4935):1275-1281.
Huston, J.S. et al. (Aug. 1988). "Protein Engineering of Antibody Binding Sites: Recovery of Specific Activity in an Anti-Digoxin Single-Chain Fv Analogue Produced in *Escherichia coli*," Proc. Natl. Acad. Sci. U.S.A. 85(16):5879-5883.
Hwang, K.J. et al. (Jul. 1980). "Hepatic Uptake and Degradation of Unilamellar Sphingomyelin/Cholesterol Liposomes: A Kinetic Study," Proc. Natl Acad. Sci. USA 77(7):4030-4034.
Inbar, D. et al. (Sep. 1972). "Localization of Antibody-Combining Sites Within the Variable Portions of Heavy and Light Chains," Proc. Nat. Acad. Sci. USA 69(9):2659-2662.
International Preliminary Report on Patentability Chapter I mailed Sep. 18, 2018 for International Application No. PCT/CN2017/076816, filed on Mar. 15, 2017, 7 pages.
International Preliminary Report on Patentability Chapter I mailed Mar. 9, 2021 for International Application No. PCT/CN2019/104680, filed on Sep. 6, 2019, 6 pages.
International Preliminary Report on Patentability issued Jun. 16, 2021, for Patent Application No. PCT/CN2018/123108 filed on Dec. 24, 2018, 6 pages.
International Preliminary Report on Patentability issued Jun. 16, 2021, for Patent Application No. PCT/CN2019/127433 filed on Dec. 23, 2019, 5 pages.
International Preliminary Report on Patentability mailed Nov. 28, 2013, for Patent Application No. PCT/US2012/038177 filed on May 16, 2012, 7 pages.
International Search Report and Written Opinion from the International Searching Authority mailed Sep. 24, 2019, for International Patent Application No. PCT/CN2018/123108 filed Dec. 24, 2018, 15 pages.
International Search Report and Written Opinion from the International Searching Authority mailed Mar. 18, 2020, for International Patent Application No. PCT/CN2019/127433 filed Dec. 23, 2019, 13 pages.
International Search Report mailed Nov. 14, 2012, Patent Application No. PCT/US2012/038177 filed on May 16, 2012, 10 pages.
International Search Report mailed on Dec. 17, 2019 for International Patent Application No. PCT/CN2019/104680, filed on Sep. 6, 2019, 7 pages.
International Search Report mailed on Jun. 21, 2017 for International Patent Application No. PCT/CN2017/076816, filed on Mar. 15, 2017, 6 pages.
Jakobovits, A. et al. (Mar. 18, 1993) "Germ-line Transmission and Expression of a Human-derived Yeast Artificial Chromosome," Nature 362:255-258.
Jakobovits, A. et al. (Mar. 1993). "Analysis of Homozygous Mutant Chimeric Mice: Deletion of The Immunoglobulin Heavy-chain Joining Region Blocks B-Cell Development and Antibody Production," Proceedings of the National Academy of Sciences 90:2551-2555.
Jansen, F.K. et al. (Feb. 1982). "Immunotoxins: Hybrid Molecules Combining High Specificity and Potent Cytotoxicity," Immunological Reviews 62(1):185-216.
Jiang, T. et al. (Dec. 21, 2004; e-pub Dec. 15, 2004). "Tumor Imaging by Means of Proteolytic Activation of Cell-Penetrating Peptides," Proc. Natl. Acad. Sci. U.S.A. 101(51):17867-17872.
Johnson, et al. (2010, e-pub. Apr. 9, 2020). "Effector Cell Recruitment with Novel Fv-based Dual-affinity Re-targeting Protein Leads to Potent Tumor Cytolysis and in Vivo B-cell Depletion," J Mol. Biol. 399:436-449.
Johnson, G. et al. (2003). "The Kabat Database and a Bioinformatics Example," Methods in Molecular Biology 248:1-25. (Abstract Only, 1 page).
Jones, P.T. et al. (May 29, 1986). "Replacing the Complementarity-Determining Regions in a Human Antibody with Those from a Mouse," Nature 321:522-525.
Kaplitt, M.G. et al. (Oct. 1994). "Long-Term Gene Expression and Phenotypic Correction Using Adeno-Associated Virus Vectors in the Mammalian Brain," Nature Genetics 8:148-154.
Kappel, C.A. et al. (Oct. 1, 1992). "Regulating Gene Expression In Transgenic Animals," Current Opinion In Biotechnology 3(5):548-553.
Killen J.A. et al. (Nov. 1984) "Specific killing of lymphocytes that cause experimental autoimmune myasthenia gravis by ricin toxin-acetylcholine receptor conjugates," J. Immunol. 133(5):2549-2553.
Kini, R.M. et al. (1991, e-pub May 21, 2012). "Molecular Modeling of Proteins: A Strategy for Energy Minimization by Molecular Mechanics in the AMBER Force Field," J. Biomol. Struct. Dyn. 9(3):475-488, 16 pages.
Kipriyanov, S.M. et al. (1999). "Bispecific tandem diabody for tumor therapy with improved antigen binding and pharmacokinetics," J Mal. Biol., 293:41-56.
Kipriyanov, S.M. and Le Gall, F. (2004). "Recent Advances In The Generation Of Bispecific Antibodies For Tumor Immunotherapy," Curr. Opin. Drug Discov. Devel. 7:233-242.

(56) References Cited

OTHER PUBLICATIONS

Kipriyanov, S.M. et al. (Dec. 31, 1998). "Bispecific CD3xCD19 Diabody for T Cell-Mediated LYSIS of Malignant Human B Cells," Int. J. Cancer 77:763-772.
Klimka, A. et al. (Jun. 20, 2000). "Human Anti-CD30 Recombinant Antibodies by Guided Phage Antibody Selection Using Cell Panning," British Journal of Cancer 83(2):252-260.
Koch-Nolte, F. et al. (2007; e-pub. Jun. 15, 2007). "Single Domain Antibodies From Llama Effectively and Specifically Block T Cell Ecto-ADP-Ribosyltransferase ART2.2 in vivo," FASEB J. 21:3490-3498.
Kohler, G. et al. (Aug. 7, 1975). "Continuous Cultures of Fused Cells Secreting Antibody of Predefined Specificity," Nature 256:495-497.
Koide, A. et al. (2007). "Monobodies: Antibody Mimics Based on the Scaffold of the Fibronectin Type III Domain," Methods Mol. Biol. 352:95-109.
Koide, A. et al. (Dec. 11, 1998). "The Fibronectin Type III Domain as a Scaffold For Novel Binding Proteins," J. Mol. Biol. 284(4):1141-1151.
Kontermann, R.E. (Jan. 2005). "Recombinant bispecific antibodies for cancer therapy," Acta Pharmacol. Sin. 26(1):1-9.
Kostelny, S.A. et al. (Mar. 1, 1992). "Formation of a Bispecific Antibody by the Use of Leucine Zippers," The Journal of Immunology 148(5):1547-1553.
Kozbor, D. et al. (Dec. 1984). "A Human Hybrid Myeloma for Production of Human Monoclonal Antibodies," The Journal of Immunology 133(6):3001-3005.
Kozbor, D. et al. (Mar. 1983). "The Production of Monoclonal Antibodies From Human Lymphocytes," Immunology Today 4(3):72-79.
La Rocca, G. et al. (Apr. 5, 2004; e-pub. Mar. 16, 2004). "Zymographic Detection and Clinical Correlations of MMP-2 And MMP-9 in Breast Cancer Sera," British J. of Cancer 90(7):1414-1421.
Laplanche, L.A. et al. (Nov. 25, 1986). "Phosphorothioate-modified oligodeoxyribonucleotides. III. NMR and UV spectroscopic studies of the Rp-Rp, Sp-Sp, and Rp-Sp duplexes, [d(GGSAATTCC)]2, derived from diastereomeric O-ethyl phosphorothioates," Nucl. Acids Res. 14(22):9081-9093.
Lavasani, S. et al. (2007; e-pub. Dec. 14, 2006). "Monoclonal Antibody against T-Cell Receptor αβ Induces Self-Tolerance in Chronic Experimental Autoimmune Encephalomyelitis," Scandinavian Journal of Immunology 65(1):39-47.
Lavie, G. et al. (Apr. 1, 2000). "Inhibition of the CD8+ T Cell-Mediated Cytotoxicity Reaction By Hypericin: Potential For Treatment Of T Cell-Mediated Diseases," International Immunology 12(4):479-486.
Le Gal La Salle, G. et al. (Feb. 12, 1993). "An Adenovirus Vector for Gene Transfer Into Neurons and Glia in the Brain," Science 259(5097):988-990.
Lee, C.V. et al. (2004). "Bivalent Antibody Phage Display Mimics Natural Immunoglobulin," Journal of Immunological Methods 284(1-2):119-132.
Lee, C.V. et al. (2004). "High-affinity Human Antibodies from Phage-displayed Synthetic Fab Libraries with a Single Framework Scaffold," Journal of Molecular Biology 340:1073-1093.
Li, J. et al. (Mar. 7, 2006). "Human Antibodies for Immunotherapy Development Generated via a Human B Cell Hybridoma Technology," PNAS 103(10):3557-3562.
Lindmark, R. et al. (Aug. 12, 1983). "Binding of Immunoglobulins To Protein A and Immunoglobulin Levels in Mammalian Sera," J. Immunol. Meth. 62(1):1-13.
Liu, A.Y. et al. (May 1987). "Chimeric Mouse-Human IgG1 Antibody That Can Mediate Lysis of Cancer Cells," Proc Natl Acad Sci U S A. 84(10):3439-3443.
Liu, A.Y. et al. (Nov. 15, 1987). "Production of a Mouse-Human Chimeric Monoclonal Antibody to CD20 With Potent Fc-Dependent Biologic Activity," J. Immunol. 139(10):3521-3526.
Liu, R. et al. (Jun. 5, 2010). "Efficient Inhibition of Human B-cell Lymphoma in SCID Mice by Synergistic Antitumor Effect of Human 4-IBB Ligand/anti-CD20 Fusion Proteins and Anti-CD3/anti-CD20 Diabodies," J Immunother. 33(5):500-509.
Lonberg, N. et al. (1995). "Human Antibodies from Transgenic Mice," International Reviews of Immunology. 13(1):65-93.
Lonberg, N. et al. (Apr. 28, 1994). "Antigen-Specific Human Antibodies from Mice Comprising Four Distinct Genetic Modifications," Nature 368:856-859.
Lu, D. et al. (2002). "Fab-scFv Fusion Protein: An Efficient Approach to Production of Bispecific Antibody Fragments," Journal of Immunological Methods 267:213-226.
Lybrand, T.P. (Jan.-Feb. 1991). "Molecular Simulation and Drug Design," J. Pharm. Belg. 46(1):49-54. (Abstract Only, 1 page).
Mabry, R. et al. (2010, e-pub. Dec. 18, 2009). "Engineering Of Stable Bispecific Antibodies Targeting IL-17A and IL-23," Protein Eng Des Sel. 23(3):115-127.
Mack, M. et al. (Jul. 1995). "A Small Bispecific Antibody Construct Expressed As A Functional Single-Chain Molecule With High Tumor Cell Cytotoxic," Proc. Natl. Acad. Sci. USA. 92:7021-7025.
Maratea, D. et al. (1985). "Deletion and Fusion Analysis of the Phage φ X174 Lysis Gene E.," Gene 40(1):39-46.
Marks, J.D. et al. (Dec. 1991). "By-Passing Immunization: Human Antibodies From V-Gene Libraries Displayed On Phage," Journal of Molecular Biology 222(3):581-597.
Marks, J.D. et al. (Jul. 1992)."By-Passing Immunization: Building High Affinity Human Antibodies By Chain Shuffling," Biotechnology 10(7):779-783.
Martin, F.J. et al. (Jan. 10, 1982). "Irreversible Coupling of Immunoglobulin Fragments to Preformed Vesicles," J. Biol. Chem. 257(1):286-288.
Marvin, J.S. et al. (Jun. 2005). "Recombinant Approaches to IgG-like Bispecific Antibodies," Acta Pharmacol. Sin. 26(6):649-658.
Mather, J.P. (Aug. 1980). "Establishment and Characterization of Two Distinct Mouse Testicular Epithelial Cell Lines," Biol. Reprod. 23(1):243-252.
Mather, J.P. et al. (1982). "Culture of Testicular Cells in Hormone-Supplemented Serum-Free Medium," Annals N.Y. Acad. Sci. 383:44-68.
Mau-Sorensen, M. et al. (May 2015, e-pub. Mar. 27, 2015). "A Phase I Trial of Intravenous Catumaxomab: A Bispecific Monoclonal Antibody Targeting EpCAM And the T Cell Coreceptor CD3," Cancer Chemotherapy And Pharmacology 75(5):1065-1073.
Merchant, M.A. et al. (Jul. 1998). "An efficient route to human bispecific IgG," Nat Biotechnol. 16:677-681.
Mertens, N. et al. (2004). "New Strategies in Polypeptide and Antibody Synthesis: An Overview," Cancer Biotherapy & Radiopharmaceuticals 19(1):99-109.
Meylan, F. et al. (Jul. 18, 2008; Jun. 19, 2008). "The TNF-Family Receptor DR3 is Essential for Diverse T cell-mediated Inflammatory Diseases," Immunity 29(1):79-89, twenty six pages.
Michaelson, J.S. et al. (Mar./Apr. 2009). "Anti-Tumor Activity Of Stability-Engineered IgG-like Bispecific Antibodies Targeting TRAIL-R2 and LTbetaR," mAbs, 1:2:128-141.
Miller, B.R. et al. (2010, e-pub. May 10, 2010). "Stability engineering of scFvs for the development of bispecific and multivalent antibodies," Protein EnR Des Sel. 23(7):549-557.
Milstein, C. et al. (Oct. 6, 1983). "Hybrid Hybridomas and their use in Immunohistochemistry," Nature 305:537-540.
Morrison, P.F. et al. (1994). "High Flow Microinfusion: Tissue Penetration and Pharmacodynamics," Am. J. Physiol. 266:R292-R305.
Morrison, S.L. (Apr. 28, 1994). "Success in Specification," Nature 368:812-813.
Morrison, S.L. et al. (Nov. 1984). "Chimeric Human Antibody Molecules: Mouse Antigen-binding Domains with Human Constant Region Domains," Proc. Nat'l Acad. Sci 81:6851-6855.
Muller, D. et al. (2010). "Bispecific Antibodies for Cancer Immunotherapy: Current Perspectives," Biodrugs 24(2):89-98.
Munson, P.J. et al. (1980). "Ligand: A Versatile Computerized Approach for Characterization of Ligand-binding Systems," Analytical Biochemistry 107:220-239.
Munz, M. et al. (Nov. 2, 2010) "Side-by-side analysis of five clinically tested anti-EpCAM monoclonal antibodies." Cancer Cell Int. 10(44):1-12.

(56) References Cited

OTHER PUBLICATIONS

Murphy, J.R. et al. (Nov. 1986). "Genetic Construction, Expression, and Melanoma-Selective Cytotoxicity of a Diphtheria Toxin-Related Alpha-Melanocyte-Stimulating Hormone Fusion Protein," Proc. Natl. Acad. Sci. USA 83(21):8258-8262.
Myers, E.W. et al. (1988). "Optimal Alignments in Llinear Space," Comput Appl Biosci. 4(1):11-17.
Needleman, S.B. et al. (Mar. 28, 1970). "A General Method Applicable to the Search for Similarities in the Amino Acid Sequence of Two Proteins," J. Mol. Biol. 48(3):443-453.
Nelson, A.L. et al. (Oct. 2010; e-pub Sep. 3, 2010). "Development Trends for Human Monoclonal Antibody Therapeutics," Nature Reviews Drug Discovery 9(10):767-774.
Neuberger, M. (Jul. 1996). "Generating High-Avidity Human Mabs In Mice," Nature Biotechnology 14:826, one page.
Nguyen, V.K. et al. (Apr. 2002; Feb. 26, 2002). "Heavy-Chain Antibodies in Camelidae; A Case of Evolutionary Innovation," Immunogenetics 54(1):39-47.
Nguyen, V.K. et al. (Jan. 23, 1998). "The Specific Variable Domain of Camel Heavy-Chain Antibodies is Encoded in the Germline," J. Mol. Biol. 275(3):413-418.
Nilson, B.H.K. at al. (Feb. 5, 1992). "Protein L From Peptostreptococcus Magnus Binds to the Kappa Light Chain Variable Domain," J. Biol. Chem. 267(4):2234-2239.
Obeidy, P. et al. (Dec. 2009, e-pub. Jul. 22, 2009). "NKG2D and its Ligands," Int J Biochem Cell Biol. 41(12):2364-2367.
O'Hare, M. et al. (Oct. 29, 1990). "Cytotoxicity of a Recombinant Ricin-A-Chain Fusion Protein Containing A Proteolytically-Cleavable Spacer Sequence," FEBS Lett. 273(1-2):200-204.
Okayama, H. et al. (Feb. 1983). "A cDNA Cloning Vector That Permits Expression of cDNA Inserts in Mammalian Cells," Molecular and Cellular Biology 3(2):280-289.
Olson, E.S. et al. (Mar. 2, 2010). "Activatable Cell Penetrating Peptides Linked to Nanoparticles as Dual Probes for In Vivo Fluorescence and MR Imaging of Proteases," Proc. Natl. Acad. Sci. USA 107(9):4311-4316.
Orcutt, K.D. et al. (2010, e-pub. Dec. 17, 2009). "A modular IgG-scFv Bispecific Antibody Topology," Protein Eng Des Sel. 23(4):221-228.
Ortho Multicenter Transplant Study Group "A Randomized Clinical Trial Of OKT3 Monoclonal Antibody For Acute Rejection Of Cadaveric Renal Transplants. Ortho Multicenter Transplant Study Group," N Engl. J Med., 313:337-342, (1985).
Otz, T. et al. (2009, e-pub. Oct. 2, 2008). "A Bispecific Single-Chain Antibody That Mediates Target Cell-Restricted, Supra-Agonistic CD28 Stimulation And Killing Of Lymphoma Cells," Leukemia, 23:71-77.
Parmley, S.F. et al. (1988). "Antibody-Selectable Filamentous fd Phage Vectors: Affinity Purification of Target Genes," Gene 73:305-318.
Paul, W.E. (ed.). (1993). "Fv Structure and Diversity in Three Dimensions," in Chapter 9 of Fundamental Immunology, 3rd Edition, Raven Press, 1185 Avenue of the Americas, New York, NY 10036, pp. 292-295, six pages.
Pearson, W.R. et al. (Apr. 1, 1988). "Improved Tools for Biological Sequence Comparison," Proc. Natl. Acad. Sci. USA 85(8):2444-2448.
Pedersen, L. (Sep. 1985). "Conformational Properties of Molecules by ab Initio Quantum Mechanical Energy Minimization," Environmental Health Perspectives 61:185-190.
Pessano, S. et al. (1985). "The T3/T Cell Receptor Complex: Antigenic Distinction Between The Two 20-kd T3 (T3-delta and T3-epsilon) Subunits," The EMBO J. 4(2):337-344.
Pluckthun, A. (Jun. 1991). "Antibody Engineering: Advances From the Use of Escherichia coli Expression Systems," Bio/Technology 9:545-551.
Pluckthun, A. (Oct. 4, 1990). "Antibodies from Escherichia coli," Nature 347(6292):497-498.
Portolano, S. et al. (Feb. 1, 1993). "Lack of Promiscuity in Autoantigen-Specific H and L Chain Combinations as Revealed by Human H and L Chain "Roulette"," The Journal of Immunology 150(3):880-887.
Powell, M.F. et al. (Sep.-Oct. 1998). "Compendium of Excipients for Parenteral Foimulations," PDA J Pharm Sci Technol. 52(5):238-311. (Abstract page only).
Prell, R.A. et al. (2013, e-pub. Jun. 28, 2013) "Catumaxomab (EpCAM/CD3 Multi-targeting Full-length Antibody)" Chpater 14 in Nonclinical Development of Novel Biologics, Biosimilars, Vaccines and Specialty Biologics, book, abstract only, 2 pages.
Presta, L.G. (1992). "Antibody Engineering," Current Opinion in Structural Biology 2:593-596.
Qian, B. et al. (Nov. 8, 2007). "High-Resolution Structure Prediction and the Crystallographic Phase Problem," Nature 450(7167):259-264, twenty three pages.
Rader, C. et al. (Jul. 21, 1998). "A Phage Display Approach for Rapid Antibody Humanization: Designed Combinatorial V Gene Libraries," Proc. Natl. Acad. Sci. USA 95(15):8910-8915.
Ramakrishnan, S. et al. (Jan. 1984). "Comparison of the Selective Cytotoxic Effects of Immunotoxins Containing Ricin A Chain or Pokeweed Antiviral Protein and Anti-Thy 1.1 Monoclonal Antibodies," Cancer Res. 44:201-208.
Raman, S. et al. (Feb. 19, 2010). "NMR Structure Determination for Larger Proteins Using Backbone-Only Data," Science 327(5968):1014-1018, twelve pages.
Reff, M.E. (Oct. 1993). "High-Level Production of Recombinant Immunoglobulins in Mammalian Cells," Curr. Opinion Biotech. 4(5):573-576.
Reynolds, J.A. (1979). "Interaction of Divalent Antibody With Cell Surface Antigens," Biochemistry 18(2):264-269.
Ridgway, J.B.B. et al. (1996). "Knobs-Into-Holes' Engineering of Antibody CH3 Domains For Heavy Chain Heterodimerization," Protein Engineering 9(7):617-621.
Riechmann, L. et al. (Dec. 10, 1999). "Single Domain Antibodies: Comparison of Camel VH and Camelised Human VH Domains," J. Immunol. Methods 231(1-2):25-38.
Riechmann, L. et al. (Mar. 24, 1988). "Reshaping Human Antibodies for Therapy," Nature 332:323-327.
Robinson, D.F. (1971). "Comparison of Labeled Trees with Valency Three," Comb. Theor. 11:105-119.
Robinson, M.K. et al. (2008, e-pub. Oct. 7, 2008). "Targeting ErbB2 and ErbB3 with a bispecific single-chain Fv enhances targeting selectivity and induces a therapeutic effect in vitro," British Journal of Cancer 99:1415-1425.
Roux, K.H. et al. (Sep. 29, 1998). "Structural Analysis of the Nurse Shark (New) Antigen Receptor (NAR): Molecular Convergence of NAR and Unusual Mammalian Immunoglobulins," Proc. Natl. Acad. Sci. USA 95(20):11804-11809.
Rudikoff, S. et al. (Mar. 1982). "Single Amino Acid Substitution Altering Antigen-Binding Specificity," Proc. Natl. Acad. Sci. USA 79:1979-1983.
Russell, S.J. et al. (1993). "Retroviral Vectors Displaying Functional Antibody Fragments," Nucl. Acids Research 21(5):1081-1085.
Saitou, N. et al. (Jul. 1, 1987). "The Neighbor-Joining Method: A New Method For Reconstructing Phylogenetic Trees," Mol. Biol. Evol. 4(4):406-425.
Salmeron, A. et al. (Nov. 1, 1991). "A Conformational Epitope Expressed Upon Association of CD3-Epsilon With Either CD3-Delta Or CD3-Gamma Is The Main Target For Recognition By Anti-CD3 Monoclonal Antibodies," J. Immunol. 147(9):3047-3052.
Scatchard, G. (May 1949). "The Attractions of Proteins for Small Molecules and Ions," Annals of the New York Academy of Sciences 51(4):660-672.
Schaefer, W. et al. (Jul. 5, 2011; e-pub. Jun. 20, 2011). "Immunoglobulin Domain Crossover as a Generic Approach for the Production of Bispecific IgG Antibodies," Proc. Natl. Acad. Sci. USA 108(27):111870-111892.
Schmidt, M. et al. (Feb. 1, 2010, e-pub. Jul. 24, 2009). "An Open-Label, Randomized Phase II Study Of Adecatumumab, A Fully Human Anti-Epcam Antibody, As Monotherapy In Patients With Metastatic Breast Cancer," Annals Of Oncology 21(2):275-282.

(56) References Cited

OTHER PUBLICATIONS

Schoonjans, R. et al. (2000). "Fab Chains as an Efficient Heterodimerization Scaffold for the Production of Recombinant Bispecific and Trispecific Antibody Derivatives," Journal of Immunology 165:7050-7057.
Schueler-Furman, O. et al. (Oct. 28, 2005). "Progress in Modeling of Protein Structures and Interactions," Science 310(5748):638-642.
Schwartzberg, L.S. (Oct. 2001). "Clinical Experience With Edrecolomab: A Monoclonal Antibody Therapy For Colorectal Carcinoma," Critical Reviews In Oncology/ Hematology 40(1):17-24.
Scott, J.K. (Jul. 1992). "Discovering peptide ligands using epitope libraries," Trends in Biochemical Sciences 17(7):241-245.
Shalaby, M.F. et al. (Jan. 1992). "Development of Humanized Bispecific Antibodies Reactive with Cytotoxic Lymphocytes and Tumor Cells Overexpressing the HER2 Protooncogene," The Journal of Experimental Medicine 175:217-225.
Shen, H.M. et al. (Aug. 1, 2006). "TNF Receptor Superfamily-Induced Cell Death: Redox-Dependent Execution," FASEB J. 20(10):1589-1598.
Shen, J. et al. (2007, e-pub. Oct. 26, 2006). "Single Variable Domain Antibody As A Versatile Building Block For The Construction Of Igg-Like Bispecific Antibodies," J Immunol. Methods 318:65-74.
Shen, J. et al. (Apr. 21, 2006). "Single Variable Domain-Igg Fusion. A Novel Recombinant Approach To Fe Domain-Containing Bispecific Antibodies," J Biol. Chem. 281(16):10706-10714.
Sheriff, S. et al. (Sep. 1996). "Redefining the Minimal Antigen-binding Fragment," Nature Structural & Molecular Biology 3(9):733-736.
Shopes, B. (May 1, 1992). "A Genetically Engineered Human IgG Mutant With Enhanced Cytolytic Activity," J. Immunol. 148(9):2918-2922.
Sidhu, S.S. et al. (Apr. 2004). "Phage-displayed Antibody Libraries of Synthetic Heavy Chain Complementarity Determining Regions," Journal of Molecular Biology 338(2):299-310.
Smith, T.F. et al. (1981). "Comparison of Bio-Sequences," Adv. Appl. Math. 2:482-489.
Staerz, U.D. et al. (Mar. 1986). "Hybrid hybridoma producing a bispecific monoclonal antibody that can focus effector T-cell activity," Proc Natl Acad Sci USA, 83:1453-1457.
Stec, W.J. et al. (1984). "Automated Solid-Phase Synthesis, Separation, and Stereochemistry of Phosphorothioate Analogs of Oligodeoxyribonucleotides," J. Am. Chem. Soc. 106(20):6077-6079.
Stein, C.A. et al. (Apr. 25, 1988). "Physicochemical Properties of Phosphorothioate Oligodeoxynucleotides," Nucl. Acids Res. 16(8):3209-3221.
Stevenson, G.T. et al. (Mar. 1989). "A Chimeric Antibody With Dual Fc Regions (Bisfabfc) Prepared by Manipulations at the IgG Hinge," Anti-Cancer Drug Design 3(4):219-230.
Suresh, M.R. et al. (1986). "Bispecific Monoclonal Antibodies from Hybrid Hybridomas," Methods In Enzymology 121:210-228.
Third Party Observation submitted on Apr. 9, 2013 for International Application No. PCT/US2012/038177, filed on May 16, 2012, two pages.
Torkildsen, O. et al. (Mar. 24, 2006). "FcγR and Multiple Sclerosis: An Overview," Acta Neural Scand Suppl. 113(Suppl. 183):61-63.
Traunecker, A. et al. (1991). "Bispecific Single Chain Molecules (Janusins) Target Cytotoxic Lymphocytes on HIV Infected Cells," The EMBO Journal 10(12):3655-3659.
Trill, J.J. et al. (Oct. 1995). "Production of Monoclonal Antibodies in COS and CHO Cells," Curr. Opinion Biotech 6(5):553-560.
Turk, B.E. et al. (Jul. 1, 2001). "Determination of Protease Cleavage Site Motifs Using Mixture-Based Oriented Peptide Libraries," Nature Biotechnology 19:661-667.
Tutt, A. et al. (Jul. 1, 1991). "Trispecific F(Ab')3 Derivatives That Use Cooperative Signaling via the TCR/CD3 Complex and CD2 to Activate and Redirect Resting Cytotoxic T Cells," J. Immunol. 147(1):60-69.
Uhlmann, E. et al. (Jun. 1990). "Antisense Oligonucleotides: A New Therapeutic Principle," Chemical Reviews 90(4):543-584.

Urlaub, G. et al. (Jul. 1, 1980). "Isolation of Chinese Hamster Cell Mutants Deficient in Dihydrofolate Reductase Activity," Proc. Natl. Acad. Sci. USA 77(7):4216-4220.
Van Dijk, M.A et al. (2001). "Human Antibodies as Next Generation Therapeutics," Current Opinion in Chemical Biology 5:368-374.
Vaswani, S.K. et al. (Aug. 1998). "Humanized Antibodies as Potential Therapeutic Drugs," Annals of Allergy, Asthma & Immunology 81:105-119.
Vitetta, E.S. et al. (Nov. 20, 1987). "Redesigning Nature's Poisons to Create Anti-Tumor Reagents," Science 238:1098-1104.
Wall, R.J. (Jan. 1, 1996). "Transgenic Livestock: Progress And Prospects For The Future," Theriogenology 45(1):57-68.
Wang, W. (Aug. 1, 2000). "Lyophilization and Development of Solid Protein Pharmaceuticals," Int. J. Pharm. 203(1-2):1-60.
Weiner, S.J. et al (Feb. 1984). "A New Force Field for Molecular Mechanical Simulation of Nucleic Acids and Proteins," J. Comput. Chem. 106(3):765-784.
Weisel, J.W. et al. (Dec. 20, 1985). "A Model for Fibrinogen: Domains and Sequence," Science 230(4732):1388-1391.
Westby, M. et al. (Sep.-Oct. 1992). "Preparation and Characterization of Recombinant Proricin Containing an Alternative Protease-Sensitive Linker Sequence," Bioconjugate Chemistry 3(5):375-381.
Wilbur, W.J. et al. (Feb. 1, 1983). "Rapid Similarity Searches of Nucleic Acid and Protein Data Banks," Proc. Natl. Acad. Sci. USA 80(3):726-730.
Willems, A. et al. (2005, e-pub. May 13, 2005). "CD3 X CD28 Cross-Interacting Bispecific Antibodies Improve Tumor Cell Dependent T-Cell Activation," Cancer Immunol Immunother 54:1059-1071.
Winter, G. et al. (Jun. 1993). "Humanized Antibodies," Immunol Today 14(6):243-246.
Wright, A. et al. (1992) "Genetically Engineered Antibodies: Progress And Prospects," Crit. Rev Immunol. 12(3-4)125-168.
Written Opinion of the International Searching Authority mailed on Dec. 17, 2019 for International Patent Application No. PCT/CN2019/104680, filed on Sep. 6, 2019, five pages.
Written Opinion of the International Searching Authority mailed on Jun. 21, 2017 for International Patent Application No. PCT/CN2017/076816, filed on Mar. 15, 2017, six pages.
Written Opinion of the International Searching Authority mailed on Nov. 14, 2012 for International Patent Application No. PCT/US2012/038177, filed on May 16, 2012, 5 pages.
Wu, C. et al. (Nov. 2007, e-pub. Oct. 14, 2007). "Simultaneous Targeting Of Multiple Disease Mediators By A Dual-Variable-Domain Immunoglobulin," Nat. Biotechnol. 25(11):1290-1297.
Wu, T.T. et al. (Aug. 1, 1970). "An Analysis of the Sequences of the Variable Regions of Bence Jones Proteins and Myeloma Light Chains and their Implications for Antibody Complementarity," J. Exp. Med. 132(2):211-250.
Wu, X. et al. (Mar. 16, 2015, e-pub. May 1, 2015). "Fab-based Bispecific Antibody Formats With Robust Biophysical Properties and Biological Activity," MABs. 7(3):470-482.
Xu, J. L. et al. (Jul. 2000). "Diversity in the CDR3 Region of VH Is Sufficient for Most Antibody Specificities," Immunity 13:37-45.
Yang, S.Y. et al. (Aug. 15, 1986). "A Common Pathway For T Lymphocyte Activation Involving Both the CD3-Ti Complex and CD2 Sheep Erythrocyte Receptor Determinants," J. Immunol. 137(4):1097-1100.
Yang, Y. et al. (Apr. 1995). "Cellular and Humoral Immune Responses to Viral Antigens Create Barriers to Lung-Directed Gene Therapy with Recombinant Adenoviruses," J. Virol. 69(4):2004-2015, 21 pages.
Yoshino, N. et al. (2000). "Upgrading of Flow Cytometric Analysis for Absolute Counts, Cytokines and Other Antigenic Molecules of Cynomolgus Monkeys (Macaca fascicularis) by Using Anti-Human Cross-Reactive Antibodies," Exp. Anim 49(2):97-110.
Zelensky, A.N. et al. (Dec. 2005; e-pub. Nov. 28, 2005). "The C-Type Lectin-Like Domain Superfamily," FEBS J. 272(24):6179-6217.
Zettlitz, K.A. (2010). "Protein A/G Chromatography," Chapter 34 in Antibody Engineering, Kontermann, R. (ed.) et al., Springer, Berlin, Heidelberg, 2nd Edition, Part V, 531-535.

(56) References Cited

OTHER PUBLICATIONS

Zhang, P. et al. (Feb. 1, 2014, e-pub. Nov. 1, 2013). "An EpCAM/CD3 Bispecific Antibody Efficiently Eliminates Hepatocellular Carcinoma Cells with Limited Galectin-1 Expression," Cancer Immunology Immunotherapy 63(2):121-132.

Zon, G. et al. (Dec. 1, 1991). "Phosphorothioate Oligonucleotides: Chemistry, Purification, Analysis, Scale-Up and Future Directions," Anti-Cancer Drug Design 6(6):539-568.

Cui, Y. et al. (Nov. 29, 2018). "CD3-Activating Bi-Specific Antibody Targeting CD19 on B Cells in Mono- and Bi-Valent Format", Blood, American Society of Hematology 132(Supp. 1):4169, 2 pages.

Houdebine, L. M. (2009). "Production Of Pharmaceutical Proteins By Transgenic Animals," Comparative Immunology, Microbiology And Infectious Diseases 32(2):107-121.

Spiess, C. et al. (2015, e-pub. Jan. 27, 2015). "Alternative Molecular Formats and Therapeutic Applications For Bispecific Antibodies," Molecular Immunology 67(2):95-106.

Beyer, B. M. et al. (2008, e-pub. Aug. 7, 2008). "Crystal Structures Of The Pro-Inflammatory Cytokine Interleukin-23 And Its Complex With A High-Affinity Neutralizing Antibody," Journal Of Molecular Biology 382(4):942-955.

George, R.A. et al. (2002). "An Analysis of Protein Domain Linkers: Their Classification and Role in Protein Folding," Protein Eng. 15(11):871-879.

Li, W. et al. (2010). "Construction And Expression Of Anti-CD3xanti-CD19 Bispecific Diabody And Analyzing Its Specific Binding Activity," China Oncology 20(4):241-246 (English Abstract Only).

Schoonjans, R. et al. (2001). "A New Model For Intermediate Molecular Weight Recombinant Bispecific And Trispecific Antibodies By Efficient Heterodimerization Of Single Chain Variable Domains Through Fusion To A Fab-Chain," Biomolecular Engineering 17(6):193-202.

\* cited by examiner

ANTI-CD19 AND ANTI-CD3 BISPECIFIC ANTIGEN BINDING PROTEINS AND USES THEREOF

CROSS REFERENCE TO RELATED APPLICATIONS

This application is a national stage application under 35 U.S.C. § 371 of International Application No. PCT/CN2019/104680, filed internationally on Sep. 6, 2019, which claims priority benefit of Chinese Patent Application No. 201811041588.X, filed on Sep. 7, 2018, the contents of each of which are incorporated herein by reference in their entirety.

SUBMISSION OF SEQUENCE LISTING ON ASCII TEXT FILE

The content of the following submission on ASCII text file is incorporated herein by reference in its entirety: a computer readable form (CRF) of the Sequence Listing (file name: 720622000900SEQLIST.TXT, date recorded: Feb. 26, 2021, size: 52 KB).

FIELD OF THE PRESENT APPLICATION

The present invention relates to bispecific antigen binding proteins (BSAPs) that specifically bind to CD3 and a tumor antigen (e.g., CD19). Further provided are pharmaceutical compositions comprising the BSAPs, methods of treating cancer using the BSAPs, and kits comprising the BSAPs.

BACKGROUND OF THE PRESENT APPLICATION

Some antigens are over-expressed, mutagenized, or selectively mutagenized in tumor tissues. Therefore, antibodies targeting specific antigens on the surface of cancer cells can be used as cancer therapeutics. The B-lymphocyte antigen CD19 is also known as CD19 molecule (cluster of differentiation 19), B-lymphocyte surface antigen B4, T-cell surface antigen Leu-12, and CVID3. CD19 is expressed in both normal B and malignant B lymphocytes and is considered a B-cell tumor-associated antigen. It can be used as biomarker for B lymphocyte development, lymphoma diagnosis, and a target for leukemia immunotherapies.

CD3, comprising 6 polypeptide chains (one CD3δ chain, one CD3γ chain, two CD3ζ chains and two CD3Σ chains), is an antigen expressed by T cells. Transmembrane domains of CD3 ε, δ and γ chains can interact with T cell receptor (TCR) and the CD3ζ-chain to form the TCR complex, which has the function of activating signaling cascades in T cells. Currently, many therapeutic strategies target the TCR signal transduction to treat diseases using anti-human CD3 monoclonal antibodies. The CD3 specific antibody OKT3 is the first monoclonal antibody approved for human therapeutic use, and is clinically used as an immunomodulator for the treatment of allogenic transplant rejections.

Although bispecific antibodies have been shown to have potential in effectively killing cancer cells, severe adverse effects, including systemic immune activation, immunogenicity (anti-drug antibody effect), and the generally poor manufacturability of these molecules, have greatly limited the widespread application of this type of drugs. For example, one drawback of the CD19×CD3 bispecific scFv-scFv (single-chain variable fragment) fusion protein (Blinatumomab) is that this drug needs to be administered intravenously (i.v.) on a daily basis due to its short half-life and incompatibility with subcutaneous administration; yet, neurological reactions such as disorientation, confusion, speech and language impairment, tremor or convulsion still occurred during clinical trials (Bargou et al. Science 321 (5891):974-977, 2008).

The drawbacks of current formats of bispecific antibodies remain great challenges for their widespread application in the treatment of cancer patients with good efficacy and safety. Therefore, there is an urgent need in the field for the development of new bispecific antibodies or treatment regimen with improved efficacy, stability, safety and manufacturability.

BRIEF SUMMARY OF THE PRESENT APPLICATION

The present invention provides bispecific antigen binding proteins (BSAPs, hereinafter also referred to as "bispecific antibodies") that specifically bind to CD3 and a tumor antigen (e.g., CD19), pharmaceutical compositions comprising the BSAPs, and methods of treating cancer using the BSAPs.

In one aspect of the present invention, there is provided a BSAP comprising: i) an anti-tumor antigen Fab specifically recognizing a tumor antigen (e.g., CD19, such as human CD19 ("huCD19") or cynomolgus monkey CD19 ("cynoCD19")), wherein the anti-tumor antigen Fab comprises: (a) an immunoglobulin (Ig) heavy chain variable region (VH) and an Ig heavy chain constant region 1 (CH1), and (b) an Ig light chain variable region (VL) and an Ig light chain constant region (CL); and ii) an anti-CD3 binding domain (e.g., scFv) specifically recognizing CD3 (e.g., human CD3 ("huCD3") or cynomolgus monkey CD3 ("cynoCD3")); wherein the anti-tumor antigen Fab and the anti-CD3 binding domain are connected directly or via an optional linker. In some embodiments, the anti-CD3 binding domain (e.g., scFv) is connected to the N-terminus of the VH of the anti-tumor antigen Fab. In some embodiments, the anti-CD3 binding domain (e.g., scFv) is connected to the N-terminus of the VL of the anti-tumor antigen Fab.

In some embodiments according to any of the BSAPs described above, the tumor antigen is selected from the group consisting of CD19, EpCAM, CD20, CD22, CD30, CD37, CD40, and CD74.

In some embodiments according to any of the BSAPs described above, the tumor antigen is CD19 (e.g., huCD19 or cynoCD19). In some embodiments, the VH of the anti-CD19 Fab comprises: a heavy chain hypervariable region 1 (HVR-H1) comprising the amino acid sequence of SEQ ID NO: 1, an HVR-H2 comprising the amino acid sequence of SEQ ID NO: 2, and an HVR-H3 comprising the amino acid sequence of SEQ ID NO: 3; wherein the VL of the anti-CD19 Fab comprises: a light chain hypervariable region 1 (HVR-L1) comprising the amino acid sequence of SEQ ID NO: 4 or 37, an HVR-L2 comprising the amino acid sequence of SEQ ID NO: 5 or 38, and an HVR-L3 comprising the amino acid sequence of SEQ ID NO: 6 or 39. In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; wherein the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6. In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; wherein the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39. In some embodiments, the VH of the anti-CD19 Fab comprises an amino acid sequence at least about 95% (such as at least about any of 96%, 97%, 98%, or 99%) identical to the amino acid sequence of SEQ ID NO: 7, wherein the VL of the anti-CD19 Fab comprises an amino acid sequence at least about 95% (such as at least about any of 96%, 97%, 98%, or 99%) identical to the amino acid sequence of SEQ ID NO: 8 or 40. In some embodiments, the VH of the anti-CD19 Fab comprises the amino acid sequence of SEQ ID NO: 7, wherein the VL of the anti-CD19 Fab comprises the amino acid sequence of SEQ ID NO: 8. In some embodiments, the VH of the anti-CD19 Fab comprises the amino acid sequence of SEQ ID NO: 7, wherein the VL of the anti-CD19 Fab comprises the amino acid sequence of SEQ ID NO: 40.

In some embodiments according to any of the BSAPs described above, the anti-CD3 binding domain (e.g., scFv) specifically recognizes the N-terminus of CD3ε (e.g., huCD3ε or cynoCD3ε), such as an epitope within amino acid residues 1-27 of CD3ε. In some embodiments, the anti-CD3 binding domain (e.g., scFv) comprises a VH and a VL; wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, the VH of the anti-CD3 binding domain (e.g., scFv) comprises an amino acid sequence at least about 95% (such as at least about any of 96%, 97%, 98%, or 99%) identical to the amino acid sequence of SEQ ID NO: 15, wherein the VL of the anti-CD3 binding domain comprises an amino acid sequence at least about 95% (such as at least about any of 96%, 97%, 98%, or 99%) identical to the amino acid sequence of SEQ ID NO: 16. In some embodiments, the VH of the anti-CD3 binding domain (e.g., scFv) comprises the amino acid sequence of SEQ ID NO: 15, wherein the VL of the anti-CD3 binding domain comprises the amino acid sequence of SEQ ID NO: 16.

In some embodiments according to any of the BSAPs described above, the anti-CD3 binding domain is an anti-CD3 scFv, wherein the anti-CD3 scFv comprises a VH and a VL connected by a connecting peptide. In some embodiments, the anti-CD3 scFv comprises the amino acid sequence of SEQ ID NO: 17.

In some embodiments according to any of the BSAPs described above, the CH1 and the CL of the anti-tumor antigen Fab (e.g., anti-CD19 Fab) are connected by a disulfide bond, such as about 1 to about 5 disulfide bonds, e.g., about 2 disulfide bonds.

In some embodiments according to any of the BSAPs described above, the CH1 of the anti-tumor antigen Fab (e.g., anti-CD19 Fab) comprises the amino acid sequence of SEQ ID NO: 18, wherein the CL of the anti-tumor antigen Fab comprises the amino acid sequence of SEQ ID NO: 19.

In some embodiments according to any of the BSAPs described above, the linker and/or the connecting peptide comprises about 2 to about 30 (such as about 2 to about 15) amino acid residues selected from the group consisting of Glycine (Gly, G), Serine (Ser, S), Arginine (Arg, R), and Alanine (Ala, A). In some embodiments, the linker and/or the connecting peptide comprises the amino acid sequence selected from the group consisting of SEQ ID NOs: 20-22, 33, and 41-54. In some embodiments, the linker comprises about 6 to about 12 amino acid residues.

In some embodiments according to any of the BSAPs described above, the BSAP comprises a first polypeptide and a second polypeptide, wherein the first polypeptide comprises an amino acid sequence at least about 95% (such as at least about any of 96%, 97%, 98%, or 99%) identical to the amino acid sequence of any of SEQ ID NOs: 23, 28, 35, 58, and 59, wherein the second polypeptide comprises an amino acid sequence at least about 95% (such as at least about any of 96%, 97%, 98%, or 99%) identical to the amino acid sequence of SEQ ID NO: 24 or 27. In some embodiments, the first polypeptide comprises the amino acid sequence of SEQ ID NO: 23, and the second polypeptide comprises the amino acid sequence of SEQ ID NO: 24. In some embodiments, the first polypeptide comprises the amino acid sequence of SEQ ID NO: 28 or 58, and the second polypeptide comprises the amino acid sequence of SEQ ID NO: 24. In some embodiments, the first polypeptide comprises the amino acid sequence of SEQ ID NO: 35 or 59, and the second polypeptide comprises the amino acid sequence of SEQ ID NO: 24. In some embodiments, the first polypeptide comprises the amino acid sequence of SEQ ID NO: 28 or 58, and the second polypeptide comprises the amino acid sequence of SEQ ID NO: 27, Further provided are isolated nucleic acids encoding any of the BSAPs described above, expression vectors carrying the isolated nucleic acids, isolated host cells comprising the expression vectors, and methods of producing any of the BSAPs described above, comprising culturing the isolated host cells and recovering the BSAPs from the cell culture.

Also provided herein are uses, compositions (such as pharmaceutical compositions), kits and articles of manufactures comprising any of the BSAPs described above. In some embodiments, there is provided a composition (such as pharmaceutical composition) comprising any of the BSAPs described above, and optionally a pharmaceutically acceptable carrier.

Use of any of the BSAPs described above in the preparation of a medicament for treating a cancer is further provided herein. In some embodiments, there is provided a method of treating a cancer (e.g., BCL or ALL) in an individual (e.g., human) in need thereof, comprising administering to the individual an effective amount of any of the BSAPs described above or a composition (such as pharmaceutical composition) thereof. In some embodiments, the BSAP or the composition (such as pharmaceutical composition) is administered intravenously. In some embodiments, the individual is a human. In some embodiments, the cancer is selected from the group consisting of acute lymphocytic leukemia (ALL), chronic lymphocytic leukemia (CLL), mantel cell leukemia (MCL), and B cell lymphoma (BCL).

These and other aspects and advantages of the present invention will become apparent from the subsequent detailed description and the appended claims. It is to be understood that one, some, or all of the properties of the various embodiments described herein may be combined to form other embodiments of the present invention.

The disclosures of all publications, patents, patent applications and published patent applications referred to herein are hereby incorporated herein by reference in their entirety.

DETAILED DESCRIPTION OF THE PRESENT APPLICATION

Figure 1A:
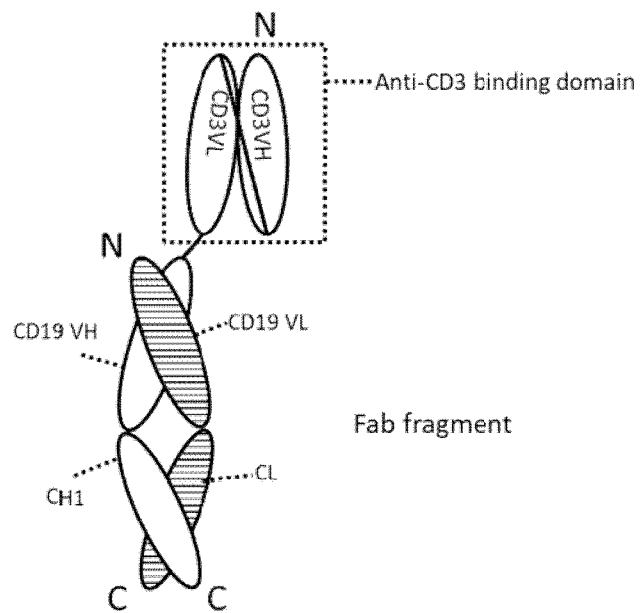
FIG. 1A depicts the structure of an exemplary CD19×CD3 antigen binding protein, wherein the anti-CD3 scFv is connected to the N-terminus of the VH of the anti-CD19 Fab.

The present invention provides a bispecific antigen binding proteins (BSAP), comprising an anti-tumor antigen Fab that specifically recognizes a tumor antigen (e.g., CD19, such as huCD19 or cynoCD19), and an anti-CD3 binding domain (e.g., scFv) that specifically recognizes CD3 (e.g., huCD3 or cynoCD3). In some embodiments, the anti-CD3 binding domain (e.g., scFv) is connected to the N-terminus of the heavy chain variable region (VH) or light chain variable region (VL) of the anti-tumor antigen Fab (e.g., anti-CD19 Fab). The invention also provides the use of the BSAP (e.g., CD19×CD3 BSAP) for the treatment of tumors, particularly hematological malignancies.

Current anti-tumor bispecific antibodies in the art suffer from several drawbacks, such as poor manufacturability, aggregation, short half-life, severe adverse effects (such as systemic immune activation and immunogenicity (anti-drug antibody response)), long infusion time, and inability of retaining in tumor tissue, which present great challenges for widespread application of these anti-cancer bispecific antibodies in cancer treatment with good efficacy and safety For example, Blinatumomab (BLINCYTO®, anti-CD3/CD19 bispecific scFv-scFv) was approved in the United States in 2014 as second-line treatment of Philadelphia chromosome-negative relapsed or refractory acute lymphoblastic leukemia (ALL). However, due to its short half-life and incompatibility with subcutaneous administration, Blinatumomab needs to be administered intravenously (i.v.) on a daily basis, yet, neurological effects such as disorientation, confusion, speech and language impairment, tremor or convulsion still occurred during clinical trials (Bargou et al. *Science* 321 (5891):974-797, 2008).

After extensive investigation, inventors of the present application unexpectedly discovered an effective BSAP format in which an anti-CD3 binding domain (e.g., scFv) is connected to an anti-tumor antigen Fab (e.g., anti-CD19 Fab). Taking CD19×CD3 BSAP as an example, we found that the CD19×CD3 BSAP described herein has several advantages compared to other bispecific proteins known in the art. First, CD19×CD3 BSAP has enhanced cytotoxic activities against cancer cells, especially for low CD19-expressing tumor, such as B cell lymphoma (BCL) and ALL. Second, the BSAP (e.g., CD19×CD3 BSAP) of the present invention has cross-reactivity with non-human primates (such as cynomolgus monkeys), which can facilitate toxicological researches. In particular, the BSAP of the present invention has binding activity to target tumor antigens (e.g., CD19) of both human and non-human primates (e.g., cynomolgus monkeys), which may facilitate extrapolating results from toxicological studies in non-human primates (such as cynomolgus monkeys) to human clinical studies. Third, the CD3×CD19 BSAP described herein has improved safety profiles and tolerance, as demonstrated in non-human primates (such as cynomolgus monkeys).

Accordingly, in one aspect, the present invention provides a BSAP (e.g., CD19×CD3 BSAP) comprising: i) an anti-tumor antigen Fab (e.g., anti-CD19 Fab) specifically recognizing a tumor antigen (e.g., CD19, such as huCD19 or cynoCD19), comprising: (a) an immunoglobulin (Ig) heavy chain variable region (VH) and an Ig heavy chain constant region 1 (CH1); and (b) an Ig light chain variable region (VL) and an Ig light chain constant region (CL); and ii) an anti-CD3 binding domain (e.g., scFv) specifically recognizing CD3 (e.g., huCD3 or cynoCD3); wherein the anti-tumor antigen Fab and the anti-CD3 binding domain are connected directly or via an optional linker. In some embodiments, the CH1 and the CL of the anti-tumor antigen Fab are connected by a disulfide bond.

Also provided are pharmaceutical compositions and kits comprising any of the BSAPs described herein (e.g., CD19× CD3 BSAP), and methods of use thereof for treating cancer.

I. Definitions

The practice of the present invention will employ, unless indicated specifically to the contrary, conventional methods of virology, immunology, microbiology, molecular biology and recombinant DNA techniques within the skill of the art, many of which are described below for the purpose of illustration. Such techniques are explained fully in the literature. See, e.g., Current Protocols in Molecular Biology or Current Protocols in Immunology, John Wiley & Sons, New York, N.Y. (2009); Ausubel et al., Short Protocols in Molecular Biology, 3rd ed., John Wiley & Sons, 1995; Sambrook and Russell, Molecular Cloning: A Laboratory Manual (3rd Edition, 2001); Maniatis et al., Molecular Cloning: A Laboratory Manual (1982); DNA Cloning: A Practical Approach, vol. I&II (D. Glover, ed.); Oligonucleotide Synthesis (N. Gait, ed., 1984); Nucleic Acid Hybridization (B. Hames & S. Higgins, eds., 1985); Transcription and Translation (B. Hames & S. Higgins, eds., 1984); Animal Cell Culture (R. Freshney, ed., 1986); Perbal, A Practical Guide to Molecular Cloning (1984) and other like references.

As used herein, the term "treatment" refers to clinical intervention designed to alter the natural course of the individual or cell being treated during the course of clinical pathology. Desirable effects of treatment include decreasing the rate of disease progression, ameliorating or palliating the disease state, and remission or improved prognosis. For example, an individual is successfully "treated" if one or more symptoms associated with cancer are mitigated or eliminated, including, but are not limited to, reducing the proliferation of (or destroying) cancerous cells, decreasing symptoms resulting from the disease, increasing the quality of life of those suffering from the disease, decreasing the dose of other medications required to treat the disease, and/or prolonging survival of individuals.

As used herein, an "effective amount" refers to an amount of an agent or drug effective to treat a disease or disorder in a subject. In the case of cancer, the effective amount of the agent may reduce the number of cancer cells; reduce the tumor size; inhibit (i.e., slow to some extent and preferably stop) cancer cell infiltration into peripheral organs; inhibit (i.e., slow to some extent and preferably stop) tumor metastasis; inhibit, to some extent, tumor growth; and/or relieve to some extent one or more of the symptoms associated with the cancer. A person of ordinary skill in the art would readily appreciate that "therapeutically effective amount" may vary depending on the route of administration, pharmaceutical excipients employed, and whether the administration is in conjunction with another drug or pharmaceutical composition.

As used herein, an "individual" or a "subject" refers to a mammal, including, but not limited to, human, bovine, horse, feline, canine, rodent, or primate. In some embodiments, the individual is a human.

The term "antibody" is used in the broadest sense and specifically covers monoclonal antibodies (including full length monoclonal antibodies), multispecific antibodies (e.g., bispecific antibodies), and antibody fragments so long as they exhibit the desired biological activity or function. As used herein, the terms "immunoglobulin" (Ig) and "antibody" are used interchangeably.

The terms "native antibody", "full length antibody," "intact antibody" and "whole antibody" are used herein interchangeably to refer to an antibody in its substantially intact form, not antibody fragments as defined below. The terms particularly refer to an antibody with light chains (LC) and heavy chains (HC) that contain an Fc region. Native antibodies are usually heterotetrameric glycoproteins of about 150,000 Daltons, composed of two identical light (L) chains and two identical heavy (H) chains. Each light chain is linked to a heavy chain by one covalent disulfide bond, while the number of disulfide linkages varies among the heavy chains of different immunoglobulin isotypes. Each heavy and light chain also has regularly spaced intrachain disulfide bridges. Each heavy chain has at one end a variable domain ($V_H$) followed by a number of constant domains. Each light chain has a variable domain at one end ($V_L$) and a constant domain at its other end; the constant domain of the light chain is aligned with the first constant domain of the heavy chain (CH1), and the VL is aligned with the VH. Particular amino acid residues are believed to form an interface between the light chain and heavy chain variable domains.

The term "constant domain" refers to the portion of an immunoglobulin molecule having a more conserved amino acid sequence relative to the other portion of the immunoglobulin, the variable domain, which contains the antigen binding site. The constant domain contains the $C_H1$, $C_H2$ and $C_H3$ domains (collectively, CH) of the heavy chain and the CL domain of the light chain.

The "variable region" or "variable domain" of an antibody refers to the amino-terminal domains of the heavy or light chain of the antibody. The variable domain of the heavy chain may be referred to as "VH." The variable domain of the light chain may be referred to as "VL." These domains are generally the most variable parts of an antibody and contain the antigen-binding sites.

The term "variable" refers to the fact that certain portions of the variable domains differ extensively in sequence among antibodies and are used in the binding and specificity of each particular antibody for its particular antigen. However, the variability is not evenly distributed throughout the variable domains of antibodies. It is concentrated in three segments called hypervariable regions (HVRs, also referred to as CDRs) both in the light-chain and the heavy-chain variable domains. The more highly conserved portions of variable domains are called the framework regions (FR). The variable domains of native heavy and light chains each comprise four FR regions, largely adopting a beta-sheet configuration, connected by three HVRs, which form loops connecting, and in some cases forming part of, the beta-sheet structure. The HVRs in each chain are held together in close proximity by the FR regions and, with the HVRs from the other chain, contribute to the formation of the antigen-binding site of antibodies (see Kabat et al., Sequences of Proteins of Immunological Interest, Fifth Edition, National Institute of Health, Bethesda, Md. (1991)). The constant domains are not involved directly in the binding of an antibody to an antigen, but exhibit various effector functions, such as participation of the antibody in antibody-dependent cellular toxicity.

The "light chains" of antibodies (immunoglobulins) from any mammalian species can be assigned to one of two clearly distinct types, called kappa ("κ") and lambda ("λ"), based on the amino acid sequences of their constant domains.

The term IgG "isotype" or "subclass" as used herein is meant any of the subclasses of immunoglobulins defined by the chemical and antigenic characteristics of their constant regions.

Depending on the amino acid sequences of the constant domains of their heavy chains, antibodies (immunoglobulins) can be assigned to different classes. There are five major classes of immunoglobulins: IgA, IgD, IgE, IgG, and IgM, and several of these may be further divided into subclasses (isotypes), e.g., IgG1, IgG2, IgG3, IgG4, IgA1, and IgA2. The heavy chain constant domains that correspond to the different classes of immunoglobulins are called α, γ, ε, γ, and μ, respectively. The subunit structures and three-dimensional configurations of different classes of immunoglobulins are well known and described generally in, for example, Abbas et al. Cellular and Mol. Immunology, 4th ed. (W.B. Saunders, Co., 2000). An antibody may be part of a larger fusion molecule, formed by covalent or non-covalent association of the antibody with one or more other proteins or peptides.

"Antibody fragment" or "antigen binding domain" comprises a portion of an intact antibody, preferably comprising the antigen binding region thereof. In some embodiments, the antibody fragment or antigen binding domain described herein is an antigen binding fragment. Examples of antigen binding fragments include but are not limited to Fab, Fab', $F(ab')_2$, and Fv fragments (such as single-chain variable fragment, scFv); diabodies; linear antibodies; single-chain antibody molecules; and multispecific antibodies formed from antibody fragments.

Papain digestion of antibodies produces two identical antigen binding fragments, called "Fragment antigen binding" (Fab), each comprising a single antigen binding site; and a residual "Fragment crystallizable region" (Fc) fragment, the name of which reflects its ability to crystallize readily. In some embodiments, pepsin treatment yields a bigger $F(ab')_2$ fragment, generally can be considered as two Fabs connected via a disulfide bond, and is still capable of cross-linking antigen.

"Fv" is the minimum antibody fragment which contains a complete antigen-binding site. In some embodiments, a two-chain Fv species consists of a dimer of one heavy- and one light-chain variable domain in tight, non-covalent association. In a single-chain Fv (scFv) species, one heavy- and one light-chain variable domain can be covalently linked by a flexible peptide linker such that the light and heavy chains can associate in a "dimeric" structure analogous to that in a two-chain Fv species. The folded configuration of these two Fvs results in 6 HVRs (three HVRs of VH and three HVRs of VL) that interact to define an antigen-binding site and contribute to antigen-binding specific to the antibody. However, even a single variable domain (or half of an Fv comprising only three HVRs specific for an antigen) has the ability to recognize and bind antigen, although at a lower affinity than the entire binding site.

The Fab fragment comprises the intact light chain (LC), the heavy chain variable region (VH), and the first constant domain of the heavy chain (CH1). Fab' fragments differ from Fab fragments by the addition of a few residues at the carboxy terminus of the heavy chain CH1 domain including one or more cysteines from the antibody hinge region. Fab'-SH is the designation herein for Fab' in which the cysteine residue(s) of the constant domains bear a free thiol group. F(ab')2 antibody fragments originally were produced as pairs of Fab' fragments which have hinge cysteines between them. Other chemical couplings of antibody fragments are also known.

"Single-chain Fv" or "scFv" antibody fragments comprise the VH and VL domains of antibody, wherein these domains are present in a single polypeptide chain. Generally, the scFv polypeptide further comprises a polypeptide linker ("connecting peptide") between the VH and VL domains which enables the scFv to form the desired structure for antigen binding. For a review of scFv, see, e.g., Pluckthun, The Pharmacology of Monoclonal Antibodies. Springer Berlin Heidelberg, 1994. 269-315.

The "Fc" fragment comprises the carboxy-terminal portions of both heavy chains held together by di-sulfide bonds. The effector functions of antibodies are determined by sequences in the Fc region, which region is also the part recognized by Fc receptors (FcR) found on certain types of cells.

The term "monoclonal antibody" as used herein refers to an antibody obtained from a population of substantially homogeneous antibodies, e.g., the individual antibodies comprising the population are identical except for possible mutations, e.g., naturally occurring mutations, that may be present in minor amounts. Thus, the modifier "monoclonal" indicates the character of the antibody as not being a mixture of discrete antibodies. In some embodiments, such a monoclonal antibody typically includes an antibody comprising a polypeptide sequence that binds a target, wherein the target-binding polypeptide sequence was obtained by a process that includes the selection of a single target binding polypeptide sequence from a plurality of polypeptide sequences. For example, the selection process can be the selection of a unique clone from a plurality of clones, such as a pool of hybridoma clones, phage clones, or recombinant DNA clones. It should be understood that a selected target binding sequence can be further altered, for example, to improve affinity for the target, to humanize the target binding sequence, to improve its production in cell culture, to reduce its immunogenicity in vivo, to create a multispecific antibody, etc., and that an antibody comprising the altered target binding sequence is also a monoclonal antibody of this invention. In contrast to polyclonal antibody preparations, which typically include different antibodies directed against different determinants (epitopes), each monoclonal antibody of a monoclonal antibody preparation is directed against a single determinant on an antigen. In addition to their specificity, monoclonal antibody preparations are advantageous in that they are typically uncontaminated by other immunoglobulins.

The modifier "monoclonal" indicates the character of the antibody as being obtained from a substantially homogeneous population of antibodies, and is not to be construed as requiring production of the antibody by any particular method. For example, the monoclonal antibodies to be used in accordance with the invention may be made by a variety of techniques, including, for example, the hybridoma method (e.g., Kohler and Milstein, Nature 256:495-97 (1975); Hongo et al., Hybridoma 14 (3): 253-260 (1995), Harlow et al., Antibodies: A Laboratory Manual, (Cold Spring Harbor Laboratory Press, 2nd ed. 1988); Hammerling et al., Monoclonal Antibodies and T-Cell Hybridomas 563-681 (Elsevier, N.Y., 1981)), recombinant DNA methods (see, e.g., U.S. Pat. No. 4,816,567), phage-display technologies (see, e.g., Clackson et al., Nature 352: 624-628 (1991); Marks et al., J. Mol. Biol. 222: 581-597 (1992); Sidhu et al., J. Mol. Biol. 338(2): 299-310 (2004); Lee et al., J. Mol. Biol. 340(5): 1073-1093 (2004); Fellouse, Proc. Natl. Acad. Sci. USA 101(34): 12467-12472 (2004); and Lee et al., J. Immunol. Methods 284(1-2): 119-132 (2004)), and technologies for producing human or human-like antibodies in animals that have parts or all of the human immunoglobulin loci or genes encoding human immunoglobulin sequences (see, e.g., WO 1998/24893; WO 1996/34096; WO 1996/33735; WO 1991/10741; Jakobovits et al., Proc. Natl. Acad. Sci. USA 90: 2551 (1993); Jakobovits et al., Nature 362: 255-258 (1993); Bruggemann et al., Year in Immunol. 7:33 (1993); U.S. Pat. Nos. 5,545,807; 5,545,806; 5,569,825; 5,625,126; 5,633,425; and U.S. Pat. No. 5,661,016; Marks et al., Bio/Technology 10: 779-783 (1992); Lonberg et al., Nature 368: 856-859 (1994); Morrison, Nature 368: 812-813 (1994); Fishwild et al., Nature Biotechnol. 14: 845-851 (1996); Neuberger, Nature Biotechnol. 14: 826 (1996); and Lonberg and Huszar, Intern. Rev. Immunol. 13: 65-93 (1995)).

The monoclonal antibodies herein specifically include "chimeric" antibodies in which a portion of the heavy and/or light chain is identical with or homologous to corresponding sequences in antibodies derived from a particular species or belonging to a particular antibody class or subclass, while the remainder of the chain(s) is identical with or homologous to corresponding sequences in antibodies derived from another species or belonging to another antibody class or subclass, as well as fragments of such antibodies, so long as they exhibit the desired biological activity (see, e.g., U.S. Pat. No. 4,816,567; and Morrison et al., Proc. Natl. Acad. Sci. USA 81:6851-6855 (1984)). Chimeric antibodies include PRIMATTZED® antibodies wherein the antigen-binding region of the antibody is derived from an antibody produced by, e.g., immunizing macaque monkeys with the antigen of interest "Humanized" forms of non-human (e.g., murine) antibodies are chimeric antibodies that contain minimal sequence derived from non-human immunoglobulin. In one embodiment, a humanized antibody is a human immunoglobulin (recipient antibody) in which residues from an HVR (defined below) of the recipient are replaced by residues from a HVR of a non-human species (donor antibody) such as mouse, rat, rabbit, or nonhuman primate having the desired specificity, affinity, and/or capacity. In some instances, FR residues of the human immunoglobulin are replaced by corresponding non-human residues. Furthermore, humanized antibodies may comprise residues that are not found in the recipient antibody or in the donor antibody. These modifications may be made to further refine antibody performance. In general, a humanized antibody will comprise substantially all of at least one, and typically two, variable domains, in which all or substantially all of the hypervariable loops correspond to those of a non-human immunoglobulin, and all or substantially all of the FRs are those of a human immunoglobulin sequence. The humanized antibody optionally will also comprise at least a portion of an immunoglobulin constant region (Fc), typically that of a human immunoglobulin. For further details, see, e.g., Jones et al., Nature 321:522-525 (1986); Riechmann et al., Nature 332:323-329 (1988); and Presta, Curr. Op. Struct. Biol. 2:593-596 (1992). See also, e.g., Vaswani and Hamilton, Ann. Allergy, Asthma & Immunol. 1:105-115 (1998); Harris, Biochem. Soc. Transactions 23:1035-1038 (1995); Hurle and Gross, Cuff. Op. Biotech. 5:428-433 (1994); and U.S. Pat. Nos. 6,982,321 and 7,087,409.

A "human antibody" is one which possesses an amino acid sequence which corresponds to that of an antibody produced by a human and/or has been made using any of the techniques for making human antibodies as disclosed herein. This definition of a human antibody specifically excludes a humanized antibody comprising non-human antigen-binding residues. Human antibodies can be produced using various techniques known in the art, including phage-display libraries (Hoogenboom and Winter, J. Mol. Biol. 227: 381 (1991); Marks et al., J. Mol. Biol. 222:581 (1991)). Also available for the preparation of human monoclonal antibodies are methods described in Cole et al., Monoclonal Antibodies and Cancer Therapy, Alan R. Liss, 77 (1985); Boerner et al., J. Immunol. 147(1):86-95 (1991). See also van Dijk and van de Winkel, Curr. Opin. Pharmacol. 5: 368-74 (2001). Human antibodies can be prepared by administering the antigen to a transgenic animal that has been modified to produce such antibodies in response to antigenic challenge, but whose endogenous loci have been disabled, e.g., immunized xenomice (see, e.g., U.S. Pat. Nos. 6,075,181 and 6,150,584 regarding XENOMOUSE™ technology). See also, for example, Li et al., Proc. Natl. Acad. Sci. USA 103:3557-3562 (2006) regarding human antibodies generated via a human B-cell hybridoma technology.

The term "hypervariable region," "HVR," or "HV," when used herein refers to the regions of an antibody variable domain which are hypervariable in sequence and/or form structurally defined loops. Generally, antibodies comprise six HVRs; three in the VH (H1, H2, H3), and three in the VL (L1, L2, L3). In native antibodies, H3 and L3 display the most diversity of the six HVRs, and H3 in particular is believed to play a unique role in conferring fine specificity to antibodies. See, e.g., Xu et al., Immunity 13:37-45 (2000); Johnson and Wu, in Methods in Molecular Biology 248:1-25

(Lo, ed., Human Press, Totowa, N.J., 2003). Indeed, naturally occurring camelid antibodies consisting of a heavy chain only are functional and stable in the absence of light chain. See, e.g., Hamers-Casterman et al., Nature 363:446-448 (1993); Sheriff et al., Nature Struct. Biol. 3:733-736 (1996).

The structures and locations of immunoglobulin variable regions may be determined by reference to Kabat, E. A. et al, Sequences of Proteins of Immunological Interest 4th Edition. US Department of Health and Human Services. 1987, and updates thereof, now available on the Internet (immuno.bme.nwu.edu).

"Framework" or "FR" residues are those variable domain residues other than the HVR residues as herein defined.

The term "covalently linked" as used herein, refers to a direct linkage through one or more chemical bonds or an indirect linkage through one or more linkers. Any suitable chemical bond can be used to create a direct linkage, including but not limited to, a covalent bond such as a peptide bond and a disulfide bond, or a non-covalent bond such as a hydrogen bond, a hydrophobic bond, an ionic bond, or a van der Waals bond.

"Covalent bond" as used herein refers to a stable bond between two atoms sharing one or more electrons. Examples of covalent bonds include, but are not limited to, peptide bonds and disulfide bonds. As used herein, "peptide bond" refers to a covalent bond formed between a carboxyl group of an amino acid and an amine group of an adjacent amino acid. A "disulfide bond" as used herein refers to a covalent bond formed between two sulfur atoms. Disulfide bonds can be formed by oxidation of two thiol groups. In some embodiments, the covalent linkage is directly linked by a covalent bond. In some embodiments, the covalent linkage is directly linked by a peptide bond or a disulfide bond.

"Disulfide bond" as used herein refers to the combination of a heavy chain fragment CH1 and a light chain fragment CL by one or more disulfide bonds. One or more disulfide bonds may be formed between the two fragments by connecting the thiol groups in the two fragments. In some embodiments, one or more disulfide bonds can be formed between one or more cysteines of the heavy chain fragment and the light chain fragment, respectively.

As use herein, the term "binds", "specifically binds to," "specifically recognizes," or is "specific for" refers to measurable and reproducible interactions such as binding between a target and an antibody, which is determinative of the presence of the target in the presence of a heterogeneous population of molecules including biological molecules. For example, an antibody that binds to or specifically binds to a target (which can be an epitope) is an antibody that binds this target with greater affinity, avidity, more readily, and/or with greater duration than it binds to other targets. In one embodiment, the extent of binding of an antibody to an unrelated target is less than about 10% of the binding of the antibody to the target as measured, e.g., by a radioimmunoassay (RIA). In some embodiments, an antibody that specifically binds to a target has a dissociation constant ($K_d$) of ≤1 μM, ≤100 nM, ≤10 nM, ≤1 nM, or ≤0.1 nM. In some embodiments, an antibody specifically binds to an epitope on a protein that is conserved among the protein from different species. In another embodiment, specific binding can include, but does not require exclusive binding.

As used herein, "Percent (%) amino acid sequence identity" and "homology" with respect to a peptide, polypeptide or antibody sequence are defined as the percentage of amino acid residues in a candidate sequence that are identical with the amino acid residues in the specific peptide or polypeptide sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN or MEGALIGN™ (DNASTAR) software. Those skilled in the art can determine appropriate parameters for measuring alignment, including any algorithms needed to achieve maximal alignment over the full length of the sequences being compared.

An amino acid substitution may include but are not limited to the replacement of one amino acid in a polypeptide with another amino acid. Exemplary substitutions are shown in Table A. Amino acid substitutions may be introduced into an antibody of interest and the products screened for a desired activity, e.g., retained/improved antigen binding, decreased immunogenicity, or improved antibody-dependent cellular cytotoxicity (ADCC) or Complement Dependent Cytotoxicity (CDC).

TABLE. A

| Original Residue | Exemplary Substitutions |
| --- | --- |
| Ala (A) | Val; Leu; Ile |
| Arg (R) | Lys; Gln; Asn |
| Asn (N) | Gln; His; Asp, Lys; Arg |
| Asp (D) | Glu; Asn |
| Cys (C) | Ser; Ala |
| Gln (Q) | Asn; Glu |
| Glu (E) | Asp; Gln |
| Gly (G) | Ala |
| His (H) | Asn; Gln; Lys; Arg |
| Ile (I) | Leu; Val; Met; Ala; Phe; Norleucine |
| Leu (L) | Norleucine; Ile; Val; Met; Ala; Phe |
| Lys (K) | Arg; Gln; Asn |
| Met (M) | Leu; Phe; Ile |
| Phe (F) | Trp; Leu; Val; Ile; Ala; Tyr |
| Pro (P) | Ala |
| Ser (S) | Thr |
| Thr (T) | Val; Ser |
| Trp (W) | Tyr; Phe |
| Tyr (Y) | Trp; Phe; Thr; Ser |
| Val (V) | Ile; Leu; Met; Phe; Ala; Norleucine |

Amino acids may be grouped according to common side-chain properties: (1) hydrophobic: Norleucine, Met, Ala, Val, Leu, Ile; (2) neutral hydrophilic: Cys, Ser, Thr, Asn, Gln; (3) acidic: Asp, Glu; (4) basic: His, Lys, Arg; (5) residues that influence chain orientation: Gly, Pro; (6) aromatic: Trp, Tyr, Phe. Non-conservative substitutions will entail exchanging a member of one of these classes for another class.

As used herein, a "bispecific antigen binding protein" refers to a protein comprising an anti-tumor antigen Fab that specifically binds to a tumor antigen covalently linked to an anti-CD3 binding domain (e.g., scFv) that specifically binds to CD3, wherein the anti-tumor antigen Fab has different characteristics. The characteristics may be biological characteristics, such as in vitro or in vivo activity. The characteristics may also be simple chemical or physical properties, such as binding to a target molecule, catalytic reactions, and the like. The anti-tumor antigen Fab and the anti-CD3 binding domain (e.g., scFv) may be directly connected by a single peptide bond, or connected via a peptide linker, but to each other in an in-frame manner.

The term "bispecific" as used in conjunction with an antibody or antigen binding protein (such as a bispecific antigen binding protein, BSAP) refers to an antibody or antigen binding protein capable of specifically binding to two different epitopes on one biological molecule, or capable of specifically binding to epitopes on two different biological molecules. Unless otherwise indicated, the order in which the antigens bound by a bispecific antibody or BSAP listed in a bispecific antibody or BSAP name is arbitrary. That is, the terms "anti-CD3/CD19," "anti-CD19/CD3," "CD19×CD3" and "CD3×CD19" may be used interchangeably to refer to bispecific antibodies (such as BSAP) that specifically bind to both CD3 and CD19.

The terms "bispecific antigen binding protein", "bispecific antibody" and "BSAP" may be used interchangeably to refer to an antigen binding protein that has two epitopic specificity.

As used herein, the "C terminus" of a polypeptide refers to the last amino acid residue of the polypeptide which donates its amine group to form a peptide bond with the carboxyl group of its adjacent amino acid residue. "N terminus" of a polypeptide as used herein refers to the first amino acid of the polypeptide which donates its carboxyl group to form a peptide bond with the amine group of its adjacent amino acid residue.

The term "vector," as used herein, refers to a nucleic acid molecule capable of propagating another nucleic acid to which it is linked. The term includes the vector as a self-replicating nucleic acid structure as well as the vector incorporated into the genome of a host cell into which it has been introduced. Certain vectors are capable of directing the expression of nucleic acids to which they are operatively linked. Such vectors are referred to herein as "expression vectors."

The term "cell" includes the primary subject cell and its progeny.

The term "cytokine storm," also known as a "cytokine cascade" or "hypercytokinemia," is a potentially fatal immune reaction typically consisting of a positive feedback loop between cytokines and immune cells, with highly elevated levels of various cytokines (e.g. INF-γ, IL-10, IL-6, CCL2, etc.).

It is understood that embodiments of the invention described herein include "consisting" and/or "consisting essentially of" embodiments.

Reference to "about" a value or parameter herein includes (and describes) variations that are directed to that value or parameter per se. For example, description referring to "about X" includes description of "X".

As used herein, reference to "not" a value or parameter generally means and describes "other than" a value or parameter. For example, the method is not used to treat cancer of type X means the method is used to treat cancer of types other than X.

The term "about X-Y" used herein has the same meaning as "about X to about Y."

As used herein and in the appended claims, the singular forms "a," "or," and "the" include plural referents unless the context clearly dictates otherwise.

II. Bispecific Antigen Binding Proteins (BSAPs)

Figure 1B:
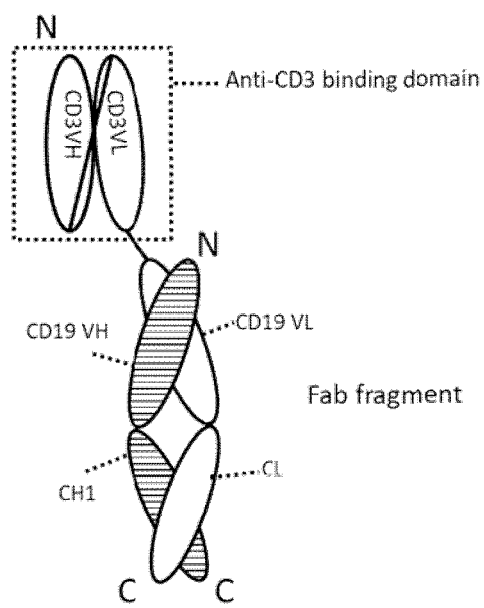
FIG. 1B depicts the structure of an exemplary CD19×CD3 antigen binding protein, wherein the anti-CD3 scFv is connected to the N-terminus of the VL of the anti-CD19 Fab.

The present invention provides a BSAP comprising a Fab specifically recognizing a tumor antigen (e.g., CD19, such as huCD19 or cynoCD19) (hereinafter referred to as "anti-tumor antigen Fab," such as "anti-CD19 Fab") and an anti-CD3 binding domain (e.g., scFv) specifically recognizing CD3 (e.g., huCD3 or cynoCD3; hereinafter referred to as "anti-CD3 binding domain," such as "anti-CD3 scFv"), wherein the anti-tumor antigen Fab comprises an immunoglobulin (Ig) heavy chain variable region (VH) and an Ig heavy chain constant region 1 (CH1), and an Ig light chain variable region (VL) and an Ig light chain constant region (CL). In some embodiments, the CH1 and the CL of the anti-tumor antigen Fab are connected by a disulfide bond. In some embodiments, the anti-tumor antigen Fab (e.g., anti-CD19 Fab) and the anti-CD3 binding domain (e.g., scFv) are connected directly. In some embodiments, the anti-tumor antigen Fab (e.g., anti-CD19 Fab) and the anti-CD3 binding domain (e.g., scFv) are connected by a linker. In some embodiments, the anti-CD3 binding domain (e.g., scFv) is connected to the N-terminus of the VH and/or VL of the anti-tumor antigen Fab (e.g., anti-CD19 Fab). In some embodiments, the BSAP comprises two anti-CD3 binding domains (e.g., scFvs), wherein the first anti-CD3 binding domain is connected to the N-terminus of the VH of the anti-tumor antigen Fab; and wherein the second anti-CD3 binding domain is connected to the N-terminus of the VL of the anti-tumor antigen Fab. FIGS. 1A and 1B demonstrate exemplary configurations of BSAPs described herein. In some embodiments, the BSAP comprises an anti-CD19 Fab specifically recognizing CD19, and an anti-CD3 binding domain (e.g., scFv) specifically recognizing CD3, hereinafter referred to as "CD19×CD3 BSAP."

The BSAP of the present invention (e.g., CD19×CD3 BSAP) has significant advantages including but not limited to: 1) demonstrated enhanced cancer cell killing efficacy; 2) BSAPs of the invention (e.g., ×CD3 BSAP) demonstrated superior in vivo therapeutic effects on B cell lymphoma and acute lymphoblastic leukemia (ALL) in animal models; 3) cross-reactivity with non-human primates, such as cynomolgus monkeys, which may facilitate toxicological research on non-human primates (e.g., cynomolgus monkeys) for the benefit of human clinical study prediction; 4) improved safety profiles and tolerance.

Thus, in some embodiments, there is provided a BSAP comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-tumor antigen Fab and the anti-CD3 binding domain are connected directly or via an optional linker. In some embodiments, the anti-CD3 binding domain (e.g., scFv) is connected to the N-terminus of the VH of the anti-tumor antigen Fab (e.g., anti-CD19 Fab). Thus, in some embodiments, there is provided a BSAP comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-tumor antigen Fab and the anti-CD3 binding domain (e.g., scFv) are connected directly or via an optional linker; and wherein the anti-CD3 binding domain (e.g., scFv) is connected to the N-terminus of the VH of the anti-tumor antigen Fab. In some embodiments, the anti-CD3 binding domain (e.g., scFv) is connected to the N-terminus of the VL of the anti-tumor antigen Fab. Thus, in some embodiments, there is provided a BSAP comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-tumor antigen Fab and the anti-CD3 binding domain are connected directly or via an optional linker; and wherein the anti-CD3 binding domain (e.g., scFv) is connected to the N-terminus of the VL of the anti-tumor antigen Fab. In some embodiments, the BSAP comprises two anti-CD3 binding domains (e.g., scFvs), wherein the first anti-CD3 binding domain (e.g., scFv) is connected to the N-terminus of the VH of the anti-tumor antigen (e.g., CD19) Fab; and wherein the second anti-CD3 binding domain (e.g., scFv) is connected to the N-terminus of the VL of the anti-tumor antigen (e.g., CD19) Fab. Thus, in some embodiments, there is provided a BSAP comprising: i) an anti-tumor antigen Fab specifically recognizing a tumor antigen (e.g., CD19, such as huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-tumor antigen Fab and the first anti-CD3 binding domain are connected directly or via an optional first linker, and the anti-tumor antigen Fab and the second anti-CD3 binding domain are connected directly or via an optional second linker; and wherein the first anti-CD3 binding domain (e.g., scFv) is connected to the N-terminus of the VH of the anti-tumor antigen (e.g., CD19) Fab, and the second anti-CD3 binding domain (e.g., scFv) is connected to the N-terminus of the VL of the anti-tumor antigen (e.g., CD19) Fab. In some embodiments, the tumor antigen is selected from the group consisting of CD19, EpCAM, CD20, CD22, CD30, CD37, CD40, and CD74. In some embodiments, the tumor antigen is CD19. Thus in some embodiments, the anti-tumor antigen Fab is an anti-CD19 Fab specifically recognizing CD19. In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4 or 37, an HVR-L2 comprising the amino acid sequence of SEQ ID NO: 5 or 38, and an HVR-L3 comprising the amino acid sequence of SEQ ID NO: 6 or 39. In some embodiments, the anti-CD3 binding domain (e.g., scFv) specifically recognizes the N-terminus of CD3ε (e.g., huCD3ε or cynoCD3ε), for example, an epitope within amino acid residues 1-27 of CD3ε. In some embodiments, the anti-CD3 binding domain is an scFv ("anti-CD3 scFv"), wherein the anti-scFv comprises a VH and a VL optionally connected by a connecting peptide. In some embodiments, the anti-CD3 scFv comprises the amino acid sequence of SEQ ID NO: 17. In some embodiments, the CH1 and the CL of the anti-tumor antigen (e.g., CD19) Fab are connected by a disulfide bond, such as about 1 to about 5 (such as about any of 1, 2, 3, 4, or 5) disulfide bonds, e.g., about 2 disulfide bonds. In some embodiments, the CH1 of the anti-tumor antigen (e.g., CD19) Fab comprises the amino acid sequence of SEQ ID NO: 18, and/or the CL of the anti-tumor antigen (e.g., CD19) Fab comprises the amino acid sequence of SEQ ID NO: 19. In some embodiments, the linker situated between the anti-tumor antigen (e.g., CD19) Fab and the anti-CD3 binding domain (e.g., scFv), and/or the connecting peptide situated between the VH and the VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine. In some embodiments, the linker situated between the anti-tumor antigen Fab and the anti-CD3 binding domain, and/or the connecting peptide situated between the VH and the VL of the anti-CD3 scFv is selected from a group consisting of SEQ ID NOs: 20-22, 33, and 41-54, e.g., selected from amino acid sequences of any of SEQ ID NOs: 21, 22, 33, and 53.

In some embodiments, the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14.

Thus in some embodiments, there is provided a BSAP comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-tumor antigen Fab and the anti-CD3 binding domain (e.g., scFv) are connected directly or via an optional linker; wherein the anti-CD3 binding domain (e.g., scFv) comprises a VH, wherein the VH of the anti-CD3 binding domain (e.g., scFv) comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain (e.g., scFv) comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO:14. In some embodiments, there is provided a BSAP comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-tumor antigen Fab and the anti-CD3 binding domain (e.g., scFv) are connected directly or via an optional linker; wherein the anti-CD3 binding domain (e.g., scFv) comprises a VH, wherein the VH of the anti-CD3 binding domain (e.g., scFv) comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain (e.g., scFv) comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO:14; and wherein the anti-CD3 binding domain (e.g., scFv) is connected to the N-terminus of the VH of the anti-tumor antigen (e.g., CD19) Fab. In some embodiments, there is provided a BSAP comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-tumor antigen Fab and the anti-CD3 binding domain (e.g., scFv) are connected directly or via an optional linker; wherein the anti-CD3 binding domain (e.g., scFv) comprises a VH, wherein the VH of the anti-CD3 binding domain (e.g., scFv) comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain (e.g., scFv) comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO:14; and wherein the anti-CD3 binding domain (e.g., scFv) is connected to the N-terminus of the VL of the anti-tumor antigen (e.g., CD19) Fab. In some embodiments, there is provided a BSAP comprising: i) an anti-tumor antigen Fab specifically recognizing a tumor antigen (e.g., CD19, such as huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-tumor antigen Fab and the first anti-CD3 binding domain (e.g., scFv) are connected directly or via an optional first linker, and anti-tumor antigen Fab and the second anti-CD3 binding domain (e.g., scFv) are connected directly or via an optional second linker; wherein each of the anti-CD3 binding domains (e.g., scFv) comprises a VH, wherein the VH of the anti-CD3 binding domain (e.g., scFv) comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or each of the anti-CD3 binding domains (e.g., scFv) comprises a VL, wherein the VL of the anti-CD3 binding domain (e.g., scFv) comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO:14; and wherein the first anti-CD3 binding domain (e.g., scFv) is connected to the N-terminus of the VH of the anti-tumor antigen (e.g., CD19) Fab, and the second anti-CD3 binding domain (e.g., scFv) is connected to the N-terminus of the VL of the anti-tumor antigen (e.g., CD19) Fab. In some embodiments, the CL and the CH1 of the anti-tumor antigen Fab are connected by a disulfide bond, such as about 1 to about 5 (e.g., about any of 1, 2, 3, 4, or 5) disulfide bonds, e.g., 2 disulfide bonds. In some embodiments, the anti-CD3 binding domain (e.g., scFv) specifically recognizes the N-terminus of CD3ε (e.g., huCD3ε, cynoCD3ε), for example, an epitope within amino acid residues 1-27 of CD3ε. In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the tumor antigen is selected from the group consisting of CD19, EpCAM, CD20, CD22, CD30, CD37, CD40, and CD74. In some embodiments, the tumor antigen is CD19. In some embodiments, the linker situated between the anti-tumor antigen (e.g., CD19) Fab and the anti-CD3 binding domain (e.g., scFv), and/or the connecting peptide situated between the VH and the VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine. In some embodiments, the linker and/or the connecting peptide is selected from any one of SEQ ID NOs: 21, 22, 33, and 53.

In some embodiments, the anti-CD3 binding domain that specifically binds to (or specifically recognizes) CD3 (e.g., huCD3 or cynoCD3) is an scFv.

Thus, in some embodiments, there is provided a BSAP comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-tumor antigen Fab and the anti-CD3 scFv are connected directly or via an optional linker. In some embodiments, there is provided a BSAP comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-tumor antigen Fab and the anti-CD3 scFv are connected directly or via an optional linker; and wherein the anti-CD3 scFv is connected to the N-terminus of the VH of the anti-tumor antigen Fab. In some embodiments, there is provided a BSAP comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-tumor antigen Fab and the anti-CD3 scFv are connected directly or via an optional linker; and wherein the anti-CD3 scFv is connected to the N-terminus of the VL of the anti-tumor antigen Fab via an optional linker. In some embodiments, there is provided a BSAP comprising: i) an anti-tumor antigen Fab specifically recognizing a tumor antigen (e.g., CD19, such as huCD19 or cynoCD19), comprising: (a) a VH and a CH1; and (b) a VL and a CL; and ii) two anti-CD3 scFvs specifically recognizing CD3 (e.g., huCD3 or cynoCD3); wherein the anti-tumor antigen Fab and the first anti-CD3 scFv are connected directly or via an optional first linker, and the anti-tumor antigen Fab and the second anti-CD3 scFv are connected directly or via an optional second linker; and wherein the first anti-CD3 scFv is connected to the N-terminus of the VH of the anti-tumor antigen (e.g., CD19) Fab, and the second anti-CD3 scFv is connected to the N-terminus of the VL of the anti-tumor antigen (e.g., CD19) Fab. In some embodiments, the CL and the CH1 of the anti-tumor antigen Fab are connected by a disulfide bond, such as about 1 to about 5 (e.g., about any of 1, 2, 3, 4, or 5) disulfide bonds, e.g., 2 disulfide bonds. In some embodiments, the tumor antigen is selected from the group consisting of CD19, EpCAM, CD20, CD22, CD30, CD37, CD40, and CD74. In some embodiments, the tumor antigen is CD19. In some embodiments, the anti-CD3 scFv specifically binds to the N-terminus of CD3ε (e.g., huCD3ε or cynoCD3ε), such as an epitope within amino acid residues 1-27 of CD3ε. In some embodiments, the VH and the VL of the anti-CD3 scFv are connected by a connecting peptide. In some embodiments, the linker situated between the anti-tumor antigen (e.g., CD19) Fab and the anti-CD3 scFv, and/or the connecting peptide situated between VH and VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine. In some embodiments, the linker and/or the connecting peptide is selected from any one of SEQ ID NOs: 21, 22, 33, and 53.

In some embodiments, there is provided a BSAP comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-tumor antigen Fab and the anti-CD3 scFv are connected directly or via an optional linker; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO:14. In some embodiments, there is provided a BSAP comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-tumor antigen Fab and the anti-CD3 scFv are connected directly or via an optional linker; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO:14; and wherein the anti-CD3 scFv is connected to the N-terminus of the VH of the anti-tumor antigen (e.g., CD19) Fab. In some embodiments, there is provided a BSAP comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-tumor antigen Fab and the anti-CD3 scFv are connected directly or via an optional linker; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO:14; and wherein the anti-CD3 scFv is connected to the N-terminus of the VL of the anti-tumor antigen (e.g., CD19) Fab. In some embodiments, there is provided a BSAP comprising: i) an anti-tumor antigen Fab specifically recognizing a tumor antigen (e.g., CD19, such as huCD19 or cynoCD19), comprising: (a) a VH and a CH1; and (b) a VL and a CL; and ii) two anti-CD3 scFvs specifically recognizing CD3 (e.g., huCD3 or cynoCD3); wherein the anti-tumor antigen Fab and the first anti-CD3 scFv are connected directly or via an optional first linker, and anti-tumor antigen Fab and the second anti-CD3 scFv are connected directly or via an optional second linker; wherein each of the anti-CD3 scFvs comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or each of the anti-CD3 scFvs comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO:14; and wherein the first anti-CD3 scFv is connected to the N-terminus of the VH of the anti-tumor antigen (e.g., CD19) Fab, and the second anti-CD3 scFv is connected to the N-terminus of the VL of the anti-tumor antigen (e.g., CD19) Fab. In some embodiments, the CL and the CH1 of the anti-tumor antigen Fab are connected by a disulfide bond, such as about 1 to about 5 (e.g., about any of 1, 2, 3, 4, or 5) disulfide bonds, e.g., 2 disulfide bonds. In some embodiments, the anti-CD3 scFv specifically recognizes the N-terminus of CD3ε (e.g., huCD3ε, cynoCD3ε), for example, an epitope within amino acid residues 1-27 of CD3ε. In some embodiments, the VH of the anti-CD3 scFv comprises the amino acid sequence of SEQ ID NO: 15, and/or the VL of the anti-CD3 scFv comprises the amino acid sequence of SEQ ID NO: 16. In some embodiments, the VH and the VL of the anti-CD3 scFv are connected by a connecting peptide. In some embodiments, the anti-CD3 scFv comprises the amino acid sequence of SEQ ID NO: 17. In some embodiments, the tumor antigen is selected from the group consisting of CD19, EpCAM, CD20, CD22, CD30, CD37, CD40, and CD74. In some embodiments, the tumor antigen is CD19. In some embodiments, the linker situated between the anti-tumor antigen (e.g., CD19) Fab and the anti-CD3 scFv, and/or the connecting peptide situated between the VH and the VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine. In some embodiments, the linker and/or the connecting peptide is selected from any one of SEQ ID NOs: 21, 22, 33, and 53.

In some embodiments, the tumor antigen is CD19. Thus in some embodiments, the anti-tumor antigen Fab is an anti-CD19 Fab that specifically recognizes CD19 (e.g., huCD19 or cynoCD19).

Thus, in some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g. huCD3 or cynoCD3); wherein the anti-CD19 Fab and the anti-CD3 binding domain (e.g., scFv) are connected directly or via an optional linker. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VH of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VL of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-CD19 Fab and the first anti-CD3 binding domain are connected directly or via an optional first linker, and the anti-CD19 Fab and the second anti-CD3 binding domain are connected directly or via an optional second linker; wherein the first anti-CD3 binding domain (e.g., scFv) is connected to the N-terminus of the VH of the anti-CD19 Fab, and wherein the second anti-CD3 binding domain (e.g., scFv) is connected to the N-terminus of the VL of the anti-CD19 Fab. In some embodiments, the anti-CD3 binding domain (e.g., scFv) specifically recognizes the N-terminus of CD3ε (e.g., huCD3ε, cynoCD3ε), for example, an epitope within amino acid residues 1-27 of CD3ε. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the CH1 and the CL of the anti-CD19 Fab are connected by a disulfide bond, such as about 1 to about 5 (such as about any of 1, 2, 3, 4, or 5) disulfide bonds, e.g., about 2 disulfide bonds. In some embodiments, the CH1 of the anti-CD19 Fab comprises the amino acid sequence of SEQ ID NO: 18, and/or the CL of the anti-CD19 Fab comprises the amino acid sequence of SEQ ID NO: 19. In some embodiments, the linker situated between the anti-CD19 Fab and the anti-CD3 binding domain (e.g., scFv), and/or the connecting peptide situated between the VH and the VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine; e.g., the linker and/or the connecting peptide is selected from any of SEQ ID NOs: 21, 22, 33, and 53.

In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the anti-CD3 binding domain (e.g., scFv) comprises a VH, wherein the VH of the anti-CD3 binding domain (e.g., scFv) comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain (e.g., scFv) comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO:14. In some embodiments, there is provided a BSAP comprising: i) an anti-CD19 Fab specifically recognizing CD19, (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the anti-CD3 binding domain (e.g., scFv) comprises a VH, wherein the VH of the anti-CD3 binding domain (e.g., scFv) comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain (e.g., scFv) comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO:14; and wherein the anti-CD3 binding domain (e.g., scFv) is connected to the N-terminus of the VH of the anti-CD19 Fab. In some embodiments, there is provided a BSAP comprising: i) an anti-CD19 Fab specifically recognizing a CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the anti-CD3 binding domain (e.g., scFv) comprises a VH, wherein the VH of the anti-CD3 binding domain (e.g., scFv) comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain (e.g., scFv) comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO:14; and wherein the anti-CD3 binding domain (e.g., scFv) is connected to the N-terminus of the VL of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-CD19 Fab and the first anti-CD3 binding domain (e.g., scFv) are connected directly or via an optional first linker, and anti-CD19 Fab and the second anti-CD3 binding domain (e.g., scFv) are connected directly or via an optional second linker; wherein each of the anti-CD3 binding domains (e.g., scFv) comprises a VH, wherein the VH of the anti-CD3 binding domain (e.g., scFv) comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or each of the anti-CD3 binding domains (e.g., scFv) comprises a VL, wherein the VL of the anti-CD3 binding domain (e.g., scFv) comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO:14; and wherein the first anti-CD3 binding domain (e.g., scFv) is connected to the N-terminus of the VH of the anti-CD19 Fab, and the second anti-CD3 binding domain (e.g., scFv) is connected to the N-terminus of the VL of the anti-CD19 Fab. In some embodiments, the CL and the CH1 of the anti-CD19 Fab are connected by a disulfide bond, such as about 1 to about 5 (e.g., about any of 1, 2, 3, 4, or 5) disulfide bonds, e.g., 2 disulfide bonds. In some embodiments, the anti-CD3 binding domain (e.g., scFv) specifically recognizes the N-terminus of CD3ε (e.g., huCD3ε, cynoCD3ε), for example, an epitope within amino acid residues 1-27 of CD3ε. In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the linker situated between the anti-CD19 Fab and the anti-CD3 binding domain (e.g., scFv), and/or the connecting peptide situated between the VH and the VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine. In some embodiments, the linker and/or the connecting peptide is selected from any one of SEQ ID NOs: 21, 22, 33, and 53.

In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; and wherein the anti-CD3 scFv is connected to the N-terminus of the VH of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; and wherein the anti-CD3 scFv is connected to the N-terminus of the VL of the anti-CD19 Fab via an optional linker. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) two anti-CD3 scFvs specifically recognizing CD3 (e.g., huCD3 or cynoCD3); wherein the anti-CD19 Fab and the first anti-CD3 scFv are connected directly or via an optional first linker, and the anti-CD19 Fab and the second anti-CD3 scFv are connected directly or via an optional second linker; and wherein the first anti-CD3 scFv is connected to the N-terminus of the VH of the anti-CD19 Fab, and the second anti-CD3 scFv is connected to the N-terminus of the VL of the anti-CD19 Fab. In some embodiments, the CL and the CH1 of the anti-CD19 Fab are connected by a disulfide bond, such as about 1 to about 5 (e.g., about any of 1, 2, 3, 4, or 5) disulfide bonds, e.g., 2 disulfide bonds. In some embodiments, the anti-CD3 scFv specifically binds to the N-terminus of CD3ε (e.g., huCD3ε or cynoCD3ε), such as an epitope within amino acid residues 1-27 of CD3ε. In some embodiments, the VH and the VL of the anti-CD3 scFv are connected by a connecting peptide. In some embodiments, the linker situated between the anti-CD19 Fab and the anti-CD3 scFv, and/or the connecting peptide situated between VH and VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine. In some embodiments, the linker and/or the connecting peptide is selected from any one of SEQ ID NOs: 21, 22, 33, and 53.

In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO:14. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO:14; and wherein the anti-CD3 scFv is connected to the N-terminus of the VH of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO:14; and wherein the anti-CD3 scFv is connected to the N-terminus of the VL of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) two anti-CD3 scFvs specifically recognizing CD3 (e.g., huCD3 or cynoCD3); wherein the anti-CD19 Fab and the first anti-CD3 scFv are connected directly or via an optional first linker, and anti-CD19 Fab and the second anti-CD3 scFv are connected directly or via an optional second linker; wherein each of the anti-CD3 scFvs comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or each of the anti-CD3 scFvs comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO:14; and wherein the first anti-CD3 scFv is connected to the N-terminus of the VH of the anti-CD19 Fab, and the second anti-CD3 scFv is connected to the N-terminus of the VL of the anti-CD19 Fab. In some embodiments, the CL and the CH1 of the anti-CD19 Fab are connected by a disulfide bond, such as about 1 to about 5 (e.g., about any of 1, 2, 3, 4, or 5) disulfide bonds, e.g., 2 disulfide bonds. In some embodiments, the anti-CD3 scFv specifically recognizes the N-terminus of CD3ε (e.g., huCD3ε, cynoCD3ε), for example, an epitope within amino acid residues 1-27 of CD3ε. In some embodiments, the VH of the anti-CD3 scFv comprises the amino acid sequence of SEQ ID NO: 15, and/or the VL of the anti-CD3 scFv comprises the amino acid sequence of SEQ ID NO: 16. In some embodiments, the VH and the VL of the anti-CD3 scFv are connected by a connecting peptide. In some embodiments, the anti-CD3 scFv comprises the amino acid sequence of SEQ ID NO: 17. In some embodiments, the linker situated between the anti-CD19 Fab and the anti-CD3 scFv, and/or the connecting peptide situated between the VH and the VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine. In some embodiments, the linker and/or the connecting peptide is selected from any one of SEQ ID NOs: 21, 22, 33, and 53.

In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6.

Thus, in some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; wherein the anti-CD3 binding domain (e.g., scFv) is connected to the N-terminus of the VH of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; wherein the anti-CD3 binding domain (e.g., scFv) is connected to the N-terminus of the VL of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-CD19 Fab and the first anti-CD3 binding domain are connected directly or via an optional first linker, and the anti-CD19 Fab and the second anti-CD3 binding domain are connected directly or via an optional second linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; and wherein the first anti-CD3 binding domain (e.g., scFv) is connected to the N-terminus of the VH of the anti-CD19 Fab, the second anti-CD3 binding domain (e.g., scFv) is connected to the N-terminus of the VL of the anti-CD19 Fab. In some embodiments, the VH of the anti-CD19 Fab comprises the amino acid sequence of SEQ ID NO: 7, and/or the VL of the anti-CD19 Fab comprises the amino acid sequence of SEQ ID NO: 8. In some embodiments, the anti-CD3 binding domain (e.g., scFv) specifically recognizes the N-terminus of CD3ε (e.g., huCD3ε or cynoCD3ε), for example, an epitope within amino acid residues 1-27 of CD3ε. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the CH1 and the CL of the anti-CD19 Fab are connected by a disulfide bond, such as about 1 to about 5 (such as about any of 1, 2, 3, 4, or 5) disulfide bonds, e.g., about 2 disulfide bonds. In some embodiments, the CH1 of the anti-CD19 Fab comprises the amino acid sequence of SEQ ID NO: 18, and/or the CL of the anti-CD19 Fab comprises the amino acid sequence of SEQ ID NO: 19. In some embodiments, the linker situated between the anti-CD19 Fab and the anti-CD3 binding domain (e.g., scFv), and/or the connecting peptide situated between the VH and the VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine; e.g., the linker and/or the connecting peptide is selected from any of SEQ ID NOs: 21, 22, 33, and 53.

In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; and wherein the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; and wherein the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; wherein the anti-CD3 binding domain (e.g., scFv) is connected to the N-terminus of the VH of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; and wherein the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; wherein the anti-CD3 binding domain (e.g., scFv) is connected to the N-terminus of the VL of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-CD19 Fab and the first anti-CD3 binding domain (e.g., scFv) are connected directly or via an optional first linker, and the anti-CD19 Fab and the second anti-CD3 binding domain (e.g., scFv) are connected directly or via an optional second linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; and wherein each of the anti-CD3 binding domains (e.g., scFvs) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or each of the anti-CD3 binding domains (e.g., scFvs) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the first anti-CD3 binding domain (e.g., scFv) is connected to the N-terminus of the VH of the anti-CD19 Fab, the second anti-CD3 binding domain (e.g., scFv) is connected to the N-terminus of the VL of the anti-CD19 Fab. In some embodiments, the VH of the anti-CD19 Fab comprises the amino acid sequence of SEQ ID NO: 7, and/or the VL of the anti-CD19 Fab comprises the amino acid sequence of SEQ ID NO: 8. In some embodiments, the anti-CD3 binding domain (e.g., scFv) specifically recognizes the N-terminus of CD3ε (e.g., huCD3ε, cynoCD3ε), for example, an epitope within amino acid residues 1-27 of CD3ε. In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the CH1 and the CL of the anti-CD19 Fab are connected by a disulfide bond, such as about 1 to about 5 (such as about any of 1, 2, 3, 4, or 5) disulfide bonds, e.g., about 2 disulfide bonds. In some embodiments, the CH1 of the anti-CD19 Fab comprises the amino acid sequence of SEQ ID NO: 18, and/or the CL of the anti-CD19 Fab comprises the amino acid sequence of SEQ ID NO: 19. In some embodiments, the linker situated between the anti-CD19 Fab and the anti-CD3 binding domain (e.g., scFv), and/or the connecting peptide situated between the VH and the VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine; e.g., the linker and/or the connecting peptide is selected from any of SEQ ID NOs: 21, 22, 33, and 53.

In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; and wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the anti-CD3 scFv is connected to the N-terminus of the VH of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the anti-CD3 scFv is connected to the N-terminus of the VL of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) two anti-CD3 scFvs specifically recognizing CD3 (e.g., huCD3 or cynoCD3); wherein the anti-CD19 Fab and the first anti-CD3 scFv are connected directly or via an optional first linker, and the anti-CD19 Fab and the second anti-CD3 scFv are connected directly or via an optional second linker; wherein the VH of the anti-CD19 Fab comprises: an HVR- H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; wherein each of the anti-CD3 scFvs comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or each of the anti-CD3 scFvs comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the first anti-CD3 scFv is connected to the N-terminus of the VH of the anti-CD19 Fab, and the second anti-CD3 scFv is connected to the N-terminus of the VL of the anti-CD19 Fab. In some embodiments, the VH of the anti-CD19 Fab comprises the amino acid sequence of SEQ ID NO: 7, and/or the VL of the anti-CD19 Fab comprises the amino acid sequence of SEQ ID NO: 8. In some embodiments, the anti-CD3 scFv specifically recognizes the N-terminus of CD3ε (e.g., huCD3ε or cynoCD3ε), such as an epitope within amino acid residues 1-27 of CD3ε. In some embodiments, the VH of the anti-CD3 scFv comprises the amino acid sequence of SEQ ID NO: 15, and/or the VL of the anti-CD3 scFv comprises the amino acid sequence of SEQ ID NO: 16. In some embodiments, the VH and the VL of the anti-CD3 scFv are connected by a connecting peptide. In some embodiments, the anti-CD3 scFv comprises the amino acid sequence of SEQ ID NO: 17. In some embodiments, the CH1 and the CL of the anti-CD19 Fab are connected by a disulfide bond, such as about 1 to about 5 (such as about any of 1, 2, 3, 4, or 5) disulfide bonds, e.g., about 2 disulfide bonds. In some embodiments, the CH1 of the anti-CD19 Fab comprises the amino acid sequence of SEQ ID NO: 18, and/or the CL of the anti-CD19 Fab comprises the amino acid sequence of SEQ ID NO: 19. In some embodiments, the linker situated between the anti-CD19 Fab and the anti-CD3 scFv, and/or the connecting peptide situated between the VH and the VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine; e.g., the linker and/or the connecting peptide is selected from any of SEQ ID NOs: 21, 22, 33, and 53.

In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the VH of the anti-CD19 Fab comprises the amino acid sequence of SEQ ID NO: 7, and/or the VL of the anti-CD19 Fab comprises the amino acid sequence of SEQ ID NO: 8; and wherein the anti-CD3 scFv comprises a VH, wherein the VH of the anti-CD3 scFv comprises the amino acid sequence of SEQ ID NO: 15, and/or the anti-CD3 scFv comprises a VL, wherein the VL of the anti-CD3 scFv comprises the amino acid sequence of SEQ ID NO: 16. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the VH of the anti-CD19 Fab comprises the amino acid sequence of SEQ ID NO: 7, and/or the VL of the anti-CD19 Fab comprises the amino acid sequence of SEQ ID NO: 8; wherein the anti-CD3 scFv comprises a VH, wherein the VH of the anti-CD3 scFv comprises the amino acid sequence of SEQ ID NO: 15, and/or the anti-CD3 scFv comprises a VL, wherein the VL of the anti-CD3 scFv comprises the amino acid sequence of SEQ ID NO: 16; and wherein the anti-CD3 scFv is connected to the N-terminus of the VH of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the VH of the anti-CD19 Fab comprises the amino acid sequence of SEQ ID NO: 7, and/or the VL of the anti-CD19 Fab comprises the amino acid sequence of SEQ ID NO: 8; wherein the anti-CD3 scFv comprises a VH, wherein the VH of the anti-CD3 scFv comprises the amino acid sequence of SEQ ID NO: 15, and/or the anti-CD3 scFv comprises a VL, wherein the VL of the anti-CD3 scFv comprises the amino acid sequence of SEQ ID NO: 16; and wherein the anti-CD3 scFv is connected to the N-terminus of the VL of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) two anti-CD3 scFvs specifically recognizing CD3 (e.g., huCD3 or cynoCD3); wherein the anti-CD19 Fab and the first anti-CD3 scFv are connected directly or via an optional first linker, and the anti-CD19 Fab and the second anti-CD3 scFv are connected directly or via an optional second linker; wherein the VH of the anti-CD19 Fab comprises the amino acid sequence of SEQ ID NO: 7, and/or the VL of the anti-CD19 Fab comprises the amino acid sequence of SEQ ID NO: 8; wherein the anti-CD3 scFv comprises a VH, wherein the VH of the anti-CD3 scFv comprises the amino acid sequence of SEQ ID NO: 15, and/or the anti-CD3 scFv comprises a VL, wherein the VL of the anti-CD3 scFv comprises the amino acid sequence of SEQ ID NO: 16; wherein the first anti-CD3 scFv is connected to the N-terminus of the VH of the anti-CD19 Fab, and the second anti-CD3 scFv is connected to the N-terminus of the VL of the anti-CD19 Fab. In some embodiments, the anti-CD3 scFv specifically recognizes the N-terminus of CD3ε (e.g., huCD3 or cynoCD3ε), such as an epitope within amino acid residues 1-27 of CD3ε. In some embodiments, the VH and the VL of the anti-CD3 scFv are connected by a connecting peptide. In some embodiments, the anti-CD3 scFv comprises the amino acid sequence of SEQ ID NO: 17. In some embodiments, the CH1 and the CL of the anti-CD19 Fab are connected by a disulfide bond, such as about 1 to about 5 (such as about any of 1, 2, 3, 4, or 5) disulfide bonds, e.g., about 2 disulfide bonds. In some embodiments, the CH1 of the anti-CD19 Fab comprises the amino acid sequence of SEQ ID NO: 18, and/or the CL of the anti-CD19 Fab comprises the amino acid sequence of SEQ ID NO: 19. In some embodiments, the linker situated between the anti-CD19 Fab and the anti-CD3 scFv, and/or the connecting peptide situated between the VH and the VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine; e.g., the linker and/or the connecting peptide is selected from any of SEQ ID NOs: 21, 22, 33, and 53.

In some embodiments, there is provided a CD19×CD3 BSAP comprising a first polypeptide and a second polypeptide, wherein the first polypeptide comprises an amino acid sequence at least about 95% (such as at least about any of 96%, 97%, 98%, or 99%) identical to the amino acid sequence of any of SEQ ID NOs: 23, 28, 35, 58, and 59, and/or the second polypeptide comprises an amino acid sequence at least about 95% (such as at least about any of 96%, 97%, 98%, or 99%) identical to the amino acid sequence of SEQ ID NO: 24. In some embodiments, there is provided a CD19×CD3 BSAP comprising: a first polypeptide comprising the amino acid sequence of SEQ ID NO: 23; and a second polypeptide comprising the amino acid sequence of SEQ ID NO: 24. In some embodiments, there is provided a CD19×CD3 BSAP comprising: a first polypeptide comprising the amino acid sequence of SEQ ID NO: 28 or 58; and a second polypeptide comprising the amino acid sequence of SEQ ID NO: 24. In some embodiments, there is provided a CD19×CD3 BSAP comprising: a first polypeptide comprising the amino acid sequence of SEQ ID NO: 35 or 59; and a second polypeptide comprising the amino acid sequence of SEQ ID NO: 24.

In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39.

Thus, in some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3 wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; and wherein the anti-CD3 binding domain (e.g., scFv) is connected to the N-terminus of the VH of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; and wherein the anti-CD3 binding domain (e.g., scFv) is connected to the N-terminus of the VL of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-CD19 Fab and the first anti-CD3 binding domain (e.g., scFv) are connected directly or via an optional first linker, and the anti-CD19 Fab and the second anti-CD3 binding domain (e.g., scFv) are connected directly or via an optional second linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; and wherein the first anti-CD3 binding domain (e.g., scFv) is connected to the N-terminus of the VH of the anti-CD19 Fab, and the second anti-CD3 binding domain (e.g., scFv) is connected to the N-terminus of the VL of the anti-CD19 Fab. In some embodiments, the VH of the anti-CD19 Fab comprises the amino acid sequence of SEQ ID NO: 7, and/or the VL of the anti-CD19 Fab comprises the amino acid sequence of SEQ ID NO: 40. In some embodiments, the anti-CD3 binding domain (e.g., scFv) specifically recognizes the N-terminus of CD3ε (e.g., huCD3ε or cynoCD3ε), such as an epitope within amino acid residues 1-27 of CD3ε. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the CH1 and the CL of the anti-CD19 Fab are connected by a disulfide bond, such as about 1 to about 5 (such as about any of 1, 2, 3, 4, or 5) disulfide bonds, e.g., about 2 disulfide bonds. In some embodiments, the CH1 of the anti-CD19 Fab comprises the amino acid sequence of SEQ ID NO: 18, and/or the CL of the anti-CD19 Fab comprises the amino acid sequence of SEQ ID NO: 19. In some embodiments, the linker situated between the anti-CD19 Fab and the anti-CD3 binding domain (e.g., scFv), and/or the connecting peptide situated between the VH and the VL of the anti-CD3 scFv, is composed of an amino acid sequence having a length of from about 2 to about 30 (e.g., about 6 to about 12) amino acid residues, wherein the amino acid residues are selected from glycine, serine, arginine and alanine; e.g., the linker and/or the connecting peptide is selected from any of SEQ ID NOs: 21, 22, 33, and 53.

In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; and wherein the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; wherein the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the anti-CD3 binding domain (e.g., scFv) is connected to the N-terminus of the VH of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; wherein the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the anti-CD3 binding domain (e.g., scFv) is connected to an N-terminus of the VL of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-CD19 Fab and the first anti-CD3 binding domain (e.g., scFv) are connected directly or via an optional first linker, and the anti-CD19 Fab and the second anti-CD3 binding domain (e.g., scFv) are connected directly or via an optional second linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; wherein each of the anti-CD3 binding domains (e.g., scFvs) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or each of the anti-CD3 binding domains (e.g., scFvs) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the first anti-CD3 binding domain (e.g., scFv) is connected to the N-terminus of the VH of the anti-CD19 Fab, and the second anti-CD3 binding domain (e.g., scFv) is connected to the N-terminus of the VL of the anti-CD19 Fab. In some embodiments, the VH of the anti-CD19 Fab comprises the amino acid sequence of SEQ ID NO: 7, and/or the VL of the anti-CD19 Fab comprises the amino acid sequence of SEQ ID NO: 40.

In some embodiments, the anti-CD3 binding domain (e.g., scFv) specifically recognizes the N-terminus of CD3ε (e.g., huCD3ε or cynoCD3ε), such as an epitope within amino acid residues 1-27 of CD3ε. In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the CH1 and the CL of the anti-CD19 Fab are connected by a disulfide bond, such as about 1 to about 5 (such as about any of 1, 2, 3, 4, or 5) disulfide bonds, e.g., about 2 disulfide bonds. In some embodiments, the CH1 of the anti-CD19 Fab comprises the amino acid sequence of SEQ ID NO: 18, and/or the CL of the anti-CD19 Fab comprises the amino acid sequence of SEQ ID NO: 19. In some embodiments, the linker situated between the anti-CD19 Fab and the anti-CD3 binding domain (e.g., scFv), and/or the connecting peptide situated between the VH and the VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine; e.g., the linker and/or the connecting peptide is selected from any of SEQ ID NOs: 21, 22, 33, and 53.

In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; and wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the anti-CD3 scFv is connected to the N-terminus of the VH of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the anti-CD3 scFv is connected to the N-terminus of the VL of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) two anti-CD3 scFvs specifically recognizing CD3 (e.g., huCD3 or cynoCD3); wherein the anti-CD19 Fab and the first anti-CD3 scFv are connected directly or via an optional first linker, and the anti-CD19 Fab and the second anti-CD3 scFv are connected directly or via an optional second linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the first anti-CD3 scFv is connected to the N-terminus of the VH of the anti-CD19 Fab, and the second anti-CD3 scFv is connected to the N-terminus of the VL of the anti-CD19 Fab. In some embodiments, the VH of the anti-CD19 Fab comprises the amino acid sequence of SEQ ID NO: 7, and/or the VL of the anti-CD19 Fab comprises the amino acid sequence of SEQ ID NO: 40. In some embodiments, the anti-CD3 scFv specifically recognizes the N-terminus of CD3ε (e.g., huCD3ε or cynoCD3ε), such as an epitope within amino acid residues 1-27 of CD3ε. In some embodiments, the VH of the anti-CD3 scFv comprises the amino acid sequence of SEQ ID NO: 15, and/or the VL of the anti-CD3 scFv comprises the amino acid sequence of SEQ ID NO: 16. In some embodiments, the VH and the VL of the anti-CD3 scFv are connected by a connecting peptide. In some embodiments, the anti-CD3 scFv comprises the amino acid sequence of SEQ ID NO: 17. In some embodiments, the CH1 and the CL of the anti-CD19 Fab are connected by a disulfide bond, such as about 1 to about 5 (such as about any of 1, 2, 3, 4, or 5) disulfide bonds, e.g., about 2 disulfide bonds. In some embodiments, the CH1 of the anti-CD19 Fab comprises the amino acid sequence of SEQ ID NO: 18, and/or the CL of the anti-CD19 Fab comprises the amino acid sequence of SEQ ID NO: 19. In some embodiments, the linker situated between the anti-CD19 Fab and the anti-CD3 scFv, and/or the connecting peptide situated between the VH and the VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine; e.g., the linker and/or the connecting peptide is selected from any of SEQ ID NOs: 21, 22, 33, and 53.

In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the VH of the anti-CD19 Fab comprises the amino acid sequence of SEQ ID NO: 7, and/or the VL of the anti-CD19 Fab comprises the amino acid sequence of SEQ ID NO: 40; and wherein the anti-CD3 scFv comprises a VH, wherein the VH of the anti-CD3 scFv comprises the amino acid sequence of SEQ ID NO: 15, and/or the anti-CD3 scFv comprises a VL, wherein the VL of the anti-CD3 scFv comprises the amino acid sequence of SEQ ID NO: 16; and wherein the anti-CD3 scFv is connected to the N-terminus of the VL of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the VH of the anti-CD19 Fab comprises the amino acid sequence of SEQ ID NO: 7, and/or the VL of the anti-CD19 Fab comprises the amino acid sequence of SEQ ID NO: 40; wherein the anti-CD3 scFv comprises a VH, wherein the VH of the anti-CD3 scFv comprises the amino acid sequence of SEQ ID NO: 15, and/or the anti-CD3 scFv comprises a VL, wherein the VL of the anti-CD3 scFv comprises the amino acid sequence of SEQ ID NO: 16; and wherein the anti-CD3 scFv is connected to the N-terminus of the VH of the anti-CD19 Fab. In some embodiments, there is provided a BSAP comprising: i) an anti-CD19 Fab specifically recognizing CD19 (e.g., huCD19 or cynoCD19), comprising: (a) a VH and a CH1; and (b) a VL and a CL; and ii) two anti-CD3 scFvs specifically recognizing CD3 (e.g., huCD3 or cynoCD3); wherein the anti-CD19 Fab and the first anti-CD3 scFv are connected directly or via an optional first linker, and the anti-CD19 Fab and the second anti-CD3 scFv are connected directly or via an optional second linker; wherein the VH of the anti-CD19 Fab comprises the amino acid sequence of SEQ ID NO: 7, and/or the VL of the anti-CD19 Fab comprises the amino acid sequence of SEQ ID NO: 40; wherein each of the anti-CD3 scFvs comprises a VH, wherein the VH of the anti-CD3 scFv comprises the amino acid sequence of SEQ ID NO: 15, and/or each of the anti-CD3 scFvs comprises a VL, wherein the VL of the anti-CD3 scFv comprises the amino acid sequence of SEQ ID NO: 16; and wherein the first anti-CD3 scFv is connected to the N-terminus of the VH of the anti-CD19 Fab, and the second anti-CD3 scFv is connected to the N-terminus of the VL of the anti-CD19 Fab. In some embodiments, the anti-CD3 scFv specifically recognizes the N-terminus of CD3ε (e.g., huCD3ε or cynoCD3ε), such as an epitope within amino acid residues 1-27 of CD3ε. In some embodiments, the VH and the VL of the anti-CD3 scFv are connected by a connecting peptide. In some embodiments, the anti-CD3 scFv comprises the amino acid sequence of SEQ ID NO: 17. In some embodiments, the CH1 and the CL of the anti-CD19 Fab are connected by a disulfide bond, such as about 1 to about 5 (such as about any of 1, 2, 3, 4, or 5) disulfide bonds, e.g., about 2 disulfide bonds. In some embodiments, the CH1 of the anti-CD19 Fab comprises the amino acid sequence of SEQ ID NO: 18, and/or the CL of the anti-CD19 Fab comprises the amino acid sequence of SEQ ID NO: 19. In some embodiments, the linker situated between the anti-CD19 Fab and the anti-CD3 scFv, and/or the connecting peptide situated between the VH and the VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine; e.g., the linker and/or the connecting peptide is selected from any of SEQ ID NOs: 21, 22, 33, and 53.

In some embodiments, there is provided a CD19×CD3 BSAP comprising a first polypeptide and a second polypeptide, wherein the first polypeptide comprises an amino acid sequence at least about 95% (such as at least about any of 96%, 97%, 98%, or 99%) identical to the amino acid sequence of any of SEQ ID NOs: 23, 28, 35, 58 and 59, and/or the second polypeptide comprises an amino acid sequence at least about 95% (such as at least about any of 96%, 97%, 98%, or 99%) identical to the amino acid sequence of SEQ ID NO: 27. In some embodiments, there is provided a CD19×CD3 BSAP comprising: a first polypeptide comprising the amino acid sequence of SEQ ID NO: 23; and a second polypeptide comprising the amino acid sequence of SEQ ID NO: 27. In some embodiments, there is provided a CD19×CD3 BSAP comprising: a first polypeptide comprising the amino acid sequence of SEQ ID NO: 28 or 58; and a second polypeptide comprising the amino acid sequence of SEQ ID NO: 27. In some embodiments, there is provided a CD19×CD3 BSAP comprising: a first polypeptide comprising the amino acid sequence of SEQ ID NO: 35 or 59; and a second polypeptide comprising the amino acid sequence of SEQ ID NO: 27.

The invention further provides fusion proteins comprising any of the CD19×CD3 BSAPs described herein, CD19×CD3 BSAP conjugates (e.g., small molecule drug conjugates), or isolated cells expressing any of the CD19×CD3 BSAPs described herein.

Anti-CD3 Binding Domain

BSAPs of the present invention (e.g., CD19×CD3 BSAP) comprise one or two anti-CD3 binding domain(s) (e.g., scFv) specifically recognizing CD3 (e.g., human CD3, or cynomolgus monkey CD3). In some embodiments, the anti-CD3 binding domain (e.g., scFv) is connected to the N-terminus of the VH of the anti-tumor antigen (e.g., CD19, such as huCD19 or cynoCD19) Fab. In some embodiments, the anti-CD3 binding domain (e.g., scFv) is connected to the N-terminus of the VL of the anti-tumor antigen (e.g., CD19, such as huCD19 or cynoCD19) Fab. In some embodiments, the BSAP comprises two anti-CD3 binding domains (e.g., scFvs), the first anti-CD3 binding domain (e.g., scFv) is connected to the N-terminus of the VH of the anti-tumor antigen (e.g., CD19, such as huCD19 or cynoCD19) Fab, and the second anti-CD3 binding domain (e.g., scFv) is connected to the N-terminus of the VL of the anti-tumor antigen (e.g., CD19, such as huCD19 or cynoCD19) Fab.

In some embodiments, the BSAP described herein (e.g., CD19×CD3 BSAP) have an increased in vivo half-life compared to the anti-tumor antigen Fab alone. In some embodiments, the BSAP has a half-life of at least about 1.5, 2, 3, 4, 5, 6, 7, 8, 9, 10, or more times the individual anti-tumor antigen Fab.

"CD3" is known in the art as a multi-protein complex of six chains (see, Abbas and Lichtman, 2003; Janeway et al., p 172 and 178, 1999). In mammals, the T cell receptor (TCR) complex comprises a CD3δ chain, a CD3γ chain, two CD3ε chains, and a homodimer of CD3ζ chains. The CD3δ, CD3γ, and CD3ε chains are highly related cell surface proteins of the immunoglobulin superfamily containing a single immunoglobulin domain. The transmembrane regions of the CD3δ, CD3γ, and CD3ε chains are negatively charged, which is a characteristic that allows these chains to associate with the positively charged TCR chains. The intracellular tails of the CD3δ, CD3γ, and CD3ε chains each contain a single conserved motif known as an immunoreceptor tyrosine-based activation motif or "ITAM," whereas each CD3ζ chain has three. Without being bound by theory, it is believed the ITAMs are important for the signaling capacity of a TCR complex. CD3 as used herein may be from various animal species, including human, primate, mouse, rat, or other mammals. In some embodiments, the CD3 is a human CD3 ("huCD3"). In some embodiments, the CD3 is a cynomolgus monkey CD3 ("cynoCD3").

In some embodiments, the anti-CD3 binding domain (e.g., scFv) of the BSAP specifically recognizes an individual CD3 chain, such as CD3δ chain, CD3γ chain, or CD3ε chain. In some embodiments, the anti-CD3 binding domain (e.g., scFv) specifically binds to a complex formed from two or more individual CD3 chains (e.g., a complex of more than one CD3ε chains, a complex of a CD3γ and CD3ε chain, a complex of a CD3δ and CD3ε chain, or other CD3 chain combinations). In some embodiments, the anti-CD3 binding domain (e.g., scFv) specifically binds to a CD3ε chain (e.g., huCD3ε or cynoCD3ε). In some embodiments, the anti-CD3 binding domain (e.g., scFv) specifically binds to the N-terminus of CD3ε. In some embodiments, the anti-CD3 binding domain (e.g., scFv) specifically binds to an epitope within amino acid residues 1-27 of CD3ε.

In some embodiments, the anti-CD3 binding domain (e.g., scFv) specifically binds to human and/or non-human primates (such as cynomolgus monkey) CD3. Exemplary anti-human CD3 antibody with cross reactivity to monkey CD3 include, but are not limited to, SP34 mouse monoclonal antibody, (see, for example, Pressano, S. The EMBO J. 4:337-344, 1985; Alarcon, B. EMBO J. 10:903-912, 1991; Salmeron A. et al., J. Immunol. 147:3047-52, 1991; Yoshino N. et al., Exp. Anim 49:97-110, 2000; Conrad M L. et al., Cytometry 71A:925-33, 2007; and Yang et al., J. Immunol. 137:1097-1100: 1986). BSAPs having anti-CD3 binding domain (e.g., scFv) with cross-reactivity to monkey CD3 (such as cynomolgus monkey) may facilitate toxicity studies in non-human primates, which can provide more relevant safety assessments for human clinical trial candidates, without having to perform toxicity studies in chimpanzees or using surrogate molecules.

In some embodiments, the anti-CD3 binding domain (e.g., scFv) is derived from an anti-CD3 antibody that does not have cross-reactivity to non-human primates. Exemplary anti-CD3 antibodies include the Cris-7 monoclonal antibody (Reinherz, E. L. et al. (eds.), Leukocyte typing II, Springer Verlag, New York, (1986)), BC3 monoclonal antibody (Anasetti et al. (1990) J. Exp. Med. 172:1691), OKT3 (Ortho multicenter Transplant Study Group (1985) N. Engl. J. Med. 313:337) and derivatives thereof such as OKT3 ala-ala (Herold et al. (2003) J. Clin. Invest. 11:409), visilizumab (Carpenter et al. (2002) Blood 99:2712), and 145-2C11 monoclonal antibody (Hirsch et al. (1988) J. Immunol. 140: 3766). Further CD3 binding molecules contemplated herein include UCHT-1 (Beverley, P C and Callard, R E. (1981) Eur. J. Immunol. 11: 329-334) and CD3 binding molecules described in WO2004/106380, WO2010/037838, WO2008/119567, WO2007/042261, or WO2010/0150918.

In some embodiments, the anti-CD3 binding domain (e.g., scFv) is an antigen binding fragment and can be derived from any suitable anti-CD3 antibody. Any form of antigen binding fragment can be used in the present invention. In some embodiments, the anti-CD3 binding domain may be selected from the group consisting of: scFv, scFv-scFv, Fv, immunoglobulin (Ig) VL domain, Ig VH domain, Ig VL domain and VH domain, Fab, Fab', (Fab') 2, small molecule antibody (minibody), bifunctional antibody (diabody), camelid antibody VHH (camelid VHH), dAb (domain antibody) such as single domain antibody (sdAb), ankyrin repeat and other gene-specific binding domains derived from other protein scaffolds. In some embodiments, the anti-CD3 binding domain is an scFv. In some embodiments, the antigen binding fragment is humanized. In some embodiments, the antigen binding fragment is chimeric. In some embodiments, the antigen binding fragment is derived from a monoclonal antibody of mouse, rat, monkey or rabbit In some embodiments, the antigen binding fragment is derived from a fully human antibody, for example, developed using phage display, yeast display, or transgenic mouse bearing human Ig genes.

In some embodiments, the anti-CD3 binding domain (e.g., scFv) of the invention binds to CD3 with an equilibrium binding constant (Kd) ≤1 µM, such as ≤100 nM, preferably ≤10 nM, more preferably ≤1 nM. For example, the Kd value of the anti-CD3 binding domain (e.g., scFv) ranges from about ≤1 nM to about 1 pM. In some embodiments, the anti-CD3 binding domain (e.g., scFv) binds to human CD3 with a Kd of about $1\times10^{-9}$ M to about $1\times10^{-7}$ M, such as $2.35\times10^{-8}$ M. In some embodiments, the anti-CD3 binding domain (e.g., scFv) binds to a monkey (e.g., cynomolgus monkey) CD3 with a Kd of about $1\times10^{-9}$ M to about $1\times10^{-7}$ M, such as $1.29\times10^{-8}$ M.

In some embodiments, the anti-CD3 binding domain (e.g., scFv) is an antigen binding fragment that comprises a VH and a VL. VH and/or VL of any anti-CD3 antibodies known in the art may be used as VH and/or VL of the anti-CD3 binding domain (e.g., scFv) described herein. In some embodiments, the anti-CD3 binding domain (e.g., scFv) comprises 1, 2, 3, 4, 5, or all 6 HVRs of VH and VL of a full-length antibody that specifically binds to CD3. In some embodiments, the anti-CD3 binding domain (e.g., scFv) comprises a VH comprising one, two, or three HVRs from SEQ ID NO: 15, and/or the anti-CD3 binding domain (e.g., scFv) comprises a VL comprising one, two, or three HVRs from SEQ ID NO: 16. In some embodiments, the anti-CD3 binding domain (e.g., scFv) comprises a VH comprising: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL comprising: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, the VH of the anti-CD3 binding domain (e.g., scFv) comprises an amino acid sequence at least about 85% (such as at least about any of 86%, 87%, 88%, 89%, 90%, 91%, 92%, 93%, 94%, 95%, 96%, 97%, 98%, or 99%) identical to the amino acid sequence of SEQ ID NO: 15, and/or the VL of the anti-CD3 binding domain (e.g., scFv) comprises an amino acid sequence at least about 85% (such as at least about any of 86%, 87%, 88%, 89%, 90%, 91%, 92%, 93%, 94%, 95%, 96%, 97%, 98%, or 99%) identical to the amino acid sequence of SEQ ID NO: 16. In some embodiments, the VH of the anti-CD3 binding domain (e.g., scFv) comprises an amino acid sequence at least about 95% (such as at least about any of 96%, 97%, 98%, or 99%) identical to the amino acid sequence of SEQ ID NO: 15, and/or the VL of the anti-CD3 binding domain (e.g., scFv) comprises an amino acid sequence at least about 95% (such as at least about any of 96%, 97%, 98%, or 99%) identical to the amino acid sequence of SEQ ID NO: 16. In some embodiments, the VH of the anti-CD3 binding domain (e.g., scFv) comprises three HVRs from SEQ ID NO: 15, wherein the amino acid residues different from that of SEQ ID NO: 15 reside in the framework region (FR); and/or the VL of the anti-CD3 binding domain (e.g., scFv) comprises three HVRs from SEQ ID NO: 16, wherein the amino acid residues different from that of SEQ ID NO: 16 reside in the FR In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16.

```
(anti-CD3 HVR-H1)
                                        SEQ ID NO: 9
TYAMN (anti-CD3 HVR-H2)
                                        SEQ ID NO: 10
RIRSKYNNYATYYADSVKD (anti-CD3 HVR-H3)
                                        SEQ ID NO: 11
HGNFGNSYVSWFAY (anti-CD3 HVR-L1)
                                        SEQ ID NO: 12
RSSTGAVTTSNYAN (anti-CD3 HVR-L2)
                                        SEQ ID NO: 13
GTNKRAP (anti-CD3 HVR-L3)
                                        SEQ ID NO: 14
ALWYSNLWV (anti-CD3 VH; the underlined sequences are HVR-
H1, HVR-H2, and HVR-H3, respectively)
                                        SEQ ID NO: 15
EVQLVESGGGLVQPGGSLRLSCAASGFTFNTYAMNWVRQAPGKGLEWVA

RIRSKYNNYATYYADSVKDRFTISRDDSKNTLYLQMNSLRAEDTAVYYC

VRHGNFGNSYVSWFAYWGQGTMVTVSS (anti-CD3 VL; the underlined sequences are HVR-
L1, HVR-L2, and HVR-L3, respectively)
                                        SEQ ID NO: 16
QAVVTQEPSLTVSPGGTVTLTCRSSTGAVTTSNYANWVQQKPGQAPRGL

IGGTNKRAPGTPARFSGSLLGGKAALTLSGVQPEDEAEYYCALWYSNLW

VFGGGTKLTVL
```

In some embodiments, the anti-CD3 binding domain is an scFv that specifically binds to CD3 (also referred herein as anti-CD3 scFv). In some embodiments, the VH and the VL of the anti-CD3 scFv are connected to each other via a connecting peptide, such as a flexible connecting peptide comprising Glycines and/or Serines. Any of the peptide linkers described in the "Linker" section below can be used as a connecting peptide between VH and VL of the anti-CD3 scFv. In some embodiments, the VH and the VL of the anti-CD3 scFv are connected to each other directly. In some embodiments, the anti-CD3 scFv is a fusion polypeptide comprising the configuration: N'-VH-VL-C', wherein L is an optional connecting peptide. In some embodiments, the anti-CD3 scFv is a fusion polypeptide comprising the configuration: N'-VL-VH-C', wherein L is an optional connecting peptide. In some embodiments, the anti-CD3 scFv comprises the amino acid sequence of SEQ ID NO: 17.

```
(anti-CD3 scFv; VH-L-VL, connecting peptide L
sequence is bolded and italicized)
                                        SEQ ID NO: 17
EVQLVESGGGLVQPGGSLRLSCAASGFTFNTYAMNWVRQAPGKGLEWVA

RIRSKYNNYATYYADSVKDRFTISRDDSKNTLYLQMNSLRAEDTAVYYC

VRHGNFGNSYVSWFAYWGQGTMVTVSS***GGGGSGGGGSGGGGS***QAVVTQE

PSLTVSPGGTVTLTCRSSTGAVTTSNYANWVQQKPGQAPRGLIGGTNKR
```

-continued

APGTPARFSGSLLGGKAALTLSGVQPEDEAEYYCALWYSNLWVFGGGTK

LTVL

Anti-Tumor Antigen Fab

The anti-tumor antigen Fab within the BSAPs described herein can specifically recognize a tumor antigen (e.g., CD19, such as huCD19 or cynoCD19).

In some embodiments, the BSAP described herein (e.g., CD19×CD3 BSAP) have an increased in vivo half-life compared to the anti-CD3 binding domain (e.g., scFv) alone. In some embodiments, the BSAP has a half-life of at least about 1.5, 2, 3, 4, 5, 6, 7, 8, 9, 10, or more times the individual anti-CD3 binding domain (e.g., scFv).

In some embodiments, the anti-tumor antigen Fab specifically binds to human and/or non-human primates (such as cynomolgus monkey) tumor antigen (e.g., CD19, such as huCD19 or cynoCD19). The BSAPs described herein (e.g., CD19×CD3 BSAP) comprising an anti-tumor antigen Fab (e.g., anti-CD19 Fab) with cross-reactivity to monkey (such as cynomolgus monkey) tumor antigen (e.g., CD19) may facilitate toxicity studies in non-human primates, which can provide more relevant safety assessments for human clinical trial candidates, without having to perform toxicity studies in chimpanzees or using surrogate molecules. In some embodiments, the anti-tumor antigen (e.g., CD19) Fab is derived from an antibody that does not have cross-reactivity to non-human primates.

The anti-tumor antigen Fabs described herein can be generated using a variety of methods known in the art (see, e.g., U.S. Pat. Nos. 6,291,161; 6,291,158). Sources of Fabs include monoclonal antibody or antigen-binding fragments thereof from various species, including human, camelid (from camels, dromedaries, or llamas; Hamers-Casterman et al. (1993) Nature, 363:446 and Nguyen et al. (1998) J. Mol. Biol., 275:413), shark (Roux et al. (1998) Proc. Nat'l. Acad. Sci. (USA) 95:11804), fish (Nguyen et al. (2002) Immunogenetics, 54:39), rodent, avian, or ovine. In some embodiments, the Fab fragment is derived from a human antibody or humanized antibody.

In some embodiments, the anti-tumor antigen (e.g., CD19) Fab fragment comprises one constant region (CH1) and one variable region (VH) of an immunoglobulin heavy chain (HC), and one constant region (CL) and one variable region (VL) of an immunoglobulin light chain (LC). In some embodiments, the CH1 and VH heterodimerize with the VL and CL, and are covalently linked by a disulfide bond between the heavy and light chain constant regions. In some embodiments, the anti-tumor antigen Fab has the basic structure NH$_2$-VL-CL-S-S-CH1-VH-NH$_2$ (-S-S- is a disulfide bond between CL and CH1). In some embodiments, the CH1 and the CL of the anti-tumor antigen Fab are connected by one or more disulfide bonds. In some embodiments, the CH1 and the CL of the anti-tumor antigen Fab are connected by at least one disulfide bond, such as at least about any of 2, 3, 4, 5, or more, disulfide bonds. In some embodiments, the number of disulfide bonds is about 2. In some embodiments, cysteine residues within the anti-tumor antigen Fab (such as within the CH1 or CL) are engineered to introduce disulfide bonds. In some embodiments, the C-terminus of the CH1 and the CL of the anti-tumor antigen Fab comprises the amino acid sequence of CPPC (SEQ ID NO: 55) or CPPCS (SEQ ID NO: 56), which can serve as a covalent binding region to form intermolecular disulfide bond(s).

In some embodiments, the anti-tumor antigen (e.g., CD19) Fab of the BSAP does not comprise a disulfide bond. For example, the heavy and light chains may be engineered in such a way so as to stably interact without the need for disulfide bonds. In some embodiments, the heavy chain or light chain can be engineered to remove a cysteine residue, and wherein the heavy and light chains still stably interact and function as a Fab. In some embodiments, mutations are made to facilitate stable interactions between the heavy and light chains. For example, a "knobs into holes" engineering strategy can be used to facilitate dimerization between the heavy and light chains of a Fab (see, e.g., 1996 Protein Engineering, 9:617-621). Also contemplated for use herein are variant Fab fragments designed for a particular purpose, for example, amino acid changes in the constant domains of CH1 and/or CL, and removal of a disulfide bond or addition of tags for purification, etc.

In some embodiments, the C-terminus of CH1 and/or CL of the anti-tumor antigen (e.g., CD19) Fab can be connected with an additional fusion protein. For example, in some embodiments, the C-terminus of the CH1 of the anti-tumor antigen Fab is connected to the N-terminus of an Fc monomer (CH2-CH3) via an optional linker, to form a dual-chain structure of N'-VH-CH1-CH2-CH3-C' and N'-VL-CL-C'.

In some embodiments, the configuration of the variable and constant regions within the anti-tumor antigen (e.g., CD19) Fab may be different from what is found in a native Fab. In some embodiments, the orientation of the variable and constant regions may be VH-CL in one chain, and VL-CH1 in another chain (see, for example, Shaefer et al. (2011), PNAS, 108:111870-92).

In some embodiments, the anti-tumor antigen (e.g., CD19) Fab within the BSAP is derived from a monoclonal antibody. Suitable monoclonal antibodies may be of any type, including IgA, IgM, IgD, IgG, IgE and subtypes thereof, such as lgG1, lgG2, lgG3, and lgG4. In some embodiments, the light chain domains may be derived from the kappa or lambda chain. In some embodiments, the anti-tumor antigen Fab is designed recombinantly.

In some embodiments, the anti-tumor antigen (e.g., CD19) Fab comprises a human immunoglobulin CH1. In some embodiments, the human immunoglobulin CH1 comprises the amino acid sequence of SEQ ID NO: 18. In some embodiment, the anti-tumor antigen Fab comprises a human light chain kappa constant region. In one embodiment, the human light chain kappa constant region comprises the amino acid sequence of SEQ ID NO: 19. In some embodiment, the anti-tumor antigen Fab comprises a human light chain lambda constant region.

(human CH1)
SEQ ID NO: 18
ASTKGPSVFPLAPSSKSTSGGTAALGCLVKDYFPEPVTVSWNSGALTSG

VHTFPAVLQSSGLYSLSSVVTVPSSSLGTQTYICNVNHKPSNTKVDKKV

EPKS (human kappa CL)
SEQ ID NO: 19
RTVAAPSVFIFPPSDEQLKSGTASVVCLLNNFYPREAKVQWKVDNALQS

GNSQESVTEQDSKDSTYSLSSTLTLSKADYEKHKVYACEVTHQGLSSPV

TKSFNRGE

In some embodiments, the anti-tumor antigen Fab specifically recognizes a tumor antigen. In some embodiments, the tumor antigen is a B cell surface antigen, including but not limited to CD19, EpCAM, CD20, CD22, CD30, CD37, CD40 or CD74, etc. In some embodiments, the tumor antigen is CD19 and the anti-tumor antigen Fab is an anti-CD19 Fab. In some embodiments, the anti-tumor antigen Fab can specifically recognize other cell surface antigens related to cancer therapy, including but not limited to FcγRI, FcγRIIa, FcγRIIb, FcγRIIIa, FcγRIIIb, NKG2D, CD25, CD28, CD137, CTLA-4, FAS, FGFR1, FGFR2, FGFR3, FGFR4, GITR, LTβR, TLR, TRAIL receptor 1, TRAIL receptor 2, EGFR, Her2/neu, or ErbB3.

In some embodiments, the anti-tumor antigen (e.g., CD19) Fab described herein binds to a tumor antigen with an equilibrium binding constant (Kd) ≤1 μM, such as ≤100 nM, preferably ≤10 nM, more preferably ≤1 nM. For example, the anti-tumor antigen (e.g., CD19) Fab described herein has a Kd value ranging from about ≤1 nM to about 1 pM. In some embodiments, the anti-CD19 Fab binds to human CD19 with a Kd of about $1\times10^{-9}$ M to about $1\times10^{-7}$ M, such as $1.82\times10^{-8}$ M. In some embodiments, the anti-CD19 Fab binds to a monkey (e.g., cynomolgus monkey) CD19 with a Kd of about $1\times10^{-9}$ M to about $1\times10^{-7}$ M, such as $2.96\times10^{-8}$ M.

The anti-tumor antigen (e.g., CD19) Fab of the invention may completely or partially modulate, block, inhibit, reduce, antagonize, neutralize or otherwise interfere with the functional activity of the widely distributed tumor antigen (e.g., CD19). When the functional activity of a tumor antigen (e.g., CD19) is reduced by at least about 95% (such as about any of 96%, 97%, 98%, 99% or 100%) in the presence of an anti-tumor antigen (e.g., CD19) Fab compared to not bound by an anti-tumor antigen (e.g., CD19) Fab, the anti-tumor antigen Fab is considered capable of fully modulating, blocking, inhibiting, reducing, antagonizing, neutralizing or interfering with the functional activity of the tumor antigen. When the functional activity of a tumor antigen (e.g., CD19) is reduced by at least about 50% (such as about any of 55%, 60%, 75%, 80%, 85%, or 90%) in the presence of an anti-tumor antigen (e.g., CD19) Fab compared to not bound by an anti-tumor antigen (e.g., CD19) Fab, the anti-tumor antigen (e.g., CD19) Fab is considered capable of significantly modulating, blocking, inhibiting, reducing, antagonizing, neutralizing or interfering with the functional activity of the tumor antigen (e.g., CD19). When the functional activity of a tumor antigen (e.g. CD19) is reduced by less than about 95% (such as reduced by about any of 10%, 20%, 25%, 30%, 40%, 50%, 60%, 75%, 80%, 85%, or 90%) in the presence of an anti-tumor antigen (e.g., CD19) Fab compared to not bound by an anti-tumor antigen (e.g., CD19) Fab, the anti-tumor antigen (e.g., CD19) Fab is considered capable of partially modulating, blocking, inhibiting, reducing, antagonizing, neutralizing or interfering with the functional activity of the tumor antigen (e.g., CD19).

In some embodiments, the anti-tumor antigen (e.g., CD19) Fab described herein comprises a particular sequence or certain variants of these sequences. In some embodiments, the amino acid substitutions in the variant sequences do not substantially reduce the ability of the anti-tumor antigen (e.g., CD19) Fab to bind to the corresponding tumor antigen (e.g., CD19). Also contemplated are modifications that substantially improve the binding affinity of the anti-tumor antigen (e.g., CD19) Fab to the corresponding tumor antigen (e.g., CD19) or other properties, such as specificity, immunogenicity, antibody-dependent cellular cytotoxicity (ADCC) or Complement-Dependent Cytotoxicity (CDC), and/or cross-reactivity with tumor antigen (e.g., CD19) variants.

The B-lymphocyte antigen CD19 is also known as CD19 molecule (cluster of differentiation 19), B-lymphocyte surface antigen B4, T-cell surface antigen Leu-12 and CVID3. In humans, CD19 is expressed in all B lineage cells, except for plasma cells, and in follicular dendritic cells. CD19 has two major roles: 1) acting as an adaptor protein to recruit cytoplasmic signaling proteins to the membrane; and 2) functioning within the CD19/CD21 complex to decrease the threshold for B cell receptor signaling pathways. CD19 is expressed in both normal B lymphocytes and malignant B lymphocytes, and is considered a B-cell tumor-associated antigen. For example, CD19 can serve as a biomarker for B lymphocyte development, a cancer diagnosis marker, or a target for immunotherapy, such as for B cell lymphomas, mantle cell lymphoma (MCL), acute lymphoblastic leukemia (ALL), and chronic lymphocytic leukemia (CLL). The B lymphocyte antigen CD19 is also known as CD19 molecule (cluster of differentiation 19), B lymphocyte surface antigen B4, T cell surface antigen Leu-12 and CVID3. In humans, except for plasma cells and follicular dendritic cells, CD19 is expressed in all B lineage cells. CD19 plays two major roles in human B cells, 1) acting as an adaptor protein to recruit cytoplasmic signaling proteins to the membrane; and 2) functioning within the CD19/CD21 complex to decrease the threshold for B cell receptor signaling pathways. Because CD19 is present in all B cells, it can serve as a biomarker for B lymphocyte development or lymphoma diagnosis, and can serve as a target for leukemia immunotherapy. CD19 is expressed in both normal B and malignant B lymphocytes and is considered as a B-cell tumor-associated antigen, for example, as a biomarker for B-cell lymphoma, mantle cell lymphoma (MCL), acute lymphoblastic leukemia (ALL), and chronic lymphocyte leukemia (CLL).

In some embodiments, the anti-CD19 Fab specifically binds to CD19 present on the surface of a cell. In some embodiments, the cell is a cancer cell. In some embodiments, the cancer cell is in a solid tumor. In some embodiments, the cancer cell is a metastatic cancer cell, such as hematological cancers, e.g., ALL, CLL, MCL, B cell lymphoma, etc.

In some embodiments, the anti-tumor antigen Fab of the BSAP specifically binds to CD19 via an antigen-binding site formed between the VH and the VL of the anti-tumor antigen Fab, i.e., anti-CD19 Fab. The antigen-binding site comprises at least one (such as 1, 2, or 3) HVR of an immunoglobulin heavy chain and/or at least one (such as 1, 2, or 3) HVR of an immunoglobulin light chain. In some embodiments, the anti-CD19 Fab comprises 1, 2, 3, 4, 5, or all 6 HVRs of VH and VL sequence of a full-length antibody that specifically binds to CD19. In some embodiments, the anti-CD19 Fab is derived from an anti-CD19 monoclonal antibody, e.g., B43, MEDI-551, CLB-CD19, 4G7, SJ25-C1LT19, Leu-12, HD37, or other known anti-human CD19 monoclonal antibodies. In some embodiments, the 1, 2, 3, 4, 5 or all 6 HVRs of the anti-CD19 Fab are derived from a known anti-CD19 monoclonal antibody. In some embodiments, the VH and/or the VL of the anti-CD19 Fab is derived from a known anti-CD19 monoclonal antibody. In some embodiments, the anti-CD19 Fab comprises a VH, wherein the VH comprises one, two, or three HVRs from SEQ ID NO: 7, and/or the anti-CD19 Fab comprises a VL, wherein the VL comprises one, two, or three HVRs from SEQ ID NO: 8 or 40. In some embodiments, the anti-CD19 Fab comprises a VH comprising three HVRs from SEQ ID NO: 7, and/or the anti-CD19 Fab comprises a VL comprising three HVRs from SEQ ID NO: 8 or 40. In some embodiments, the anti-CD19 Fab comprises a VH comprising: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the anti-CD19 Fab comprises a VL comprising: an HVR-L1 comprising the amino acid sequence of SEQ ID NO: 4 or 37, an HVR-L2 comprising the amino acid sequence of SEQ ID NO: 5 or 38, and an HVR-L3 comprising the amino acid sequence of SEQ ID NO: 6 or 39. In some embodiments, the anti-CD19 Fab comprises a VH comprising: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the anti-CD19 Fab comprises a VL comprising: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6. In some embodiments, the anti-CD19 Fab comprises a VH comprising: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the anti-CD19 Fab comprises a VL comprising: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39. In some embodiments, the VH of the anti-CD19 Fab comprises an amino acid sequence at least about 85% (such as at least about any of 86%, 87%, 88%, 89%, 90%, 91%, 92%, 93%, 94%, 95%, 96%, 97%, 98%, or 99%) identical to the amino acid sequence of SEQ ID NO: 7, and/or the VL of the anti-CD19 Fab comprises an amino acid sequence at least about 85% (such as at least about any of 86%, 87%, 88%, 89%, 90%, 91%, 92%, 93%, 94%, 95%, 96%, 97%, 98%, or 99%) identical to the amino acid sequence of SEQ ID NO: 8 or 40. In some embodiments, the VH of the anti-CD19 Fab comprises an amino acid sequence at least about 95% (such as at least about any of 96%, 97%, 98%, or 99%) identical to the amino acid sequence of SEQ ID NO: 7, and/or the VL of the anti-CD19 Fab comprises an amino acid sequence at least about 95% (such as at least about any of 96%, 97%, 98%, or 99%) identical to the amino acid sequence of SEQ ID NO: 8 or 40. In some embodiments, the VH of the anti-CD19 Fab comprises three HVRs from SEQ ID NO: 7, wherein the amino acid residues different from that of SEQ ID NO: 7 reside in the framework region (FR); and/or the VL of the anti-CD19 Fab comprises three HVRs from SEQ ID NO: 8 or 40, wherein the amino acid residues different from that of SEQ ID NO: 8 or 40 reside in the FR In some embodiments, the VH of the anti-CD19 Fab comprises the amino acid sequence of SEQ ID NO: 7, and/or the VL of the anti-CD19 Fab comprises the amino acid sequence of SEQ ID NO: 8 or 40. In some embodiments, the VH of the anti-CD19 Fab comprises the amino acid sequence of SEQ ID NO: 7, and the VL of the anti-CD19 Fab comprises the amino acid sequence of SEQ ID NO: 8. In some embodiments, the VH of the anti-CD19 Fab comprises the amino acid sequence of SEQ ID NO: 7, and the VL of the anti-CD19 Fab comprises the amino acid sequence of SEQ ID NO: 40.

```
(anti-CD19 VH; the underlined sequences are HVR-
H1, HVR-H2, and HVR-H3, respectively)
                                     SEQ ID NO: 7
QVQLVQSGPELIKPGGSVKMSCKASGYTFTSYVMHWVRQKPGQGLEWIG

YINPYNDGTKYNEKFKGRATLTSDKSSSTAYMELSSLRSEDSAVYYCAR

GTYYYGSRVFDYWGQGTTVTVSS

Anti-CD19 HVR-H1: SYVMH (SEQ ID NO: 1)

Anti-CD19 HVR-H2: WIGYINPYNDGTKY (SEQ ID NO: 2)

Anti-CD19 HVR-H3: GTYYYGSRVFDY (SEQ ID NO: 3)

(anti-CD19 VL1.2; the underlined sequences are
HVR-L1, HVR-L2, and HVR-L3, respectively)
                                     SEQ ID NO: 8
DVVMTQSPSSIPVTLGESVSISCRSSKSLQNVNGNTYLYWFQQRPGQSP

QLLIYRMSNLNSGVPDRFSGSGSGTDFTLRISGVEPEDVGVYYCMQHLE

YPITFGAGTKLEIK

Anti-CD19 VL1.2 HVR-L1: RSSKSLQNVNGNTYLY (SEQ ID
NO: 4)

Anti-CD19 VL1.2 HVR-L2: RMSNLNS (SEQ ID NO: 5)

Anti-CD19 VL1.2 HVR-L3: MQHLEYPIT (SEQ ID NO: 6)

(anti-CD19 VL1.1; the underlined sequences are
HVR-L1, HVR-L2, and HVR-L3, respectively)
                                    SEQ ID NO: 40
DVVMTQSPSSIPVTLGESVSISCRSSKSLLNSNGNTYLYWFQQRPGQSP

QLLIYRMSNLASGVPDRFSGSGSGTDFTLRISGVEPEDVGVYYCMQHLE

YPLTFGAGTKLEIK

Anti-CD19 VL1.1 HVR-L1: RSSKSLLNSNGNTYLY (SEQ ID
NO: 37)

Anti-CD19 VL1.1 HVR-L2: RMSNLAS (SEQ ID NO: 38)

Anti-CD19 VL1.1 HVR-L3: MQHLEYPLT (SEQ ID NO: 39)
```

Linkers

The BSAPs described herein may comprise a linker (e.g., a peptide linker, or chemically coupled) between the anti-tumor antigen (e.g., CD19) Fab and the anti-CD3 binding domain (e.g., scFv). In some embodiments, the anti-CD3 binding domain is an scFv comprising a VH and a VL, and the VH and the VL of the anti-CD3 scFv are connected a "connecting peptide." Any linkers described herein (e.g., connecting peptides, peptide linkers, or chemically coupled) can be used in any of the BSAP structures/modules described herein to be connected together, for example, as a linker between the VH and the CH1 of the anti-tumor antigen (e.g., CD19) Fab, and/or a linker between the VL and CL of the anti-tumor antigen (e.g., CD19) Fab; as a connecting peptide between the aforementioned VH and VL of the anti-CD3 scFv; as a linker situated between the anti-tumor antigen (e.g., CD19) Fab and the anti-CD3 binding domain (e.g., scFv); or as a linker between the BSAP and an additional polypeptide, e.g., as a linker situated between the C-terminus of the CH1 of the anti-tumor antigen (e.g., CD19) Fab and the N-terminus of an additional Fc fragment CH2-CH3.

The linkers can be peptide linkers of any length. In some embodiments, the linker (such as peptide linker, or connecting peptide) is from about 1 amino acid to about 10 amino acids long, from about 21 amino acids to about 30 amino acids long, from about 1 amino acid to about 20 amino acids long, from about 1 amino acid to about 30 amino acids long, from about 11 amino acids to about 30 amino acids long, from about 2 amino acids to about 20 amino acids long, from about 2 amino acids to about 19 amino acids long, from about 3 amino acids to about 18 amino acids long, from about 4 amino acids to about 17 amino acids long, from about 4 amino acids to about 16 amino acids long, from about 4 amino acids to about 15 amino acids long, from about 5 amino acids to about 14 amino acids long, from about 5 amino acids to about 13 amino acids long, from about 6 amino acids to about 12 amino acids long, from about 6 amino acids to about 11 amino acids long, from about 6 amino acids to about 10 amino acids long, from about 4 amino acids to about 9 amino acids long, from about 4 amino acids to about 8 amino acids long, or from about 5 amino acids to about 7 amino acids long. In some embodiments, the linker (e.g., peptide linker, or connecting peptide) is about any of 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 amino acids long. In some embodiments, the linker (e.g., peptide linker, or connecting peptide) is composed of an amino acid sequence having a length of from about 2 to about 30 (e.g., about 6 to about 12) amino acid residues. In some embodiments, the linker (e.g., peptide linker, or connecting peptide) is 6 amino acids long. In some embodiments, the linker (e.g., peptide linker, or connecting peptide) is 12 amino acids long. In some embodiments, the N-terminus of the linker (e.g., peptide linker) is covalently linked to the C-terminal of the anti-CD3 binding domain (e.g. scFv), and the C-terminus of the linker (e.g., peptide linker) is covalently linked to the N-terminus of the VH and/or the VL of the anti-tumor antigen (e.g. CD19) Fab.

A linker (e.g., peptide linker, connecting peptide) can have a naturally occurring sequence or a non-naturally occurring sequence. For example, a sequence derived from the hinge region of a heavy chain only antibody can be used as a linker (e.g., peptide linker, connecting peptide). See, for example, WO1996/34103. In some embodiments, the peptide linker or connecting peptide is a human IgG1 or IgG4 hinge. In some embodiments, the peptide linker or connecting peptide is a mutated human IgG1 or IgG4 hinge. In some embodiments, the linker (e.g., peptide linker, connecting peptide) is a flexible linker. Exemplary flexible linkers include glycine polymers (G)$_n$ (SEQ ID NO: 41), glycine-serine polymers (including, for example, (GS)$_n$ (SEQ ID NO: 42), (GSGGS)$_n$ (SEQ ID NO: 43), (GGGS)$_n$ (SEQ ID NO: 44), or (GGGGS)$_n$ (SEQ ID NO: 45), where n is an integer of at least one), glycine-alanine polymers, alanine-serine polymers, and other flexible linkers known in the art. Glycine and glycine-serine polymers are relatively unstructured, and therefore may be able to serve as a neutral tether between components. Glycine accesses significantly more phi-psi space than even alanine, and is much less restricted than residues with longer side chains (see Scheraga, Rev. Computational Chem. 11 173-142 (1992)). Exemplary flexible linkers include, but are not limited to Gly-Gly (SEQ ID NO: 46), Gly-Gly-Ser-Gly (SEQ ID NO: 47), Gly-Gly-Ser-Gly-Gly (SEQ ID NO: 48), Gly-Ser-Gly-Ser-Gly (SEQ ID NO: 49), Gly-Ser-Gly-Gly-Gly (SEQ ID NO: 50), Gly-Gly-Gly-Ser-Gly (SEQ ID NO: 51), Gly-Ser-Ser-Ser-Gly (SEQ ID NO: 52), Gly-Gly-Ser-Gly-Gly-Ser (SEQ ID NO: 20), Ser-Gly-Gly-Gly-Ser (SEQ ID NO: 21), Gly-Arg-Ala-Gly-Gly-Gly-Ala-Gly-Gly-Gly (SEQ ID NO: 22), Gly-Arg-Ala-Gly-Gly-Gly (SEQ ID NO: 33), GGGGSGGGGSGGGGS (SEQ ID NO:53), GGGGS (SEQ ID NO:54), and the like. In some embodiments, the linker situated between the VH and/or the VL of the anti-tumor antigen (e.g., CD19) Fab and the anti-CD3 binding domain (e.g., scFv) is SGGGGS (SEQ ID NO: 21), GRAGGG-GAGGGG (SEQ ID NO: 22), or GRAGGG (SEQ ID NO: 33). In some embodiments, the connecting peptide situated between the VH and the VL of the anti-CD3 scFv is GGGGSGGGGSGGGGS (SEQ ID NO: 53). The ordinarily skilled artisan will recognize that design of a BSAP can include linkers (e.g., peptide linker, connecting peptide) that are all or partially flexible, such that the linker can include a flexible linker as well as one or more portions that confer less flexible structure to provide a desired BSAP structure.

In some embodiments, the linker situated between the anti-tumor antigen (e.g., CD19) Fab and the anti-CD3 binding domain (such as scFv), or the connecting peptide situated between the VH and the VL of the anti-CD3 scFv, is a stable linker (not cleavable by protease, especially MMPs).

In some embodiments, the linker (e.g., peptide linker, or connecting peptide) is a cleavable linker. In some embodiments, the linker between the VH/VL of the anti-tumor antigen (e.g., CD19) Fab and the anti-CD3 binding domain (e.g., scFv) comprises a protease substrate cleavage sequence, for example, an MMP substrate cleavage sequence. Substrate sequences that can be cleaved by MMPs have been extensively studied. For example, a well-known peptide sequence of PLGLAG (SEQ ID NO: 34) can be cleaved by most MMPs. In some embodiments, the protease cleavage site is recognized by MMP-2, MMP-9, or a combination thereof.

In some embodiments, the BSAP comprises a first polypeptide and a second polypeptide, wherein the first polypeptide comprises the structure: N'-anti-CD3 VH-L1-anti-CD3 VL-L2-anti-CD19 VH-CH1-C', and the second polypeptide comprises the structure: N'-anti-CD19 VL-CL-C'. In some embodiments, the BSAP comprises a first polypeptide and a second polypeptide, wherein the first polypeptide comprises the structure: N'-anti-CD3 VL-L1 anti-CD3 VH-L2-anti-CD19 VH-CH1-C', and the second polypeptide comprises the structure: N'-anti-CD19 VL-CL-C'. In some embodiments, the BSAP comprises a first polypeptide and a second polypeptide, wherein the first polypeptide comprises the structure: N'-anti-CD19 VH-CH1-C', and the second polypeptide comprises the structure: N'-anti-CD3 VH L1-anti-CD3 VL-L2-anti-CD19 VL-CL-C'. In some embodiments, the BSAP comprises a first polypeptide and a second polypeptide, wherein the first polypeptide comprises the structure: N'-anti-CD19 VH-CH1-C', and the second polypeptide comprises the following structure: N'-anti-CD3 VL-L1-anti-CD3 VH-L2-anti-CD19 VL-CL-C'. In some embodiments, the BSAP comprises a first polypeptide and a second polypeptide, wherein the first polypeptide comprises the structure: N'-anti-CD3 VH-L1-anti-CD3 VL-L2-anti-CD19 VH-CH1-C', and the second polypeptide comprises the structure: N'-anti-CD3 VH-L1-anti-CD3 VL-L2-anti-CD19 VL-CL-C'. In some embodiments, the BSAP comprises a first polypeptide and a second polypeptide, wherein the first polypeptide comprises the structure: N'-anti-CD3 VL-L1-anti-CD3 VH-L2-anti-CD19 VH-CH1-C', and the second polypeptide comprises the following structure: N'-anti-CD3 VL-L1-anti-CD3 VH-L2-anti-CD19 VL-CL-C'. In some embodiments, the BSAP comprises a first polypeptide and a second polypeptide, wherein the first polypeptide comprises the structure: N'-anti-CD3 VH-L1-anti-CD3 VL-L2-anti-CD19 VH-CH1-C', and the second polypeptide comprises the structure: N' anti-CD3 VL-L1-anti-CD3 VH-L2-anti-CD19 VL-CL-C'. L1 and L2 are optional linkers (e.g., L1 is a connecting peptide) and may be selected from any of the linker forms described herein. L1 and L2 can be the same or different.

Thus, in some embodiments, the CD19×CD3 BSAP comprises a first polypeptide and a second polypeptide, wherein the first polypeptide comprises an amino acid sequence at least about 85% (such as at least about any of 86%, 87%, 88%, 89%, 90%, 91%, 92%, 93%, 94%, 95%, 96%, 97%, 98%, or 99%) identical to the amino acid sequence of any of SEQ ID NOs: 23, 28, 35, 58, and 59, and the second polypeptide comprises an amino acid sequence at least about 85% (such as at least about any of 86%, 87%, 88%, 89%, 90%, 91%, 92%, 93%, 94%, 95%, 96%, 97%, 98%, or 99%) identical to the amino acid sequence of SEQ ID NO: 24 or 27. In some embodiments, the BSAP comprises a first polypeptide and a second polypeptide, wherein the first polypeptide comprises an amino acid sequence at least about 95% (such as at least about any of 96%, 97%, 98%, or 99%) identical to the amino acid sequence of any of SEQ ID NOs: 23, 28, 35, 58, and 59, and the second polypeptide comprises an amino acid sequence at least about 95% (such as at least about any of 96%, 97%, 98%, or 99%) identical to the amino acid sequence of SEQ ID NO: 24 or 27. In some embodiments, the BSAP comprises a first polypeptide and a second polypeptide, wherein the first polypeptide comprises the amino acid sequence of SEQ ID NO: 23, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 35 or 59, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 27. In some embodiments, the first polypeptide is encoded by a nucleic acid sequence comprising any of SEQ ID NOs: 30, 32, 36, 60, and 61. In some embodiments, the second polypeptide is encoded by a nucleic acid sequence comprising SEQ ID NO: 29 or 31.

In some embodiments, the C-terminus of the first and/or the second polypeptide of the BSAP comprises a covalent binding region CPPC (SEQ ID NO: 55) or CPPCS (SEQ ID NO: 56) capable of forming an intermolecular disulfide bond. For example, in some embodiments, the covalent binding region capable of forming an intermolecular disulfide bond is located at the C-terminus of CH1 and CL of the anti-tumor antigen Fab. In some embodiments, the N-terminus or C-terminus of the first and/or the second polypeptide may comprise a histidine tag (HIS tag), such as the amino acid sequence set forth in SEQ ID NO: 57, for protein purification. For example, in some embodiments, the N-terminus of the anti-CD3 binding domain (e.g., scFv) is additionally connected with a histidine tag. In some embodiments, the C-terminus of the CH1 and/or the CL of the anti-tumor antigen (e.g., CD19) Fab is additionally connected with a histidine tag. In some embodiments, for better expression, the N-terminus of the first and/or the second polypeptide of the BSAP is additionally connected with a signal peptide, such as the signal peptide sequence set forth in SEQ ID NO: 25, or encoded by nucleic acid sequence of SEQ ID NO: 26.

```
BSAP first polypeptide amino acid sequence (SEQ ID NO: 23;
anti-CD3 scFv (VH-connecting peptide-VL) - 6aa linker -
anti-CD19 VH - CH1 - CPPC-S; linker is bolded, connecting
peptide is bolded and italicized)
EVQLVESGGGLVQPGGSLRLSCAASGFTFNTYAMNWVRQAPGKGLEWVARIRSKYNN

YATYYADSVKDRFTISRDDSKNTLYLQMNSLRAEDTAVYYCVRHGNFGNSYVSWFAY

WGQGTMVTVSSGGGGSGGGGSGGGGSQAVVTQEPSLTVSPGGTVTLTCRSSTGAVTTS

NYANWVQQKPGQAPRGLIGGTNKRAPGTPARFSGSLLGGKAALTLSGVQPEDEAEYYC

ALWYSNLWVFGGGTKLTVLSGGGGSQVQLVQSGPELIKPGGSVKMSCKASGYTFTSY

VMHWVRQKPGQGLEWIGYINPYNDGTKYNEKFKGRATLTSDKSSSTAYMELSSLRSED

SAVYYCARGTYYYGSRVFDYWGQGTTVTVSSASTKGPSVFPLAPSSKSTSGGTAALGC

LVKDYFPEPVTVSWNSGALTSGVHTFPAVLQSSGLYSLSSVVTVPSSSLGTQTYICNVNH

KPSNTKVDKKVEPKSCPPCS

Nucleic acid sequence encoding anti-CD3 scFv (VH-connecting
peptide-VL) - 6aa linker - anti- CD19 VH - CH1 - CPPC-S
GAGGTGCAGCTGGTGGAGTCTGGGGGAGGCTTGGTACAGCCTGGGGGGTCCCTGAG

ACTCTCCTGTGCAGCCTCTGGATTCACCTTTAACACCTACGCCATGAACTGGGTCCG

CCAGGCTCCAGGGAAGGGGCTGGAGTGGGTCGCACGCATAAGAAGTAAATATAATA

ATTATGCAACATATTATGCCGATTCAGTGAAAGACCGGTTCACCATCTCCAGAGACG

ATTCCAAGAACACGCTGTATCTGCAAATGAACAGCCTGAGAGCCGAGGACACGGCC

GTATATTACTGTGTGAGACATGGGAACTTCGGTAATAGCTACGTTTCCTGGTTTGCTT
```

-continued

```
ACTGGGGCCAAGGGACAATGGTCACCGTCTCTTCAGGTGGCGGTGGCAGCGGCGGT

GGTGGGTCCGGTGGCGGCGGATCTCAGGCTGTGGTGACTCAGGAGCCCTCACTGACT

GTGTCCCCAGGAGGGACAGTCACTCTCACCTGTCGCTCAAGTACTGGGGCTGTTACA

ACTAGTAACTATGCCAACTGGGTCCAGCAGAAACCTGGACAAGCACCCAGGGGTCT

GATTGGTGGTACCAACAAGCGAGCTCCAGGTACCCCTGCCCGGTTCTCAGGCTCCCT

CCTTGGGGGCAAAGCTGCCCTGACACTGTCAGGTGTGCAGCCTGAGGACGAGGCTG

AGTATTACTGCGCTCTATGGTACAGCAACCTCTGGGTGTTCGGCGGAGGGACCAAGC

TGACCGTCCTAAGTGGCGGTGGAGGATCTCAGGTGCAGCTGGTGCAGTCTGGCCCCG

AGCTAATCAAGCCTGGCGGCAGCGTGAAGATGAGCTGCAAGGCCTCCGGCTACACC

TTCACCAGCTACGTGATGCACTGGGTGCGCCAGAAGCCTGGACAGGGCCTGGAATG

GATCGGCTACATCAACCCCTACAACGATGGCACCAAGTACAACGAGAAGTTCAAGG

GCAGAGCCACCCTGACCAGCGACAAGAGCAGCAGCACCGCCTACATGGAACTGAGC

AGCCTGCGGAGCGAGGACAGCGCCGTGTACTATTGTGCCAGAGGCACCTACTACTA

CGGCAGCCGGGTGTTCGACTACTGGGGACAGGGCACCACGGTCACCGTCTCCTCAG

CTAGCACCAAGGGCCCATCCGTCTTCCCCCTGGCACCCTCCTCCAAGAGCACCTCTG

GGGGCACAGCGGCCCTGGGCTGCCTGGTCAAGGACTACTTCCCCGAACCGGTGACG

GTGTCGTGGAACTCAGGCGCCCTGACCAGCGGCGTGCACACCTTCCCGGCTGTCCTA

CAGTCCTCAGGACTCTACTCCCTCAGCAGCGTGGTGACCGTGCCCTCCAGCAGCTTG

GGCACCCAGACCTACATCTGCAACGTGAATCACAAGCCCAGCAACACCAAGGTGGA

CAAGAAAGTTGAGCCCAAATCTTGTCCACCGTGCTCA*TAG*
```

BSAP first polypeptide amino acid sequence (SEQ ID NO: 28; anti-CD3 scFv (VH-connecting peptide-VL) - 6aa linker - anti-CD19 VH - CH1 - CPPC - His-tag; linker is bolded, connecting peptide is bolded and italicized)

EVQLVESGGGLVQPGGSLRLSCAASGFTFNTYAMNWVRQAPGKGLEWVARIRSKYNN

YATYYADSVKDRFTISRDDSKNTLYLQMNSLRAEDTAVYYCVRHGNFGNSYVSWFAY

WGQGTMVTVSS*GGGGSGGGGSGGGGS*QAVVTQEPSLTVSPGGTVTLTCRSSTGAVTTS

NYANWVQQKPGQAPRGLIGGTNKRAPGTPARFSGSLLGGKAALTLSGVQPEDEAEYYC

ALWYSNLWVFGGGTKLTVLGRAGGGQVQLVQSGPELIKPGGSVKMSCKASGYTFTSY

VMHWVRQKPGQGLEWIGYINPYNDGTKYNEKFKGRATLTSDKSSSTAYMELSSLRSED

SAVYYCARGTYYYGSRVFDYWGQGTTVTVSSASTKGPSVFPLAPSSKSTSGGTAALGC

LVKDYFPEPVTVSWNSGALTSGVHTFPAVLQSSGLYSLSSVVTVPSSSLGTQTYICNVNH

KPSNTKVDKKVEPKSCPPCGGGGSHHHHHH

Nucleic acid encoding anti-CD3 scFv (VH-connecting peptide-
VL) - 6aa linker - anti-CD19 VH - CH1 - CPPC - His-tag
(SEQ ID NO: 32)

```
GAGGTGCAGCTGGTGGAGTCTGGGGGAGGCTTGGTACAGCCTGGGGGGTCCCTGAG

ACTCTCCTGTGCAGCCTCTGGATTCACCTTTAACACCTACGCCATGAACTGGGTCCG

CCAGGCTCCAGGGAAGGGGCTGGAGTGGGTCGCACGCATAAGAAGTAAATATAATA

ATTATGCAACATATTATGCCGATTCAGTGAAAGACCGGTTCACCATCTCCAGAGACG

ATTCCAAGAACACGCTGTATCTGCAAATGAACAGCCTGAGAGCCGAGGACACGGCC

GTATATTACTGTGTGAGACATGGGAACTTCGGTAATAGCTACGTTTCCTGGTTTGCTT

ACTGGGGCCAAGGGACAATGGTCACCGTCTCTTCAGGTGGCGGTGGCAGCGGCGGT

GGTGGGTCCGGTGGCGGCGGATCTCAGGCTGTGGTGACTCAGGAGCCCTCACTGACT
```

-continued

```
GTGTCCCCAGGAGGGACAGTCACTCTCACCTGTCGCTCAAGTACTGGGGCTGTTACA

ACTAGTAACTATGCCAACTGGGTCCAGCAGAAACCTGGACAAGCACCCAGGGGTCT

GATTGGTGGTACCAACAAGCGAGCTCCAGGTACCCCTGCCCGGTTCTCAGGCTCCCT

CCTTGGGGGCAAAGCTGCCCTGACACTGTCAGGTGTGCAGCCTGAGGACGAGGCTG

AGTATTACTGCGCTCTATGGTACAGCAACCTCTGGGTGTTCGGCGGAGGGACCAAGC

TGACCGTCCTAGGGCGCGCCGGCGGTGGACAGGTGCAGCTGGTGCAGTCTGGCCCC

GAGCTAATCAAGCCTGGCGGCAGCGTGAAGATGAGCTGCAAGGCCTCCGGCTACAC

CTTCACCAGCTACGTGATGCACTGGGTGCGCCAGAAGCCTGGACAGGGCCTGGAAT

GGATCGGCTACATCAACCCCTACAACGATGGCACCAAGTACAACGAGAAGTTCAAG

GGCAGAGCCACCCTGACCAGCGACAAGAGCAGCAGCACCGCCTACATGGAACTGAG

CAGCCTGCGGAGCGAGGACAGCGCCGTGTACTATTGTGCCAGAGGCACCTACTACT

ACGGCAGCCGGGTGTTCGACTACTGGGGACAGGGCACCACGGTCACCGTCTCCTCA

GCTAGCACCAAGGGCCCATCCGTCTTCCCCCTGGCACCCTCCTCCAAGAGCACCTCT

GGGGGCACAGCGGCCCTGGGCTGCCTGGTCAAGGACTACTTCCCCGAACCGGTGAC

GGTGTCGTGGAACTCAGGCGCCCTGACCAGCGGCGTGCACACCTTCCCGGCTGTCCT

ACAGTCCTCAGGACTCTACTCCCTCAGCAGCGTGGTGACCGTGCCCTCCAGCAGCTT

GGGCACCCAGACCTACATCTGCAACGTGAATCACAAGCCCAGCAACACCAAGGTGG

ACAAGAGAGTTGAGCCCAAATCTTGTCCACCGTGCGGTGGCGGGGGCTCCCATCAT

CATCATCATCATTAG
```

BSAP first polypeptide amino acid sequence (SEQ ID NO: 58; anti-CD3 scFv (VH-connecting peptide-VL) - 6aa linker - anti-CD19 VH - CH1 - CPPC; linker is bolded, connecting peptide is bolded and italicized)

```
EVQLVESGGGLVQPGGSLRLSCAASGFTFNTYAMNWVRQAPGKGLEWVARIRSKYNN

YATYYADSVKDRFTISRDDSKNTLYLQMNSLRAEDTAVYYCVRHGNFGNSYVSWFAY

WGQGTMVTVSSGGGGSGGGGSGGGGSQAVVTQEPSLTVSPGGTVTLTCRSSTGAVTTS

NYANWVQQKPGQAPRGLIGGTNKRAPGTPARFSGSLLGGKAALTLSGVQPEDEAEYYC

ALWYSNLWVFGGGTKLTVLGRAGGGQVQLVQSGPELIKPGGSVKMSCKASGYTFTSY

VMHWVRQKPGQGLEWIGYINPYNDGTKYNEKFKGRATLTSDKSSSTAYMELSSLRSED

SAVYYCARGTYYYGSRVFDYWGQGTTVTVSSASTKGPSVFPLAPSSKSTSGGTAALGC

LVKDYFPEPVTVSWNSGALTSGVHTFPAVLQSSGLYSLSSVVTVPSSSLGTQTYICNVNH

KPSNTKVDKKVEPKSCPPC
```

Nucleic acid encoding anti-CD3 scFv (VH-connecting peptide-VL) - 6aa linker - anti-CD19 VH - CH1 - CPPC (SEQ ID NO: 60)

```
GAGGTGCAGCTGGTGGAGTCTGGGGGAGGCTTGGTACAGCCTGGGGGGTCCCTGAG

ACTCTCCTGTGCAGCCTCTGGATTCACCTTTAACACCTACGCCATGAACTGGGTCCG

CCAGGCTCCAGGGAAGGGGCTGGAGTGGGTCGCACGCATAAGAAGTAAATATAATA

ATTATGCAACATATTATGCCGATTCAGTGAAAGACCGGTTCACCATCTCCAGAGACG

ATTCCAAGAACACGCTGTATCTGCAAATGAACAGCCTGAGAGCCGAGGACACGGCC

GTATATTACTGTGTGAGACATGGGAACTTCGGTAATAGCTACGTTTCCTGGTTTGCTT

ACTGGGGCCAAGGGACAATGGTCACCGTCTCTTCAGGTGGCGGTGGCAGCGGCGGT

GGTGGGTCCGGTGGCGGCGGATCTCAGGCTGTGGTGACTCAGGAGCCCTCACTGACT

GTGTCCCCAGGAGGGACAGTCACTCTCACCTGTCGCTCAAGTACTGGGGCTGTTACA
```

-continued

```
ACTAGTAACTATGCCAACTGGGTCCAGCAGAAACCTGGACAAGCACCCAGGGGTCT

GATTGGTGGTACCAACAAGCGAGCTCCAGGTACCCCTGCCCGGTTCTCAGGCTCCCT

CCTTGGGGGCAAAGCTGCCCTGACACTGTCAGGTGTGCAGCCTGAGGACGAGGCTG

AGTATTACTGCGCTCTATGGTACAGCAACCTCTGGGTGTTCGGCGGAGGGACCAAGC

TGACCGTCCTAGGGCGCGCCGGCGGTGGACAGGTGCAGCTGGTGCAGTCTGGCCCC

GAGCTAATCAAGCCTGGCGGCAGCGTGAAGATGAGCTGCAAGGCCTCCGGCTACAC

CTTCACCAGCTACGTGATGCACTGGGTGCGCCAGAAGCCTGGACAGGGCCTGGAAT

GGATCGGCTACATCAACCCCTACAACGATGGCACCAAGTACAACGAGAAGTTCAAG

GGCAGAGCCACCCTGACCAGCGACAAGAGCAGCAGCACCGCCTACATGGAACTGAG

CAGCCTGCGGAGCGAGGACAGCGCCGTGTACTATTGTGCCAGAGGCACCTACTACT

ACGGCAGCCGGGTGTTCGACTACTGGGGACAGGGCACCACGGTCACCGTCTCCTCA

GCTAGCACCAAGGGCCCATCCGTCTTCCCCCTGGCACCCTCCTCCAAGAGCACCTCT

GGGGGCACAGCGGCCCTGGGCTGCCTGGTCAAGGACTACTTCCCCGAACCGGTGAC

GGTGTCGTGGAACTCAGGCGCCCTGACCAGCGGCGTGCACACCTTCCCGGCTGTCCT

ACAGTCCTCAGGACTCTACTCCCTCAGCAGCGTGGTGACCGTGCCCTCCAGCAGCTT

GGGCACCCAGACCTACATCTGCAACGTGAATCACAAGCCCAGCAACACCAAGGTGG

ACAAGAGAGTTGAGCCCAAATCTTGTCCACCGTGC*TAG*
```

BSAP first polypeptide amino acid sequence (SEQ ID NO: 35;
anti-CD3 scFv (VH-connecting peptide-VL) - 12aa linker -
anti-CD19 VH - CH1 - CPPC - His-tag; linker is bolded,
connecting peptide is bolded and italicized)

```
EVQLVESGGGLVQPGGSLRLSCAASGFTFNTYAMNWVRQAPGKGLEWVARIRSKYNN

YATYYADSVKDRFTISRDDSKNTLYLQMNSLRAEDTAVYYCVRHGNFGNSYVSWFAY

WGQGTMVTVSSGGGGSGGGGSGGGGSQAVVTQEPSLTVSPGGTVTLTCRSSTGAVTTS

NYANWVQQKPGQAPRGLIGGTNKRAPGTPARFSGSLLGGKAALTLSGVQPEDEAEYYC

ALWYSNLWVFGGGTKLTVLGRAGGGGAGGGGQVQLVQSGPELIKPGGSVKMSCKAS

GYTFTSYVMHWVRQKPGQGLEWIGYINPYNDGTKYNEKFKGRATLTSDKSSSTAYMEL

SSLRSEDSAVYYCARGTYYYGSRVFDYWGQGTTVTVSSASTKGPSVFPLAPSSKSTSGG

TAALGCLVKDYFPEPVTVSWNSGALTSGVHTFPAVLQSSGLYSLSSVVTVPSSSLGTQT

YICNVNHKPSNTKVDKRVEPKSCPPCGGGGSHHHHHH
```

Nucleic acid encoding anti-CD3 scFv (VH-connecting peptide-
VL) - 12aa linker - anti-CD19 VH - CH1 - CPPC - His-tag
(SEQ ID NO: 36)

```
GAGGTGCAGCTGGTGGAGTCTGGGGGAGGCTTGGTACAGCCTGGGGGGTCCCTGAG

ACTCTCCTGTGCAGCCTCTGGATTCACCTTTAACACCTACGCCATGAACTGGGTCCG

CCAGGCTCCAGGGAAGGGGCTGGAGTGGGTCGCACGCATAAGAAGTAAATATAATA

ATTATGCAACATATTATGCCGATTCAGTGAAAGACCGGTTCACCATCTCCAGAGACG

ATTCCAAGAACACGCTGTATCTGCAAATGAACAGCCTGAGAGCCGAGGACACGGCC

GTATATTACTGTGTGAGACATGGGAACTTCGGTAATAGCTACGTTTCCTGGTTTGCTT

ACTGGGGCCAAGGGACAATGGTCACCGTCTCTTCAGGTGGCGGTGGCAGCGGCGGT

GGTGGGTCCGGTGGCGGCGGATCTCAGGCTGTGGTGACTCAGGAGCCCTCACTGACT

GTGTCCCCAGGAGGGACAGTCACTCTCACCTGTCGCTCAAGTACTGGGGCTGTTACA

ACTAGTAACTATGCCAACTGGGTCCAGCAGAAACCTGGACAAGCACCCAGGGGTCT

GATTGGTGGTACCAACAAGCGAGCTCCAGGTACCCCTGCCCGGTTCTCAGGCTCCCT
```

-continued

```
CCTTGGGGGCAAAGCTGCCCTGACACTGTCAGGTGTGCAGCCTGAGGACGAGGCTG

AGTATTACTGCGCTCTATGGTACAGCAACCTCTGGGTGTTCGGCGGAGGGACCAAGC

TGACCGTCCTAGGGCGCGCCGGCGGAGGTGGTGCAGGAGGCGGTGGACAGGTGCAG

CTGGTGCAGTCTGGCCCCGAGCTAATCAAGCCTGGCGGCAGCGTGAAGATGAGCTG

CAAGGCCTCCGGCTACACCTTCACCAGCTACGTGATGCACTGGGTGCGCCAGAAGC

CTGGACAGGGCCTGGAATGGATCGGCTACATCAACCCCTACAACGATGGCACCAAG

TACAACGAGAAGTTCAAGGGCAGAGCCACCCTGACCAGCGACAAGAGCAGCAGCA

CCGCCTACATGGAACTGAGCAGCCTGCGGAGCGAGGACAGCGCCGTGTACTATTGT

GCCAGAGGCACCTACTACTACGGCAGCCGGGTGTTCGACTACTGGGGACAGGGCAC

CACGGTCACCGTCTCCTCAGCTAGCACCAAGGGCCCATCCGTCTTCCCCCTGGCACC

CTCCTCCAAGAGCACCTCTGGGGGCACAGCGGCCCTGGGCTGCCTGGTCAAGGACT

ACTTCCCCGAACCGGTGACGGTGTCGTGGAACTCAGGCGCCCTGACCAGCGGCGTG

CACACCTTCCCGGCTGTCCTACAGTCCTCAGGACTCTACTCCCTCAGCAGCGTGGTG

ACCGTGCCCTCCAGCAGCTTGGGCACCCAGACCTACATCTGCAACGTGAATCACAA

GCCCAGCAACACCAAGGTGGACAAGAGAGTTGAGCCCAAATCTTGTCCACCGTGCG

GTGGCGGGGGCTCCCATCATCATCATCATCATTAG
```

BSAP first polypeptide amino acid sequence (SEQ ID NO: 59;
anti-CD3 scFv (VH-connecting peptide-VL) - 12aa linker -
anti-CD19 VH - CH1 - CPPC; linker is bolded, connecting
peptide is bolded and italicized)

```
EVQLVESGGGLVQPGGSLRLSCAASGFTFNTYAMNWVRQAPGKGLEWVARIRSKYNN

YATYYADSVKDRFTISRDDSKNTLYLQMNSLRAEDTAVYYCVRHGNFGNSYVSWFAY

WGQGTMVTVSS*GGGGSGGGGSGGGGS*QAVVTQEPSLTVSPGGTVTLTCRSSTGAVTTS

NYANWVQQKPGQAPRGLIGGTNKRAPGTPARFSGSLLGGKAALTLSGVQPEDEAEYYC

ALWYSNLWVFGGGTKLTVLGRAGGGGAGGGGQVQLVQSGPELIKPGGSVKMSCKAS

GYTFTSYVMHWVRQKPGQGLEWIGYINPYNDGTKYNEKFKGRATLTSDKSSTAYMEL

SSLRSEDSAVYYCARGTYYYGSRVFDYWGQGTTVTVSSASTKGPSVFPLAPSSKSTSGG

TAALGCLVKDYFPEPVTVSWNSGALTSGVHTFPAVLQSSGLYSLSSVVTVPSSSLGTQT

YICNVNHKPSNTKVDKRVEPKSCPPC
```

Nucleic acid encoding anti-CD3 scFv (VH-connecting peptide-
VL) - 12aa linker - anti-CD19 VH - CH1 - CPPC
(SEQ ID NO: 61)

```
GAGGTGCAGCTGGTGGAGTCTGGGGGAGGCTTGGTACAGCCTGGGGGGTCCCTGAG

ACTCTCCTGTGCAGCCTCTGGATTCACCTTTAACACCTACGCCATGAACTGGGTCCG

CCAGGCTCCAGGGAAGGGGCTGGAGTGGGTCGCACGCATAAGAAGTAAATATAATA

ATTATGCAACATATTATGCCGATTCAGTGAAAGACCGGTTCACCATCTCCAGAGACG

ATTCCAAGAACACGCTGTATCTGCAAATGAACAGCCTGAGAGCCGAGGACACGGCC

GTATATTACTGTGTGAGACATGGGAACTTCGGTAATAGCTACGTTTCCTGGTTTGCTT

ACTGGGGCCAAGGGACAATGGTCACCGTCTCTTCAGGTGGCGGTGGCAGCGGCGGT

GGTGGGTCCGGTGGCGGCGGATCTCAGGCTGTGGTGACTCAGGAGCCCTCACTGACT

GTGTCCCCAGGAGGGACAGTCACTCTCACCTGTCGCTCAAGTACTGGGGCTGTTACA

ACTAGTAACTATGCCAACTGGGTCCAGCAGAAACCTGGACAAGCACCCAGGGGTCT

GATTGGTGGTACCAACAAGCGAGCTCCAGGTACCCCTGCCCGGTTCTCAGGCTCCCT

CCTTGGGGGCAAAGCTGCCCTGACACTGTCAGGTGTGCAGCCTGAGGACGAGGCTG
```

-continued
```
AGTATTACTGCGCTCTATGGTACAGCAACCTCTGGGTGTTCGGCGGAGGGACCAAGC

TGACCGTCCTAGGGCGCGCCGGCGGAGGTGGTGCAGGAGGCGGTGGACAGGTGCAG

CTGGTGCAGTCTGGCCCCGAGCTAATCAAGCCTGGCGGCAGCGTGAAGATGAGCTG

CAAGGCCTCCGGCTACACCTTCACCAGCTACGTGATGCACTGGGTGCGCCAGAAGC

CTGGACAGGGCCTGGAATGGATCGGCTACATCAACCCCTACAACGATGGCACCAAG

TACAACGAGAAGTTCAAGGGCAGAGCCACCCTGACCAGCGACAAGAGCAGCAGCA

CCGCCTACATGGAACTGAGCAGCCTGCGGAGCGAGGACAGCGCCGTGTACTATTGT

GCCAGAGGCACCTACTACTACGGCAGCCGGGTGTTCGACTACTGGGGACAGGGCAC

CACGGTCACCGTCTCCTCAGCTAGCACCAAGGGCCCATCCGTCTTCCCCCTGGCACC

CTCCTCCAAGAGCACCTCTGGGGGCACAGCGGCCCTGGGCTGCCTGGTCAAGGACT

ACTTCCCCGAACCGGTGACGGTGTCGTGGAACTCAGGCGCCCTGACCAGCGGCGTG

CACACCTTCCCGGCTGTCCTACAGTCCTCAGGACTCTACTCCCTCAGCAGCGTGGTG

ACCGTGCCCTCCAGCAGCTTGGGCACCCAGACCTACATCTGCAACGTGAATCACAA

GCCCAGCAACACCAAGGTGGACAAGAGAGTTGAGCCCAAATCTTGTCCACCGTGCT

AG
```

BSAP second polypeptide amino acid sequence (SEQ ID NO:
24; anti-CD19 VL1.2 - CL - CPPC-S)
```
DVVMTQSPSSIPVTLGESVSISCRSSKSLQNVNGNTYLYWFQQRPGQSPQLLIYRMSNLN

SGVPDRFSGSGSGTDFTLRISGVEPEDVGVYYCMQHLEYPITFGAGTKLEIKRTVAAPSV

FIFPPSDEQLKSGTASVVCLLNNFYPREAKVQWKVDNALQSGNSQESVTEQDSKDSTYS

LSSTLTLSKADYEKHKVYACEVTHQGLSSPVTKSFNRGECPPCS
```

Nucleic acid encoding anti-CD19 VL1.2 - CL - CPPC-S
(SEQ ID NO: 29)
```
GATGTTGTGATGACTCAGTCTCCCAGCAGCATCCCCGTGACCCTGGGCGAGTCTGTG

TCCATCAGCTGCAGAAGCAGCAAGAGCCTGCAGAACGTCAACGGCAACACCTACCT

GTACTGGTTCCAGCAGCGGCCTGGCCAGTCTCCCCAGCTGCTGATCTACCGGATGAG

CAACCTGAACAGCGGCGTGCCCGATAGATTTTCTGGCTCTGGCAGCGGCACCGACTT

CACCCTGAGAATCTCCGGCGTGGAACCCGAGGACGTGGGCGTGTACTACTGTATGC

AGCACCTGGAATACCCCATCACCTTCGGAGCCGGCACCAAGCTGGAGATCAAACGT

ACGGTGGCTGCACCATCTGTCTTCATCTTCCCGCCATCTGATGAGCAGTTGAAATCT

GGAACTGCCTCTGTTGTGTGCCTGCTGAATAACTTCTATCCCAGAGAGGCCAAAGTA

CAGTGGAAGGTGGATAACGCCCTCCAATCGGGTAACTCCCAGGAGAGTGTCACAGA

GCAGGACAGCAAGGACAGCACCTACAGCCTCAGCAGCACCCTGACGCTGAGCAAAG

CAGACTACGAGAAACACAAAGTCTACGCCTGCGAAGTCACCCATCAGGGCCTGAGC

TCGCCCGTCACAAAGAGCTTCAACAGGGGAGAGTGTCCACCGTGCTCCTAG
```

BSAP second polypeptide amino acid sequence (SEQ ID NO: 27;
anti-CD19 VL1.1 - CL - CPPC)
```
DVVMTQSPSSIPVTLGESVSISCRSSKSLLNSNGNTYLYWFQQRPGQSPQLLIYRMSNLA

SGVPDRFSGSGSGTDFTLRISGVEPEDVGVYYCMQHLEYPLTFGAGTKLEIKRTVAAPSV

FIFPPSDEQLKSGTASVVCLLNNFYPREAKVQWKVDNALQSGNSQESVTEQDSKDSTYS

LSSTLTLSKADYEKHKVYACEVTHQGLSSPVTKSFNRGECPPC
```

Nucleic acid encoding anti-CD19 VL1.1 - CL - CPPC
(SEQ ID NO: 31)
```
GATGTTGTGATGACTCAGTCTCCCAGCAGCATCCCCGTGACCCTGGGCGAGTCTGTG

TCCATCAGCTGCAGAAGCAGCAAGAGCCTGCTGAACAGCAACGGCAACACCTACCT
```

```
GTACTGGTTCCAGCAGCGGCCTGGCCAGTCTCCCCAGCTGCTGATCTACCGGATGAG

CAACCTGGCCAGCGGCGTGCCCGATAGATTTTCTGGCTCTGGCAGCGGCACCGACTT

CACCCTGAGAATCTCCGGCGTGGAACCCGAGGACGTGGGCGTGTACTACTGTATGC

AGCACCTGGAATACCCCCTGACCTTCGGAGCCGGCACCAAGCTGGAGATCAAACGT

ACGGTGGCTGCACCATCTGTCTTCATCTTCCCGCCATCTGATGAGCAGTTGAAATCT

GGAACTGCCTCTGTTGTGTGCCTGCTGAATAACTTCTATCCCAGAGAGGCCAAAGTA

CAGTGGAAGGTGGATAACGCCCTCCAATCGGGTAACTCCCAGGAGAGTGTCACAGA

GCAGGACAGCAAGGACAGCACCTACAGCCTCAGCAGCACCCTGACGCTGAGCAAAG

CAGACTACGAGAAACACAAAGTCTACGCCTGCGAAGTCACCCATCAGGGCCTGAGC

TCGCCCGTCACAAAGAGCTTCAACAGGGGAGAGTGTCCACCGTGCTAG
```

III. Methods of Preparation

The BSAPs described herein (e.g., CD19×CD3 BSAP) may be prepared by any of the known protein expression and purification methods in the art. See Example 1. The DNA sequence encoding the BSAP described herein can be fully synthesized. After obtaining such sequence, it is cloned into a suitable expression vector then transferred into a suitable host cell (e.g., CHO cell). Finally, the transformed (e.g., transfected) host cells are cultured, and the expression supernatant is harvested and purified to obtain the BSAP of the present invention.

Thus, the present invention in some aspects also provide isolated nucleic acids encoding any of the BSAPs described herein (e.g., CD19×CD3 BSAP), vectors (e.g., expression vector) comprising any of the nucleic acids encoding the BSAPs, and host cells (e.g., CHO cells, bacteria cells) containing any of the vectors carrying nucleic acids encoding the BSAPs.

In some embodiments, the present application provides isolated nucleic acids encoding one or more of the polypeptides of any one of the BSAPs described herein. In some embodiments, the isolated nucleic acid comprises the nucleic acid sequence of SEQ ID NO: 30, 32, 36, 60, or 61. In some embodiments, the isolated nucleic acid comprises the nucleic acid sequence of SEQ ID NO: 29 or 31. The isolated nucleic acids may be DNA or RNA.

In some embodiments, the isolated nucleic acid is inserted into a vector, such as an expression vector, a viral vector, or a cloning vector. For the expression of the nucleic acids, the vector may be introduced into a host cell to allow expression of the nucleic acids within the host cell. The expression vectors may contain a variety of elements for controlling expression, including without limitation, promoter sequences, transcription initiation sequences, enhancer sequences, selectable markers, and signal sequences. These elements may be selected as appropriate by a person of ordinary skill in the art. For example, the promoter sequences may be selected to promote the transcription of the polynucleotide in the vector. Suitable promoter sequences include, without limitation, T7 promoter, T3 promoter, SP6 promoter, beta-actin promoter, EF1a promoter, CMV promoter, and SV40 promoter. Enhancer sequences may be selected to enhance the transcription of the nucleic acids. Selectable markers may be selected to allow selection of the host cells inserted with the vector from those not, for example, the selectable markers may be genes that confer antibiotic resistance. Signal sequences may be selected to allow the expressed polypeptide to be transported outside of the host cell. In some embodiments, the isolated nucleic acids further comprise a nucleic acid sequence encoding a signal peptide. In some embodiments, the signal peptide comprises the amino acid sequence of SEQ ID NO: 25. In some embodiments, the nucleic acid encoding the signal peptide comprises the nucleic acid sequence of SEQ ID NO: 26.

(Signal peptide)
SEQ ID NO: 25
MEWSWVFLFFLSVTTGVHS (Nucleic acid encoding signal peptide)
SEQ ID NO: 26
ATGGAATGGAGCTGGGTCTTTCTCTTCTTCCTGTCAGTAACGACTGGTG
TCCACTCC In some embodiments, there is provided an isolated host cell containing any of the vectors described above. The host cells containing the vector may be useful in expression or cloning of the isolated nucleic acids. Suitable host cells can include, without limitation, prokaryotic cells, fungal cells, yeast cells, or higher eukaryotic cells such as mammalian cells. The expression of antibodies and antigen-binding fragments in prokaryotic cells such as *E. coli* is well established in the art. For a review, see for example Pluckthun, A. BioTechnology 9: 545-551 (1991). Expression in eukaryotic cells in culture is also available to those skilled in the art as an option for production of antibodies or antigen-binding fragments thereof, see recent reviews, for example Ref, L E. (1993) Curr. Opinion Biotech. 4: 573-576; Trill J. J. et al. (1995) Curr. Opinion Biotech 6: 553-560. Higher eukaryotic cells, in particular, those derived from multicellular organisms can be used for expression of glycosylated polypeptides. Suitable higher eukaryotic cells include, without limitation, invertebrate cells and insect cells, and vertebrate cells.

The vector can be introduced to the host cell using any suitable methods known in the art, including, but not limited to, DEAE-dextran mediated delivery, calcium phosphate precipitate method, cationic lipids mediated delivery, liposome mediated transfection, electroporation, microprojectile bombardment, receptor-mediated gene delivery, delivery mediated by polylysine, histone, chitosan, and peptides. Standard methods for transfection and transformation of cells for expression of a vector of interest are well known in the art. In some embodiments, the host cells comprise a first vector encoding a first polypeptide and a second vector encoding a second polypeptide. In some embodiments, the host cells comprise a single vector comprising isolated nucleic acids encoding a first polypeptide and a second polypeptide.

In some embodiments, the present application provides methods of expressing any of the BSAPs described herein, comprising culturing the isolated host cell containing the vector encoding the BSAP and recovering the BSAP from the cell culture. The isolated host cells are cultured under conditions that allow expression of the isolated nucleic acids inserted in the vectors. Suitable conditions for expression of polynucleotides may include, without limitation, suitable medium, suitable density of host cells in the culture medium, presence of necessary nutrients, presence of supplemental factors, suitable temperatures and humidity, and absence of microorganism contaminants. A person with ordinary skill in the art can select the suitable conditions as appropriate for the purpose of the expression.

In some embodiments, the polypeptides expressed in the host cell can form a dimer and thus produce a BSAP described herein. In some embodiments, the polypeptide expressed in the host cell can form a polypeptide complex which is a homodimer. In some embodiments, wherein the host cells express a first polynucleotide and a second polynucleotide, the first polynucleotide and the second polynucleotide can form a polypeptide complex which is a heterodimer.

In some embodiments, the polypeptide complex (such as the BSAP) may be formed inside the host cell. For example, the dimer may be formed inside the host cell with the aid of relevant enzymes and/or cofactors. In some embodiments, the polypeptide complex may be secreted out of the cell. In some embodiments, a first polypeptide and a second polypeptide may be secreted out of the host cell and form a dimer (such as the BSAP) outside of the host cell.

In some embodiments, a first polypeptide and a second polypeptide may be separately expressed and allowed to dimerize to form the BSAP under suitable conditions. For example, the first polypeptide and the second polypeptide may be combined in a suitable buffer and allow the first protein monomer and the second protein monomer to dimerize through appropriate interactions such as hydrophobic interactions. In some embodiments, the first polypeptide and the second polypeptide may be combined in a suitable buffer containing an enzyme and/or a cofactor which can promote the dimerization of the first polypeptide and the second polypeptide. In some embodiments, the first polypeptide and the second polypeptide may be combined in a suitable vehicle and allow them to react with each other in the presence of a suitable reagent and/or catalyst.

The expressed polypeptide(s) and/or the polypeptide complex can be collected using any suitable methods. The polypeptide(s) and/or the polypeptide complex can be expressed intracellularly, in the periplasmic space or be secreted outside of the cell into the medium. If the polypeptide and/or the polypeptide complex are expressed intracellularly, the host cells containing the polypeptide and/or the polypeptide complex may be lysed and polypeptide and/or the polypeptide complex may be isolated from the lysate by removing the unwanted debris by centrifugation or ultrafiltration. If the polypeptide and/or the polypeptide complex is secreted into periplasmic space of E. coli, the cell paste may be thawed in the presence of agents such as sodium acetate (pH 3.5), EDTA, and phenylmethylsulfonylfluoride (PMSF) for about 30 min, and cell debris can be removed by centrifugation (Carter et al., BioTechnology 10:163-167 (1992)). If the polypeptide and/or the polypeptide complex is secreted into the medium, the supernatant of the cell culture may be collected and concentrated using a commercially available protein concentration filter, for example, an Amincon or Millipore Pellicon ultrafiltration unit. A protease inhibitor and/or an antibiotics may be included in the collection and concentration steps to inhibit protein degradation and/or growth of contaminated microorganisms.

The expressed polypeptide(s) and/or the polypeptide complex can be further purified by a suitable method, such as without limitation, affinity chromatography, hydroxylapatite chromatography, size exclusion chromatography, gel electrophoresis, dialysis, ion exchange fractionation on an ion-exchange column, ethanol precipitation, reverse phase HPLC, chromatography on silica, chromatography on heparin sepharose, chromatography on an anion or cation exchange resin (such as a polyaspartic acid column), chromatofocusing, SDS-PAGE, and ammonium sulfate precipitation (see, for review, Bonner, P. L., Protein purification, published by Taylor & Francis. 2007; Janson, J. C., et al, Protein purification: principles, high resolution methods and applications, published by Wiley-VCH, 1998). See Example 1.

In some embodiments, the polypeptides and/or polypeptide dimer complexes can be purified by affinity chromatography. In some embodiments, protein A chromatography or protein A/G (fusion protein of protein A and protein G) chromatography can be useful for purification of polypeptides and/or polypeptide complexes comprising a component derived from antibody CH2 domain and/or CH3 domain (Lindmark et al., J. Immunol. Meth. 62:1-13 (1983)); Zettlit, K. A., Antibody Engineering, Part V, 531-535, 2010). In some embodiments, protein G chromatography can be useful for purification of polypeptides and/or polypeptide complexes comprising IgG γ3 heavy chain (Guss et al., EMBO J. 5:1567 1575 (1986)). In some embodiments, protein L chromatography can be useful for purification of polypeptides and/or polypeptide complexes comprising a light chain (Sudhir, P., Antigen engineering protocols, Chapter 26, published by Humana Press, 1995; Nilson, B. H. K. at al, J. Biol. Chem., 267, 2234-2239 (1992)). The matrix to which the affinity ligand is attached is most often agarose, but other matrices are available. Mechanically stable matrices such as controlled pore glass or poly(styrenedivinyl) benzene allow for faster flow rates and shorter processing times than can be achieved with agarose. Where the BSAP (e.g., CD19×CD3 BSAP) comprises an additional CH3 domain, the Bakerbond ABX resin (J. T. Baker, Phillipsburg, N.J.) is useful for purification.

Iv. Pharmaceutical Compositions, Dosage Forms, Articles of Manufacture, and Kits Further provided by the present application are pharmaceutical compositions comprising any one of the BSAPs described herein (such as CD19×CD3 BSAP), and optionally a pharmaceutically acceptable carrier.

The pharmaceutical compositions may be suitable for a variety of modes of administration described herein, including for example systemic or localized administration. In some embodiments, the pharmaceutical composition is formulated for intravenous administration. In some embodiments, the pharmaceutical composition is formulated for subcutaneous administration. In some embodiments, the pharmaceutical composition is formulated for local administration to a tumor site. In some embodiments, the pharmaceutical composition is formulated for intratumoral injection. In some embodiments, the pharmaceutical composition is formulated for intraperitoneal injection.

"Carriers" as used herein include pharmaceutically acceptable carriers, excipients, or stabilizers which are non-toxic to the cell or mammal being exposed thereto at the dosages and concentrations employed. Often the physiologically acceptable carrier is an aqueous pH buffered solution. Acceptable carriers, excipients, or stabilizers are nontoxic to recipients at the dosages and concentrations employed, and include buffers such as phosphate, citrate, and other organic acids; antioxidants including ascorbic acid and methionine; preservatives (such as octadecyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g., Zn-protein complexes); and/or non-ionic surfactants such as TWEEN™, PLURONICS™ or polyethylene glycol (PEG).

It will be appreciated that BSAPs of the present invention can be administered in conjunction with suitable carriers, excipients, and other agents formulated into the formulations (e.g., pharmaceutical formulation) to improve transfer, delivery, tolerance, and the like. Many appropriate formulations can be obtained from a list of formulations known to all pharmaceutical chemists: Remington's Pharmaceutical Sciences (15th ed, Mack Publishing Company, Easton, PA (1975)), particularly Chapter 87 by Blaug, Seymour. These formulations include, for example, powders, pastes, ointments, jellies, waxes, oils, lipids, lipid (cationic or anionic) containing vesicles (such as Lipofectin™), DNA conjugates, anhydrous absorption pastes, oil-in-water and water-in-oil emulsions, emulsions carbowax (polyethylene glycols of various molecular weights), semi-solid gels, and semi-solid mixtures containing carbowax. Any of the foregoing mixtures may be appropriate in treatments and therapies in accordance with the present invention, provided that the active ingredient in the formulation is not inactivated by the formulation and the formulation is physiologically compatible and tolerable with the route of administration. See also Baldrick P. "Pharmaceutical excipient development: the need for preclinical guidance." Regul. Toxicol Pharmacol. 32(2):210-8 (2000), Wang W. "Lyophilization and development of solid protein pharmaceuticals." Int. J. Pharm. 203 (1-2):1-60 (2000), Charman W N "Lipids, lipophilic drugs, and oral drug delivery-some emerging concepts." J Pharm Sci. 89(8):967-78 (2000), Powell et al. "Compendium of excipients for parenteral formulations" PDA J Pharm Sci Technol. 52:238-311 (1998) and the citations therein for additional information related to formulations, excipients and carriers well known to pharmaceutical chemists.

In some embodiments, the pharmaceutical composition can also be made to be isotonic with blood by the addition of a suitable tonicity modifier, such as glycerol.

The pharmaceutical compositions to be used for in vivo administration are generally formulated as sterile, substantially isotonic, and in full compliance with all Good Manufacturing Practice (GMP) regulations of the U.S. Food and Drug Administration. Sterility is readily accomplished by filtration through sterile filtration membranes. In some embodiments, the composition is free of pathogen. For injection, the pharmaceutical composition can be in the form of liquid solutions, for example in physiologically compatible buffers such as Hank's solution or Ringer's solution. In addition, the pharmaceutical composition can be in a solid form and re-dissolved or suspended immediately prior to use. Lyophilized compositions are also included.

In some embodiment, the pharmaceutical composition is formulated in accordance with routine procedures as a pharmaceutical composition adapted for injection intravenously, introperitoneally, or intravitreally. Typically, compositions for injection are solutions in sterile isotonic aqueous buffer. Where necessary, the composition may also include a solubilizing agent and a local anesthetic such as lignocaine to ease pain at the site of the injection. Generally, the ingredients are supplied either separately or mixed together in unit dosage form, for example, as a dry lyophilized powder or water free concentrate in a hermetically sealed container such as an ampoule or sachette indicating the quantity of active agent. Where the composition is to be administered by infusion, it can be dispensed with an infusion bottle containing sterile pharmaceutical grade water or saline. Where the composition is administered by injection, an ampoule of sterile water for injection or saline can be provided so that the ingredients may be mixed prior to administration.

In some embodiments, the BSAP composition (e.g., CD19×CD3 BSAP, or a pharmaceutical composition containing the BSAP) is suitable for administration to a human. In some embodiments, the BSAP composition (e.g., CD19×CD3 BSAP, or a pharmaceutical composition containing the BSAP) is suitable for administration to rodents (e.g., mice, rats) or non-human primates (e.g., cynomolgus monkeys). In some embodiments, the pharmaceutical composition is contained in a single-use vial, such as a single-use sealed vial. In some embodiments, the pharmaceutical composition is contained in a multi-use vial. In some embodiments, the pharmaceutical composition is contained in bulk in a container. In some embodiments, the pharmaceutical composition is cryopreserved.

Also provided are unit dosage forms of the BSAP (e.g., CD19×CD3 BSAP) or pharmaceutical compositions thereof. The term "unit dosage form" refers to a physically discrete unit suitable as unitary dosages for an individual, each unit containing a predetermined quantity of active material calculated to produce the desired therapeutic effect, in association with a suitable pharmaceutical carrier, diluent, or excipient. These unit dosage forms can be stored in a suitable packaging in single or multiple unit dosages and may also be further sterilized and sealed.

The present application further provides articles of manufacture comprising the BSAP (e.g., CD19×CD3 BSAP) compositions (such as pharmaceutical compositions) described herein in suitable packaging. Suitable packaging for the compositions (e.g., BSAP compositions) described herein are known in the art, and include, for example, vials (such as sealed vials), vessels, ampules, bottles, jars, flexible packaging (e.g., sealed Mylar or plastic bags), and the like. These articles of manufacture may further be sterilized and/or sealed.

The present application also provides kits comprising BSAP (e.g., CD19×CD3 BSAP) compositions (such as pharmaceutical compositions) described herein and may further comprise instruction(s) on methods of using the composition, such as uses described herein. The kits described herein may further include other materials desirable from a commercial and user standpoint, including other buffers, diluents, filters, needles, syringes, and package inserts with instructions for performing any methods described herein.

V. Methods of Treating Cancer

The present application also provides methods of treating a cancer in an individual (such as a human), comprising administering to the individual an effective amount of any of the BSAPs (e.g., CD19×CD3 BSAP) described herein, or a pharmaceutical composition comprising any of the BSAP and optionally a pharmaceutically acceptable carrier. In some embodiments, the BSAP (e.g., CD19×CD3 BSAP) or the pharmaceutical composition thereof is administered intravenously. In some embodiments, the method does not induce cytokine storm. In some embodiments, the cancer is selected from the group consisting of acute lymphocytic leukemia (ALL), chronic lymphocytic leukemia (CLL), mantel cell leukemia (MCL), and B cell lymphoma (BCL).

Thus in some embodiments, there is provided a method of treating a cancer in an individual (e.g., human), comprising administering to the individual an effective amount of a BSAP (or pharmaceutical composition thereof) comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-tumor antigen Fab and the anti-CD3 binding domain are connected directly or via an optional linker. In some embodiments, there is provided a method of treating a cancer in an individual (e.g., human), comprising administering to the individual an effective amount of a BSAP (or pharmaceutical composition thereof) comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-tumor antigen Fab and the anti-CD3 binding domain are connected directly or via an optional linker; wherein the anti-CD3 binding domain (e.g., scFv) is connected to the N-terminus of the VH of the anti-tumor antigen Fab. In some embodiments, there is provided a method of treating a cancer in an individual (e.g., human), comprising administering to the individual an effective amount of a BSAP (or pharmaceutical composition thereof) comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-tumor antigen Fab and the anti-CD3 binding domain are connected directly or via an optional linker; wherein the anti-CD3 binding domain (e.g., scFv) is connected to the N-terminus of the VL of the anti-tumor antigen Fab. In some embodiments, there is provided a method of treating a cancer in an individual (e.g., human), comprising administering to the individual an effective amount of a BSAP (or pharmaceutical composition thereof) comprising: i) an anti-tumor antigen Fab specifically recognizing a tumor antigen (e.g., CD19, such as huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-tumor antigen Fab and the first anti-CD3 binding domain (e.g., scFv) are connected directly or via an optional first linker, and the anti-tumor antigen Fab and the second anti-CD3 binding domain (e.g., scFv) are connected directly or via an optional second linker; wherein the first anti-CD3 binding domain (e.g., scFv) is connected to the N-terminus of the VH of the anti-tumor antigen Fab, and the second anti-CD3 binding domain (e.g., scFv) is connected to the N-terminus of the VL of the anti-tumor antigen Fab. In some embodiments, the tumor antigen is selected from the group consisting of CD19, EpCAM, CD20, CD22, CD30, CD37, CD40, and CD74. In some embodiments, the tumor antigen is CD19. In some embodiments, the anti-CD3 binding domain (e.g., scFv) specifically recognizes the N-terminus of CD3ε (e.g., huCD3ε or cynoCD3ε), such as an epitope within amino acid residues 1-27 of CD3ε. In some embodiments, the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the CH1 and the CL of the anti-tumor antigen Fab are connected by a disulfide bond, such as about 1 to about 5 (such as about any of 1, 2, 3, 4, or 5) disulfide bonds, e.g., about 2 disulfide bonds. In some embodiments, the CH1 of the anti-tumor antigen Fab comprises the amino acid sequence of SEQ ID NO: 18, and/or the CL of the anti-tumor antigen Fab comprises the amino acid sequence of SEQ ID NO: 19. In some embodiments, the linker situated between the anti-tumor antigen (e.g., CD19) Fab and the anti-CD3 binding domain (e.g., scFv), and/or the connecting peptide situated between the VH and the VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine; e.g., the linker and/or the connecting peptide is selected from any of SEQ ID NOs: 21, 22, 33, and 53. In some embodiments, the BSAP (e.g., CD19×CD3 BSAP) or pharmaceutical composition thereof is administered intravenously. In some embodiments, the method of treating cancer described herein can achieve one or more of the following biological effects: (1) killing cancer cells; (2) inhibiting proliferation of cancer cells; (3) inducing redistribution of peripheral T cells (e.g., recruiting T cells to tissues or tumors that express the tumor antigens); (4) reducing tumor size; (5) alleviating one or more symptoms in the individual having cancer; (6) inhibiting tumor metastasis (e.g., metastasis to lymph nodes); (7) prolonging individual survival; (8) prolonging time to cancer progression; (9) preventing, inhibiting, or reducing the likelihood of cancer recurrence. In some embodiments, the method of killing cancer cells mediated by the BSAPs described herein (e.g., CD3×CD19 BSAP) or pharmaceutical composition thereof can achieve a tumor cell death rate of at least about any of 40%, 50%, 60%, 70%, 80%, 90%, 95%, or more. In some embodiments, the method of reducing tumor size mediated by the BSAP described herein (e.g., CD19×CD3 BSAP) or pharmaceutical composition thereof can reduce tumor size by at least about 10% (such as at least about any of 20%, 30%, 40%, 50%, 60%, 70%, 80%, 90%, 95%, or more). In some embodiments, the method of inhibiting tumor metastasis (e.g., metastasis to lymph nodes) mediated by the BSAP described herein (e.g., CD19×CD3 BSAP) or pharmaceutical composition thereof can inhibit the metastasis by at least about 10% (such as at least about any of 20%, 30%, 40%, 50%, 60%, 70%, 80%, 90%, 95%, or more). In some embodiments, the method of prolonging survival of an individual (e.g., human) mediated by the BSAP described herein (e.g., CD19×CD3 BSAP) or a pharmaceutical composition thereof can prolong the survival of the individual (e.g., human) by at least about any of 1, 2, 3, 4, 5, 6, 7, 8, 9, 10, 11, 12, 18, 24 months, or more. In some embodiments, the method of prolonging the time to cancer progression mediated by the BSAP described herein (e.g., CD19×CD3 BSAP) or pharmaceutical composition thereof can prolong the time to cancer progression by at least about any of 1, 2, 3, 4, 5, 6, 7, 8, 9, 10, 11, 12 weeks, or more. In some embodiments, the BSAP described herein (e.g., CD3×CD19 BSAP) or pharmaceutical composition thereof can increase, enhance, or stimulate an immune response or function in a subject by activating effector cells (e.g., T cells, e.g., CD8+ and/or CD4+ T cells). In some embodiments, the CD4 and/or CD8 T cells in the individual have increased or enhanced priming, activation, proliferation, cytokine release and/or cytolytic activity relative to prior to the administration of the BSAP described herein (e.g., CD3×CD19 BSAP) or pharmaceutical composition thereof.

In some embodiments, the anti-CD3 binding domain is an scFv, wherein the anti-CD3 scFv comprises a VH and a VL optionally connected by a connecting peptide. In some embodiments, the connecting peptide comprises an amino acid sequence of SEQ ID NO: 53.

Thus, in some embodiments, there is provided a method of treating a cancer in an individual (e.g., a human), comprising administering to the individual an effective amount of a BSAP (or pharmaceutical composition thereof) comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-tumor antigen Fab and the anti-CD3 scFv are connected directly or via an optional linker. In some embodiments, there is provided a method of treating a cancer in an individual (e.g., a human), comprising administering to the individual an effective amount of a BSAP (or pharmaceutical composition thereof) comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-tumor antigen Fab and the anti-CD3 scFv are connected directly or via an optional linker; and wherein the anti-CD3 scFv is connected to the N-terminus of the VH of the anti-tumor antigen (e.g., CD19) Fab. In some embodiments, there is provided a method of treating a cancer in an individual (e.g., a human), comprising administering to the individual an effective amount of a BSAP (or pharmaceutical composition thereof) comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-tumor antigen Fab and the anti-CD3 scFv are connected directly or via an optional linker; and wherein the anti-CD3 scFv is connected to the N-terminus of the VL of the anti-tumor antigen Fab. In some embodiments, there is provided a method of treating a cancer in an individual (e.g., a human), comprising administering to the individual an effective amount of a BSAP (or pharmaceutical composition thereof) comprising: i) an anti-tumor antigen Fab specifically recognizing a tumor antigen (e.g., CD19, such as huCD19 or cynoCD19), comprising: (a) a VH and a CH1; and (b) a VL and a CL; and two anti-CD3 scFvs specifically recognizing CD3 (e.g., huCD3 or cynoCD3); wherein the anti-tumor antigen Fab and the first anti-CD3 scFv are connected directly or via an optional first linker, and the anti-tumor antigen Fab and the second anti-CD3 scFv are connected directly or via an optional second linker; and wherein the first anti-CD3 scFv is connected to an N-terminus of the VH of the anti-tumor antigen (e.g., CD19) Fab, and the second anti-CD3 scFv is connected to the N-terminus of the VL of the anti-tumor antigen (e.g., CD19) Fab. In some embodiments, the CL and the CH1 of the anti-tumor antigen Fab are connected by a disulfide bond, such as about 1 to about 5 (e.g., about any of 1, 2, 3, 4, or 5) disulfide bonds, e.g., 2 disulfide bonds. In some embodiments, the tumor antigen is selected from the group consisting of CD19, EpCAM, CD20, CD22, CD30, CD37, CD40, and CD74. In some embodiments, the tumor antigen is CD19. In some embodiments, the anti-CD3 scFv specifically recognizes the N-terminus of CD3ε (e.g., huCD3ε or cynoCD3ε), such as an epitope within amino acid residues 1-27 of CD3ε. In some embodiments, the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, the VH of the anti-CD3 scFv comprises the amino acid sequence of SEQ ID NO: 15, and/or the VL of the anti-CD3 scFv comprises the amino acid sequence of SEQ ID NO: 16. In some embodiments, the VH and the VL of the anti-CD3 scFv are connected by a connecting peptide. In some embodiments, the anti-CD3 scFv comprises the amino acid sequence of SEQ ID NO: 17. In some embodiments, the linker and/or the connecting peptide is selected from any of SEQ ID NOs: 21, 22, 33, and 53. In some embodiments, the BSAP (e.g., CD19×CD3 BSAP) or the pharmaceutical composition thereof is administered intravenously. In some embodiments, the method of treating cancer described herein can achieve one or more of the following biological effects: (1) killing cancer cells; (2) inhibiting proliferation of cancer cells; (3) inducing redistribution of peripheral T cells (e.g., recruiting T cells to tissues or tumors that express the tumor antigens); (4) reducing tumor size; (5) alleviating one or more symptoms in the individual having cancer; (6) inhibiting tumor metastasis (e.g., metastasis to lymph nodes); (7) prolonging individual survival; (8) prolonging time to cancer progression; (9) preventing, inhibiting, or reducing the likelihood of cancer recurrence.

In some embodiments, the anti-CD3 binding domain is an anti-CD3 scFv, wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14.

Thus, in some embodiments, there is provided a method of treating a cancer in an individual (e.g., a human), comprising administering to the individual an effective amount of a BSAP (or pharmaceutical composition thereof) comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-tumor antigen Fab and the anti-CD3 scFv are connected directly or via an optional linker; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, there is provided a method of treating a cancer in an individual (e.g., a human), comprising administering to the individual an effective amount of a BSAP (or pharmaceutical composition thereof) comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-tumor antigen Fab and the anti-CD3 scFv are connected directly or via an optional linker; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the anti-CD3 scFv is connected to the N-terminus of the VH of the anti-tumor antigen (e.g., CD19) Fab. In some embodiments, there is provided a method of treating a cancer in an individual (e.g., a human), comprising administering to the individual an effective amount of a BSAP (or pharmaceutical composition thereof) comprising: i) an anti-tumor antigen Fab specifically recognizing a tumor antigen (e.g., CD19, such as huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-tumor antigen Fab and the anti-CD3 scFv are connected directly or via an optional linker; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the anti-CD3 scFv is connected to the N-terminus of the VL of the anti-tumor antigen (e.g., CD19) Fab. In some embodiments, there is provided a method of treating a cancer in an individual (e.g., a human), comprising administering to the individual an effective amount of a BSAP (or pharmaceutical composition thereof) comprising: i) an anti-tumor antigen Fab specifically recognizing a tumor antigen (e.g., CD19, such as huCD19 or cynoCD19), comprising: (a) a VH and a CH1; and (b) a VL and a CL; and ii) two anti-CD3 scFvs specifically recognizing CD3 (e.g., huCD3 or cynoCD3); wherein the anti-tumor antigen Fab and the first anti-CD3 scFv are connected directly or via an optional first linker, and the anti-tumor antigen Fab and the second anti-CD3 scFv are connected directly or via an optional second linker; wherein each of the anti-CD3 scFvs comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or each of the anti-CD3 scFvs comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the first anti-CD3 scFv is connected to the N-terminus of the VH of the anti-tumor antigen (e.g., CD19) Fab, and the second anti-CD3 scFv is connected to the N-terminus of the VL of the anti-tumor antigen (e.g., CD19) Fab. In some embodiments, the CL and the CH1 of the anti-tumor antigen Fab are connected by a disulfide bond, such as about 1 to about 5 (e.g., about any of 1, 2, 3, 4, or 5) disulfide bonds, e.g., 2 disulfide bonds. In some embodiments, the tumor antigen is selected from the group consisting of CD19, EpCAM. CD20, CD22, CD30, CD37, CD40, and CD74. In some embodiments, the tumor antigen is CD19. In some embodiments, the anti-CD3 scFv specifically recognizes the N-terminus of CD3ε (e.g., huCD3ε or cynoCD3ε), such as an epitope within amino acid residues 1-27 of CD3ε. In some embodiments, the VH of the anti-CD3 scFv comprises the amino acid sequence of SEQ ID NO: 15, and/or the VL of the anti-CD3 scFv comprises the amino acid sequence of SEQ ID NO: 16. In some embodiments, the VH and the VL of the anti-CD3 scFv are connected by a connecting peptide. In some embodiments, the anti-CD3 scFv comprises the amino acid sequence of SEQ ID NO: 17. In some embodiments, the linker and/or the connecting peptide is selected from any of SEQ ID NOs: 21, 22, 33, and 53. In some embodiments, the BSAP (e.g., CD19×CD3 BSAP) or pharmaceutical composition thereof is administered intravenously. In some embodiments, the method of treating cancer described herein can achieve one or more of the following biological effects: (1) killing cancer cells; (2) inhibiting proliferation of cancer cells; (3) inducing redistribution of peripheral T cells (e.g., recruiting T cells to tissues or tumors that express the tumor antigens); (4) reducing tumor size; (5) alleviating one or more symptoms in the individual having cancer; (6) inhibiting tumor metastasis (e.g., metastasis to lymph nodes); (7) prolonging individual survival; (8) prolonging time to cancer progression; (9) preventing, inhibiting, or reducing the likelihood of cancer recurrence.

In some embodiments, the tumor antigen is CD19, i.e., the BSAP is a CD19×CD3 BSAP. Thus, in some embodiments, the invention provides a method of treating a disease associated with or characterized by the expression of CD19, such as a cancer expressing CD19, e.g., ALL, CLL, MCL, or B cell lymphoma.

Thus, in some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker. In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VH of the anti-CD19 Fab. In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VL of the anti-CD19 Fab. In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3 wherein the anti-CD19 Fab and the first anti-CD3 binding domain (e.g., scFv) are connected directly or via an optional first linker, and the anti-CD19 Fab and the second anti-CD3 binding domain (e.g., scFv) are connected directly or via an optional second linker; wherein the first anti-CD3 binding domain (e.g., scFv) is connected to the N-terminus of the VH of the anti-CD19 Fab, and the second anti-CD3 binding domain (e.g., scFv) is connected to the N-terminus of the VL of the anti-CD19 Fab. In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6. In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39. In some embodiments, the VH of the anti-CD19 Fab comprises the amino acid sequence of SEQ ID NO: 7, and/or the VL of the anti-CD19 Fab comprises the amino acid sequence of SEQ ID NO: 8 or 40. In some embodiments, the anti-CD3 binding domain (e.g., scFv) specifically recognizes the N-terminus of CD3ε (e.g., huCD3ε or cynoCD3ε), such as an epitope within amino acid residues 1-27 of CD3ε. In some embodiments, the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the CL and the CH1 of the anti-CD19 Fab are connected by a disulfide bond, such as about 1 to about 5 (e.g., about any of 1, 2, 3, 4, or 5) disulfide bonds, e.g., 2 disulfide bonds. In some embodiments, the linker and/or the connecting peptide is selected from any of SEQ ID NOs: 21, 22, 33, and 53. In some embodiments, the BSAP (e.g., CD19×CD3 BSAP) or pharmaceutical composition thereof is administered intravenously. In some embodiments, the method of treating cancer described herein can achieve one or more of the following biological effects: (1) killing cancer cells; (2) inhibiting proliferation of cancer cells; (3) inducing redistribution of peripheral T cells (e.g., recruiting T cells to tissues or tumors that express the tumor antigens); (4) reducing tumor size; (5) alleviating one or more symptoms in the individual having cancer; (6) inhibiting tumor metastasis (e.g., metastasis to lymph nodes); (7) prolonging individual survival; (8) prolonging time to cancer progression; (9) preventing, inhibiting, or reducing the likelihood of cancer recurrence. In some embodiments, the cancer is selected from the group consisting of ALL, CLL, MCL, and B cell lymphoma.

In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6.

Thus, in some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6. In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; and wherein the anti-CD3 binding domain (e.g., scFv) is connected to the N-terminus of the VH of the anti-CD19 Fab. In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; and wherein the anti-CD3 binding domain (e.g., scFv) is connected to the N-terminus of the VL of the anti-CD19 Fab. In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-CD19 Fab and the first anti-CD3 binding domain (e.g., scFv) are connected directly or via an optional first linker, and the anti-CD19 Fab and the second anti-CD3 binding domain (e.g., scFv) are connected directly or via an optional second linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; and wherein the first anti-CD3 binding domain (e.g., scFv) is connected to the N-terminus of the VH of the anti-CD19 Fab, and the second anti-CD3 binding domain (e.g., scFv) is connected to the N-terminus of the VL of the anti-CD19 Fab. In some embodiments, the CL and the CH1 of the anti-CD19 Fab are connected by a disulfide bond, such as about 1 to about 5 (e.g., about any of 1, 2, 3, 4, or 5) disulfide bonds, e.g., 2 disulfide bonds. In some embodiments, the VH of the anti-CD19 Fab comprises the amino acid sequence of SEQ ID NO: 7, and/or the VL of the anti-CD19 Fab comprises the amino acid sequence of SEQ ID NO: 8. In some embodiments, the anti-CD3 binding domain (e.g., scFv) specifically recognizes the N-terminus of CD3ε (e.g., huCD3ε or cynoCD3ε), such as an epitope within amino acid residues 1-27 of CD3ε. In some embodiments, the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the linker and/or the connecting peptide is selected from any of SEQ ID NOs: 21, 22, 33, and 53. In some embodiments, the BSAP (e.g., CD19×CD3 BSAP) or pharmaceutical composition thereof is administered intravenously. In some embodiments, the method of treating cancer described herein can achieve one or more of the following biological effects: (1) killing cancer cells; (2) inhibiting proliferation of cancer cells; (3) inducing redistribution of peripheral T cells (e.g., recruiting T cells to tissues or tumors that express the tumor antigens); (4) reducing tumor size; (5) alleviating one or more symptoms in the individual having cancer; (6) inhibiting tumor metastasis (e.g., metastasis to lymph nodes); (7) prolonging individual survival; (8) prolonging time to cancer progression; (9) preventing, inhibiting, or reducing the likelihood of cancer recurrence. In some embodiments, the cancer is selected from the group consisting of ALL, CLL, MCL, and B cell lymphoma.

In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; and wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the anti-CD3 scFv is connected to the N-terminus of the VH of the anti-CD19 Fab. In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the anti-CD3 scFv is connected to the N-terminus of the VL of the anti-CD19 Fab. In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) two anti-CD3 scFvs specifically recognizing CD3 (e.g., huCD3 or cynoCD3); wherein the anti-CD19 Fab and the first anti-CD3 scFv are connected directly or via an optional first linker, and the anti-CD19 Fab and the second anti-CD3 scFv are connected directly or via an optional second linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4, an HVR-L2 comprising the amino acid sequence of SEQ ID NO: 5, and an HVR-L3 comprising the amino acid sequence of SEQ ID NO: 6; wherein each of the anti-CD3 scFvs comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or each of the anti-CD3 scFvs comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the first anti-CD3 scFv is connected to the N-terminus of the VH of the anti-CD19 Fab, and the second anti-CD3 scFv is connected to the N-terminus of the VL of the anti-CD19 Fab. In some embodiments, the VH of the anti-CD19 Fab comprises the amino acid sequence of SEQ ID NO: 7, and/or the VL of the anti-CD19 Fab comprises the amino acid sequence of SEQ ID NO: 8. In some embodiments, the anti-CD3 binding domain (e.g., scFv) specifically recognizes the N-terminus of CD3ε (e.g., huCD3ε or cynoCD3ε), such as an epitope within amino acid residues 1-27 of CD3ε. In some embodiments, the VH of the anti-CD3 scFv comprises the amino acid sequence of SEQ ID NO: 15, and/or the VL of the anti-CD3 scFv comprises the amino acid sequence of SEQ ID NO: 16. In some embodiments, the VH and the VL of the anti-CD3 scFv are connected by a connecting peptide. In some embodiments, the anti-CD3 scFv comprises the amino acid sequence of SEQ ID NO: 17. In some embodiments, the CH1 and the CL of the anti-CD19 Fab are connected by a disulfide bond, such as about 1 to about 5 (such as about any of 1, 2, 3, 4, or 5) disulfide bonds, e.g., about 2 disulfide bonds. In some embodiments, the CH1 of the anti-CD19 Fab comprises the amino acid sequence of SEQ ID NO: 18, and/or the CL of the anti-CD19 Fab comprises the amino acid sequence of SEQ ID NO: 19. In some embodiments, the linker situated between the anti-CD19 Fab and the anti-CD3 scFv, and/or the connecting peptide situated between the VH and the VL of the anti-CD3 scFv, is composed of an amino acid sequence having a length of from about 2 to about 30 (e.g., about 6 to about 12) amino acid residues, wherein the amino acid residues are selected from glycine, serine, arginine, and alanine; e.g., the linker and/or the connecting peptide is selected from any of SEQ ID NOs: 21, 22, 33, and 53. In some embodiments, the BSAP (e.g., CD19×CD3 BSAP) or pharmaceutical composition thereof is administered intravenously. In some embodiments, the method of treating cancer described herein can achieve one or more of the following biological effects: (1) killing cancer cells; (2) inhibiting proliferation of cancer cells; (3) inducing redistribution of peripheral T cells (e.g., recruiting T cells to tissues or tumors that express the tumor antigens); (4) reducing tumor size; (5) alleviating one or more symptoms in the individual having cancer; (6) inhibiting tumor metastasis (e.g., metastasis to lymph nodes); (7) prolonging individual survival; (8) prolonging time to cancer progression; (9) preventing, inhibiting, or reducing the likelihood of cancer recurrence. In some embodiments, the cancer is selected from the group consisting of ALL, CLL, MCL, or B cell lymphoma.

In some embodiments, there is provided a method of treating a cancer (e.g., CD19+ cancer) in an individual (e.g., human), comprising administering to the individual an effective amount of a BSAP (or pharmaceutical composition thereof) comprising: a first polypeptide and a second polypeptide, wherein the first polypeptide comprises an amino acid sequence at least about 95% (such as at least about any of 96%, 97%, 98%, or 99%) identical to the amino acid sequence of any of SEQ ID NOs: 23, 28, 35, 58, and 59, and/or the second polypeptide comprises an amino acid sequence at least about 95% (such as at least about any of 96%, 97%, 98%, or 99%) identical to the amino acid sequence of SEQ ID NO: 24. In some embodiments, there is provided a method of treating a cancer (e.g., CD19+ cancer) in an individual (e.g., human), comprising administering to the individual an effective amount of a BSAP (or pharmaceutical composition thereof) comprising: a first polypeptide comprising the amino acid sequence of SEQ ID NO: 23; and a second polypeptide comprising the amino acid sequence of SEQ ID NO: 24. In some embodiments, there is provided a method of treating a cancer (e.g., CD19+ cancer) in an individual (e.g., human), comprising administering to the individual an effective amount of a BSAP (or pharmaceutical composition thereof) comprising: a first polypeptide comprising the amino acid sequence of SEQ ID NO: 28 or 58; and a second polypeptide comprising the amino acid sequence of SEQ ID NO: 24. In some embodiments, there is provided a method of treating a cancer (e.g., CD19+ cancer) in an individual (e.g., human), comprising administering to the individual an effective amount of a BSAP (or pharmaceutical composition thereof) comprising: a first polypeptide comprising the amino acid sequence of SEQ ID NO: 35 or 59; and a second polypeptide comprising the amino acid sequence of SEQ ID NO: 24.

In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39.

Thus, in some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39. In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; and wherein the anti-CD3 binding domain (e.g., scFv) is connected to the N-terminus of the VH of the anti-CD19 Fab. In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; and wherein the anti-CD3 binding domain (e.g., scFv) is connected to the N-terminus of the VL of the anti-CD19 Fab. In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-CD19 Fab and the first anti-CD3 binding domain (e.g., scFv) are connected directly or via an optional first linker, and the anti-CD19 Fab and the second anti-CD3 binding domain (e.g., scFv) are connected directly or via an optional second linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; and wherein the first anti-CD3 binding domain (e.g., scFv) is connected to the N-terminus of the VH of the anti-CD19 Fab, and the second anti-CD3 binding domain (e.g., scFv) is connected to the N-terminus of the VL of the anti-CD19 Fab. In some embodiments, the VH of the anti-CD19 Fab comprises the amino acid sequence of SEQ ID NO: 7, and/or the VL of the anti-CD19 Fab comprises the amino acid sequence of SEQ ID NO: 40. In some embodiments, the anti-CD3 binding domain (e.g., scFv) specifically recognizes the N-terminus of CD3ε (e.g., huCD3ε or cynoCD3ε), such as an epitope within amino acid residues 1-27 of CD3ε. In some embodiments, the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the linker and/or the connecting peptide is selected from any of SEQ ID NOs: 21, 22, 33, and 53. In some embodiments, the CL and the CH1 of the anti-CD19 Fab are connected by a disulfide bond, such as about 1 to about 5 (e.g., about any of 1, 2, 3, 4, or 5) disulfide bonds, e.g., 2 disulfide bonds. In some embodiments, the BSAP (e.g., CD19×CD3 BSAP) or pharmaceutical composition thereof is administered intravenously. In some embodiments, the method of treating cancer described herein can achieve one or more of the following biological effects: (1) killing cancer cells; (2) inhibiting proliferation of cancer cells; (3) inducing redistribution of peripheral T cells (e.g., recruiting T cells to tissues or tumors that express the tumor antigens); (4) reducing tumor size; (5) alleviating one or more symptoms in the individual having cancer; (6) inhibiting tumor metastasis (e.g., metastasis to lymph nodes); (7) prolonging individual survival; (8) prolonging time to cancer progression; (9) preventing, inhibiting, or reducing the likelihood of cancer recurrence. In some embodiments, the cancer is selected from the group consisting of ALL, CLL, MCL, or B cell lymphoma.

In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; and wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the anti-CD3 scFv is connected to the N-terminus of the VH of the anti-CD19 Fab. In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 scFv specifically recognizing CD3 (e.g., huCD3 or cynoCD3); wherein the anti-CD19 Fab and the anti-CD3 scFv are connected directly or via an optional linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; wherein the anti-CD3 scFv comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 scFv comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the anti-CD3 scFv is connected to the N-terminus of the VL of the anti-CD19 Fab. In some embodiments, there is provided a method of treating a cancer (e.g., CD19+ cancer) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) two anti-CD3 scFvs specifically recognizing CD3 (e.g., huCD3 or cynoCD3); wherein the anti-CD19 Fab and the first anti-CD3 scFv are connected directly or via an optional first linker, and the anti-CD19 Fab and the second anti-CD3 scFv are connected directly or via an optional second linker; wherein the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; wherein each of the anti-CD3 scFvs comprises a VH, wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or each of the anti-CD3 scFvs comprises a VL, wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14; and wherein the first anti-CD3 scFv is connected to the N-terminus of the VH of the anti-CD19 Fab, and the second anti-CD3 scFv is connected to the N-terminus of the VL of the anti-CD19 Fab. In some embodiments, the VH of the anti-CD19 Fab comprises the amino acid sequence of SEQ ID NO: 7, and/or the VL of the anti-CD19 Fab comprises the amino acid sequence of SEQ ID NO: 40. In some embodiments, the anti-CD3 scFv specifically recognizes the N-terminus of CD3ε (e.g., huCD3ε or cynoCD3ε), such as an epitope within amino acid residues 1-27 of CD3ε. In some embodiments, the VH of the anti-CD3 scFv comprises the amino acid sequence of SEQ ID NO: 15, and/or the VL of the anti-CD3 scFv comprises the amino acid sequence of SEQ ID NO: 16. In some embodiments, the VH and the VL of the anti-CD3 scFv are connected by a connecting peptide. In some embodiments, the anti-CD3 scFv comprises the amino acid sequence of SEQ ID NO: 17. In some embodiments, the linker and/or the connecting peptide is selected from any of SEQ ID NOs: 21, 22, 33, and 53. In some embodiments, the BSAP (e.g., CD19×CD3 BSAP) or pharmaceutical composition thereof is administered intravenously. In some embodiments, the method of treating cancer described herein can achieve one or more of the following biological effects: (1) killing cancer cells; (2) inhibiting proliferation of cancer cells; (3) inducing redistribution of peripheral T cells (e.g., recruiting T cells to tissues or tumors that express the tumor antigens); (4) reducing tumor size; (5) alleviating one or more symptoms in the individual having cancer; (6) inhibiting tumor metastasis (e.g., metastasis to lymph nodes); (7) prolonging individual survival; (8) prolonging time to cancer progression; (9) preventing, inhibiting, or reducing the likelihood of cancer recurrence. In some embodiments, the cancer is selected from the group consisting of ALL, CLL, MCL, or B cell lymphoma.

In some embodiments, there is provided a method of treating a cancer (e.g., CD19+ cancer) in an individual (e.g., human), comprising administering to the individual an effective amount of a BSAP (or pharmaceutical composition thereof) comprising: a first polypeptide and a second polypeptide, wherein the first polypeptide comprises an amino acid sequence at least about 95% (such as at least about any of 96%, 97%, 98%, or 99%) identical to the amino acid sequence of any of SEQ ID NOs: 23, 28, 35, 58, and 59, and/or the second polypeptide comprises an amino acid sequence at least about 95% (such as at least about any of 96%, 97%, 98%, or 99%) identical to the amino acid sequence of SEQ ID NO: 27. In some embodiments, there is provided a method of treating a cancer (e.g., CD19+ cancer) in an individual (e.g., human), comprising administering to the individual an effective amount of a BSAP (or pharmaceutical composition thereof) comprising: a first polypeptide comprising the amino acid sequence of SEQ ID NO: 23; and a second polypeptide comprising the amino acid sequence of SEQ ID NO: 27. In some embodiments, there is provided a method of treating a cancer (e.g., CD19+ cancer) in an individual (e.g., human), comprising administering to the individual an effective amount of a BSAP (or pharmaceutical composition thereof) comprising: a first polypeptide comprising the amino acid sequence of SEQ ID NO: 28 or 58; and a second polypeptide comprising the amino acid sequence of SEQ ID NO: 27. In some embodiments, there is provided a method of treating a cancer (e.g., CD19+ cancer) in an individual (e.g., human), comprising administering to the individual an effective amount of a BSAP (or pharmaceutical composition thereof) comprising: a first polypeptide comprising the amino acid sequence of SEQ ID NO: 35 or 59; and a second polypeptide comprising the amino acid sequence of SEQ ID NO: 27.

The methods provided herein may be practiced in an adjuvant setting. In some embodiments, the method is practiced in a neoadjuvant setting, i.e., the method may be carried out before the primary/definitive therapy. In some embodiments, the method is used to treat an individual (e.g., human) who has previously been treated. Any of the methods of treatment provided herein may be used to treat an individual (e.g., human) who has not previously been treated. In some embodiments, the method is used as a first line therapy. In some embodiments, the method is used as a second line therapy.

In some embodiments, there is provided a method of inhibiting proliferation of cancer cells (e.g., tumor growth in CD19+ cancer) in an individual (e.g., a human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker. In some embodiments, there is provided a method of inhibiting proliferation of cancer cells (e.g., tumor growth in CD19+ cancer) in an individual (e.g., a human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VH of the anti-CD19 Fab. In some embodiments, there is provided a method of inhibiting proliferation of cancer cells (e.g., tumor growth in CD19+ cancer) in an individual (e.g., a human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VL of the anti-CD19 Fab. In some embodiments, there is provided a method of inhibiting proliferation of cancer cells (e.g., tumor growth in CD19+ cancer) in an individual (e.g., a human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-CD19 Fab and the first anti-CD3 binding domain (e.g., scFv) are connected directly or via an optional first linker, and the anti-CD19 Fab and the second anti-CD3 binding domain (e.g., scFv) are connected directly or via an optional second linker; wherein the first anti-CD3 binding domain (e.g., scFv) is connected to the N-terminus of the VH of the anti-CD19 Fab, and the second anti-CD3 binding domain (e.g., scFv) is connected to the N-terminus of the VL of the anti-CD19 Fab. In some embodiments, the cancer cell proliferation rate is reduced by at least about any of 10%, 20%, 30%, 40%, 50%, 60%, 70%, 80%, 90%, 95%, or more, in the present of the BSAP (or a pharmaceutical composition thereof). In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4 or 37, an HVR-L2 comprising the amino acid sequence of SEQ ID NO: 5 or 38, and an HVR-L3 comprising the amino acid sequence of SEQ ID NO: 6 or 39. In some embodiments, the VH of the anti-CD19 Fab comprises the amino acid sequence of SEQ ID NO: 7, and/or the VL of the anti-CD19 Fab comprises the amino acid sequence of SEQ ID NO: 8 or 40. In some embodiments, the anti-CD3 binding domain (e.g., scFv) specifically recognizes the N-terminus of CD3ε (e.g., huCD3ε or cynoCD3ε), such as an epitope within amino acid residues 1-27 of CD3ε. In some embodiments, the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain (e.g., scFv) comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the linker and/or the connecting peptide is selected from any of SEQ ID NOs: 21, 22, 33, and 53. In some embodiments, the CL and the CH1 of the anti-CD19 Fab are connected by a disulfide bond, such as about 1 to about 5 (e.g., about any of 1, 2, 3, 4, or 5) disulfide bonds, e.g., 2 disulfide bonds. In some embodiments, the BSAP comprises a first polypeptide and a second polypeptide, wherein the first polypeptide comprises an amino acid sequence at least about 95% (such as at least about any of 96%, 97%, 98%, or 99%) identical to the amino acid sequence of any of SEQ ID NOs: 23, 28, 35, 58, and 59, and the second polypeptide comprises an amino acid sequence at least about 95% (such as at least about any of 96%, 97%, 98%, or 99%) identical to the amino acid sequence of SEQ ID NO: 24 or 27. In some embodiments, the BSAP comprises a first polypeptide and a second polypeptide, wherein the first polypeptide comprises the amino acid sequence of SEQ ID NO: 23, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 35 or 59, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 27. In some embodiments, the BSAP (e.g., CD19×CD3 BSAP) or pharmaceutical composition thereof is administered intravenously. In some embodiments, the cancer is selected from the group consisting of ALL, CLL, MCL, or B cell lymphoma.

In some embodiments, there is provided a method of inhibiting tumor metastasis (e.g., metastasis to lymph nodes) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker. In some embodiments, there is provided a method of inhibiting tumor metastasis (e.g., metastasis to lymph nodes) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VH of the anti-CD19 Fab. In some embodiments, there is provided a method of inhibiting tumor metastasis (e.g., metastasis to lymph nodes) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VL of the anti-CD19 Fab. In some embodiments, there is provided a method of inhibiting tumor metastasis (e.g., metastasis to lymph nodes) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-CD19 Fab and the first anti-CD3 binding domain (e.g., scFv) are connected directly or via an optional first linker, and the anti-CD19 Fab and the second anti-CD3 binding domain (e.g., scFv) are connected directly or via an optional second linker; wherein the first anti-CD3 binding domain (e.g., scFv) is connected to the N-terminus of the VH of the anti-CD19 Fab, and the second anti-CD3 binding domain (e.g., scFv) is connected to the N-terminus of the VL of the anti-CD19 Fab. In some embodiments, tumor metastasis is inhibited by at least about 10% (such as at least about any of 20%, 30%, 40%, 60%, 70%, 80%, 90%, or 100%). In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4 or 37, an HVR-L2 comprising the amino acid sequence of SEQ ID NO: 5 or 38, and an HVR-L3 comprising the amino acid sequence of SEQ ID NO: 6 or 39. In some embodiments, the VH of the anti-CD19 Fab comprises the amino acid sequence of SEQ ID NO: 7, and/or the VL of the anti-CD19 Fab comprises the amino acid sequence of SEQ ID NO: 8 or 40. In some embodiments, the anti-CD3 binding domain (e.g., scFv) specifically recognizes the N-terminus of CD3ε (e.g., huCD3ε or cynoCD3ε), such as an epitope within amino acid residues 1-27 of CD3ε. In some embodiments, the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the linker and/or the connecting peptide is selected from any of SEQ ID NOs: 21, 22, 33, and 53. In some embodiments, the CL and the CH1 of the anti-CD19 Fab are connected by a disulfide bond, such as about 1 to about 5 (e.g., about any of 1, 2, 3, 4, or 5) disulfide bonds, e.g., 2 disulfide bonds. In some embodiments, the BSAP comprises a first polypeptide and a second polypeptide, wherein the first polypeptide comprises an amino acid sequence at least about 95% (such as at least about any of 96%, 97%, 98%, or 99%) identical to the amino acid sequence of any of SEQ ID NOs: 23, 28, 35, 58, and 59, and the second polypeptide comprises an amino acid sequence at least about 95% (such as at least about any of 96%, 97%, 98%, or 99%) identical to the amino acid sequence of SEQ ID NO: 24 or 27. In some embodiments, the BSAP comprises a first polypeptide and a second polypeptide, wherein the first polypeptide comprises the amino acid sequence of SEQ ID NO: 23, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 35 or 59, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 27. In some embodiments, the BSAP (e.g., CD19×CD3 BSAP) or pharmaceutical composition thereof is administered intravenously. In some embodiments, the cancer is selected from the group consisting of ALL, CLL, MCL, or B cell lymphoma.

In some embodiments, there is provided a method of reducing (such as eradicating) pre-existing tumor metastasis (such as metastasis to the lymph node) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker. In some embodiments, there is provided a method of reducing (such as eradicating) pre-existing tumor metastasis (such as metastasis to the lymph node) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VH of the anti-CD19 Fab. In some embodiments, there is provided a method of reducing (such as eradicating) pre-existing tumor metastasis (such as metastasis to the lymph node) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VL of the anti-CD19 Fab. In some embodiments, there is provided a method of reducing (such as eradicating) pre-existing tumor metastasis (such as metastasis to the lymph node) in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-CD19 Fab and the first anti-CD3 binding domain (e.g., scFv) are connected directly or via an optional first linker, and the anti-CD19 Fab and the second anti-CD3 binding domain (e.g., scFv) are connected directly or via an optional second linker; wherein the first anti-CD3 binding domain (e.g., scFv) is connected to the N-terminus of the VH of the anti-CD19 Fab, and the second anti-CD3 binding domain (e.g., scFv) is connected to the N-terminus of the VL of the anti-CD19 Fab. In some embodiments, metastasis is reduced by at least about 10% (such as at least about any of 20%, 30%, 40%, 60%, 70%, 80%, 90%, or 100%). In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4 or 37, an HVR-L2 comprising the amino acid sequence of SEQ ID NO: 5 or 38, and an HVR-L3 comprising the amino acid sequence of SEQ ID NO: 6 or 39. In some embodiments, the VH of the anti-CD19 Fab comprises the amino acid sequence of SEQ ID NO: 7, and/or the VL of the anti-CD19 Fab comprises the amino acid sequence of SEQ ID NO: 8 or 40. In some embodiments, the CL and the CH1 of the anti-CD19 Fab are connected by a disulfide bond, such as about 1 to about 5 (e.g., about any of 1, 2, 3, 4, or 5) disulfide bonds, e.g., 2 disulfide bonds. In some embodiments, the anti-CD3 binding domain (e.g., scFv) specifically recognizes the N-terminus of CD3ε (e.g., huCD3ε or cynoCD3ε), such as an epitope within amino acid residues 1-27 of CD3ε. In some embodiments, the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the linker and/or the connecting peptide is selected from any of SEQ ID NOs: 21, 22, 33, and 53. In some embodiments, the BSAP comprises a first polypeptide and a second polypeptide, wherein the first polypeptide comprises an amino acid sequence at least about 95% (such as at least about any of 96%, 97%, 98%, or 99%) identical to the amino acid sequence of any of SEQ ID NOs: 23, 28, 35, 58, and 59, and the second polypeptide comprises an amino acid sequence at least about 95% (such as at least about any of 96%, 97%, 98%, or 99%) identical to the amino acid sequence of SEQ ID NO: 24 or 27. In some embodiments, the BSAP comprises a first polypeptide and a second polypeptide, wherein the first polypeptide comprises the amino acid sequence of SEQ ID NO: 23, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 35 or 59, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 27. In some embodiments, the BSAP (e.g., CD19×CD3 BSAP) or pharmaceutical composition thereof is administered intravenously. In some embodiments, the cancer is selected from the group consisting of ALL, CLL, MCL, or B cell lymphoma.

In some embodiments, there is provided a method of reducing tumor size in an individual (e.g., a human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker. In some embodiments, there is provided a method of reducing tumor size in an individual (e.g., a human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VH of the anti-CD19 Fab. In some embodiments, there is provided a method of reducing tumor size in an individual (e.g., a human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VL of the anti-CD19 Fab. In some embodiments, there is provided a method of reducing tumor size in an individual (e.g., a human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-CD19 Fab and the first anti-CD3 binding domain (e.g., scFv) are connected directly or via an optional first linker, and the anti-CD19 Fab and the second anti-CD3 binding domain (e.g., scFv) are connected directly or via an optional second linker; wherein the first anti-CD3 binding domain (e.g., scFv) is connected to the N-terminus of the VH of the anti-CD19 Fab, and the second anti-CD3 binding domain (e.g., scFv) is connected to the N-terminus of the VL of the anti-CD19 Fab. In some embodiments, the tumor size is reduced by at least about 10% (such as at least about any of 20%, 30%, 40%, 60%, 70%, 80%, 90%, or 100%). In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4 or 37, an HVR-L2 comprising the amino acid sequence of SEQ ID NO: 5 or 38, and an HVR-L3 comprising the amino acid sequence of SEQ ID NO: 6 or 39. In some embodiments, the VH of the anti-CD19 Fab comprises the amino acid sequence of SEQ ID NO: 7, and/or the VL of the anti-CD19 Fab comprises the amino acid sequence of SEQ ID NO: 8 or 40. In some embodiments, the anti-CD3 binding domain (e.g., scFv) specifically recognizes the N-terminus of CD3ε (e.g., huCD3ε or cynoCD3ε), such as an epitope within amino acid residues 1-27 of CD3ε. In some embodiments, the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the linker and/or the connecting peptide is selected from any of SEQ ID NOs: 21, 22, 33, and 53. In some embodiments, the CL and the CH1 of the anti-CD19 Fab are connected by a disulfide bond, such as about 1 to about 5 (e.g., about any of 1, 2, 3, 4, or 5) disulfide bonds, e.g., 2 disulfide bonds. In some embodiments, the BSAP comprises a first polypeptide and a second polypeptide, wherein the first polypeptide comprises an amino acid sequence at least about 95% (such as at least about any of 96%, 97%, 98%, or 99%) identical to the amino acid sequence of any of SEQ ID NO: 23, 28, 35, 58, and 59, and the second polypeptide comprises an amino acid sequence at least about 95% (such as at least about any of 96%, 97%, 98%, or 99%) identical to the amino acid sequence of SEQ ID NO: 24 or 27. In some embodiments, the BSAP comprises a first polypeptide and a second polypeptide, wherein the first polypeptide comprises the amino acid sequence of SEQ ID NO: 23, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 35 or 59, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 27. In some embodiments, the BSAP (e.g., CD19×CD3 BSAP) or pharmaceutical composition thereof is administered intravenously. In some embodiments, the cancer is selected from the group consisting of ALL, CLL, MCL, or B cell lymphoma.

In some embodiments, there is provided a method of prolonging the time to disease progression in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker. In some embodiments, there is provided a method of prolonging the time to disease progression in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VH of the anti-CD19 Fab. In some embodiments, there is provided a method of prolonging the time to disease progression in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; wherein the anti-CD3 binding domain (e.g., scFv) is connected to the N-terminus of the VL of the anti-CD19 Fab. In some embodiments, there is provided a method of prolonging the time to disease progression in an individual (e.g., human), comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-CD19 Fab and the first anti-CD3 binding domain (e.g., scFv) are connected directly or via an optional first linker, and the anti-CD19 Fab and the second anti-CD3 binding domain (e.g., scFv) are connected directly or via an optional second linker; wherein the first anti-CD3 binding domain (e.g., scFv) is connected to the N-terminus of the VH of the anti-CD19 Fab, and the second anti-CD3 binding domain (e.g., scFv) is connected to the N-terminus of the VL of the anti-CD19 Fab. In some embodiments, the method prolongs the time to disease progression by at least about any of 1, 2, 3, 4, 5, 6, 7, 8, 9, 10, 11, or 12 weeks, or more. In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4 or 37, an HVR-L2 comprising the amino acid sequence of SEQ ID NO: 5 or 38, and an HVR-L3 comprising the amino acid sequence of SEQ ID NO: 6 or 39. In some embodiments, the VH of the anti-CD19 Fab comprises the amino acid sequence of SEQ ID NO: 7, and/or the VL of the anti-CD19 Fab comprises the amino acid sequence of SEQ ID NO: 8 or 40. In some embodiments, the anti-CD3 binding domain (e.g., scFv) specifically recognizes the N-terminus of CD3ε (e.g., huCD3ε or cynoCD3ε), such as an epitope within amino acid residues 1-27 of CD3ε. In some embodiments, the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the linker and/or the connecting peptide is selected from any of SEQ ID NOs: 21, 22, 33, and 53. In some embodiments, the CL and the CH1 of the anti-CD19 Fab are connected by a disulfide bond, such as about 1 to about 5 (e.g., about any of 1, 2, 3, 4, or 5) disulfide bonds, e.g., 2 disulfide bonds. In some embodiments, the BSAP comprises a first polypeptide and a second polypeptide, wherein the first polypeptide comprises an amino acid sequence at least about 95% (such as at least about any of 96%, 97%, 98%, or 99%) identical to the amino acid sequence of any of SEQ ID NOs: 23, 28, 35, 58, and 59, and the second polypeptide comprises an amino acid sequence at least about 95% (such as at least about any of 96%, 97%, 98%, or 99%) identical to the amino acid sequence of SEQ ID NO: 24 or 27. In some embodiments, the BSAP comprises a first polypeptide and a second polypeptide, wherein the first polypeptide comprises the amino acid sequence of SEQ ID NO: 23, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 35 or 59, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 27. In some embodiments, the BSAP (e.g., CD19×CD3 BSAP) or pharmaceutical composition thereof is administered intravenously. In some embodiments, the cancer is selected from the group consisting of ALL, CLL, MCL, or B cell lymphoma.

In some embodiments, there is provided a method of prolonging survival of an individual (e.g., human) having cancer, comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker. In some embodiments, there is provided a method of prolonging survival of an individual (e.g., human) having cancer, comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VH of the anti-CD19 Fab. In some embodiments, there is provided a method of prolonging survival of an individual (e.g., human) having cancer, comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VL of the anti-CD19 Fab. In some embodiments, there is provided a method of prolonging survival of an individual (e.g., human) having cancer, comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-CD19 Fab and the first anti-CD3 binding domain (e.g., scFv) are connected directly or via an optional first linker, and the anti-CD19 Fab and the second anti-CD3 binding domain (e.g., scFv) are connected directly or via an optional second linker; wherein the first anti-CD3 binding domain (e.g., scFv) is connected to the N-terminus of the VH of the anti-CD19 Fab, and the second anti-CD3 binding domain (e.g., scFv) is connected to the N-terminus of the VL of the anti-CD19 Fab. In some embodiments, the method prolongs the survival of the individual (e.g., human) by at least about any of 1, 2, 3, 4, 5, 6, 7, 8, 9, 10, 11, 12, 18, or 24 month, or more. In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4 or 37, an HVR-L2 comprising the amino acid sequence of SEQ ID NO: 5 or 38, and an HVR-L3 comprising the amino acid sequence of SEQ ID NO: 6 or 39. In some embodiments, the VH of the anti-CD19 Fab comprises the amino acid sequence of SEQ ID NO: 7, and/or the VL of the anti-CD19 Fab comprises the amino acid sequence of SEQ ID NO: 8 or 40. In some embodiments, the anti-CD3 binding domain (e.g., scFv) specifically recognizes the N-terminus of CD3ε (e.g., huCD3ε or cynoCD3ε), such as an epitope within amino acid residues 1-27 of CD3ε. In some embodiments, the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the linker and/or the connecting peptide is selected from any of SEQ ID NOs: 21, 22, 33, and 53. In some embodiments, the CL and the CH1 of the anti-CD19 Fab are connected by a disulfide bond, such as about 1 to about 5 (e.g., about any of 1, 2, 3, 4, or 5) disulfide bonds, e.g., 2 disulfide bonds. In some embodiments, the BSAP comprises a first polypeptide and a second polypeptide, wherein the first polypeptide comprises an amino acid sequence at least about 95% (such as at least about any of 96%, 97%, 98%, or 99%) identical to the amino acid sequence of any of SEQ ID NOs: 23, 28, 35, 58, and 59, and the second polypeptide comprises an amino acid sequence at least about 95% (such as at least about any of 96%, 97%, 98%, or 99%) identical to the amino acid sequence of SEQ ID NO: 24 or 27. In some embodiments, the BSAP comprises a first polypeptide and a second polypeptide, wherein the first polypeptide comprises the amino acid sequence of SEQ ID NO: 23, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 35 or 59, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 27. In some embodiments, the BSAP (e.g., CD19×CD3 BSAP) or pharmaceutical composition thereof is administered intravenously. In some embodiments, the cancer is selected from the group consisting of ALL, CLL, MCL, or B cell lymphoma.

In some embodiments, there is provided a method of alleviating one or more symptoms in an individual (e.g., human) having cancer, comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker. In some embodiments, there is provided a method of alleviating one or more symptoms in an individual (e.g., human) having cancer, comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VH of the anti-CD19 Fab. In some embodiments, there is provided a method of alleviating one or more symptoms in an individual (e.g., human) having cancer, comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VL of the anti-CD19 Fab. In some embodiments, there is provided a method of alleviating one or more symptoms in an individual (e.g., human) having cancer, comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-CD19 Fab and the first anti-CD3 binding domain (e.g., scFv) are connected directly or via an optional first linker, and the anti-CD19 Fab and the second anti-CD3 binding domain (e.g., scFv) are connected directly or via an optional second linker; wherein the first anti-CD3 binding domain (e.g., scFv) is connected to the N-terminus of the VH of the anti-CD19 Fab, and the second anti-CD3 binding domain (e.g., scFv) is connected to the N-terminus of the VL of the anti-CD19 Fab. In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4 or 37, an HVR-L2 comprising the amino acid sequence of SEQ ID NO: 5 or 38, and an HVR-L3 comprising the amino acid sequence of SEQ ID NO: 6 or 39. In some embodiments, the VH of the anti-CD19 Fab comprises the amino acid sequence of SEQ ID NO: 7, and/or the VL of the anti-CD19 Fab comprises the amino acid sequence of SEQ ID NO: 8 or 40. In some embodiments, the anti-CD3 binding domain (e.g., scFv) specifically recognizes the N-terminus of CD3ε (e.g., huCD3ε or cynoCD3ε), such as an epitope within amino acid residues 1-27 of CD3ε. In some embodiments, the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the linker and/or the connecting peptide is selected from any of SEQ ID NOs: 21, 22, 33, and 53. In some embodiments, the CL and the CH1 of the anti-CD19 Fab are connected by a disulfide bond, such as about 1 to about 5 (e.g., about any of 1, 2, 3, 4, or 5) disulfide bonds, e.g., 2 disulfide bonds. In some embodiments, the BSAP comprises a first polypeptide and a second polypeptide, wherein the first polypeptide comprises an amino acid sequence at least about 95% (such as at least about any of 96%, 97%, 98%, or 99%) identical to the amino acid sequence of any of SEQ ID NOs: 23, 28, 35, 58, and 59, and the second polypeptide comprises an amino acid sequence at least about 95% (such as at least about any of 96%, 97%, 98%, or 99%) identical to the amino acid sequence of SEQ ID NO: 24 or 27. In some embodiments, the BSAP comprises a first polypeptide and a second polypeptide, wherein the first polypeptide comprises the amino acid sequence of SEQ ID NO: 23, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 35 or 59, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 27. In some embodiments, the BSAP (e.g., CD19×CD3 BSAP) or pharmaceutical composition thereof is administered intravenously. In some embodiments, the cancer is selected from the group consisting of ALL, CLL, MCL, or B cell lymphoma.

In some embodiments, there is provided a method of inducing redistribution of peripheral T cells (e.g., recruiting T cells to tissues or tumors that express tumor antigens such as CD19) in an individual (e.g., human) having cancer, comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker. In some embodiments, there is provided a method of inducing redistribution of peripheral T cells (e.g., recruiting T cells to tissues or tumors that express tumor antigens such as CD19) in an individual (e.g., human) having cancer, comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VH of the anti-CD19 Fab. In some embodiments, there is provided a method of inducing redistribution of peripheral T cells (e.g., recruiting T cells to tissues or tumors that express tumor antigens such as CD19) in an individual (e.g., human) having cancer, comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) an anti-CD3 binding domain (e.g., scFv) specifically recognizing CD3 (e.g., huCD3 or cynoCD3); wherein the anti-CD19 Fab and the anti-CD3 binding domain (e.g., scFv) are connected directly or via an optional linker; and wherein the anti-CD3 binding domain (e.g., scFv) is connected to the N-terminus of the VL of the anti-CD19 Fab. In some embodiments, there is provided a method of inducing redistribution of peripheral T cells (e.g., recruiting T cells to tissues or tumors that express tumor antigens such as CD19) in an individual (e.g., human) having cancer, comprising administering to the individual an effective amount of a BSAP (or pharmaceutical composition thereof) comprising: i) an anti-CD19 Fab specifically recognizing CD19 (e.g., huCD19 or cynoCD19), comprising: (a) a VH and a CH1; and (b) a VL and a CL; and ii) two anti-CD3 binding domains (e.g., scFvs) specifically recognizing CD3 (e.g., huCD3 or cynoCD3); wherein the anti-CD19 Fab and the first anti-CD3 binding domain (e.g., scFv) are connected directly or via an optional first linker, and the anti-CD19 Fab and the second anti-CD3 binding domain (e.g., scFv) are connected directly or via an optional second linker; and wherein the first anti-CD3 binding domain (e.g., scFv) is connected to the N-terminus of the VH of the anti-CD19 Fab, and the second anti-CD3 binding domain (e.g., scFv) is connected to the N-terminus of the VL of the anti-CD19 Fab. In some embodiments, the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and/or the VL of the anti-CD19 Fab comprises: an HVR-L1 comprising the amino acid sequence of SEQ ID NO: 4 or 37, an HVR-L2 comprising the amino acid sequence of SEQ ID NO: 5 or 38, and an HVR-L3 comprising the amino acid sequence of SEQ ID NO: 6 or 39. In some embodiments, the VH of the anti-CD19 Fab comprises the amino acid sequence of SEQ ID NO: 7, and/or the VL of the anti-CD19 Fab comprises the amino acid sequence of SEQ ID NO: 8 or 40. In some embodiments, the anti-CD3 binding domain (e.g., scFv) specifically recognizes the N-terminus of CD3ε (e.g., huCD3ε or cynoCD3ε), such as an epitope within amino acid residues 1-27 of CD3ε. In some embodiments, the anti-CD3 binding domain (e.g., scFv) comprises a VH, wherein the VH of the anti-CD3 binding domain comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and/or the anti-CD3 binding domain (e.g., scFv) comprises a VL, wherein the VL of the anti-CD3 binding domain comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14. In some embodiments, the VH of the anti-CD3 binding domain (e.g., scFv) comprises the amino acid sequence of SEQ ID NO: 15, and/or the VL of the anti-CD3 binding domain (e.g., scFv) comprises the amino acid sequence of SEQ ID NO: 16. In some embodiments, the anti-CD3 binding domain is an scFv. In some embodiments, the VH and the VL of the anti-CD3 scFv are connected by a connecting peptide. In some embodiments, the anti-CD3 scFv comprises the amino acid sequence of SEQ ID NO: 17. In some embodiments, the linker and/or the connecting peptide is selected from any of SEQ ID NOs: 21, 22, 33, and 53. In some embodiments, the CL and the CH1 of the anti-CD19 Fab are connected by a disulfide bond, such as about 1 to about 5 (e.g., about any of 1, 2, 3, 4, or 5) disulfide bonds, e.g., 2 disulfide bonds. In some embodiments, the BSAP comprises a first polypeptide and a second polypeptide, wherein the first polypeptide comprises an amino acid sequence at least about 95% (such as at least about any of 96%, 97%, 98%, or 99%) identical to the amino acid sequence of any of SEQ ID NOs: 23, 28, 35, 58, and 59, and the second polypeptide comprises an amino acid sequence at least about 95% (such as at least about any of 96%, 97%, 98%, or 99%) identical to the amino acid sequence of SEQ ID NO: 24 or 27. In some embodiments, the BSAP comprises a first polypeptide and a second polypeptide, wherein the first polypeptide comprises the amino acid sequence of SEQ ID NO: 23, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 35 or 59, and the second polypeptide comprises the amino acid sequence of SEQ ID NO: 24. In some embodiments, the BSAP comprises a first polypeptide and a second polypeptide, wherein the first polypeptide comprises the amino acid sequence of SEQ ID NO: 28 or 58, and the second polypeptide comprises the amino acid sequence of SEQ ID NO: 27. In some embodiments, the BSAP (e.g., CD19×CD3 BSAP) or pharmaceutical composition thereof is administered intravenously. In some embodiments, the cancer is selected from the group consisting of ALL, CLL, MCL, or B cell lymphoma.

The methods described herein are suitable for treating a variety of cancers, including both solid cancer and liquid cancer. The methods are applicable to cancers of all stages, including early stage cancer, non-metastatic cancer, primary cancer, advanced cancer, locally advanced cancer, metastatic cancer, or cancer in remission. The methods described herein may be used as a first therapy, second therapy, third therapy, or combination therapy with other types of cancer therapies known in the art, such as chemotherapy, surgery, radiation, gene therapy, immunotherapy, bone marrow transplantation, stem cell transplantation, targeted therapy, cryotherapy, ultrasound therapy, photodynamic therapy, radiofrequency ablation or the like, in an adjuvant setting or a neoadjuvant setting. In some embodiments, the cancer has been refractory to prior therapy.

Examples of solid cancers that may be treated by the methods of the invention include, but are not limited to, glioblastoma, non-small cell lung cancer, lung cancer other than non-small cell lung cancer, breast cancer, prostate cancer, pancreatic cancer, liver cancer, colon cancer, epithelial cancer, gastric cancer, spleen cancer, skin cancer, brain cancer other than glioblastoma, renal cancer, thyroid cancer, and the like. In some embodiments, the individual has a lymphoma, such as Hodgkin's disease or non-Hodgkin's lymphoma (T or B cell type).

In some embodiments, the cancer is a liquid tumor, including cancer affecting blood and/or bone marrow. In some embodiments, the individual has a hematologic disorder (or cancer), such as leukemia, e.g., acute myeloid leukemia (AML), acute lymphoblastic leukemia (ALL), chronic lymphocytic leukemia (CLL), chronic myeloid leukemia (CML), or hairy cell leukemia (HCL). In some embodiments, the individual has myelodysplastic syndrome (MDS). In some embodiments, the individual has a myeloproliferative disorder, such as polycythemia vera (also known as PV, PCV, or polycythemia rubra vera (PRV)), essential thrombocytosis (ET), or bone marrow Fibrosis. In some embodiments, the individual has amyloidosis caused by a light chain disease, Waldenstrom macroglobulinemia (WM), monoclonal grammopathy of undetermined significance (MGUS), or plasma cell leukemia (PCL).

In particular, in some embodiments, the cancer is associated with or characterized by expression of CD19, such as a cancer expressing CD19, such as acute lymphoblastic leukemia (ALL), chronic Lymphocytic leukemia (CLL), non-Hodgkin's lymphoma (NHL), mantle cell lymphoma (MCL), or B-cell lymphoma.

Exemplary routes of administration of the BSAP (e.g., CD19×CD3 BSAP) or pharmaceutical composition thereof include, but are not limited to, intravenous, intracavitary, intratumoral, intraarterial, intramuscular, subcutaneous, parenteral, transmucosal, transdermal, ocular, topical, intraperitoneal, intracranial, intrapleural and epidermal routes, or be delivered into lymph glands, body spaces, organs or tissues known to contain cancer cells. In some embodiments, the BSAP (e.g., CD19×CD3 BSAP) or pharmaceutical composition thereof is administered intravenously. In some embodiments, the BSAP (e.g., CD19×CD3 BSAP) or pharmaceutical composition thereof is administered by infusion. In some embodiments, the BSAP (e.g., CD19×CD3 BSAP) or pharmaceutical composition thereof is administered subcutaneously. In some embodiments, the BSAP (e.g., CD19×CD3 BSAP) or pharmaceutical composition thereof is administered by injection.

In some embodiments, BSAP described herein (e.g., CD19×CD3 BSAP) or pharmaceutical composition thereof is administered by intravenous infusion. In some embodiments, the BSAP (e.g., CD19×CD3 BSAP) or pharmaceutical composition thereof is infused to the individual (e.g., human) over a period of time no more than about any of 24 hours, 20 hours, 15 hours, 10 hours, 8 hours, 6 hours, 3 hours, 2 hours, 1 hours, 30 minutes, or less. In some embodiments, the BSAP (e.g., CD19×CD3 BSAP) or pharmaceutical composition thereof is infused to the individual over a period of time of any one of about 30 minutes to about 1 hour, about 1 hour to about 2 hours, about 2 hours to about 4 hours, about 4 hours to about 6 hours, about 6 hours to about 8 hours, about 8 hours to about 10 hours, about 10 hours to about 12 hours, about 12 hours to about 18 hours, about 18 hours to about 24 hours, about 30 minutes to about 2 hours, about 2 hours to about 5 hours, about 5 hours to about 10 hours, about 10 hours to about 20 hours, about 30 minutes to about 10 hours, or about 30 minutes to about 20 hours. BSAP described herein (e.g., CD19×CD3 BSAP) or pharmaceutical composition thereof may be infused to the individual at any suitable rate. In some embodiments, the BSAP (e.g., CD19×CD3 BSAP) or pharmaceutical composition thereof may be infused at a rate more than about any of 0.01 µg/kg/hr, 0.02 µg/kg/hr, 0.05 µg/kg/hr, 0.1 µg/kg/hr, 0.2 µg/kg/hr, 0.5 µg/kg/hr, 0.6 µg/kg/hr, 0.7 µg/kg/hr, 0.8 µg/kg/hr, 0.9 µg/kg/hr, 1 µg/kg/hr, 1.5 µg/kg/hr, 2 µg/kg/hr, 3 µg/kg/hr, 4 µg/kg/hr, 5 µg/kg/hr, 10 µg/kg/hr, 15 µg/kg/hr, 20 µg/kg/hr, 25 µg/kg/hr, 50 µg/kg/hr, 75 µg/kg/hr, 100 µg/kg/hr, or more.

The dosing regimen of BSAP (e.g., CD19×CD3 BSAP) or pharmaceutical composition thereof administered to the individual (e.g., human) may vary with the particular BSAP (e.g., CD19×CD3 BSAP) composition (such as pharmaceutical composition), the method of administration, and the particular type and stage of cancer being treated. In some embodiments, that effective amount of the BSAP (e.g., CD19×CD3 BSAP) or pharmaceutical composition thereof is below the level that induces a toxicological effect (i.e., an effect above a clinically acceptable level of toxicity) or is at a level where a potential side effect can be controlled or tolerated when the composition is administered to the individual.

In some embodiments, the effective amount of the BSAP (e.g., CD19×CD3 BSAP) or pharmaceutical composition thereof is below the level that induces an adverse effect in the central nervous system. For example, an adverse effect observed in antibody therapy is the occurrence of infusion-related side effects, such as the cytokine release syndrome ("CRS"), the severe cases of which are known as "cytokine storms." When a "cytokine storm" is induced, the healthy individual's immune system is activated and releases large amounts of the pro-inflammatory cytokines, such as INF-7, CCL2, IIL-10, IL-6, etc. It is a potentially fatal immune reaction typically consisting of a positive feedback loop between cytokines and immune cells, with highly elevated levels of various cytokines. Other adverse side effects described to be associated with CRS are fatigue, vomiting, tachycardia, hypertension, back pain, but also central nervous system reactions (CNS reactions), such as seizures, encephalopathy, cerebral edema, aseptic meningitis, and headache. In some embodiments, the BSAP (e.g., CD19×CD3 BSAP) or pharmaceutical composition thereof is administered at a dose that does not induce cytokine release syndrome, such as cytokine storm. In some embodiments, the BSAP (e.g., CD19×CD3 BSAP) or pharmaceutical composition thereof is administered at a dose that does not induce significant release of one or more cytokines selected from the group consisting of IL-2, IL-4, IL-5, IL-6, TNF, and INF-7. In some embodiments, a significant release of a cytokine is sustained release of a cytokine over the course of at least about any of 1 hour, 2 hours, 4 hours, 6 hours, 8 hours, 10 hours, 12 hours, 18 hours, 24 hours, or more. In some embodiments, a significant release of a cytokine is a serum or blood level of a cytokine at a concentration of at least about any of 1, 5, 10, 20, 50, 100, 200, 500, 1000 or more pg/mL. Without being bound by any theory, the BSAPs described herein (e.g., CD19×CD3 BSAP) or pharmaceutical composition thereof require binding to the tumor antigen (e.g., CD19) on the target tumor cell in order to recruit and activate T cells. Such requirement can greatly reduce unwanted cytokine storms, and unwanted activation of T cells in the absence of the desired target tumor cell.

In some embodiments, the BSAP (e.g., CD19×CD3 BSAP) or pharmaceutical composition thereof is administered at a dose of no more than about any one of 0.01 µg/kg, 0.05 µg/kg, 0.1 µg/kg, 0.5 µg/kg, 1 µg/kg, 2 µg/kg, 5 µg/kg, 10 µg/kg, 15 µg/kg, 20 µg/kg, 25 µg/kg, 30 µg/kg, 50 µg/kg, 100 µg/kg, 150 µg/kg, 200 µg/kg, 250 µg/kg, 300 µg/kg, 400 µg/kg, 500 µg/kg, 600 µg/kg, 700 µg/kg, 800 µg/kg, 900 µg/kg, or 1 mg/kg.

The effective amount of the BSAP (e.g., CD19×CD3 BSAP) or pharmaceutical composition thereof may be administered in a single dose or in multiple doses. For methods that comprises administration of the BSAP (e.g., CD19×CD3 BSAP) or pharmaceutical composition thereof in multiple doses, exemplary dosing frequencies include, but are not limited to, daily, daily without break, weekly, weekly without break, two out of three weeks, three out of four weeks, once every three weeks, once every two weeks, monthly, every six months, yearly, etc. In some embodiments, the BSAP (e.g., CD19×CD3 BSAP) or pharmaceutical composition thereof is administered about once every 2 weeks, once every 3 weeks, once every 4 weeks, once every 6 weeks, or once every 8 weeks. In some embodiments, the BSAP (e.g., CD19×CD3 BSAP) or pharmaceutical composition thereof is administered at least about any of 1×, 2×, 3×, 4×, 5×, 6×, or 7× (i.e., daily) a week. In some embodiments, the intervals between each administration are less than about any of 3 years, 2 years, 12 months, 11 months, 10 months, 9 months, 8 months, 7 months, 6 months, 5 months, 4 months, 3 months, 2 months, 1 month, 4 weeks, 3 weeks, 2 weeks, 1 week, 6 days, 5 days, 4 days, 3 days, 2 days, or 1 day. In some embodiments, the intervals between each administration are more than about any of 1 day, 2 days, 3 days, 4 days, 5 days, 6 days, 1 week, 2 weeks, 3 weeks, 4 weeks, 1 month, 2 months, 3 months, 4 months, 5 months, 6 months, 7 months, 8 months, 9 months, 10 months, 11 months, 12 months, 2 years, or 3 years. In some embodiments, there is no break in the dosing schedule.

The administration of the BSAP (e.g., CD19×CD3 BSAP) or pharmaceutical composition thereof can be extended over an extended period of time, such as from about 1 day to about a week, from about a week to about a month, from about a month to about a year, from about a year to about several years. In some embodiments, the BSAP (e.g., CD19×CD3 BSAP) or pharmaceutical composition thereof is administered over a period of at least about any of 1 day, 2 days, 3 days, 4 days, 5 days, 6 days, 1 week, 2 weeks, 3 weeks, 4 weeks, 5 weeks, 1 month, 2 months, 3 months, 4 months, 5 months, 6 months, 7 months, 8 months, 9 months, 10 months, 11 months, 12 months, 1 year, 2 years, 3 years, 4 years, or more.

EXAMPLES

The examples below and exemplary embodiments above are intended to be purely exemplary of the invention and should therefore not be considered to limit the invention in any way. The following examples and detailed description are offered by way of illustration and not by way of limitation. For the embodiments in which details of the experimental methods are not described, such methods are carried out according to conventional conditions such as those described in Sambrook et al. Molecular Cloning: A Laboratory Manual (New York: Cold Spring Harbor Laboratory Press, 1989), or as suggested by the manufacturers.

All references mentioned in the present invention are incorporated herein by reference as if each of those references has been incorporated by reference individually. Although the description referred to particular embodiments, it will be clear to a person skilled in the art that the present invention may be practiced with variation of these specific details. Hence this invention should not be construed as limited to the embodiments set forth herein.

Example 1. Expression and Purification of an Exemplary Bispecific Antigen Binding Protein Bispecific antigen binding proteins (BSAPs) were expressed using standard protocols. DNA fragments encoding the first polypeptide and the second polypeptide of the BSAP were cloned into pBOS based vector to generate constructs expressing the first polypeptide and the second polypeptide. The constructs also contained sequences encoding signal peptides in order to facilitate secretion of the first polypeptide and the second polypeptide proteins.

Amino acid sequences of exemplary CD19×CD3 BSAPs and nucleic acid sequences encoding thereof are shown in Table 1. FIG. 1A depicts the structure of these exemplary CD19×CD3 BSAPs. The exemplary CD19×CD3 BSAPs demonstrated herein comprise an anti-CD3 scFv connected to the N-terminus of the VH of the anti-CD19 Fab via a linker.

TABLE 1

Exemplary CD19 × CD3 bispecific antigen binding proteins

| Protein code | Amino acid sequence of the first polypeptide | Amino acid sequence of the second polypeptide | Nucleic acid sequence encoding the first polypeptide | Nucleic acid sequence encoding the second polypeptide | Linker |
|---|---|---|---|---|---|
| ITAB2003 | SEQ ID NO: 28 | SEQ ID NO: 27 | SEQ ID NO: 32 | SEQ ID NO: 31 | SEQ ID NO: 33 (GRAGGG) |
| ITAB2005 | SEQ ID NO: 28 | SEQ ID NO: 24 | SEQ ID NO: 32 | SEQ ID NO: 29 | SEQ ID NO: 33 (GRAGGG) |
| ITAB2006 | SEQ ID NO: 35 | SEQ ID NO: 24 | SEQ ID NO: 36 | SEQ ID NO: 29 | SEQ ID NO: 22 (GRAGGGGAGGGG) |
| ITAB2009 | SEQ ID NO: 23 | SEQ ID NO: 24 | SEQ ID NO: 30 | SEQ ID NO: 29 | SEQ ID NO: 21 (SGGGGS) |

Taking the CD19×CD3 BSAP ITAB2003 as an example, the DNA fragment encoding the first polypeptide of ITAB2003 (nucleic acid sequence SEQ ID NO: 32) and the DNA fragment encoding the second polypeptide of ITAB2003 (nucleic acid sequence SEQ ID NO: 31) were cloned into the vector pcDNA and then subcloned into pBOS based vector, respectively, and the DNA fragments encoding the first polypeptide and the second polypeptide of ITAB2003 also each comprised a Kozak sequence and a signal peptide sequence (amino acid sequence SEQ ID NO: 25, nucleic acid sequence SEQ ID NO:26), thereby producing the constructs expressing the first polypeptide and the second polypeptide of the CD19×CD3 BSAP ITAB2003. Other exemplary CD19×CD3 BSAPs were constructed similarly. Sequencing results indicated correct gene insertion. The constructs were transformed into E. coli to obtain transfection-grade plasmid DNA. HEK293 cells were grown in EXPI293™ expression medium (Invitrogen). For transfection, 10 mL of medium containing plasmid DNA (DNA constructs encoding the first polypeptide and the second polypeptide of BSAP) and 25 kD Polyethylenimine (PEI; DNA/linear 25 kD PEI weight ratio of 1:3) was added to 90 mL of cell culture. Alternatively, about 30 µg DNA mixture (DNA constructs encoding the first polypeptide and the second polypeptide of BSAP) was transfected into HEK293 cells using ExpiFectamine 293 transfection kit (Invitrogen) according to the manufaturer's instruction. Transfected cells were cultured in a $CO_2$ incubator (37° C., 5% $CO_2$, 125 rpm) for about 6 days, then the supernatant was collected.

The cell culture supernatant was purified with IgG-CH1 affinity chromatography (Thermo Fisher Scientific) to obtain target protein. The cell culture supernatant was filtered through a 0.22 µm sterile membrane, loaded onto the IgG-CH1 affinity matrix balanced with 150 mM NaCl and 10 mM phosphate buffered saline (PBS, pH 7.5), and eluted with 150 mM NaCl and 50 mM NaAc Buffer (pH 3.5). The eluate was adjusted with 2M Tris elution to a pH of 7.2, and concentrated with Vivaspin centrifugal concentrators having a 10 kD molecular weight cutoff (Sartorius). Purified protein was stored at 4° C.

Example 2. Determination of Binding Affinities of an CD19×CD3 BSAP

Antigen Binding Affinity

The binding affinity of the anti-CD19 Fab and the anti-CD3 scFv within an exemplary CD19×CD3 BSAP ITAB2009 with the corresponding human ("hu") and cynomolgus monkey ("cyno") antigens were measured using Octet QK$^e$ with an anti-human IgG Fc Capture (AHC) biosensor. The human CD3 antigen construct (CD3εAA 1-27.Fc) and the cynomolgus monkey CD3 antigen construct (cynoCD3εAA 1-27.Fc) each consists of a peptide of amino acid residues 1-27 of CD3 connected to a human IgG Fc. The expression of the antigen constructs is described in U.S. Pat. No. 8,846,042. The CD3 or CD19 antigen constructs (Cynomolgus/Rhesus CD19 Protein (Fc Tag), Sino Biological. Inc.; Recombinant Human CD19 Fc Chimera, R&D Systems. Inc.) were diluted to 0.02 mg/mL with dilution buffer (PBS), and then immobilized on an anti-Human Fc capture (AHC) biosensor. CD19×CD3 BSAP ITAB2009 was diluted to various concentrations in a black microplate, then reacted with the immobilized corresponding antigen constructs. The control wells containing only PBS were also set up. The detection results were analyzed using ForteBio Data Analysis software.

As shown in Table 2, the CD19×CD3 BSAP ITAB2009 exhibited good in vitro binding affinities to both human and cynomolgus monkey CD19 and CD3 antigen constructs, demonstrating cross-reactivity of CD19×CD3 BSAP in human and cynomolgus monkeys.

TABLE 2

In vitro binding affinities of CD19 × CD3 BSAP ITAB2009 to CD19 and CD3 antigens

| Binding domain | Antigen construct | Kd (M) |
|---|---|---|
| Anti-CD19 Fab | huCD19.Fc | $1.82 \times 10^{-8}$ |
|  | cynoCD19.Fc | $2.96 \times 10^{-8}$ |
| Anti-CD3 binding domain (scFv) | CD3εAA 1-27.Fc | $2.35 \times 10^{-8}$ |
|  | cyno CD3εAA 1-27.Fc | $1.29 \times 10^{-8}$ |

Cell Binding Affinity

The following binding assays were carried out to determine the binding affinities of an exemplary CD19×CD3 BSAP to T cells and B cells in human peripheral blood mononuclear cells (huPBMC) and cynomolgus monkey cynoPBMC, respectively.

Human PBMC Preparation: White blood cell concentrate samples from healthy human adults were diluted with PBS buffer (Gibco), centrifuged by density gradient centrifugation (Ficoll-Paque, GE Healthcare) to obtain PBMCs. Cells were collected and resuspended in RPMI 1640 Medium (Gibco) containing 10% FBS.

CynoPBMC Preparation: Whole blood samples from cynomolgus monkeys were diluted with PBS buffer (Gibco), centrifuged by density gradient centrifugation using 90% Ficoll-Paque isolation buffer (obtained by diluting Ficoll-Paque with PBS, Ficoll-Paque, GE Healthcare) to obtain PBMC, washed twice with PBS, then centrifuged at room temperature, 1000 g for 10 min. Cells were collected, and resuspended in RPMI 1640 Medium (Gibco) containing 10% FBS.

About $3.6 \times 10^5$ PBMCs (huPBMC or cynoPBMC) per well were added to a 96-well plate. CD19×CD3 BSAP ITAB2009 was diluted to various concentrations using FACS buffer (PBS with 1% FBS), then added to the 96-well plate according to experimental design, and incubated at room temperature for 45 min. A control group with no ITAB2009 (1% FBS/PBS+ PBMC) was also set up. Cells were washed with FACS buffer once, resuspended in 50 μL FACS buffer, supplemented with Antibody PE Mouse Anti-Human CD20 (BD Pharmingen™), FITC Mouse Anti-Human CD4 (BD Pharmingen™), and APC Mouse anti-Human Ig, κ Light Chain (BD Pharmingen™), and incubated at room temperature for 45 min. 200 μL FACS buffer was finally added, and the samples were analyzed using ACCURI® C6 Cytometer (BD Biosciences).

Figure 2A:
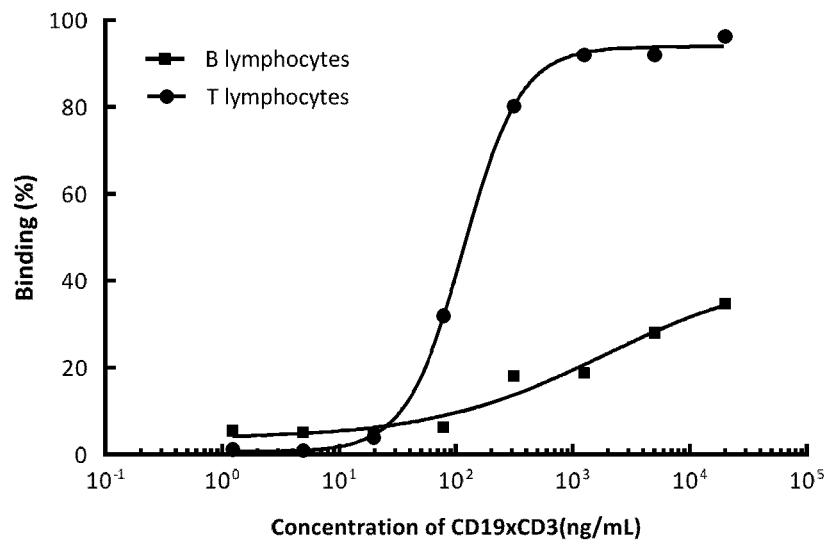
FIG. 2A depicts the binding affinity of an exemplary CD19×CD3 BSAP ("ITAB2009") to cynomolgus monkey T lymphocytes expressing cell surface antigen CD3 and cynomolgus monkey B lymphocytes expressing cell surface antigen CD19. The curve labeled by ■ shows that as the concentration increases, the binding rate of ITAB2009 to cynomolgus monkey B lymphocytes increases. The curve labeled by ● shows that as the concentration increases, the binding rate of ITAB2009 to cynomolgus monkey T lymphocytes increases.
Figure 2B:
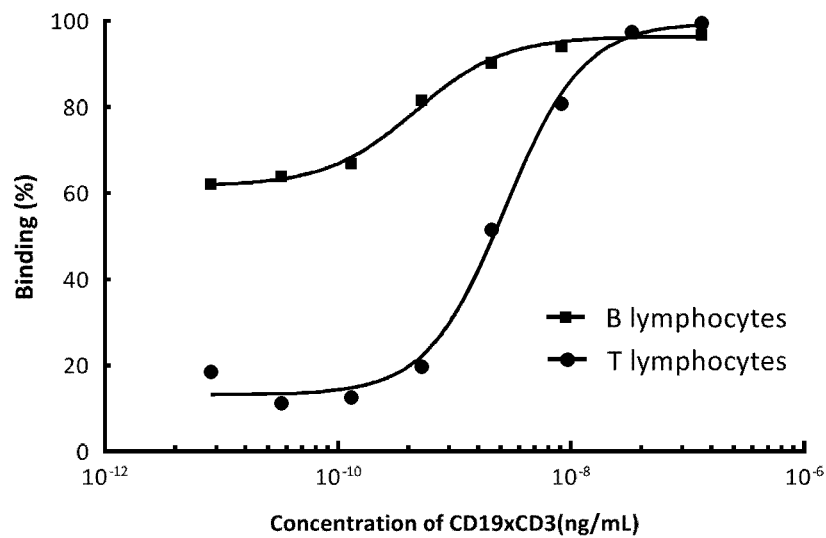
FIG. 2B depicts the binding affinity of an exemplary CD19×CD3 BSAP ITAB2009 to human T lymphocytes expressing cell surface antigen CD3 and human B lymphocytes expressing cell surface antigen CD19. The curve labeled by ■ shows that as the concentration increases, the binding rate of ITAB2009 to human B lymphocytes increases. The curve labeled by ● shows that as the concentration increases, the binding rate of ITAB2009 to human T lymphocytes increases.

Binding rate was plotted against the y-axis, and drug concentration was plotted against the x-axis. The curve was fitted using a 4-parameter logistic model to determine EC50. The detection results are shown in Table 3 and FIGS. 2A-2B.

TABLE 3

EC50 of CD19 × CD3 BSAP ITAB2009 binding to PBMC (ng/ml)

| Domain | Anti-CD3 binding domain (scFv) | | Anti-CD19 Fab | |
|---|---|---|---|---|
| | Human T cells | Cynomolgus monkey T cells | Human B cells | Cynomolgus monkey B cells |
| EC50 (ng/ml) | 204 | 115 | 35 | 1900 |

As can be seen from the results, CD19×CD3 BSAP ITAB2009 exhibited good binding affinity to T cells and B cells in both human and cynomolgus monkey PBMCs.

To summarize, the exemplary CD19×CD3 BSAP demonstrated cross-reactivity towards antigens from both human and cynomolgus monkeys in vitro. The cross-reactivity of CD19×CD3 BSAP is beneficial for extrapolating results from toxicity studies in cynomolgus monkeys to human clinical studies.

Example 3. The In Vitro Activity of CD19×CD3 BSAP Mediated PBMC Cytotoxicity Against Autologous B Cells Human and cynomolgus monkey PBMCs were prepared according to the method described in Example 2, and resuspended in RPMI 1640 Medium (Gibco) containing 10% FBS (Gibco).

200 μL (per well) of about $3 \times 10^5$ PBMCs were added to each well of a 96-well plate, and CD19×CD3 BSAPs ITAB2003, ITAB2005, and ITAB2006 diluted to different concentrations were added to the 96-well plate according to the experimental design. Control wells without the drugs were also set up (PBMCs only). The mixture was incubated at 37° C., 5% $CO_2$ for about 18-24 hrs. Cells were then harvested and incubated with antibody FITC Mouse Anti-Human CD20 (BD Pharmingen™) for 30 minutes at room temperature. Propidium iodide (Sigma) was added at 2 μg/mL and stained for 15 minutes. Analysis was performed using ACCURI C6 (BD Bioscience).

Propidium iodide (PI) is a commonly used nuclear fluorescent dye. PI cannot penetrate intact cell membranes, so it can not stain live cells with intact cell membranes; while dead cells lose their membrane integrity, PI can enter the cells to bind DNA. Thus PI staining can be used to identify dead cells. CD20-positive is indicative of viable B cells, while cells positive for both CD20 and PI represent dead B cells. CD19×CD3 BSAP mediated cytotoxicity was calculated using the following formula: Death rate=[1−(sample well survival B cells/sample well total B cells)/(control well survival B cells/control well total B cells)]×100%.

Figure 3A:
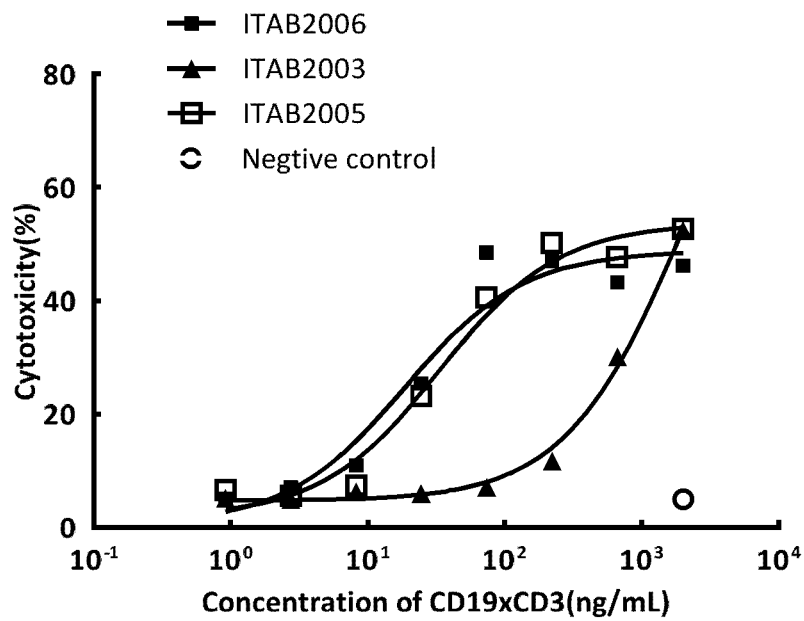
FIG. 3A shows CD19×CD3 BSAP ITAB2003, ITAB2005, and ITAB2006-mediated cynomolgus monkey PBMCs cytotoxicity against autologous B cells. The curve labeled by ■ shows that as the concentration of ITAB2006 increases, the cytotoxicity of cynomolgus monkey PBMC against autologous B cells increases. The curve labeled by ▲ shows that as the concentration of ITAB2003 increases, the cytotoxicity of cynomolgus monkey PBMC against autologous B cells increases. The curve labeled by □ shows that as the concentration of ITAB2005 increases, the cytotoxicity of cynomolgus monkey PBMC against autologous B cells increases. The point marked by ○ is a negative control of cynomolgus monkey PBMC without BSAP.

Death rate was plotted against the y-axis, and drug concentration was plotted against the x-axis. The curves was fitted using a 4-parameter logistic model to determine EC50. The assay results are shown in Table 4 and FIGS. 3A-3B.

TABLE 4

EC50 value of CD19 × CD3 BSAPs mediated PBMC cytotoxicity against autologous B cells (ng/mL)

| Protein Code | Cynomolgus monkey PBMC | Human PBMC |
|---|---|---|
| ITAB2003 | >2088 | 2.1 |
| ITAB2005 | 33.5 | 0.3 |
| ITAB2006 | 18.5 | 0.2 |

Figure 3B:
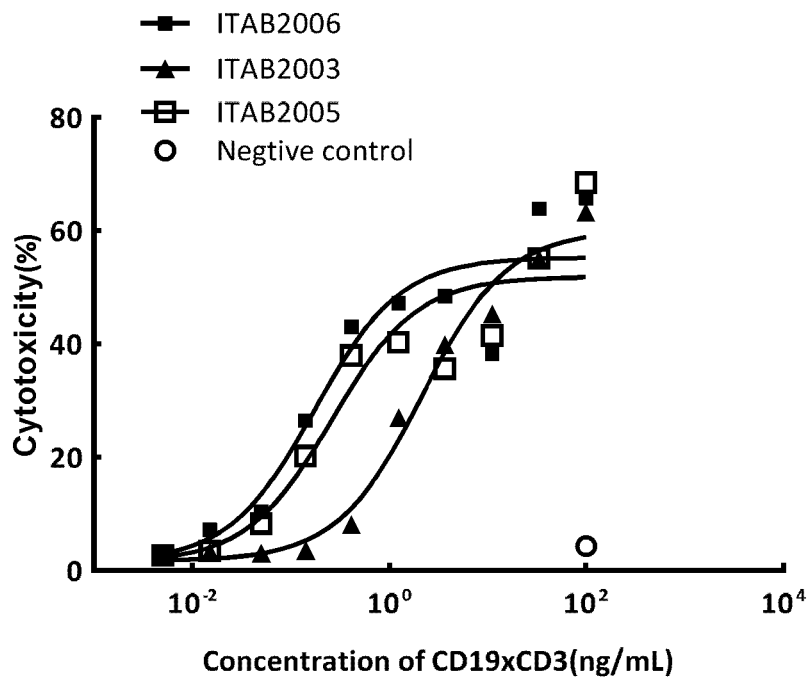
FIG. 3B shows CD19×CD3 BSAP ITAB2003, ITAB2005, and ITAB2006-mediated human PBMCs cytotoxicity against autologous B cells. The curve labeled by ■ shows that as the concentration of ITAB2006 increases, the cytotoxicity of human PBMC against autologous B cells increases. The curve labeled by ▲ shows that as the concentration of ITAB2003 increases, the cytotoxicity of human PBMC against autologous B cells increases. The curve labeled by □ shows that as the concentration of ITAB2005 increases, the cytotoxicity of human PBMC against autologous B cells increases. The point marked by ○ is a negative control of human PBMC without BSAP.

The results demonstrate that CD19×CD3 BSAPs can mediate cynomolgus monkey PBMC or human PBMC to kill autologous B cells. Among the tested BSAPs, the cell killing activity of cynomolgus monkey PBMC against autologous B cells mediated by ITAB2006 (linker consisting of SEQ ID NO: 22, GRAGGGGAGGGG, linker length is 12 amino acid residues) is similar to that mediated by ITAB2005 (linker consists of SEQ ID NO: 33, GAGGG, linker length is 6 amino acid residues). See FIG. 3A. Similarly, the killing activity of human PBMCs against autologous B cells mediated by ITAB2006 is similar to that mediated by ITAB2005 (FIG. 3B). It is worth noting that both ITAB2005 and ITAB2006 have significantly improved biological activity in mediating PBMC cytotoxicity against autologous B cells, compared to that mediated by ITAB2003. The cell killing activity mediated by ITAB2005 or ITAB2006 is at least about 62 times of that mediated by ITAB2003 for cynomolgus monkey PBMCs, and at least about 7 times of that mediated by ITAB2003 for human PBMCs.

Example 4. CD19×CD3 BSAP Mediated Human PBMC Cytotoxicity Against Tumor Cells (Cytotoxicity Assays)

Human PBMCs were prepared according to the method described in Example 2, and resuspended in RPMI 1640 Medium (Gibco) containing 10% FBS (Gibco).

Raji cells (target cells, Burkitt's lymphoma cell line, CD19+) were washed and centrifuged, stained with DiOC18 (3) (3,3′-Dioctadecyloxacarbocyanine Perchlorate, Life technologies) for 15 minutes and resuspended in RPMI-1640 medium (Gibco) containing 10% FBS. DiOC18(3) was used to stain the membrane of target cells. 100 μL $3 \times 10^4$/well of Raji cells and 100 μL $3 \times 10^5$/well of human PBMCs were added to each well of a 96-well plate. Test CD19×CD3 BSAPs (e.g., ITAB2003, ITAB2009) were then added to the cell mixture at different concentrations according to the experimental design. Wells with no drugs (PBMC+Raji target cells), wells containing Raji target cells only, and wells containing PBMC cells only were set up as controls. About 48 hrs incubation was carried out at 37° C. with 5%

$CO_2$. Cells were then stained by propidium iodide (PI, Sigma) to label dead cells. Unstained control wells were also set up. ACCURI C6 Cytometer (BD Bioscience) was used for analysis.

DiOC18(3) positive cells represent alive Raji cells, and both DiOC18(3) and propidium iodide positive cells represent dead Raji cells. CD19×CD3 BSAP mediated tumor cytotoxicity was calculated using the following formula: Death rate=[1−(sample well survival Raji cells/sample well total Raji cells)/(control well survival Raji cells/control well total Raji cells)]×100%

Death rate was plotted against the y-axis, and drug concentration was plotted against the x-axis. The curves was fitted using a 4-parameter logistic model to determine EC50. The assay results are shown in FIG. 4.

Figure 4:
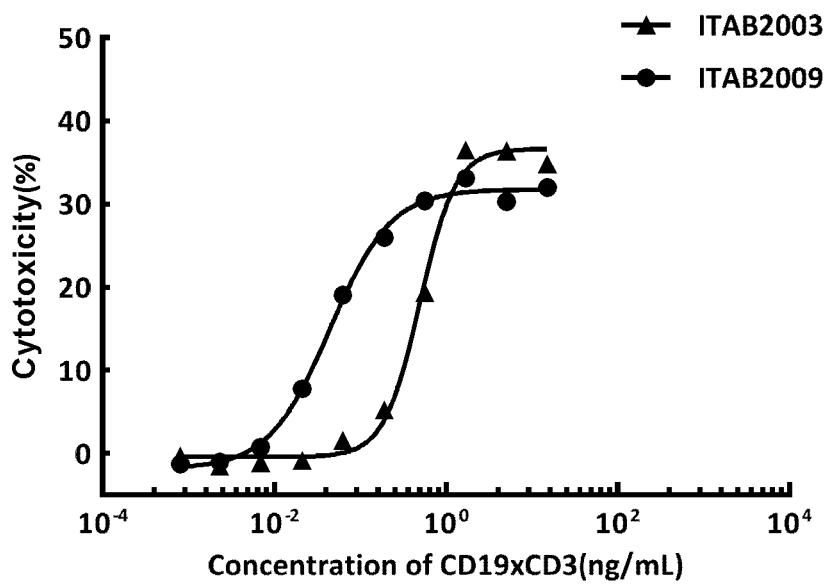
FIG. 4 shows CD19×CD3 BSAP ITAB2003 and ITAB2009-mediated human PBMCs in vitro cytotoxicity against tumor cells Raji. The curve labeled by ▲ shows that as the concentration of ITAB2003 increases, the in vitro cytotoxicity of human PBMC against tumor cells Raji increases. The curve labeled by ● shows that as the concentration of ITAB2009 increases, the in vitro cytotoxicity of human PBMC against tumor cells Raji increases.

As shown in FIG. 4, exemplary CD19×CD3 BSAPs could mediate human PBMC to kill Raji tumor cells. The EC50 of ITB2009 was 0.04 ng/mL. The EC50 of ITB2003 was 0.49 ng/mL. The results demonstrate that ITAB2009 has significantly enhanced activity in mediating human PBMC to kill tumor cells (e.g., Raji), and its killing activity is about 12 times of that mediated by ITAB2003.

The killing activities of human PBMCs against tumor cells Daudi (Burkitt's lymphoma cell line, CD19+) and Reh (ALL cell cline, CD19+) mediated by CD19×CD3 BSAP ITAB2009 were also determined, using similar methods. The killing rate was plotted against the y-axis and the drug concentration was plotted against the x-axis. The curves was fitted using a 4-parameter logistic model to determine EC50. The assay results are shown in Table 5. These results indicate that CD19×CD3 BSAP (e.g., ITAB2009) mediates T cells in vitro cytotoxicity against both lymphoma and acute lymphoblastic leukemia (ALL).

TABLE 5

EC50 values of CD19 × CD3 BSAP mediated human PBMC cytotoxicity against tumor cells

| Cell line name | Representative cancer type | EC50 (ng/ml) |
|---|---|---|
| Raji | human Burkitt lymphoma cell | 0.04 |
| Daudi | human Burkitt lymphoma cell | 0.06 |
| Reh | human acute lymphoblastic leukemia cell | 0.24 |

Example 5. Efficacy Assay of an CD19×CD3 BSAP in Killing Subcutaneous Human Lymphoma Tumor Xenograft in an Immune-Reconstructed Mouse Model To examine the effect of an exemplary CD19×CD3 BSAP on inhibiting the growth of human tumor xenograft, in vivo drug efficacy assays were carried out on immunodeficient mice having their immune system reconstructed with human lymphocytes and implanted with human B cell lymphoma tumor cells (Raji). Rituximab (anti-CD20 Ab, Maetro®, Shanghai Roche Pharmaceutical Co., Ltd.) was injected as a positive control for the treatment of B-cell lymphoma.

Female immunodeficient mice NOD SCID (NOD.Cg-$Prkdc^{scid}Il2rg^{tm1Sug}$/JicCrl) were purchased from Beijing Weitong Lihua Experimental Animal Technology Co., Ltd., and raised in an SPF-level animal facility.

The mice were first treated with Busulfan (Sigma) intraperitoneally to eradicate bone marrow cells. On the third day, in vitro cultured Raji cells (Burkitt's lymphoma cell line) were collected, thoroughly mixed and resuspended in serum-free medium pre-cooled on ice, and subcutaneously inoculated into the NOD mice in the right dorsal flank (each animal was inoculated with about $2.0 \times 10^6$ tumor cells). The day of inoculation was defined as D0. After 4 days, white blood cell concentrate samples donated by healthy people were collected, centrifuged by density gradient centrifugation (Ficoll-Paque, GE Healthcare) to obtain PBMC, resuspended in serum-free medium pre-cooled on ice, and inoculated intraperitoneally into NOG mice (each animal was inoculated with about $3.0 \times 10^6$ PBMC). When the tumor volume reached 100-350 mm³ (D14), 40 animals were divided into 5 groups based on tumor volumes (8 animals per group), referred to as vehicle control group, 50 µg/kg ITAB2009 treatment group, 5 µg/kg ITAB2009 treatment group, 0.5 µg/kg ITAB2009 treatment group, and 10 mg/kg Rituximab positive control group.

CD19×CD3 BSAP ITAB2009 to be tested was diluted to desired concentrations using sterile filtered vehicle buffer (PBS+0.05% Tween-80), and intraperitoneally administered in a volume of 0.1 mL/10 g body weight (corresponding to doses of 50 µg/kg, 5 µg/kg, and 0.5 µg/kg, respectively) to the mice on a daily basis. Animals in the vehicle control group were administered with the same volume of the vehicle. The positive control drug Rituximab was diluted to desired concentrations using sterile filtered vehicle (PBS+0.05% Tween-80), and intraperitoneally administered in a volume of 0.1 mL/10 g body weight (corresponding to a dose of 10 mg/kg) to the mice weekly, 4 times in total.

The animals were assessed twice a week for body weight and tumor volume. Tumor volume was calculated according to the formula: tumor volume (mm³)=length (mm)×width (mm)×width (mm)×0.5. Tumor growth inhibition rate (TGI %) was used to evaluate drug efficacy. TGI %=[1−(avT$_i$−avT$_0$)/(avC$_i$−avC$_0$)]×100, wherein avT$_i$−avT$_0$ is the average tumor size on day i minus the average tumor size on the day of first dosing for the treatment group, and avCi−0 is the average tumor size on day i minus the average tumor size on the day of first dosing for the vehicle control group.

Figure 5:
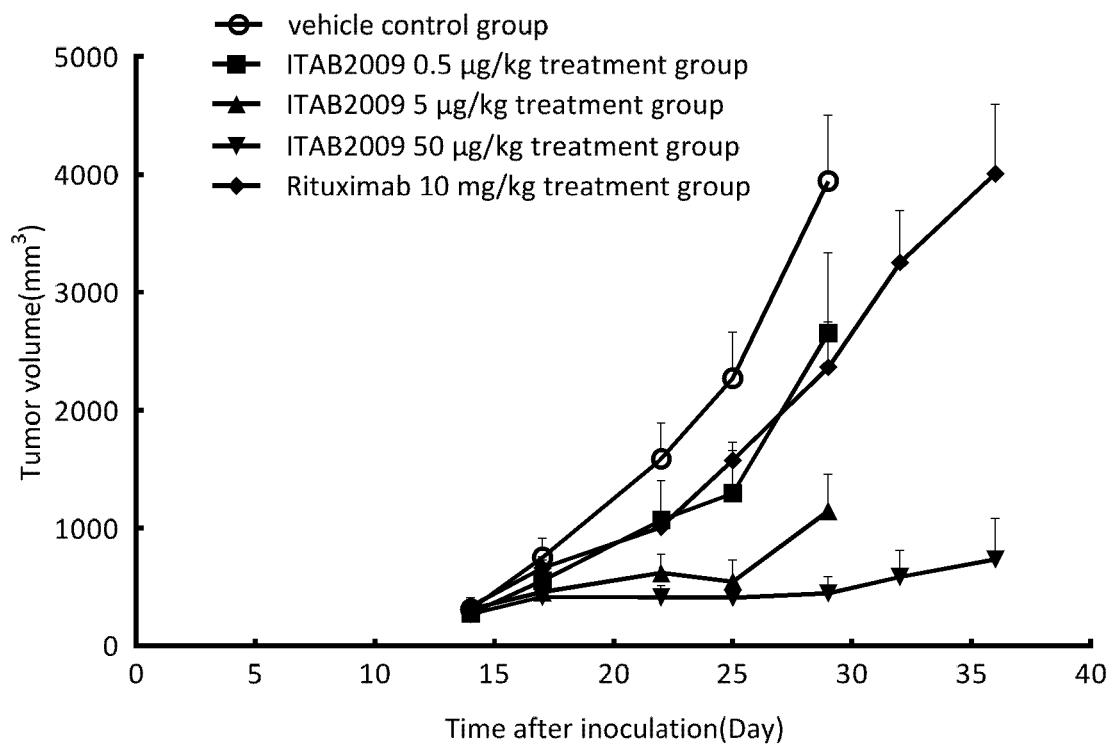
FIG. 5 depicts growth inhibitory effects of various dosages of CD19×CD3 BSAP ITAB2009 against Raji xenograft in immunodeficient mice having immune system reconstructed with human PBMC. The curve labeled by ○ shows the change of tumor volume of subcutaneous Raji cell xenografts in mice in the vehicle control group over time after inoculation of Raji cells. The curve labeled by ■ shows the change of tumor volume of subcutaneous Raji cell xenografts in mice in the ITAB2009 0.5 μg/kg treatment group over time after inoculation of Raji cells. The curve labeled by ▲ shows the change of tumor volume of subcutaneous Raji cell xenografts in mice in the ITAB2009 5 μg/kg treatment group over time after inoculation of Raji cells. The curve labeled by ▼ shows the change of tumor volume of subcutaneous Raji cell xenografts in mice in the ITAB2009 50 μg/kg treatment group over time after inoculation of Raji cells. The curve labeled by ◆ shows the change of tumor volume of subcutaneous Raji cell xenografts in mice in the Rituximab 10 mg/kg treatment group over time after inoculation of Raji cells.

As can be seen from FIG. 5, Raji tumor cells grew normally in the vehicle control group after being inoculated subcutaneously into NOG mice that had been immune-reconstructed with human peripheral blood mononuclear cells. The average tumor volume reached 3947.66±560.72 mm³ on D29 after inoculation in the vehicle control group. As shown in FIG. 5, different doses of CD19×BSAP ITAB2009 were administered for 15 consecutive days to inhibit the growth of human B cell lymphoma cells Raji tumor xenografts in NOG mice in a dose-dependent manner. On day 29, the tumor growth inhibition (TGI) of the ITAB2009 0.5 µg/kg treatment group, the 5 µg/kg treatment group, and the 50 µg/kg treatment group were 34.53% (p=0.5791), 77.21%, (p=0.2339), and 95.07% (p=0.0077) respectively; 1 of the 8 animals in the 50 µg/kg treatment group had complete tumor regression with no tumor burden. Weekly administration of Rituximab in the Rituximab 10 mg/kg group partially inhibited Raji tumor growth (TGI=44.17%, p=0.9983, D29), but there was no statistically significant difference compared to the vehicle control group. The CD19×CD3 BSAP ITAB2009 5 µg/kg treatment group and 50 µg/kg treatment group demonstrated significantly better therapeutic efficacy compared to Rituximab 10 mg/kg treatment group. These results demonstrate that CD19×CD3 BSAP can mediate immune cells to kill B cell lymphoma in vivo, and significantly inhibit tumor growth in a dose-dependent manner.

Example 6. Efficacy Assay of CD19×CD3 BSAP on Mouse Survival Model with Intravenously Injected Human Primary T Cells and Reh Leukemia Cells (Immune Reconstruction Model)

To examine the growth inhibitory effect of an exemplary CD19×CD3 BSAP on xenograft tumor, immunodeficient NOD/SCID mice intravenously injected with human Precursor B-cell (preB) acute lymphoblastic leukemia (ALL) Reh cells and human primary T cells were evaluated for BSAP in vivo efficacy of prolonged leukemia survival.

Female immunodeficient mice NOD/SCID (NOD.CB17-Prkdc$^{scid}$/NcrCrl) were purchased from Beijing Weitong Lihua Experimental Animal Technology Co., Ltd., and raised in an SPF-level animal facility.

Culture of healthy human primary T (Pri-T) cells: human PBMCs were prepared as described in Example 2 and resuspended in RPMI-1640 medium (Gibco) containing 10% FBS (Gibco) with a cell density of 1.5-2.5×10$^6$/mL. PBMCs were inoculated into a culture flask coated with Mouse IgG2a anti-human CD3 antibody (5 μg/mL) (BioLegend, Inc.) and Mouse IgG1 anti-human CD28 antibody (1 μg/mL) (BioLegend, Inc.), and cultured in a 37° C., 5% CO$_2$ incubator.

Reh cells were cultured in RPMI-1640 medium (Gibco) containing 10% FBS (Gibco) in a 37° C., 5% CO$_2$ incubator.

When NOD/SCID mice reached 22-24 g, each mouse was injected with 1.0×10$^7$ Reh cells into the tail vein (defined as D0). On D3, each mouse was inoculated with in vitro cultured 4.0×10$^6$ healthy human primary T cells via the tail vein. The animals were then randomly divided into two groups based on their body weight: the vehicle control group (PBST, n=13) and CD19×CD3 BSAP ITAB2009 treatment group (n=12), respectively. Two hours after human pri-T cell inoculation, the animals were administered by intraperitoneal injection with either solvent PBST (for vehicle control group) or ITAB2009 (ITAB2009 treatment group). ITAB2009 was administered at a dose of 50 μg/kg daily for 3 consecutive days; then the dose was increased to 100 μg/kg daily for 3 consecutive days (ITAB2009 injected for a total of 6 days per treatment). The above pri-T cell inoculation and 6-day ITAB2009 treatment cycle were repeated 3 times, using human primary T cells derived from the same donor (i.e., human primary T cell inoculation dates were D9, D15, and D21, and the total ITAB2009 dosing period was 24 days); the amount of human primary T cells inoculated per mouse during the last three administration sessions was 1.0×10$^7$.

Animal behavior was monitored daily and mouse body weights were recorded. BSAP administration was stopped if the body weight of the animal dropped more than 15%. When the animals exhibited weakness, significant weight loss, hind limb paralysis, or dyscrasia, it was considered as the onset of leukemia symptoms, then the animal was euthanized and sample collection was performed. Samples collected include: 1) At the end of the experiment, peripheral blood was collected from the submandibular vein and treated with EDTA.2K for anticoagulation, then PBS was added for 1:1 dilution by volume; 2) mice spleens were collected and rinsed with PBS solution once. Washed spleens were grinded to obtain spleen cells, which were then filtered through a cell sieve to obtain a single cell suspension, and rinsed once with PBS; 3) femur of the mice hind limbs was obtained, then muscles and connective tissues attached were removed. Both ends of the femur were cut off. The bone marrow was washed with PBS solution using a 1 mL syringe, cells were collected, and filtered through a cell sieve to obtain single cell suspension, then rinsed once with PBS; 4) cells collected were stained with PE Mouse Anti-Human CD19 antibody (Abcam) for 1 hour at room temperature, PE Mouse IgG1κ Isotype Control antibody (BD Biosciences) was used as a control. Red blood cell lysate was added and allowed to stand at room temperature for 15 minutes. Centrifugation was performed at 200×g for 10 minutes, and supernatant was carefully discarded. The cell pellet was then resuspended with FACS assay buffer (PBS containing 1% FBS), then used for fluorescence-activated cell sorting (FACS) analysis to calculate the proportion of human CD19+ tumor cells in total cells.

Mouse Kaplan-Meier survival curves were generated and the median survival of each group was calculated. P-value was calculated by Log-rank test, which was considered statistically significant when p<0.05; and Hazard Ratio and 95% confidence interval (95% CI) were calculated using Log-Rank.

Figure 6:
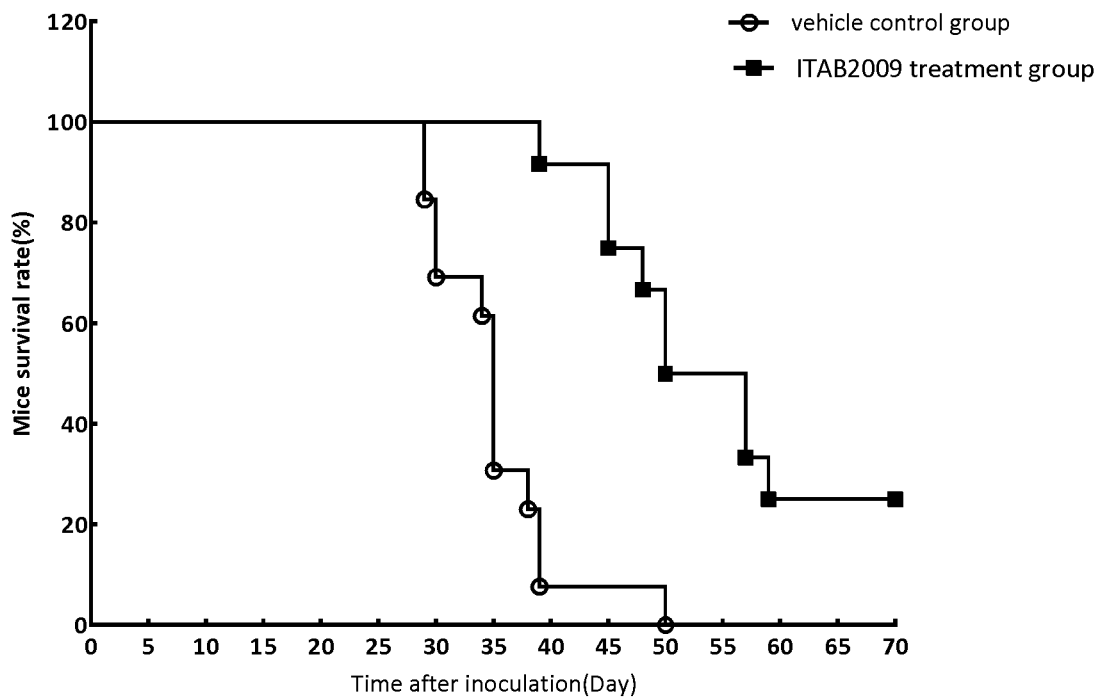
FIG. 6 shows Kaplan-Meier survival curves of Reh leukemia xenograft mice with immune system reconstructed with human primary T cells after Reh cell inoculation (DO), either treated with CD19×CD3 BSAP ITAB2009 or with vehicle control. The curve labeled by ○ shows mice survival over time in the vehicle control group. The curve labeled by ■ shows the mice survival over time in the ITAB2009 treatment group.

As described above, NOD/SCID mice were inoculated via the tail vein with Reh cells and 4 times of primary T cells derived from the same healthy volunteer. As can be seen from FIG. 6, Mice within the vehicle control group gradually developed leukemia symptoms caused by leukemia cells invading the central nervous system of the bone marrow, including significant weight loss and hind limb paralysis; the median survival time of vehicle control group mice was 35 days. CD19×CD3 BSAP ITAB2009 treatment significantly delayed disease progression and significantly prolonged mice survival (median survival was 53.5 days, Log-rank analysis p<0.0001). At the end point (D70), there were still three mice alive within the ITAB2009 treatment group. The ITAB2009 treatment group had a Hazard Ratio of 0.2294 and a 95% CI of 0.087 to 0.603.

At the end of the experiment, mice blood samples, spleen cells, and bone marrow cells were collected as described above, and the proportion of human CD19-positive tumor cells was measured by FACS. Experimental results are shown in Table 6.

TABLE 6

Survival and proportion of human CD19 positive tumor cells in peripheral blood, spleen and bone marrow in Reh leukemia xenograft mouse model

| | Vehicle control group, n = 13 | | | | ITAB2009 treatment group, n = 12 | | | |
|---|---|---|---|---|---|---|---|---|
| Animal No. | Animal survival (day) | CD19+ tumor in peripheral blood (%) | CD19+ tumor in spleen cells (%) | CD19+ tumor in bone marrow cells (%) | Animal No. | Animal survival (day) | CD19+ tumor in peripheral blood (%) | CD19+ tumor in spleen cells (%) | CD19+ tumor in bone marrow cells (%) |
| 1 | 29 | 10.2 | 0 | 35 | 14 | 57 | 0 | 1.1 | 0.1 |
| 2 | 29 | 2.8 | 0 | 56.5 | 15 | 48 | N/A | N/A | N/A |
| 3 | 39 | 15.2 | 0 | 52.1 | 16 | 39 | 7.3 | 0 | 15.4 |
| 4 | 35 | 0.7 | 0 | 39.1 | 17 | 50 | 1.1 | 15.5 | 47.5 |

TABLE 6-continued

Survival and proportion of human CD19 positive tumor cells in peripheral blood, spleen and bone marrow in Reh leukemia xenograft mouse model

| | Vehicle control group, n = 13 | | | | ITAB2009 treatment group, n = 12 | | | |
|---|---|---|---|---|---|---|---|---|
| Animal No. | Animal survival (day) | CD19+ tumor in peripheral blood (%) | CD19+ tumor in spleen cells (%) | CD19+ tumor in bone marrow cells (%) | Animal No. | Animal survival (day) | CD19+ tumor in peripheral blood (%) | CD19+ tumor in spleen cells (%) | CD19+ tumor in bone marrow cells (%) |
| 5 | 35 | 5.3 | 0 | 33 | 18 | 70* | 0 | 0 | 21.1 |
| 6 | 50 | N/A | 19.3 | 86 | 19 | 45 | 2.1 | 1.9 | 1.3 |
| 7 | 39 | 29.7 | 0 | 59.8 | 20 | 70* | 0 | 0 | 13.5 |
| 8 | 30 | 5.7 | 0 | 45.8 | 21 | 57 | 0 | 3.1 | 3.9 |
| 9 | 30 | 1.2 | 0 | 40.8 | 22 | 59 | 0.4 | 0.4 | 0.4 |
| 10 | 35 | 29.5 | 0 | 45.4 | 23 | 70* | 0 | 0 | 0.5 |
| 11 | 35 | 2.9 | 0 | 18.6 | 24 | 45 | N/A | N/A | N/A |
| 12 | 34 | 22.1 | 0 | 50.6 | 25 | 50 | 0.2 | 15.5 | 6.7 |
| 13 | 38 | 17.9 | 0 | 53.6 | | | | | |

*Animals survived at the end point (D70)

These results demonstrate that in the vehicle control group, CD19-positive cells were detected in peripheral blood of all mice, accounting for 0.7% to 29.7% of total white blood cells; CD19-positive cells were detected in the spleen of only one mouse; and CD19-positive cells were detected in the bone marrow of all mice, accounting for 18.6% to 86% of total cells.

In the CD19×CD3 BSAP ITAB2009 treatment group, human CD19 positive cells were detected in peripheral blood of 5 mice, accounting for 0.2% to 7.3% of total white blood cells; human CD19-positive cells were detected in the spleen of 6 mice, accounting for 0.4% to 15.5% of the total cells; human CD19-positive cells were detected in the bone marrow of all mice, accounting for 0.1% to 47.5% of the total cells. These CD19+ ratios were all lower than those in the vehicle control group. Thus, CD19×CD3 BSAP can significantly reduce the number and fraction of CD19 positive cells, demonstrating its significant therapeutic efficacy.

This experiment demonstrate that NOD/SCID mice inoculated with CD19-positive human acute lymphoblastic leukemia Reh cells via the tail vein can develop leukemia symptoms, and can serve as a human ALL tumor xenograft model. With the presence of human primary T cells as effector cells, CD19×CD3 BSAP ITAB2009 administered under various doses significantly prolonged the survival of tumor xenograft mice (median survival of vehicle control group and ITAB2009 treatment group: 35 days vs. 53.5 days, p<0.0001, hazard ratio 0.2294, 95% CI [0.087 to 0.603]). These results suggest that CD19×CD3 BSAPs described herein can mediate immune cells to kill CD19+ tumor cells (such as acute lymphoblastic leukemia cells) significantly inhibit tumor cell growth, and prolong patient survival.

Example 7. Pre-Clinical Study of CD19×CD3 BSAP in Cynomolgus Monkeys

A toxicology study was performed to evaluate the effect of an exemplary CD19×CD3 BSAP in vivo in cynomolgus monkeys. 40 cynomolgus monkeys were randomly divided into 4 groups (n=10 per group, 5F/5M): vehicle control group, ITAB2009 3 μg/kg treatment group, ITAB2009 10 μg/kg treatment group, and ITAB2009 30 μg/kg treatment group. ITAB2009 was diluted with a carrier of 0.002% Tween 20/5% glucose solution (w/v) and administered by 2-hour intravenous infusion, 3 times per week, for 4 consecutive weeks for a total of 13 doses, followed by 4-week recovery period. The treatment groups received 3 μg/kg, 10 μg/kg, and 30 μg/kg ITAB2009 each administration, respectively. The vehicle control group received the carrier only by 2-hour intravenous infusion similar to the dosing schedule of treatment groups. The day of the first administration was defined as Day 1. Three males and 3 females of each group were euthanized on the day after the last infusion, and the remaining animals were euthanized after 4 weeks of recovery. Histopathological examination for the tissues and organs were performed for each euthanized animals.

Clinical observations, body weight, behavior, food intaking, and feces, etc. of the animals were monitored. Functional observational battery (FOB) were performed to evaluate animals' behavior and neurologic function. CD20+ B-lymphocyte subtypes were analyzed using FACS (BD FACSCalibur) at various time points. Serum IL-6 levels were analyzed by human IL-6 ELISA Kit. Serum samples were analyzed for biochemical parameters and cytokine levels including IL-2, 1L-4, IL-5, IL-6, TNF-α, and IFN-γ using Cytometric Bead Array Kit (BD PHARMINGEN™) and FACS (BD FACSCalibur).

No mortality was observed in any group of monkeys during the study. No irritation or fester was observed at the infusion areas. None of the cynomolgus monkeys treated with ITAB2009 showed any signs of CNS symptoms.

Figure 7:
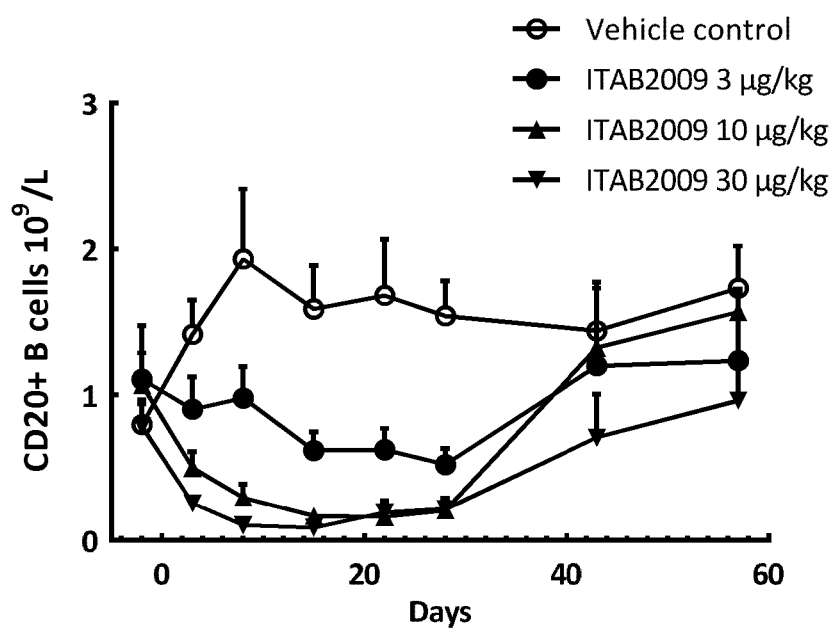
FIG. 7 shows a plot of change in the number of CD20+ B cells over time in the blood of cynomolgus monkeys administered with ITAB2009 at various dosages. Cynomolgus monkeys treated with vehicle buffer served as control.
Figure 8A:
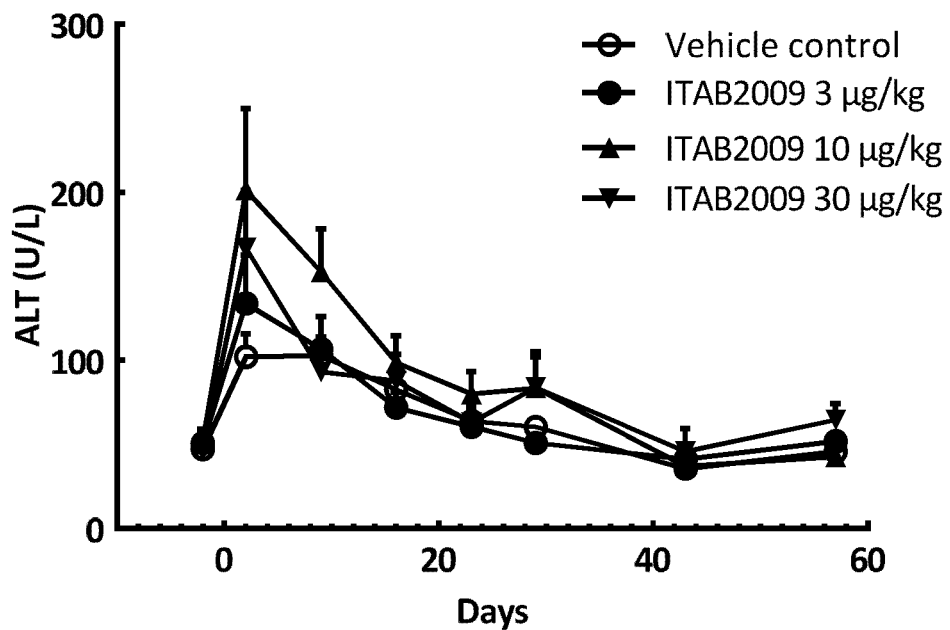
FIGS. 8A-8D depict the change of serum ALT levels (FIG. 8A), serum AST levels (FIG. 8B), serum CK levels (FIG. 8C), and serum LDH levels (FIG. 8D) over time in cynomolgus monkeys administered with ITAB2009 at various dosages. Cynomolgus monkeys treated with vehicle buffer served as control.
Figure 8B:
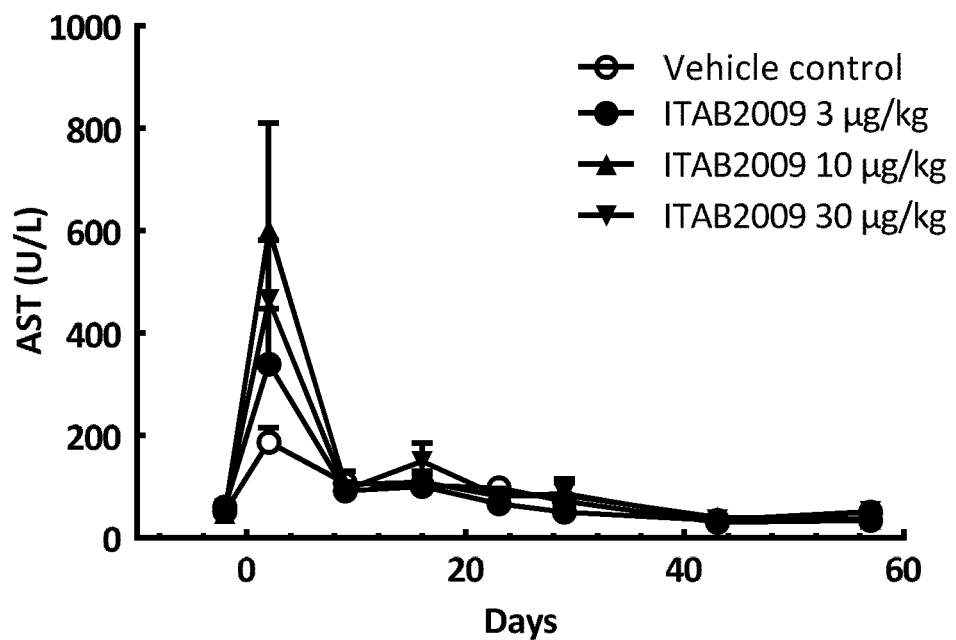
Figure 8C:
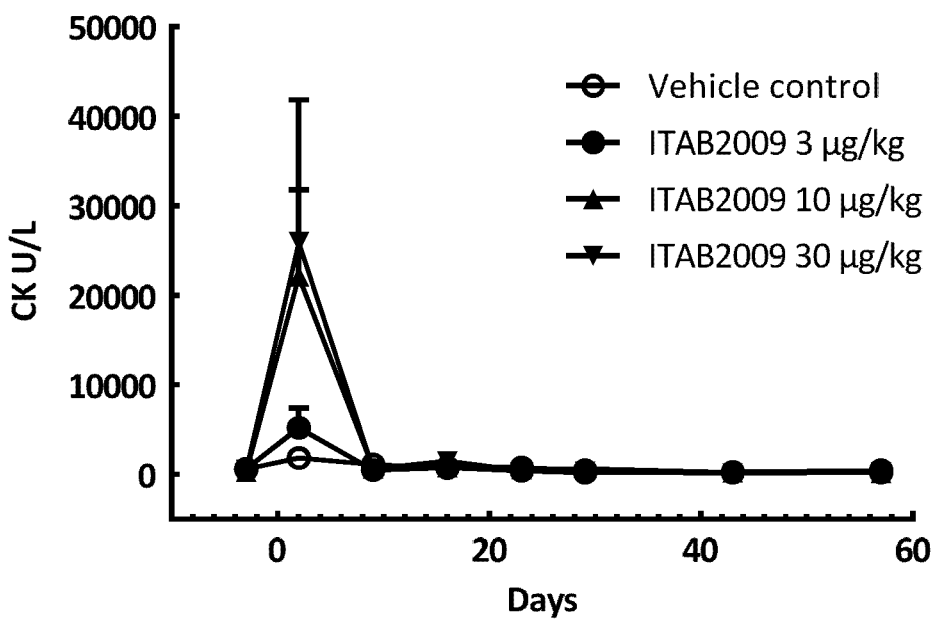
Figure 8D:
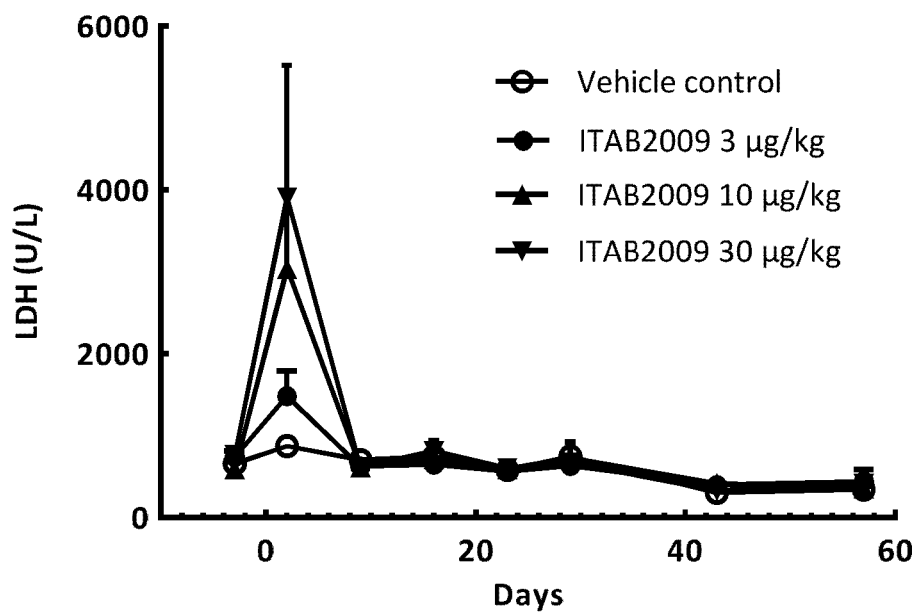

As shown in FIG. 7, dose-dependent reductions in the absolute counts of CD20+ B lymphocytes began on Day 3 in the treatment groups after the first intravenous administration of ITAB2009. During the 4-week recovery period, the reduced number of B lymphocytes recovered to baseline levels in the treatment groups. Sustained B lymphocyte depletion during the repeated dosing period demonstrates pharmacologic effect of ITAB2009.

As shown in FIGS. 8A-8D, transient and dose-dependent induction of serum levels of ALT (alanine aminotransferase), AST (aspartate transaminase), CK (creatine phosphokinase) and LDH (lactate dehydrogenase) in treatment groups were observed after the first intravenous administration of ITAB2009. However, there was no statistically significant difference between each treatment groups and the vehicle control group at the same time points. Serum levels of these biochemical parameters reduced towards baseline levels after Day 9. No pathological changes of corresponding organs in the animals were observed by histopathological examination.

Transient increase in IL-6 level was observed in the majority of cynomolgus monkeys on Day 1 following the first intravenous administration of ITAB2009 for all treatment groups. One cynomolgus monkey in the ITAB2009 10 µg/kg treatment group experienced the highest IL-6 induction (4151 pg/mL on Day 1). Serum concentrations of IL-6 returned to baseline levels on Day 8 for all treatment groups. Transient increase in serum concentrations of IL-2 (≤145.8 pg/mL) and TNF-α (≤1336.8 pg/mL) were also observed in 10 µg/kg and 30 µg/kg treatment groups on Day 1, which then gradually decreased to baseline levels on Day 8. Serum concentration of IL-5 slightly increased in 30 µg/kg treatment group on Day 1 (≤2.3 pg/mL). Serum concentrations of IL-4 and IFN-γ did not change significantly after ITAB2009 administration among all treatment groups. There were no apparent clinical observations associated with increased cytokine levels.

Histopathological examination showed microscopic pathological changes related to ITAB2009 were limited to the spleen of 10 µg/kg and 30 µg/kg treatment groups after last infusion (Day 29). Miccroscopic findings consisted of mild to moderate decrease in the number of germinal center cells in spleen. No pathological changes related to the test article was observed in the other designated organs. After 4 weeks of recovery, the number of germinal center cells of spleen in 10 µg/kg and 30 µg/kg treatment groups completely recovered.

These results demonstrate that the exemplary CD19×CD3 BSAP has good safety and tolerance profile in cynomolgus monkeys.

We claim:

1. A bispecific antigen binding protein (BSAP) comprising:
   (I) an anti-CD19 Fab specifically recognizing CD19, wherein the anti-CD19 Fab comprises:
      (a) an immunoglobulin (Ig) heavy chain variable region (VH) and an Ig heavy chain constant region 1 (CH1), and
      (b) an Ig light chain variable region (VL) and an Ig light chain constant region (CL);
      wherein:
         (i) the VH of the anti-CD19 Fab comprises: a heavy chain hypervariable region 1 (HVR-H1) comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and the VL of the anti-CD19 Fab comprises: a light chain hypervariable region 1 (HVR-L1) comprising the amino acid sequence of SEQ ID NO: 4, an HVR-L2 comprising the amino acid sequence of SEQ ID NO: 5, and an HVR-L3 comprising the amino acid sequence of SEQ ID NO: 6; or
         (ii) the VH of the anti-CD19 Fab comprises: an HVR-H1 comprising the amino acid sequence of SEQ ID NO: 1, an HVR-H2 comprising the amino acid sequence of SEQ ID NO: 2, and an HVR-H3 comprising the amino acid sequence of SEQ ID NO: 3; and the VL of the anti-CD19 Fab comprises: an HVR-L1 comprising the amino acid sequence of SEQ ID NO: 37, an HVR-L2 comprising the amino acid sequence of SEQ ID NO: 38, and an HVR-L3 comprising the amino acid sequence of SEQ ID NO: 39; and
   (II) an anti-CD3 scFv specifically recognizing CD3;
      wherein the anti-CD3 scFv comprises a VH and a VL;
      wherein the VH of the anti-CD3 scFv comprises: an HVR-H1 comprising the amino acid sequence of SEQ ID NO: 9, an HVR-H2 comprising the amino acid sequence of SEQ ID NO: 10, and an HVR-H3 comprising the amino acid sequence of SEQ ID NO: 11; and wherein the VL of the anti-CD3 scFv comprises: an HVR-L1 comprising the amino acid sequence of SEQ ID NO: 12, an HVR-L2 comprising the amino acid sequence of SEQ ID NO: 13, and an HVR-L3 comprising the amino acid sequence of SEQ ID NO: 14:
      wherein:
      (1) the anti-CD3 scFv is connected to the N-terminus of the VH or the VL of the anti-CD19 Fab via an optional linker; or
      (2) the BSAP comprises a first anti-CD3 scFv and a second anti-CD3 scFv, wherein the first anti-CD3 scFv is connected to the N-terminus of the VH of the anti-CD19 Fab via an optional first linker, and the second anti-CD3 scFv is connected to the N-terminus of the VL of the anti-CD19 Fab via an optional second linker.

2. The BSAP of claim 1, wherein the anti-CD3 scFv is connected to the N-terminus of the VH of the anti-CD19 Fab.

3. The BSAP of claim 1, wherein the anti-CD3 scFv is connected to the N-terminus of the VL of the anti-CD19 Fab.

4. The BSAP of claim 1, wherein the VH of the anti-CD19 Fab comprises the amino acid sequence of SEQ ID NO: 7, and wherein the VL of the anti-CD19 Fab comprises the amino acid sequence of SEQ ID NO: 8 or 40.

5. The BSAP of claim 1, wherein the VH of the anti-CD3 scFv comprises the amino acid sequence of SEQ ID NO: 15, and wherein the VL of the anti-CD3 scFv comprises the amino acid sequence of SEQ ID NO: 16.

6. The BSAP of claim 5, wherein the anti-CD3 scFv comprises the amino acid sequence of SEQ ID NO: 17.

7. The BSAP of claim 1, wherein the BSAP comprises a first polypeptide and a second polypeptide, wherein the first polypeptide comprises an amino acid sequence of any of SEQ ID NOs: 23, 28, 35, 58, and 59, and wherein the second polypeptide comprises an amino acid sequence of SEQ ID NO: 24 or 27.

8. The BSAP of claim 7, wherein the first polypeptide comprises an amino acid sequence of any one of SEQ ID NOs: 23, 28, 35, 58, and 59, and wherein the second polypeptide comprises the amino acid sequence of SEQ ID NO: 24.

9. The BSAP of claim 7, wherein the first polypeptide comprises an amino acid sequence of SEQ ID NO: 28 or 58, and wherein the second polypeptide comprises the amino acid sequence of SEQ ID NO: 27.

10. An isolated nucleic acid or vector encoding the BSAP of claim 1.

11. A pharmaceutical composition comprising the BSAP of claim 1, and a pharmaceutically acceptable carrier.

12. A method of treating a CD19-expressing cancer in an individual in need thereof, comprising administering to the individual an effective amount of the BSAP of claim 1.

13. The method of claim 12, wherein the CD19-expressing cancer is selected from the group consisting of acute lymphocytic leukemia (ALL), chronic lymphocytic leukemia (CLL), mantel cell leukemia (MCL), non-Hodgkin's lymphoma (NHL), and B cell lymphoma (BCL).

14. A method of generating the BSAP of claim 1, comprising:
   (i) culturing a host cell comprising the isolated nucleic acid or vector of claim 10 under a condition suitable for the expression of the encoded BSAP; and
   (ii) recovering the expressed BSAP from the cultured host cell.

15. A bispecific antigen binding protein (BSAP) comprising:
   (I) an anti-CD19 Fab specifically recognizing CD19, wherein the anti-CD19 Fab comprises:
      (a) an immunoglobulin (Ig) heavy chain variable region (VH) and an Ig heavy chain constant region 1 (CH1), and
      (b) an Ig light chain variable region (VL) and an Ig light chain constant region (CL); and
   (II) an anti-CD3 scFv specifically recognizing CD3;
   wherein the anti-CD3 scFv is connected to the N-terminus of the VH of the anti-CD19 Fab via a linker to form a first polypeptide, and the VL and the CL of the anti-CD19 Fab form a second polypeptide; and
   wherein the first polypeptide comprises the amino acid sequence of SEQ ID NO: 23, and wherein the second polypeptide comprises the amino acid sequence of SEQ ID NO: 24.

16. A pharmaceutical composition comprising the BSAP of claim 15, and a pharmaceutically acceptable carrier.

17. A method of treating a CD19-expressing cancer in an individual in need thereof, comprising administering to the individual an effective amount of the BSAP of claim 15.

18. The method of claim 17, wherein the CD19-expressing cancer is selected from the group consisting of acute lymphocytic leukemia (ALL), chronic lymphocytic leukemia (CLL), mantel cell leukemia (MCL), non-Hodgkin's lymphoma (NHL), and B cell lymphoma (BCL).

19. An isolated nucleic acid or vector encoding the BSAP of claim 15.

20. A method of generating the BSAP of claim 15, comprising:
   (i) culturing a host cell comprising the isolated nucleic acid or vector of claim 19 under a condition suitable for the expression of the encoded BSAP; and
   (ii) recovering the expressed BSAP from the cultured host cell.

* * * * *

SEQUENCE LISTING

```
<160> NUMBER OF SEQ ID NOS: 61

<210> SEQ ID NO 1
<211> LENGTH: 5
<212> TYPE: PRT
<213> ORGANISM: Artificial Sequence
<220> FEATURE:
<223> OTHER INFORMATION: Synthetic Construct

<400> SEQUENCE: 1

Ser Tyr Val Met His
1               5

<210> SEQ ID NO 2
<211> LENGTH: 14
<212> TYPE: PRT
<213> ORGANISM: Artificial Sequence
<220> FEATURE:
<223> OTHER INFORMATION: Synthetic Construct

<400> SEQUENCE: 2

Trp Ile Gly Tyr Ile Asn Pro Tyr Asn Asp Gly Thr Lys Tyr
1               5                   10

<210> SEQ ID NO 3
<211> LENGTH: 12
<212> TYPE: PRT
<213> ORGANISM: Artificial Sequence
<220> FEATURE:
<223> OTHER INFORMATION: Synthetic Construct

<400> SEQUENCE: 3

Gly Thr Tyr Tyr Tyr Gly Ser Arg Val Phe Asp Tyr
1               5                   10

<210> SEQ ID NO 4
<211> LENGTH: 16
<212> TYPE: PRT
<213> ORGANISM: Artificial Sequence
<220> FEATURE:
<223> OTHER INFORMATION: Synthetic Construct

<400> SEQUENCE: 4

Arg Ser Ser Lys Ser Leu Gln Asn Val Asn Gly Asn Thr Tyr Leu Tyr
1               5                   10                  15

<210> SEQ ID NO 5
<211> LENGTH: 7
```

```
<212> TYPE: PRT
<213> ORGANISM: Artificial Sequence
<220> FEATURE:
<223> OTHER INFORMATION: Synthetic Construct

<400> SEQUENCE: 5

Arg Met Ser Asn Leu Asn Ser
1               5

<210> SEQ ID NO 6
<211> LENGTH: 9
<212> TYPE: PRT
<213> ORGANISM: Artificial Sequence
<220> FEATURE:
<223> OTHER INFORMATION: Synthetic Construct

<400> SEQUENCE: 6

Met Gln His Leu Glu Tyr Pro Ile Thr
1               5

<210> SEQ ID NO 7
<211> LENGTH: 121
<212> TYPE: PRT
<213> ORGANISM: Artificial Sequence
<220> FEATURE:
<223> OTHER INFORMATION: Synthetic Construct

<400> SEQUENCE: 7

Gln Val Gln Leu Val Gln Ser Gly Pro Glu Leu Ile Lys Pro Gly Gly
1               5                   10                  15

Ser Val Lys Met Ser Cys Lys Ala Ser Gly Tyr Thr Phe Thr Ser Tyr
            20                  25                  30

Val Met His Trp Val Arg Gln Lys Pro Gly Gln Gly Leu Glu Trp Ile
        35                  40                  45

Gly Tyr Ile Asn Pro Tyr Asn Asp Gly Thr Lys Tyr Asn Glu Lys Phe
    50                  55                  60

Lys Gly Arg Ala Thr Leu Thr Ser Asp Lys Ser Ser Thr Ala Tyr
65                  70                  75                  80

Met Glu Leu Ser Ser Leu Arg Ser Glu Asp Ser Ala Val Tyr Tyr Cys
                85                  90                  95

Ala Arg Gly Thr Tyr Tyr Tyr Gly Ser Arg Val Phe Asp Tyr Trp Gly
            100                 105                 110

Gln Gly Thr Thr Val Thr Val Ser Ser
        115                 120

<210> SEQ ID NO 8
<211> LENGTH: 112
<212> TYPE: PRT
<213> ORGANISM: Artificial Sequence
<220> FEATURE:
<223> OTHER INFORMATION: Synthetic Construct

<400> SEQUENCE: 8

Asp Val Val Met Thr Gln Ser Pro Ser Ser Ile Pro Val Thr Leu Gly
1               5                   10                  15

Glu Ser Val Ser Ile Ser Cys Arg Ser Ser Lys Ser Leu Gln Asn Val
            20                  25                  30

Asn Gly Asn Thr Tyr Leu Tyr Trp Phe Gln Gln Arg Pro Gly Gln Ser
        35                  40                  45

Pro Gln Leu Leu Ile Tyr Arg Met Ser Asn Leu Asn Ser Gly Val Pro
    50                  55                  60
```

Asp Arg Phe Ser Gly Ser Gly Ser Gly Thr Asp Phe Thr Leu Arg Ile
65                  70                  75                  80

Ser Gly Val Glu Pro Glu Asp Val Gly Val Tyr Tyr Cys Met Gln His
                85                  90                  95

Leu Glu Tyr Pro Ile Thr Phe Gly Ala Gly Thr Lys Leu Glu Ile Lys
            100                 105                 110

<210> SEQ ID NO 9
<211> LENGTH: 5
<212> TYPE: PRT
<213> ORGANISM: Artificial Sequence
<220> FEATURE:
<223> OTHER INFORMATION: Synthetic Construct

<400> SEQUENCE: 9

Thr Tyr Ala Met Asn
1               5

<210> SEQ ID NO 10
<211> LENGTH: 19
<212> TYPE: PRT
<213> ORGANISM: Artificial Sequence
<220> FEATURE:
<223> OTHER INFORMATION: Synthetic Construct

<400> SEQUENCE: 10

Arg Ile Arg Ser Lys Tyr Asn Asn Tyr Ala Thr Tyr Tyr Ala Asp Ser
1               5                   10                  15

Val Lys Asp

<210> SEQ ID NO 11
<211> LENGTH: 14
<212> TYPE: PRT
<213> ORGANISM: Artificial Sequence
<220> FEATURE:
<223> OTHER INFORMATION: Synthetic Construct

<400> SEQUENCE: 11

His Gly Asn Phe Gly Asn Ser Tyr Val Ser Trp Phe Ala Tyr
1               5                   10

<210> SEQ ID NO 12
<211> LENGTH: 14
<212> TYPE: PRT
<213> ORGANISM: Artificial Sequence
<220> FEATURE:
<223> OTHER INFORMATION: Synthetic Construct

<400> SEQUENCE: 12

Arg Ser Ser Thr Gly Ala Val Thr Thr Ser Asn Tyr Ala Asn
1               5                   10

<210> SEQ ID NO 13
<211> LENGTH: 7
<212> TYPE: PRT
<213> ORGANISM: Artificial Sequence
<220> FEATURE:
<223> OTHER INFORMATION: Synthetic Construct

<400> SEQUENCE: 13

Gly Thr Asn Lys Arg Ala Pro
1               5

<210> SEQ ID NO 14
<211> LENGTH: 9

```
<212> TYPE: PRT
<213> ORGANISM: Artificial Sequence
<220> FEATURE:
<223> OTHER INFORMATION: Synthetic Construct

<400> SEQUENCE: 14

Ala Leu Trp Tyr Ser Asn Leu Trp Val
1               5

<210> SEQ ID NO 15
<211> LENGTH: 125
<212> TYPE: PRT
<213> ORGANISM: Artificial Sequence
<220> FEATURE:
<223> OTHER INFORMATION: Synthetic Construct

<400> SEQUENCE: 15

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Leu Tyr Leu Gln Met Asn Ser Leu Arg Ala Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Met Val Thr Val Ser Ser
        115                 120                 125

<210> SEQ ID NO 16
<211> LENGTH: 109
<212> TYPE: PRT
<213> ORGANISM: Artificial Sequence
<220> FEATURE:
<223> OTHER INFORMATION: Synthetic Construct

<400> SEQUENCE: 16

Gln Ala Val Val Thr Gln Glu Pro Ser Leu Thr Val Ser Pro Gly Gly
1               5                   10                  15

Thr Val Thr Leu Thr Cys Arg Ser Ser Thr Gly Ala Val Thr Thr Ser
            20                  25                  30

Asn Tyr Ala Asn Trp Val Gln Gln Lys Pro Gly Gln Ala Pro Arg Gly
        35                  40                  45

Leu Ile Gly Gly Thr Asn Lys Arg Ala Pro Gly Thr Pro Ala Arg Phe
    50                  55                  60

Ser Gly Ser Leu Leu Gly Gly Lys Ala Ala Leu Thr Leu Ser Gly Val
65                  70                  75                  80

Gln Pro Glu Asp Glu Ala Glu Tyr Tyr Cys Ala Leu Trp Tyr Ser Asn
                85                  90                  95

Leu Trp Val Phe Gly Gly Gly Thr Lys Leu Thr Val Leu
            100                 105

<210> SEQ ID NO 17
<211> LENGTH: 249
<212> TYPE: PRT
```

<213> ORGANISM: Artificial Sequence
<220> FEATURE:
<223> OTHER INFORMATION: Synthetic Construct

<400> SEQUENCE: 17

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Leu Tyr Leu Gln Met Asn Ser Leu Arg Ala Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Met Val Thr Val Ser Ser Gly Gly Gly
        115                 120                 125

Gly Ser Gly Gly Gly Gly Ser Gly Gly Gly Gly Ser Gln Ala Val Val
    130                 135                 140

Thr Gln Glu Pro Ser Leu Thr Val Ser Pro Gly Gly Thr Val Thr Leu
145                 150                 155                 160

Thr Cys Arg Ser Ser Thr Gly Ala Val Thr Thr Ser Asn Tyr Ala Asn
                165                 170                 175

Trp Val Gln Gln Lys Pro Gly Gln Ala Pro Arg Gly Leu Ile Gly Gly
            180                 185                 190

Thr Asn Lys Arg Ala Pro Gly Thr Pro Ala Arg Phe Ser Gly Ser Leu
        195                 200                 205

Leu Gly Gly Lys Ala Ala Leu Thr Leu Ser Gly Val Gln Pro Glu Asp
    210                 215                 220

Glu Ala Glu Tyr Tyr Cys Ala Leu Trp Tyr Ser Asn Leu Trp Val Phe
225                 230                 235                 240

Gly Gly Gly Thr Lys Leu Thr Val Leu
                245
```

<210> SEQ ID NO 18
<211> LENGTH: 102
<212> TYPE: PRT
<213> ORGANISM: Artificial Sequence
<220> FEATURE:
<223> OTHER INFORMATION: Synthetic Construct

<400> SEQUENCE: 18

```
Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80
```

```
Tyr Ile Cys Asn Val Asn His Lys Pro Ser Asn Thr Lys Val Asp Lys
                85                  90                  95

Lys Val Glu Pro Lys Ser
            100
```

<210> SEQ ID NO 19
<211> LENGTH: 106
<212> TYPE: PRT
<213> ORGANISM: Artificial Sequence
<220> FEATURE:
<223> OTHER INFORMATION: Synthetic Construct

<400> SEQUENCE: 19

```
Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu
            100                 105
```

<210> SEQ ID NO 20
<211> LENGTH: 6
<212> TYPE: PRT
<213> ORGANISM: Artificial Sequence
<220> FEATURE:
<223> OTHER INFORMATION: Synthetic Construct

<400> SEQUENCE: 20

```
Gly Gly Ser Gly Gly Ser
1               5
```

<210> SEQ ID NO 21
<211> LENGTH: 6
<212> TYPE: PRT
<213> ORGANISM: Artificial Sequence
<220> FEATURE:
<223> OTHER INFORMATION: Synthetic Construct

<400> SEQUENCE: 21

```
Ser Gly Gly Gly Gly Ser
1               5
```

<210> SEQ ID NO 22
<211> LENGTH: 12
<212> TYPE: PRT
<213> ORGANISM: Artificial Sequence
<220> FEATURE:
<223> OTHER INFORMATION: Synthetic Construct

<400> SEQUENCE: 22

```
Gly Arg Ala Gly Gly Gly Gly Ala Gly Gly Gly Gly
1               5                   10
```

<210> SEQ ID NO 23
<211> LENGTH: 483

```
<212> TYPE: PRT
<213> ORGANISM: Artificial Sequence
<220> FEATURE:
<223> OTHER INFORMATION: Synthetic Construct

<400> SEQUENCE: 23

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Leu Tyr Leu Gln Met Asn Ser Leu Arg Ala Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Met Val Thr Val Ser Ser Gly Gly Gly
        115                 120                 125

Gly Ser Gly Gly Gly Gly Ser Gly Gly Gly Ser Gln Ala Val Val
    130                 135                 140

Thr Gln Glu Pro Ser Leu Thr Val Ser Pro Gly Gly Thr Val Thr Leu
145                 150                 155                 160

Thr Cys Arg Ser Ser Thr Gly Ala Val Thr Thr Ser Asn Tyr Ala Asn
                165                 170                 175

Trp Val Gln Gln Lys Pro Gly Gln Ala Pro Arg Gly Leu Ile Gly Gly
            180                 185                 190

Thr Asn Lys Arg Ala Pro Gly Thr Pro Ala Arg Phe Ser Gly Ser Leu
        195                 200                 205

Leu Gly Gly Lys Ala Ala Leu Thr Leu Ser Gly Val Gln Pro Glu Asp
    210                 215                 220

Glu Ala Glu Tyr Tyr Cys Ala Leu Trp Tyr Ser Asn Leu Trp Val Phe
225                 230                 235                 240

Gly Gly Gly Thr Lys Leu Thr Val Leu Ser Gly Gly Gly Gly Ser Gln
                245                 250                 255

Val Gln Leu Val Gln Ser Gly Pro Glu Leu Ile Lys Pro Gly Gly Ser
            260                 265                 270

Val Lys Met Ser Cys Lys Ala Ser Gly Tyr Thr Phe Thr Ser Tyr Val
        275                 280                 285

Met His Trp Val Arg Gln Lys Pro Gly Gln Gly Leu Glu Trp Ile Gly
    290                 295                 300

Tyr Ile Asn Pro Tyr Asn Asp Gly Thr Lys Tyr Asn Glu Lys Phe Lys
305                 310                 315                 320

Gly Arg Ala Thr Leu Thr Ser Asp Lys Ser Ser Thr Ala Tyr Met
                325                 330                 335

Glu Leu Ser Ser Leu Arg Ser Glu Asp Ser Ala Val Tyr Tyr Cys Ala
            340                 345                 350

Arg Gly Thr Tyr Tyr Gly Ser Arg Val Phe Asp Tyr Trp Gly Gln
        355                 360                 365

Gly Thr Thr Val Thr Val Ser Ser Ala Ser Thr Lys Gly Pro Ser Val
    370                 375                 380
```

-continued

```
Phe Pro Leu Ala Pro Ser Ser Lys Ser Thr Ser Gly Gly Thr Ala Ala
385                 390                 395                 400

Leu Gly Cys Leu Val Lys Asp Tyr Phe Pro Glu Pro Val Thr Val Ser
            405                 410                 415

Trp Asn Ser Gly Ala Leu Thr Ser Gly Val His Thr Phe Pro Ala Val
        420                 425                 430

Leu Gln Ser Ser Gly Leu Tyr Ser Leu Ser Ser Val Val Thr Val Pro
            435                 440                 445

Ser Ser Ser Leu Gly Thr Gln Thr Tyr Ile Cys Asn Val Asn His Lys
        450                 455                 460

Pro Ser Asn Thr Lys Val Asp Lys Lys Val Glu Pro Lys Ser Cys Pro
465                 470                 475                 480

Pro Cys Ser

<210> SEQ ID NO 24
<211> LENGTH: 223
<212> TYPE: PRT
<213> ORGANISM: Artificial Sequence
<220> FEATURE:
<223> OTHER INFORMATION: Synthetic Construct

<400> SEQUENCE: 24

Asp Val Val Met Thr Gln Ser Pro Ser Ser Ile Pro Val Thr Leu Gly
1               5                   10                  15

Glu Ser Val Ser Ile Ser Cys Arg Ser Ser Lys Ser Leu Gln Asn Val
            20                  25                  30

Asn Gly Asn Thr Tyr Leu Tyr Trp Phe Gln Gln Arg Pro Gly Gln Ser
        35                  40                  45

Pro Gln Leu Leu Ile Tyr Arg Met Ser Asn Leu Asn Ser Gly Val Pro
    50                  55                  60

Asp Arg Phe Ser Gly Ser Gly Ser Gly Thr Asp Phe Thr Leu Arg Ile
65                  70                  75                  80

Ser Gly Val Glu Pro Glu Asp Val Gly Val Tyr Tyr Cys Met Gln His
                85                  90                  95

Leu Glu Tyr Pro Ile Thr Phe Gly Ala Gly Thr Lys Leu Glu Ile Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys Pro Pro Cys Ser
    210                 215                 220

<210> SEQ ID NO 25
<211> LENGTH: 19
<212> TYPE: PRT
<213> ORGANISM: Artificial Sequence
<220> FEATURE:
<223> OTHER INFORMATION: Synthetic Construct
```

<400> SEQUENCE: 25

Met Glu Trp Ser Trp Val Phe Leu Phe Phe Leu Ser Val Thr Thr Gly
1               5                   10                  15

Val His Ser

<210> SEQ ID NO 26
<211> LENGTH: 57
<212> TYPE: DNA
<213> ORGANISM: Artificial Sequence
<220> FEATURE:
<223> OTHER INFORMATION: Synthetic Construct

<400> SEQUENCE: 26
atggaatgga gctgggtctt tctcttcttc ctgtcagtaa cgactggtgt ccactcc    57

<210> SEQ ID NO 27
<211> LENGTH: 222
<212> TYPE: PRT
<213> ORGANISM: Artificial Sequence
<220> FEATURE:
<223> OTHER INFORMATION: Synthetic Construct

<400> SEQUENCE: 27

Asp Val Val Met Thr Gln Ser Pro Ser Ser Ile Pro Val Thr Leu Gly
1               5                   10                  15

Glu Ser Val Ser Ile Ser Cys Arg Ser Ser Lys Ser Leu Leu Asn Ser
                20                  25                  30

Asn Gly Asn Thr Tyr Leu Tyr Trp Phe Gln Gln Arg Pro Gly Gln Ser
            35                  40                  45

Pro Gln Leu Leu Ile Tyr Arg Met Ser Asn Leu Ala Ser Gly Val Pro
        50                  55                  60

Asp Arg Phe Ser Gly Ser Gly Ser Gly Thr Asp Phe Thr Leu Arg Ile
65                  70                  75                  80

Ser Gly Val Glu Pro Glu Asp Val Gly Val Tyr Tyr Cys Met Gln His
                85                  90                  95

Leu Glu Tyr Pro Leu Thr Phe Gly Ala Gly Thr Lys Leu Glu Ile Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys Pro Pro Cys
    210                 215                 220

<210> SEQ ID NO 28
<211> LENGTH: 493
<212> TYPE: PRT
<213> ORGANISM: Artificial Sequence
<220> FEATURE:
<223> OTHER INFORMATION: Synthetic Construct

```
<400> SEQUENCE: 28

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Leu Tyr Leu Gln Met Asn Ser Leu Arg Ala Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Met Val Thr Val Ser Ser Gly Gly Gly
        115                 120                 125

Gly Ser Gly Gly Gly Gly Ser Gly Gly Gly Gly Ser Gln Ala Val Val
    130                 135                 140

Thr Gln Glu Pro Ser Leu Thr Val Ser Pro Gly Gly Thr Val Thr Leu
145                 150                 155                 160

Thr Cys Arg Ser Ser Thr Gly Ala Val Thr Thr Ser Asn Tyr Ala Asn
                165                 170                 175

Trp Val Gln Gln Lys Pro Gly Gln Ala Pro Arg Gly Leu Ile Gly Gly
            180                 185                 190

Thr Asn Lys Arg Ala Pro Gly Thr Pro Ala Arg Phe Ser Gly Ser Leu
        195                 200                 205

Leu Gly Gly Lys Ala Ala Leu Thr Leu Ser Gly Val Gln Pro Glu Asp
    210                 215                 220

Glu Ala Glu Tyr Tyr Cys Ala Leu Trp Tyr Ser Asn Leu Trp Val Phe
225                 230                 235                 240

Gly Gly Gly Thr Lys Leu Thr Val Leu Gly Arg Ala Gly Gly Gly Gln
                245                 250                 255

Val Gln Leu Val Gln Ser Gly Pro Glu Leu Ile Lys Pro Gly Gly Ser
            260                 265                 270

Val Lys Met Ser Cys Lys Ala Ser Gly Tyr Thr Phe Thr Ser Tyr Val
        275                 280                 285

Met His Trp Val Arg Gln Lys Pro Gly Gln Gly Leu Glu Trp Ile Gly
    290                 295                 300

Tyr Ile Asn Pro Tyr Asn Asp Gly Thr Lys Tyr Asn Glu Lys Phe Lys
305                 310                 315                 320

Gly Arg Ala Thr Leu Thr Ser Asp Lys Ser Ser Thr Ala Tyr Met
                325                 330                 335

Glu Leu Ser Ser Leu Arg Ser Glu Asp Ser Ala Val Tyr Tyr Cys Ala
            340                 345                 350

Arg Gly Thr Tyr Tyr Tyr Gly Ser Arg Val Phe Asp Tyr Trp Gly Gln
        355                 360                 365

Gly Thr Thr Val Thr Val Ser Ser Ala Ser Thr Lys Gly Pro Ser Val
    370                 375                 380

Phe Pro Leu Ala Pro Ser Ser Lys Ser Thr Ser Gly Gly Thr Ala Ala
385                 390                 395                 400

Leu Gly Cys Leu Val Lys Asp Tyr Phe Pro Glu Pro Val Thr Val Ser
```

```
                    405                 410                 415
Trp Asn Ser Gly Ala Leu Thr Ser Gly Val His Thr Phe Pro Ala Val
            420                 425                 430

Leu Gln Ser Ser Gly Leu Tyr Ser Leu Ser Ser Val Val Thr Val Pro
        435                 440                 445

Ser Ser Ser Leu Gly Thr Gln Thr Tyr Ile Cys Asn Val Asn His Lys
    450                 455                 460

Pro Ser Asn Thr Lys Val Asp Lys Lys Val Glu Pro Lys Ser Cys Pro
465                 470                 475                 480

Pro Cys Gly Gly Gly Gly Ser His His His His His
                485                 490

<210> SEQ ID NO 29
<211> LENGTH: 672
<212> TYPE: DNA
<213> ORGANISM: Artificial Sequence
<220> FEATURE:
<223> OTHER INFORMATION: Synthetic Construct

<400> SEQUENCE: 29
gatgttgtga tgactcagtc tcccagcagc atcccgtga ccctgggcga gtctgtgtcc    60
atcagctgca gaagcagcaa gagcctgcag aacgtcaacg gcaacaccta cctgtactgg   120
ttccagcagc ggcctggcca gtctccccag ctgctgatct accggatgag caacctgaac   180
agcggcgtgc ccgatagatt ttctggctct ggcagcggca ccgacttcac cctgagaatc   240
tccggcgtgg aacccgagga cgtgggcgtg tactactgta tgcagcacct ggaatacccc   300
atcaccttcg gagccggcac caagctggag atcaaacgta cggtggctgc accatctgtc   360
ttcatcttcc cgccatctga tgagcagttg aaatctggaa ctgcctctgt tgtgtgcctg   420
ctgaataact tctatcccag agaggccaaa gtacagtgga aggtggataa cgccctccaa   480
tcgggtaact cccaggagag tgtcacagag caggacagca aggacagcac ctacagcctc   540
agcagcaccc tgacgctgag caaagcagac tacgagaaac acaaagtcta cgcctgcgaa   600
gtcacccatc agggcctgag ctcgcccgtc acaaagagct tcaacagggg agagtgtcca   660
ccgtgctcct ag                                                       672

<210> SEQ ID NO 30
<211> LENGTH: 1452
<212> TYPE: DNA
<213> ORGANISM: Artificial Sequence
<220> FEATURE:
<223> OTHER INFORMATION: Synthetic Construct

<400> SEQUENCE: 30
gaggtgcagc tggtggagtc tgggggaggc ttggtacagc ctgggggtc cctgagactc      60 tcctgtgcag cctctggatt cacctttaac acctacgcca tgaactgggt ccgccaggct    120
ccagggaagg gctggagtg gtcgcacgc ataagaagta aatataataa ttatgcaaca     180
tattatgccg attcagtgaa agaccggttc accatctcca gagacgattc caagaacacg    240
ctgtatctgc aaatgaacag cctgagagcc gaggacacgg ccgtatatta ctgtgtgaga    300
catgggaact cggtaatag ctacgtttcc tggtttgctt actggggcca agggacaatg     360
gtcaccgtct cttcaggtgg cggtggcagc ggcggtggtg gtccggtgg cggcggatct    420 caggctgtgg tgactcagga gccctcactg actgtgtccc caggagggac agtcactctc    480
acctgtcgct caagtactgg ggctgttaca actagtaact atgccaactg ggtccagcag   540
```

| | |
|---|---:|
| aaacctggac aagcacccag gggtctgatt ggtggtacca acaagcgagc tccaggtacc | 600 |
| cctgcccggt tctcaggctc cctccttggg ggcaaagctg ccctgacact gtcaggtgtg | 660 |
| cagcctgagg acgaggctga gtattactgc gctctatggt acagcaacct ctgggtgttc | 720 |
| ggcggaggga ccaagctgac cgtcctaagt ggcggtggag atctcaggt gcagctggtg | 780 |
| cagtctggcc ccgagctaat caagcctggc ggcagcgtga agatgagctg caaggcctcc | 840 |
| ggctacacct tcaccagcta cgtgatgcac tgggtgcgcc agaagcctgg acagggcctg | 900 |
| gaatggatcg gctacatcaa ccctacaac gatggcacca agtacaacga agttcaag | 960 |
| ggcagagcca ccctgaccag cgacaagagc agcagcaccg cctacatgga actgagcagc | 1020 |
| ctgcggagcg aggacagcgc cgtgtactat tgtgccagag gcacctacta ctacggcagc | 1080 |
| cgggtgttcg actactgggg acagggcacc acggtcaccg tctcctcagc tagcaccaag | 1140 |
| ggcccatccg tcttccccct ggcaccctcc tccaagagca cctctggggg cacagcggcc | 1200 |
| ctgggctgcc tggtcaagga ctacttcccc gaaccgtga cggtgtcgtg gaactcaggc | 1260 |
| gccctgacca gcggcgtgca caccttcccg gctgtcctac agtcctcagg actctactcc | 1320 |
| ctcagcagcg tggtgaccgt gccctccagc agcttgggca cccagaccta catctgcaac | 1380 |
| gtgaatcaca agcccagcaa caccaaggtg gacaagaaag ttgagcccaa atcttgtcca | 1440 |
| ccgtgctcat ag | 1452 |

<210> SEQ ID NO 31
<211> LENGTH: 669
<212> TYPE: DNA
<213> ORGANISM: Artificial Sequence
<220> FEATURE:
<223> OTHER INFORMATION: Synthetic Construct

<400> SEQUENCE: 31

| | |
|---|---:|
| gatgttgtga tgactcagtc tcccagcagc atccccgtga ccctgggcga gtctgtgtcc | 60 |
| atcagctgca gaagcagcaa gagcctgctg aacagcaacg gcaacaccta cctgtactgg | 120 |
| ttccagcagc ggcctggcca gtctccccag ctgctgatct accggatgag caacctggcc | 180 |
| agcggcgtgc ccgatagatt ttctggctct ggcagcggca ccgacttcac cctgagaatc | 240 |
| tccggcgtgg aacccgagga cgtgggcgtg tactactgta tgcagcacct ggaataccc | 300 |
| ctgaccttcg gagccggcac caagctggag atcaaacgta cggtggctgc accatctgtc | 360 |
| ttcatcttcc cgccatctga tgagcagttg aaatctggaa ctgcctctgt tgtgtgcctg | 420 |
| ctgaataact tctatcccag agaggccaaa gtacagtgga aggtggataa cgccctccaa | 480 |
| tcgggtaact cccaggagag tgtcacagag caggacagca aggacagcac ctacagcctc | 540 |
| agcagcaccc tgacgctgag caaagcagac tacgagaaac acaaagtcta cgcctgcgaa | 600 |
| gtcacccatc agggcctgag ctcgcccgtc acaaagagct tcaacagggg agagtgtcca | 660 |
| ccgtgctag | 669 |

<210> SEQ ID NO 32
<211> LENGTH: 1482
<212> TYPE: DNA
<213> ORGANISM: Artificial Sequence
<220> FEATURE:
<223> OTHER INFORMATION: Synthetic Construct

<400> SEQUENCE: 32

| | |
|---|---:|
| gaggtgcagc tggtggagtc tgggggaggc ttggtacagc ctggggggtc cctgagactc | 60 |
| tcctgtgcag cctctggatt cacctttaac acctacgcca tgaactgggt ccgccaggct | 120 |

```
ccagggaagg ggctggagtg ggtcgcacgc ataagaagta aatataataa ttatgcaaca      180
tattatgccg attcagtgaa agaccggttc accatctcca gagacgattc caagaacacg      240
ctgtatctgc aaatgaacag cctgagagcc gaggacacgg ccgtatatta ctgtgtgaga      300
catgggaact tcggtaatag ctacgtttcc tggtttgctt actggggcca agggacaatg      360
gtcaccgtct cttcaggtgg cggtggcagc ggcggtggtg gtccggtgg cggcggatct       420 caggctgtgt tgactcagga gccctcactg actgtgtccc caggagggac agtcactctc       480
acctgtcgct caagtactgg ggctgttaca actagtaact atgccaactg gtccagcag        540 aaacctggac aagcacccag gggtctgatt ggtggtacca caagcgagc tccaggtacc        600 cctgcccggt tctcaggctc cctccttggg ggcaaagctg ccctgacact gtcaggtgtg       660
cagcctgagg acgaggctga gtattactgc gctctatggt acagcaacct ctgggtgttc       720
ggcggaggga ccaagctgac cgtcctaggg cgcgccggcg gtggacaggt gcagctggtg       780
cagtctggcc ccgagctaat caagcctggc ggcagcgtga agatgagctg caaggcctcc       840
ggctacacct tcaccagcta cgtgatgcac tgggtgcgcc agaagcctgg acagggcctg       900
gaatggatcg gctacatcaa cccctacaac gatggcacca agtacaacga gaagttcaag       960
ggcagagcca ccctgaccag cgacaagagc agcagcaccg cctacatgga actgagcagc      1020
ctgcggagcg aggacagcgc cgtgtactat tgtgccagag gcacctacta ctacggcagc      1080
cgggtgttcg actactgggg acagggcacc acggtcaccg tctcctcagc tagcaccaag      1140
ggcccatccg tcttcccccct ggcaccctcc tccaagagca cctctggggg cacagcggcc      1200
ctgggctgcc tggtcaagga ctacttcccc gaaccggtga cggtgtcgtg gaactcaggc      1260
gccctgacca gcggcgtgca caccttcccg gctgtcctac agtcctcagg actctactcc      1320
ctcagcagcg tggtgaccgt gccctccagc agcttgggca cccagaccta catctgcaac      1380
gtgaatcaca agcccagcaa caccaaggtg gacaagagag ttgagcccaa atcttgtcca      1440
ccgtgcggtg gcgggggctc ccatcatcat catcatcatt ag                        1482
```

<210> SEQ ID NO 33
<211> LENGTH: 6
<212> TYPE: PRT
<213> ORGANISM: Artificial Sequence
<220> FEATURE:
<223> OTHER INFORMATION: Synthetic Construct

<400> SEQUENCE: 33

Gly Arg Ala Gly Gly Gly
1               5

<210> SEQ ID NO 34
<211> LENGTH: 6
<212> TYPE: PRT
<213> ORGANISM: Artificial Sequence
<220> FEATURE:
<223> OTHER INFORMATION: Synthetic Construct

<400> SEQUENCE: 34

Pro Leu Gly Leu Ala Gly
1               5

<210> SEQ ID NO 35
<211> LENGTH: 499
<212> TYPE: PRT
<213> ORGANISM: Artificial Sequence
<220> FEATURE:

<223> OTHER INFORMATION: Synthetic Construct

<400> SEQUENCE: 35

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Leu Tyr Leu Gln Met Asn Ser Leu Arg Ala Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Met Val Thr Val Ser Ser Gly Gly Gly
        115                 120                 125

Gly Ser Gly Gly Gly Gly Ser Gly Gly Gly Gly Ser Gln Ala Val Val
    130                 135                 140

Thr Gln Glu Pro Ser Leu Thr Val Ser Pro Gly Gly Thr Val Thr Leu
145                 150                 155                 160

Thr Cys Arg Ser Ser Thr Gly Ala Val Thr Thr Ser Asn Tyr Ala Asn
                165                 170                 175

Trp Val Gln Gln Lys Pro Gly Gln Ala Pro Arg Gly Leu Ile Gly Gly
            180                 185                 190

Thr Asn Lys Arg Ala Pro Gly Thr Pro Ala Arg Phe Ser Gly Ser Leu
        195                 200                 205

Leu Gly Gly Lys Ala Ala Leu Thr Leu Ser Gly Val Gln Pro Glu Asp
    210                 215                 220

Glu Ala Glu Tyr Tyr Cys Ala Leu Trp Tyr Ser Asn Leu Trp Val Phe
225                 230                 235                 240

Gly Gly Gly Thr Lys Leu Thr Val Leu Gly Arg Ala Gly Gly Gly Gly
                245                 250                 255

Ala Gly Gly Gly Gly Gln Val Gln Leu Val Gln Ser Gly Pro Glu Leu
            260                 265                 270

Ile Lys Pro Gly Gly Ser Val Lys Met Ser Cys Lys Ala Ser Gly Tyr
        275                 280                 285

Thr Phe Thr Ser Tyr Val Met His Trp Val Arg Gln Lys Pro Gly Gln
    290                 295                 300

Gly Leu Glu Trp Ile Gly Tyr Ile Asn Pro Tyr Asn Asp Gly Thr Lys
305                 310                 315                 320

Tyr Asn Glu Lys Phe Lys Gly Arg Ala Thr Leu Thr Ser Asp Lys Ser
                325                 330                 335

Ser Ser Thr Ala Tyr Met Glu Leu Ser Ser Leu Arg Ser Glu Asp Ser
            340                 345                 350

Ala Val Tyr Tyr Cys Ala Arg Gly Thr Tyr Tyr Gly Ser Arg Val
        355                 360                 365

Phe Asp Tyr Trp Gly Gln Gly Thr Thr Val Thr Val Ser Ser Ala Ser
    370                 375                 380

Thr Lys Gly Pro Ser Val Phe Pro Leu Ala Pro Ser Ser Lys Ser Thr
385                 390                 395                 400
```

| | | | | | | | | | | | |
|---|---|---|---|---|---|---|---|---|---|---|---|
|Ser|Gly|Gly|Thr|Ala|Ala|Leu|Gly|Cys|Leu|Val|Lys|Asp|Tyr|Phe|Pro|
| | | | |405| | | |410| | | |415| | | |

Ser Gly Gly Thr Ala Ala Leu Gly Cys Leu Val Lys Asp Tyr Phe Pro
                405                 410                 415

Glu Pro Val Thr Val Ser Trp Asn Ser Gly Ala Leu Thr Ser Gly Val
            420                 425                 430

His Thr Phe Pro Ala Val Leu Gln Ser Ser Gly Leu Tyr Ser Leu Ser
        435                 440                 445

Ser Val Val Thr Val Pro Ser Ser Ser Leu Gly Thr Gln Thr Tyr Ile
    450                 455                 460

Cys Asn Val Asn His Lys Pro Ser Asn Thr Lys Val Asp Lys Arg Val
465                 470                 475                 480

Glu Pro Lys Ser Cys Pro Pro Cys Gly Gly Gly Ser His His His
                485                 490                 495

His His His

<210> SEQ ID NO 36
<211> LENGTH: 1500
<212> TYPE: DNA
<213> ORGANISM: Artificial Sequence
<220> FEATURE:
<223> OTHER INFORMATION: Synthetic Construct

<400> SEQUENCE: 36

```
gaggtgcagc tggtggagtc tgggggaggc ttggtacagc ctgggggtc cctgagactc      60
tcctgtgcag cctctggatt cacctttaac acctacgcca tgaactgggt ccgccaggct     120
ccagggaagg ggctggagtg ggtcgcacgc ataagaagta aatataataa ttatgcaaca     180
tattatgccg attcagtgaa agaccggttc accatctcca gagacgattc aagaacacg     240
ctgtatctgc aaatgaacag cctgagagcc gaggacacgg ccgtatatta ctgtgtgaga     300
catgggaact tcggtaatag ctacgtttcc tggtttgctt actggggcca agggacaatg     360
gtcaccgtct cttcaggtgg cggtggcagc ggcggtggtg gtccggtgg cggcggatct     420
caggctgtgt tgactcagga gccctcactg actgtgtccc caggaggac agtcactctc     480
acctgtcgct caagtactgg ggctgttaca actagtaact atgccaactg gtccagcag     540
aaacctggac aagcacccag gggtctgatt ggtggtacca caagcgagc tccaggtacc     600
cctgcccggt tctcaggctc cctccttggg ggcaaagctg ccctgacact gtcaggtgtg     660
cagcctgagg acgaggctga gtattactgc gctctatggt acagcaacct ctgggtgttc     720
ggcggaggga ccaagctgac cgtcctaggg cgcgccggcg gaggtggtgc aggaggcggt     780
ggacaggtgc agctggtgca gtctggcccc gagctaatca agcctggcgg cagcgtgaag     840
atgagctgca aggcctccgg ctacaccttc accagctacg tgatgcactg ggtgcgccag     900
aagcctggac agggcctgga atggatcggc tacatcaacc cctacaacga tggcaccaag     960
tacaacgaga agttcaaggg cagagccacc ctgaccagcg acaagagcag cagcaccgcc    1020
tacatggaac tgagcagcct gcggagcgag gacagcgccg tgtactattg ccagagggc     1080
acctactact acggcagccg ggtgttcgac tactggggac agggcaccac ggtcaccgtc    1140
tcctcagcta gcaccaaggg cccatccgtc ttccccctgg caccctcctc caagagcacc    1200
tctgggggca gcggccct gggctgcctg gtcaaggact acttccccga accggtgacg     1260
gtgtcgtgga actcaggcgc cctgaccagc ggcgtgcaca ccttcccggc tgtcctacag    1320
tcctcaggac tctactccct cagcagcgtg gtgaccgtgc cctccagcag cttgggcacc    1380
cagacctaca tctgcaacgt gaatcacaag cccagcaaca ccaaggtgga caagagagtt    1440
gagcccaaat cttgtccacc gtgcggtggc gggggctccc atcatcatca tcatcattag    1500
```

<210> SEQ ID NO 37
<211> LENGTH: 16
<212> TYPE: PRT
<213> ORGANISM: Artificial Sequence
<220> FEATURE:
<223> OTHER INFORMATION: Synthetic Construct

<400> SEQUENCE: 37

Arg Ser Ser Lys Ser Leu Leu Asn Ser Asn Gly Asn Thr Tyr Leu Tyr
1               5                   10                  15

<210> SEQ ID NO 38
<211> LENGTH: 7
<212> TYPE: PRT
<213> ORGANISM: Artificial Sequence
<220> FEATURE:
<223> OTHER INFORMATION: Synthetic Construct

<400> SEQUENCE: 38

Arg Met Ser Asn Leu Ala Ser
1               5

<210> SEQ ID NO 39
<211> LENGTH: 9
<212> TYPE: PRT
<213> ORGANISM: Artificial Sequence
<220> FEATURE:
<223> OTHER INFORMATION: Synthetic Construct

<400> SEQUENCE: 39

Met Gln His Leu Glu Tyr Pro Leu Thr
1               5

<210> SEQ ID NO 40
<211> LENGTH: 112
<212> TYPE: PRT
<213> ORGANISM: Artificial Sequence
<220> FEATURE:
<223> OTHER INFORMATION: Synthetic Construct

<400> SEQUENCE: 40

Asp Val Val Met Thr Gln Ser Pro Ser Ser Ile Pro Val Thr Leu Gly
1               5                   10                  15

Glu Ser Val Ser Ile Ser Cys Arg Ser Ser Lys Ser Leu Leu Asn Ser
            20                  25                  30

Asn Gly Asn Thr Tyr Leu Tyr Trp Phe Gln Gln Arg Pro Gly Gln Ser
        35                  40                  45

Pro Gln Leu Leu Ile Tyr Arg Met Ser Asn Leu Ala Ser Gly Val Pro
    50                  55                  60

Asp Arg Phe Ser Gly Ser Gly Ser Gly Thr Asp Phe Thr Leu Arg Ile
65                  70                  75                  80

Ser Gly Val Glu Pro Glu Asp Val Gly Val Tyr Tyr Cys Met Gln His
                85                  90                  95

Leu Glu Tyr Pro Leu Thr Phe Gly Ala Gly Thr Lys Leu Glu Ile Lys
            100                 105                 110

<210> SEQ ID NO 41
<211> LENGTH: 1
<212> TYPE: PRT
<213> ORGANISM: Artificial Sequence
<220> FEATURE:
<223> OTHER INFORMATION: Synthetic Construct
<220> FEATURE:

<221> NAME/KEY: VARIANT
<222> LOCATION: 1
<223> OTHER INFORMATION: Can be present in repeats of at least one or
      more

<400> SEQUENCE: 41

Gly
1

<210> SEQ ID NO 42
<211> LENGTH: 2
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: (1)..(2)
<223> OTHER INFORMATION: Can be present in repeats of at least one or
      more

<400> SEQUENCE: 42

Gly Ser
1

<210> SEQ ID NO 43
<211> LENGTH: 5
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: (1)..(5)
<223> OTHER INFORMATION: Can be present in repeats of at least one or
      more

<400> SEQUENCE: 43

Gly Ser Gly Gly Ser
1               5

<210> SEQ ID NO 44
<211> LENGTH: 4
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: (1)..(4)
<223> OTHER INFORMATION: Can be present in repeats of at least one or
      more

<400> SEQUENCE: 44

Gly Gly Gly Ser
1

<210> SEQ ID NO 45
<211> LENGTH: 5
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: (1)..(5)
<223> OTHER INFORMATION: Can be present in repeats of at least one or
      more

<400> SEQUENCE: 45

Gly Gly Gly Gly Ser
1               5

<210> SEQ ID NO 46
<211> LENGTH: 2
<212> TYPE: PRT
<213> ORGANISM: Artificial Sequence
<220> FEATURE:
<223> OTHER INFORMATION: Synthetic Construct

<400> SEQUENCE: 46

Gly Gly
1

<210> SEQ ID NO 47
<211> LENGTH: 4
<212> TYPE: PRT
<213> ORGANISM: Artificial Sequence
<220> FEATURE:
<223> OTHER INFORMATION: Synthetic Construct

<400> SEQUENCE: 47

Gly Gly Ser Gly
1

<210> SEQ ID NO 48
<211> LENGTH: 5
<212> TYPE: PRT
<213> ORGANISM: Artificial Sequence
<220> FEATURE:
<223> OTHER INFORMATION: Synthetic Construct

<400> SEQUENCE: 48

Gly Gly Ser Gly Gly
1               5

<210> SEQ ID NO 49
<211> LENGTH: 5
<212> TYPE: PRT
<213> ORGANISM: Artificial Sequence
<220> FEATURE:
<223> OTHER INFORMATION: Synthetic Construct

<400> SEQUENCE: 49

Gly Ser Gly Ser Gly
1               5

<210> SEQ ID NO 50
<211> LENGTH: 5
<212> TYPE: PRT
<213> ORGANISM: Artificial Sequence
<220> FEATURE:
<223> OTHER INFORMATION: Synthetic Construct

<400> SEQUENCE: 50

Gly Ser Gly Gly Gly
1               5

<210> SEQ ID NO 51
<211> LENGTH: 5
<212> TYPE: PRT
<213> ORGANISM: Artificial Sequence
<220> FEATURE:
<223> OTHER INFORMATION: Synthetic Construct

<400> SEQUENCE: 51

Gly Gly Gly Ser Gly

```
1               5
```

<210> SEQ ID NO 52
<211> LENGTH: 5
<212> TYPE: PRT
<213> ORGANISM: Artificial Sequence
<220> FEATURE:
<223> OTHER INFORMATION: Synthetic Construct

<400> SEQUENCE: 52

```
Gly Ser Ser Ser Gly
1               5
```

<210> SEQ ID NO 53
<211> LENGTH: 15
<212> TYPE: PRT
<213> ORGANISM: Artificial Sequence
<220> FEATURE:
<223> OTHER INFORMATION: Synthetic Construct

<400> SEQUENCE: 53

```
Gly Gly Gly Gly Ser Gly Gly Gly Gly Ser Gly Gly Gly Gly Ser
1               5                   10                  15
```

<210> SEQ ID NO 54
<211> LENGTH: 5
<212> TYPE: PRT
<213> ORGANISM: Artificial Sequence
<220> FEATURE:
<223> OTHER INFORMATION: Synthetic Construct

<400> SEQUENCE: 54

```
Gly Gly Gly Gly Ser
1               5
```

<210> SEQ ID NO 55
<211> LENGTH: 4
<212> TYPE: PRT
<213> ORGANISM: Artificial Sequence
<220> FEATURE:
<223> OTHER INFORMATION: Synthetic Construct

<400> SEQUENCE: 55

```
Cys Pro Pro Cys
1
```

<210> SEQ ID NO 56
<211> LENGTH: 5
<212> TYPE: PRT
<213> ORGANISM: Artificial Sequence
<220> FEATURE:
<223> OTHER INFORMATION: Synthetic Construct

<400> SEQUENCE: 56

```
Cys Pro Pro Cys Ser
1               5
```

<210> SEQ ID NO 57
<211> LENGTH: 6
<212> TYPE: PRT
<213> ORGANISM: Artificial Sequence
<220> FEATURE:
<223> OTHER INFORMATION: Synthetic Construct

<400> SEQUENCE: 57

```
His His His His His His
1               5
```

<210> SEQ ID NO 58
<211> LENGTH: 482
<212> TYPE: PRT
<213> ORGANISM: Artificial Sequence
<220> FEATURE:
<223> OTHER INFORMATION: Synthetic Construct

<400> SEQUENCE: 58

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Leu Tyr Leu Gln Met Asn Ser Leu Arg Ala Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Met Val Thr Val Ser Ser Gly Gly Gly
        115                 120                 125

Gly Ser Gly Gly Gly Gly Ser Gly Gly Gly Gly Ser Gln Ala Val Val
    130                 135                 140

Thr Gln Glu Pro Ser Leu Thr Val Ser Pro Gly Gly Thr Val Thr Leu
145                 150                 155                 160

Thr Cys Arg Ser Ser Thr Gly Ala Val Thr Thr Ser Asn Tyr Ala Asn
                165                 170                 175

Trp Val Gln Gln Lys Pro Gly Gln Ala Pro Arg Gly Leu Ile Gly Gly
            180                 185                 190

Thr Asn Lys Arg Ala Pro Gly Thr Pro Ala Arg Phe Ser Gly Ser Leu
        195                 200                 205

Leu Gly Gly Lys Ala Ala Leu Thr Leu Ser Gly Val Gln Pro Glu Asp
    210                 215                 220

Glu Ala Glu Tyr Tyr Cys Ala Leu Trp Tyr Ser Asn Leu Trp Val Phe
225                 230                 235                 240

Gly Gly Gly Thr Lys Leu Thr Val Leu Gly Arg Ala Gly Gly Gly Gln
                245                 250                 255

Val Gln Leu Val Gln Ser Gly Pro Glu Leu Ile Lys Pro Gly Gly Ser
            260                 265                 270

Val Lys Met Ser Cys Lys Ala Ser Gly Tyr Thr Phe Thr Ser Tyr Val
        275                 280                 285

Met His Trp Val Arg Gln Lys Pro Gly Gln Gly Leu Glu Trp Ile Gly
    290                 295                 300

Tyr Ile Asn Pro Tyr Asn Asp Gly Thr Lys Tyr Asn Glu Lys Phe Lys
305                 310                 315                 320

Gly Arg Ala Thr Leu Thr Ser Asp Lys Ser Ser Thr Ala Tyr Met
                325                 330                 335

Glu Leu Ser Ser Leu Arg Ser Glu Asp Ser Ala Val Tyr Tyr Cys Ala
            340                 345                 350

Arg Gly Thr Tyr Tyr Gly Ser Arg Val Phe Asp Tyr Trp Gly Gln
        355                 360                 365
```

-continued

```
Gly Thr Thr Val Thr Val Ser Ser Ala Ser Lys Gly Pro Ser Val
    370                 375                 380

Phe Pro Leu Ala Pro Ser Ser Lys Ser Thr Ser Gly Gly Thr Ala Ala
385                 390                 395                 400

Leu Gly Cys Leu Val Lys Asp Tyr Phe Pro Glu Pro Val Thr Val Ser
                405                 410                 415

Trp Asn Ser Gly Ala Leu Thr Ser Gly Val His Thr Phe Pro Ala Val
                420                 425                 430

Leu Gln Ser Ser Gly Leu Tyr Ser Leu Ser Ser Val Val Thr Val Pro
            435                 440                 445

Ser Ser Ser Leu Gly Thr Gln Thr Tyr Ile Cys Asn Val Asn His Lys
        450                 455                 460

Pro Ser Asn Thr Lys Val Asp Lys Lys Val Glu Pro Lys Ser Cys Pro
465                 470                 475                 480

Pro Cys

<210> SEQ ID NO 59
<211> LENGTH: 488
<212> TYPE: PRT
<213> ORGANISM: Artificial Sequence
<220> FEATURE:
<223> OTHER INFORMATION: Synthetic Construct

<400> SEQUENCE: 59

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Ala Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Leu Tyr Leu Gln Met Asn Ser Leu Arg Ala Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Met Val Thr Val Ser Ser Gly Gly Gly
        115                 120                 125

Gly Ser Gly Gly Gly Gly Ser Gly Gly Gly Gly Ser Gln Ala Val Val
    130                 135                 140

Thr Gln Glu Pro Ser Leu Thr Val Ser Pro Gly Gly Thr Val Thr Leu
145                 150                 155                 160

Thr Cys Arg Ser Ser Thr Gly Ala Val Thr Thr Ser Asn Tyr Ala Asn
                165                 170                 175

Trp Val Gln Gln Lys Pro Gly Gln Ala Pro Arg Gly Leu Ile Gly Gly
            180                 185                 190

Thr Asn Lys Arg Ala Pro Gly Thr Pro Ala Arg Phe Ser Gly Ser Leu
        195                 200                 205

Leu Gly Gly Lys Ala Ala Leu Thr Leu Ser Gly Val Gln Pro Glu Asp
    210                 215                 220

Glu Ala Glu Tyr Tyr Cys Ala Leu Trp Tyr Ser Asn Leu Trp Val Phe
225                 230                 235                 240
```

Gly Gly Gly Thr Lys Leu Thr Val Leu Gly Arg Ala Gly Gly Gly
            245                 250                 255

Ala Gly Gly Gly Gln Val Gln Leu Val Gln Ser Gly Pro Glu Leu
            260                 265                 270

Ile Lys Pro Gly Gly Ser Val Lys Met Ser Cys Lys Ala Ser Gly Tyr
            275                 280                 285

Thr Phe Thr Ser Tyr Val Met His Trp Val Arg Gln Lys Pro Gly Gln
            290                 295                 300

Gly Leu Glu Trp Ile Gly Tyr Ile Asn Pro Tyr Asn Asp Gly Thr Lys
305                 310                 315                 320

Tyr Asn Glu Lys Phe Lys Gly Arg Ala Thr Leu Thr Ser Asp Lys Ser
                325                 330                 335

Ser Ser Thr Ala Tyr Met Glu Leu Ser Ser Leu Arg Ser Glu Asp Ser
            340                 345                 350

Ala Val Tyr Tyr Cys Ala Arg Gly Thr Tyr Tyr Gly Ser Arg Val
            355                 360                 365

Phe Asp Tyr Trp Gly Gln Gly Thr Thr Val Thr Val Ser Ser Ala Ser
    370                 375                 380

Thr Lys Gly Pro Ser Val Phe Pro Leu Ala Pro Ser Ser Lys Ser Thr
385                 390                 395                 400

Ser Gly Gly Thr Ala Ala Leu Gly Cys Leu Val Lys Asp Tyr Phe Pro
            405                 410                 415

Glu Pro Val Thr Val Ser Trp Asn Ser Gly Ala Leu Thr Ser Gly Val
            420                 425                 430

His Thr Phe Pro Ala Val Leu Gln Ser Ser Gly Leu Tyr Ser Leu Ser
            435                 440                 445

Ser Val Val Thr Val Pro Ser Ser Ser Leu Gly Thr Gln Thr Tyr Ile
    450                 455                 460

Cys Asn Val Asn His Lys Pro Ser Asn Thr Lys Val Asp Lys Arg Val
465                 470                 475                 480

Glu Pro Lys Ser Cys Pro Pro Cys
            485

<210> SEQ ID NO 60
<211> LENGTH: 1449
<212> TYPE: DNA
<213> ORGANISM: Artificial Sequence
<220> FEATURE:
<223> OTHER INFORMATION: Synthetic Construct

<400> SEQUENCE: 60
gaggtgcagc tggtggagtc tgggggaggc ttggtacagc ctggggggtc cctgagactc      60
tcctgtgcag cctctggatt cacctttaac acctacgcca tgaactgggt ccgccaggct     120
ccagggaagg ggctggagtg ggtcgcacgc ataagaagta aatataataa ttatgcaaca     180
tattatgccg attcagtgaa agaccggttc accatctcca gagacgattc aagaacacg      240 ctgtatctgc aaatgaacag cctgagagcc gaggacacgg ccgtatatta ctgtgtgaga     300
catgggaact tcggtaatag ctacgtttcc tggtttgctt actggggcca agggacaatg     360
gtcaccgtct cttcaggtgg cggtggcagc ggcggtggtg gtccggtgg cggcggatct     420 caggctgtgg tgactcagga gccctcactg actgtgtccc aggagggac agtcactctc     480 acctgtcgct caagtactgg ggctgttaca actagtaact atgccaactg ggtccagcag     540
aaacctggac aagcacccag gggtctgatt ggtggtacca caagcgagc tccaggtacc     600 cctgcccggt tctcaggctc cctccttggg ggcaaagctg ccctgacact gtcaggtgtg     660

```
cagcctgagg acgaggctga gtattactgc gctctatggt acagcaacct ctgggtgttc      720
ggcggaggga ccaagctgac cgtcctaggg cgcgccggcg gtggacaggt gcagctggtg      780
cagtctggcc ccgagctaat caagcctggc ggcagcgtga agatgagctg caaggcctcc      840
ggctacacct tcaccagcta cgtgatgcac tgggtgcgcc agaagcctgg acagggcctg      900
gaatggatcg gctacatcaa cccctacaac gatggcacca agtacaacga aagttcaag      960 ggcagagcca ccctgaccag cgacaagagc agcagcaccg cctacatgga actgagcagc     1020
ctgcggagcg aggacagcgc cgtgtactat tgtgccagag caccctacta ctacggcagc     1080
cgggtgttcg actactgggg acagggcacc acggtcaccg tctcctcagc tagcaccaag     1140
ggcccatccg tcttcccccct ggcaccctcc tccaagagca cctctggggg cacagcggcc     1200
ctgggctgcc tggtcaagga ctacttcccc gaaccggtga cggtgtcgtg aactcaggc     1260 gccctgacca gcggcgtgca caccttcccg gctgtcctac agtcctcagg actctactcc     1320
ctcagcagcg tggtgaccgt gccctccagc agcttgggca cccagaccta catctgcaac     1380
gtgaatcaca agcccagcaa caccaaggtg gacaagagag ttgagcccaa atcttgtcca     1440
ccgtgctag                                                              1449

<210> SEQ ID NO 61
<211> LENGTH: 1467
<212> TYPE: DNA
<213> ORGANISM: Artificial Sequence
<220> FEATURE:
<223> OTHER INFORMATION: Synthetic Construct

<400> SEQUENCE: 61
gaggtgcagc tggtggagtc tgggggaggc ttggtacagc ctgggggtc cctgagactc       60 tcctgtgcag cctctggatt caccttttaac acctacgcca tgaactgggt ccgccaggct     120
ccagggaagg gctggagtg gtcgcacgc ataagaagta aatataataa ttatgcaaca        180
tattatgccg attcagtgaa agaccggttc accatctcca gagacgattc caagaacacg      240
ctgtatctgc aaatgaacag cctgagagcc gaggacacgg ccgtatatta ctgtgtgaga      300
catgggaact tcggtaatag ctacgtttcc tggtttgctt actggggcca agggacaatg      360
gtcaccgtct cttcaggtgg cggtggcagc ggcggtggtg gtccggtgg cggcggatct      420 caggctgtgg tgactcagga gccctcactg actgtgtccc caggagggac agtcactctc      480
acctgtcgct caagtactgg ggctgttaca actagtaact atgccaactg gtccagcag      540 aaacctggac aagcacccag gggtctgatt ggtggtacca caagcgagc tccaggtacc      600 cctgcccggt tctcaggctc cctccttggg ggcaaagctg ccctgacact gtcaggtgtg      660
cagcctgagg acgaggctga gtattactgc gctctatggt acagcaacct ctgggtgttc      720
ggcggaggga ccaagctgac cgtcctaggg cgcgccggcg gaggtggtgc aggaggcggt      780
ggacaggtgc agctggtgca gtctggcccc gagctaatca agcctggcgg cagcgtgaag      840
atgagctgca aggcctccgg ctacaccttc accagctacg tgatgcactg ggtgcgccag      900
aagcctggac agggcctgga atggatcggc tacatcaacc cctacaacga tggcaccaag      960
tacaacgaga agttcaaggg cagagccacc ctgaccagca caagagcag cagcaccgcc     1020 tacatggaac tgagcagcct gcggagcgag gacagcgccg tgtactattg tgccagaggc     1080
acctactact acggcagccg ggtgttcgac tactggggac agggcaccac ggtcaccgtc     1140
tcctcagcta gcaccaaggg cccatccgtc ttccccctgg cacctcctc caagagcacc     1200
```

-continued

```
tctgggggca cagcggccct gggctgcctg gtcaaggact acttccccga accggtgacg    1260
gtgtcgtgga actcaggcgc cctgaccagc ggcgtgcaca ccttcccggc tgtcctacag    1320
tcctcaggac tctactccct cagcagcgtg gtgaccgtgc cctccagcag cttgggcacc    1380
cagacctaca tctgcaacgt gaatcacaag cccagcaaca ccaaggtgga caagagagtt    1440
gagcccaaat cttgtccacc gtgctag                                        1467
```